US012282457B2

United States Patent
Williams et al.

(10) Patent No.: US 12,282,457 B2
(45) Date of Patent: Apr. 22, 2025

(54) MULTI-SERVICE BUSINESS PLATFORM SYSTEM HAVING CUSTOM WORKFLOW ACTIONS SYSTEMS AND METHODS

(71) Applicant: HUBSPOT, INC., Cambridge, MA (US)

(72) Inventors: Jared Williams, Somerville, MA (US); Timothy Hennekey, Fairport, NY (US); Jonathan Meharry, Cambridge, MA (US); Scott Judson, Dallas, TX (US); Andrew Pitre, Cambridge, MA (US); Kevin Walsh, Cambridge, MA (US); Sophie Higgs, Cambridge, MA (US); Jesse Tremblay, Arlington, MA (US)

(73) Assignee: HubSpot, Inc., Cambridge, MA (US)

( * ) Notice: Subject to any disclaimer, the term of this patent is extended or adjusted under 35 U.S.C. 154(b) by 0 days.

(21) Appl. No.: 18/428,305

(22) Filed: Jan. 31, 2024

(65) Prior Publication Data

US 2024/0281410 A1    Aug. 22, 2024

Related U.S. Application Data

(60) Continuation-in-part of application No. 18/196,672, filed on May 12, 2023, and a continuation-in-part of application No. 17/660,085, filed on Apr. 21, 2022, and a continuation-in-part of application No. 17/654,544, filed on Mar. 11, 2022, and a continuation-in-part of application No. 17/655,320, filed on Mar. 17, 2022, which is a continuation of application No. 17/448,228, filed on Sep. 21, 2021,
(Continued)

(51) Int. Cl.
  *G06F 16/16*   (2019.01)
  *G06F 16/11*   (2019.01)
  *G06F 16/28*   (2019.01)

(52) U.S. Cl.
  CPC .......... *G06F 16/164* (2019.01); *G06F 16/122* (2019.01); *G06F 16/284* (2019.01)

(58) Field of Classification Search
  None
  See application file for complete search history.

(56) References Cited

U.S. PATENT DOCUMENTS

2011/0179114 A1 * 7/2011 Dilip .................... G06F 16/9535
                                                 709/204
2012/0041903 A1 * 2/2012 Beilby .................... H04L 51/02
                                                 706/11

(Continued)

*Primary Examiner* — Tarek Chbouki
*Assistant Examiner* — Loan T Nguyen
(74) *Attorney, Agent, or Firm* — Cooper Legal Group, LLC

(57) ABSTRACT

Techniques are provided for an automated crawler for crawling a primary online content object and storing a set of results, a parser for parsing the stored set of results to generate a plurality of key phrases and a content corpus, a plurality of models for processing at least one of the plurality of key phrases or the content corpus, wherein the processing results in a plurality of topic clusters which arrange topics within the primary online content object around a core topic based on semantic similarity, a suggestion generator for generating a suggested topic that is similar to at least one topic among the plurality of topic clusters and for storing the suggested topic, and an application for developing a strategy for development of online presence content.

20 Claims, 57 Drawing Sheets

Related U.S. Application Data application No. 18/428,305 is a continuation-in-part of application No. 18/217,594, filed on Jul. 2, 2023, which is a continuation of application No. 17/882,950, filed on Aug. 8, 2022, now Pat. No. 11,727,287, which is a continuation of application No. 16/716,688, filed on Dec. 17, 2019, now Pat. No. 11,449,775, application No. 18/428,305 is a continuation-in-part of application No. 18/217,592, filed on Jul. 2, 2023, now Pat. No. 12,125,045, which is a continuation of application No. 17/522,101, filed on Nov. 9, 2021, now Pat. No. 11,710,136, which is a continuation of application No. 16/408,020, filed on May 9, 2019, now Pat. No. 11,200,581, application No. 18/428,305 is a continuation-in-part of application No. 17/657,687, filed on Apr. 1, 2022, which is a continuation of application No. 16/668,696, filed on Oct. 30, 2019, now Pat. No. 11,321,736, which is a continuation of application No. PCT/US2018/032348, filed on May 11, 2018, application No. 18/428,305 is a continuation-in-part of application No. 18/524,294, filed on Nov. 30, 2023, which is a continuation of application No. 17/443,211, filed on Jul. 22, 2021, now Pat. No. 11,836,199, which is a division of application No. 15/807,869, filed on Nov. 9, 2017, now abandoned, application No. 18/428,305 is a continuation-in-part of application No. 18/114,657, filed on Feb. 27, 2023, which is a continuation of application No. 17/121,300, filed on Dec. 14, 2020, now Pat. No. 11,604,842, which is a division of application No. 14/854,591, filed on Sep. 15, 2015, now Pat. No. 10,867,003.

(60) Provisional application No. 63/341,646, filed on May 13, 2022, provisional application No. 63/201,274, filed on Apr. 21, 2021, provisional application No. 63/160,446, filed on Mar. 12, 2021, provisional application No. 63/080,900, filed on Sep. 21, 2020, provisional application No. 62/785,544, filed on Dec. 27, 2018, provisional application No. 62/669,617, filed on May 10, 2018, provisional application No. 62/504,549, filed on May 11, 2017, provisional application No. 62/419,772, filed on Nov. 9, 2016, provisional application No. 62/050,548, filed on Sep. 15, 2014, provisional application No. 63/450,282, filed on Mar. 6, 2023.

(56) References Cited

U.S. PATENT DOCUMENTS

| | | | |
|---|---|---|---|
| 2013/0054558 A1* | 2/2013 | Raza | G06F 16/951 707/769 |
| 2015/0261867 A1* | 9/2015 | Singal | G06Q 50/01 707/722 |
| 2016/0149852 A1* | 5/2016 | Pan | H04L 67/306 709/206 |
| 2017/0031894 A1* | 2/2017 | Bettersworth | G06F 40/284 |
| 2017/0103441 A1* | 4/2017 | Kolb | G06F 16/951 |
| 2018/0054523 A1* | 2/2018 | Zhang | H04M 7/0045 |
| 2018/0137203 A1* | 5/2018 | Hennekey | G06F 16/9535 |
| 2019/0361918 A1* | 11/2019 | Rogynskyy | H04M 15/755 |

* cited by examiner

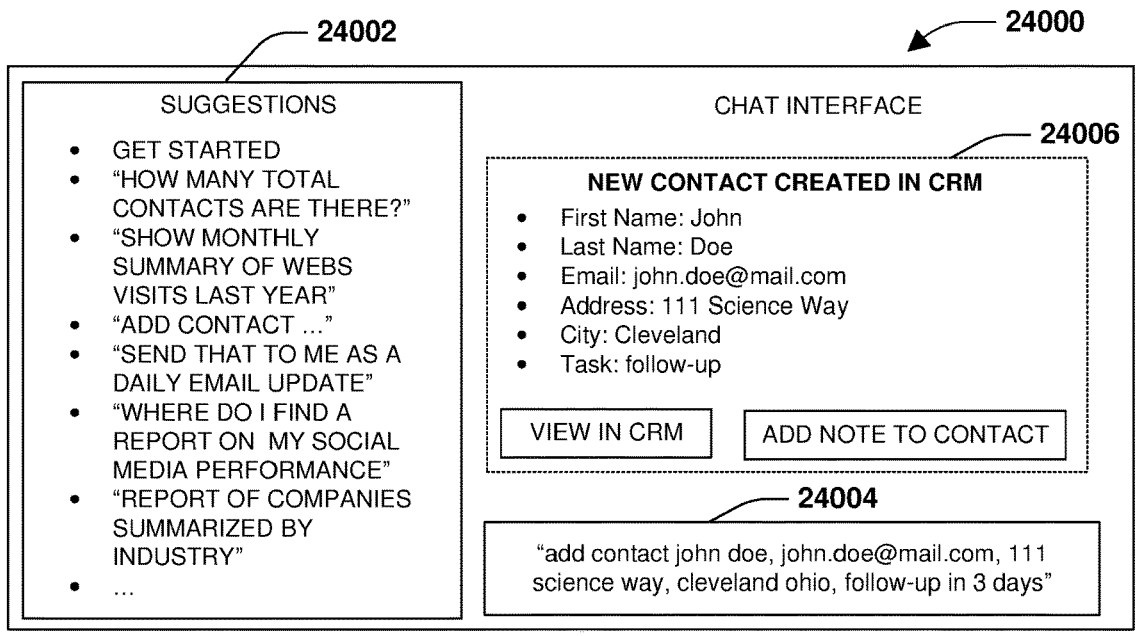
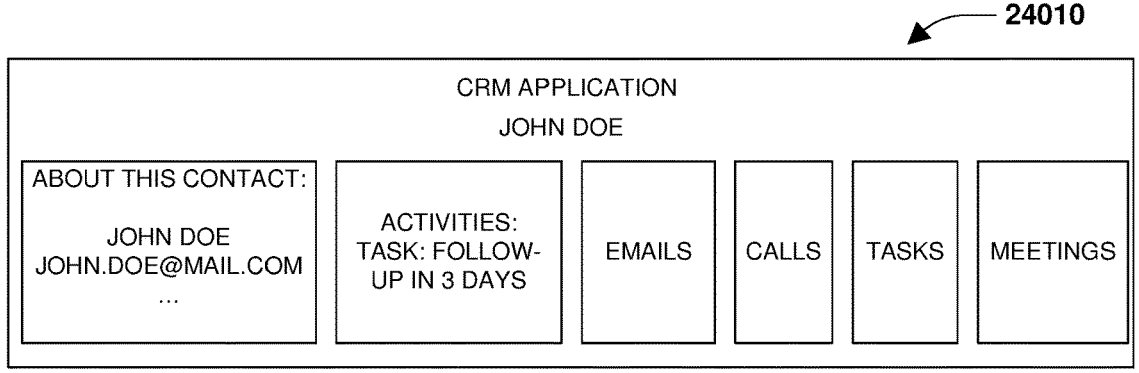
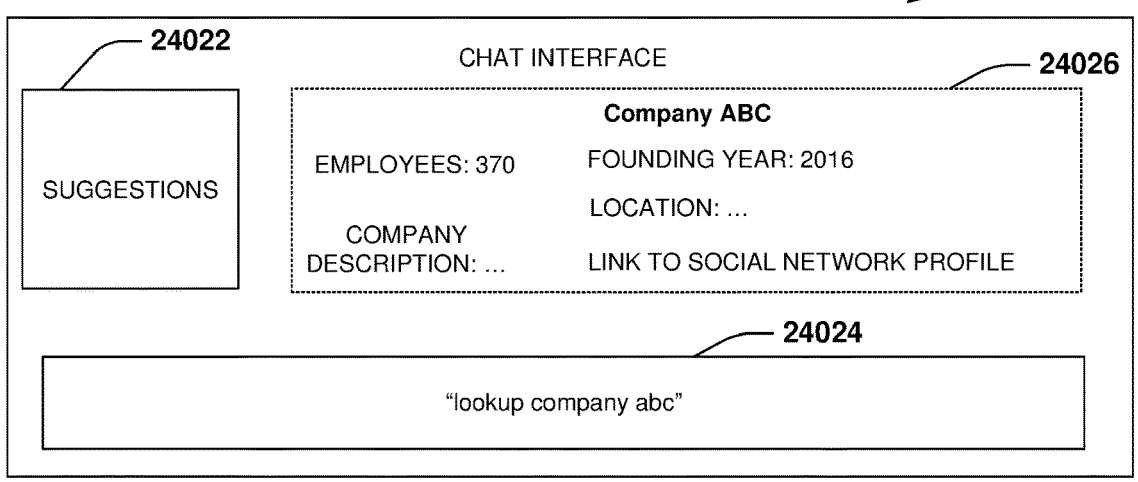
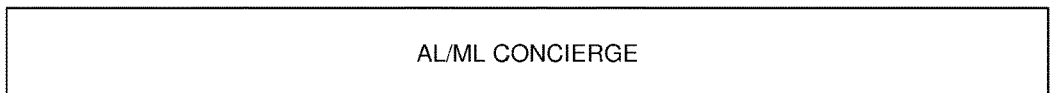
FIG. 24A

| VERSION | ENCRYPTED DATA (GUID PLUS VERSION) |
|---|---|
| 1 | +9sXBkwpK/JzQYWOHpRd+w== |
| 2 | 7sQO5Arq1+YPGVXaOjHMnA== |
| 3 | moOIwPruVOmX5HcQoscgUQ== |
| 4 | NOjlKlte58jAwCJfpdx2g== |

*FIG. 31*

| Calendar Function Attribute: | Corresponding Object Attribute |
|---|---|
| "crmObjectTypeId" : | "MARKETING_EMAIL", |
| "crmObjectDisplayName" : | "email", |
| "objectIdProperty" : | "hs_origin_asset_id", |
| "startDateProperty" : | "hs_publish_date", |
| "titleProperty" : | "hs_name", |
| "scopes" : | [ |
|  | "EMAIL_CORE_API_ACCESS" |
|  | ], |
| "gateName" : | null, |
| "categoryProperty" : | null, |
| "categoryPropertyOptions" : | [], |
| "publishStatusProperty" : | "hs_state", |
| "descriptionProperty" : | null, |
| "campaignGuidProperty" : | "hs_campaign_name", |
| "detailsUrlProperty" : | null, |
| "previewProperty" : | "hs_preview_key", |
| "previewType" : | "KEY", |
| "createdByProperty" : | "hs_marketing_email_created_by_id", |
| "assigneeIdProperty" : | null, |
| "recurringScheduleProperty" : | null, |
| "endDateProperty" : | null, |
| "atMentionedOwnerIds" : | null, |

| Calendar Function Attribute: | Corresponding Object Attribute |
|---|---|
| "propertiesFilters" : | { |
| "hs_state" | : [ |
|  | "PUBLISHED", |
|  | "SCHEDULED_OR_PUBLISHED", |
|  | "PRE_PROCESSING", |
|  | "PUBLISHED_AB", |
|  | "PUBLISHED_AB_VARIANT", |
|  | "PROCESSING", |
|  | "SCHEDULED_AB", |
|  | "AUTOMATED", |
|  | "PUBLISHED_OR_SCHEDULED", |
|  | "AUTOMATED_SENDING", |
|  | "AUTOMATED_FOR_FORM_LEGACY", |
|  | "SCHEDULED" |
|  | ] |
|  | }, |
| "iconName" | : "email", |
| "isEnabled" | : true, |
| "isEmptyStringWhenNoCampaignGuidIsAssigned" : false, |
| "isHsCoreCalendar" | : true |

MULTI-SERVICE BUSINESS PLATFORM SYSTEM HAVING CUSTOM WORKFLOW ACTIONS SYSTEMS AND METHODS

CROSS-REFERENCE TO RELATED APPLICATIONS

This application claims priority to and is a continuation-in-part of U.S. Patent Application, titled "SYSTEM AND METHOD OF TRANSLATING A TRACKING MODULE TO A UNIQUE IDENTIFIER", filed on May 12, 2023 and accorded application Ser. No. 18/196,672, which claims priority to U.S. Provisional Patent Application, filed on May 13, 2022 and accorded Application No. 63/341,646, which are incorporated herein by reference.

This application claims priority to and is a continuation-in-part of U.S. Patent Application, titled "MULTI-SERVICE BUSINESS PLATFORM SYSTEM HAVING CUSTOM WORKFLOW ACTIONS SYSTEMS AND METHODS", filed on Apr. 21, 2022 and accorded application Ser. No. 17/660,085, which claims priority to U.S. Provisional Patent Application, filed on Apr. 21, 2021 and accorded Application No. 63/201,274, which are incorporated herein by reference.

This application claims priority to and is a continuation-in-part of U.S. Patent Application, titled "MULTI-SERVICE BUSINESS PLATFORM SYSTEM HAVING CONVERSATION INTELLIGENCE SYSTEMS AND METHODS", filed on Mar. 11, 2022 and accorded application Ser. No. 17/654,544, which claims priority to U.S. Provisional Patent Application, filed on Mar. 12, 2021 and accorded Application No. 63/160,446, which are incorporated herein by reference.

This application claims priority to and is a continuation-in-part of U.S. Patent Application, titled "MULTI-SERVICE BUSINESS PLATFORM SYSTEM HAVING CUSTOM OBJECT SYSTEMS AND METHODS", filed on Mar. 17, 2022 and accorded application Ser. No. 17/655,320, which claims priority to and is a continuation of U.S. Patent Application, titled "MULTI-SERVICE BUSINESS PLATFORM SYSTEM HAVING CUSTOM OBJECT SYSTEMS AND METHODS", filed on Sep. 21, 2021 and accorded application Ser. No. 17/448,228, which claims priority to U.S. Provisional Patent Application, filed on Sep. 21, 2020 and accorded Application No. 63/080,900, which are incorporated herein by reference.

This application claims priority to and is a continuation-in-part of U.S. Patent Application, titled "SYSTEM AND METHOD OF TRANSLATING A TRACKING MODULE TO A UNIQUE IDENTIFIER", filed on May 12, 2023 and accorded application Ser. No. 18/196,672, which claims priority to U.S. Provisional Patent Application, filed on May 13, 2022 and accorded Application No. 63/341,646, which are incorporated herein by reference.

This application claims priority to and is a continuation-in-part of U.S. Patent Application, titled "MULTI-CLIENT SERVICE SYSTEM PLATFORM", filed on Jul. 2, 2023 and accorded application Ser. No. 18/217,594, which claims priority to and is a continuation of U.S. Patent Application, titled "MULTI-CLIENT SERVICE SYSTEM PLATFORM", filed on Aug. 8, 2022 and accorded application Ser. No. 17/882,950, which claims priority to and is a continuation of U.S. Patent Application, titled "MULTI-CLIENT SERVICE SYSTEM PLATFORM", filed on Dec. 17, 2019 and accorded application Ser. No. 16/716,688, which claims priority to U.S. Provisional Patent Application, filed on Dec. 27, 2018 and accorded Application No. 62/785,544, which are incorporated herein by reference.

This application claims priority to and is a continuation-in-part of U.S. Patent Application, titled "MULTI-CLIENT SERVICE SYSTEM PLATFORM", filed on Jul. 2, 2023 and accorded application Ser. No. 18/217,592, which claims priority to and is a continuation of U.S. Patent Application, titled "MULTI-CLIENT SERVICE SYSTEM PLATFORM", filed on Nov. 9, 2021 and accorded application Ser. No. 17/522,101, which claims priority to and is a continuation of U.S. Patent Application, titled "MULTI-CLIENT SERVICE SYSTEM PLATFORM", filed on May 9, 2019 and accorded application Ser. No. 16/408,020, which claims priority to U.S. Provisional Patent Application, filed on May 10, 2018 and accorded Application No. 62/669,617, which are incorporated herein by reference.

This application claims priority to and is a continuation-in-part of U.S. Patent Application, titled "METHODS AND SYSTEMS FOR AUTOMATED GENERATION OF PERSONALIZED MESSAGES", filed on Apr. 1, 2022 and accorded application Ser. No. 17/657,687, which claims priority to and is a continuation of U.S. Patent Application, titled "METHODS AND SYSTEMS FOR AUTOMATED GENERATION OF PERSONALIZED MESSAGES", filed on Oct. 30, 2019 and accorded application Ser. No. 16/668,696, which claims priority to and is a continuation of International Patent Application, titled "METHODS AND SYSTEMS FOR AUTOMATED GENERATION OF PERSONALIZED MESSAGES", filed on May 11, 2018 and accorded International Application Serial Number No.: PCT/US18/32348, which claims priority to U.S. Provisional Patent Application, filed on May 11, 2017 and accorded Application No. 62/504,549, which are incorporated herein by reference.

This application claims priority to and is a continuation-in-part of U.S. Patent Application, titled "METHODS AND SYSTEMS FOR A CONTENT DEVELOPMENT AND MANAGEMENT PLATFORM", filed on Nov. 30, 2023 and accorded application Ser. No. 18/524,294, which claims priority to and is a continuation of U.S. Patent Application, titled "METHODS AND SYSTEMS FOR A CONTENT DEVELOPMENT AND MANAGEMENT PLATFORM", filed on Jul. 22, 2021 and accorded application Ser. No. 17/443,211, which claims priority to and is a divisional application of U.S. Patent Application, titled "METHODS AND SYSTEMS FOR A CONTENT DEVELOPMENT AND MANAGEMENT PLATFORM", filed on Nov. 9, 2017 and accorded application Ser. No. 15/807,869, which claims priority to U.S. Provisional Patent Application, filed on Nov. 9, 2016 and accorded Application No.: 62/419,772, which are incorporated herein by reference.

This application claims priority to and is a continuation-in-part of U.S. Patent Application, titled "METHOD OF ENHANCING CUSTOMER RELATIONSHIP MANAGEMENT CONTENT AND WORKFLOW", filed on Feb. 27, 2023 and accorded application Ser. No. 18/114,657, which claims priority to and is a continuation of U.S. Patent Application, titled "METHOD OF ENHANCING CUSTOMER RELATIONSHIP MANAGEMENT CONTENT AND WORKFLOW", filed on Dec. 14, 2020 and accorded application Ser. No. 17/121,300, which claims priority to and is a divisional application of U.S. Patent Application, titled "METHOD OF ENHANCING CUSTOMER RELATIONSHIP MANAGEMENT CONTENT AND WORKFLOW", filed on Sep. 15, 2015 and accorded application Ser. No. 14/854,591, which claims priority to U.S. Provisional Patent Application, filed on Sep. 15, 2014 and accorded Application No. 62/050,548, which are incorporated herein by reference.

TECHNICAL FIELD

The present application relates to a multi-client service system platform that may be part of a multi-service business platform.

BACKGROUND

Conventional systems for enabling marketing and sales activities for a business user do not also respectively enable support and service interactions with customers, notwithstanding that the same individuals are typically involved in all of those activities for a business, transitioning in status from prospect, to customer, to user. While marketing activities, sales activities, and service activities strongly influence the success of each other, businesses are required to undertake complex and time-consuming tasks to obtain relevant information for one activity from the others, such as forming queries, using complicated APIs, or otherwise extracting data from separate databases, networks, or other information technology systems (some on premises and others in the cloud), transforming data from one native format to another suitable form for use in a different environment, synchronizing different data sources when changes are made in different databases, normalizing data, cleansing data, and configuring it for use.

Some systems are customer relationship management (CRM) systems that may generally provide ability to manage and analyze interactions with customers for businesses. For example, these CRM systems may compile data from various communication channels (e.g., email, phone, chat, content materials, social media, etc.). For example, some CRM systems can be used to monitor and track CRM standard objects. These CRM standard objects can include typical business objects such as accounts (e.g., accounts of customers), contacts (e.g., persons associated with accounts), leads (e.g., prospective customers), and opportunities (e.g., sales or pending deals).

SUMMARY

The present disclosure is directed to various ways of improving the functioning of computer systems, information networks, data stores, search engine systems and methods, and other advantages. As stated above, more personalized, context-dependent search engine operations are departing from traditional absolute metrics for ranking search results. Instead, search results may be further dependent on the identity, demographic, location and online history of a person making a search query. More sophisticated search engine systems and methods are required to give an advantage to a promoter or marketer in such a search environment so as to push the marketer or promoter's subject matter to the top of the search engine rankings.

Among other features and advantages, the present system and method can benefit from large scale analysis of online content (e.g., Web pages) and vast amounts of information kept and processed from prior searches to develop intelligent associations between various content with one another. Some aspects employ machine learning systems and methods to further enhance the present goals including assisting users to develop successful content strategy for online content generation. Other aspects employ novel arrangements of data in data stores to extract best associations and deliver greater search engine rankings to users in an increasingly context-based or personalized type of searching environment. In particular, this system and method can improve the architecture that guides promoters to understanding what online subject matter to direct their efforts at for maximum effect on the target marketplace.

In embodiments of the present disclosure, a platform is provided for enabling automated development of content, typically for an enterprise, that is adapted to support a variety of enterprise functions, including marketing strategy and communications, website development, search engine optimization, sales force management, electronic commerce, social networking, and others. Among other benefits, the content development platform uses a range of automated processes to extract and analyze existing online content of an enterprise, parse and analyze the content, and develop a cluster of additional content that is highly relevant to the enterprise, without reliance on conventional keyword-based techniques.

In embodiments, the platform integrates functions of a content management system (CMS) with functions of a customer relationship management (CRM) system, including sharing access to database records and other information that is typically stored in and/or accessed by either.

In embodiments, methods and systems are provided herein for a platform for generating a cluster of correlated content from a primary online content object, the methods and systems including an automated crawler for crawling the primary online content object and storing a set of results from the crawling in a data storage facility; a parser for parsing the stored content from the crawling to generate a plurality of key phrases and to generate a content corpus from the primary online content object; a plurality of models for processing at least one of the key phrases and the corpus, the models comprising at least two of a word2vec model, a doc2vec model, a latent semantic analysis (LSA) extraction model, and a key phrase logistic regression model, wherein the processing results in a plurality of content clusters representing topics within the primary online content object; a content cluster data store for storing the content clusters; and a suggestion generator for generating, using output from at least one of the models, a suggested topic that is similar to at least one topic among the content clusters and for storing the suggested topic and information regarding the similarity of the suggested topic to at least one content cluster in the content cluster data store.

In embodiments, the plurality of models used by the platform may comprise at least one of a word2vec model, a doc2vec model, a latent semantic analysis extraction model, a latent semantic indexing model, a principle component analysis model, and a key phrase logistic regression model. In embodiments, the parser uses a machine learning system to parse the crawled content. In embodiments, the machine learning system iteratively applies a set of weights to input data, wherein the weights are adjusted based on a parameter of success, wherein the parameter of success is based on the success of suggested topics in the online presence of an enterprise. In embodiments, the machine learning system is provided with a training data set that is created based on human analysis of the crawled content.

In embodiments, at least one of the plurality of models used in the platform uses a machine learning system to cluster content. In embodiments, the machine learning system iteratively applies a set of weights to input data, wherein the weights are adjusted based on a parameter of success, wherein the parameter of success is based on the success of suggested topics in the online presence of an enterprise. In embodiments, the machine learning system is provided with a training data set that is created based on human clustering of a set of content topics.

In embodiments, the suggestion generator uses machine learning to suggest topics. In embodiments, the machine learning system iteratively applies a set of weights to input data, wherein the weights are adjusted based on a parameter of success, wherein the parameter of success is based on the success of suggested topics in the online presence of an enterprise. In embodiments, the machine learning system is provided with a training data set that is created based on human creation of a set of suggested topics.

In embodiments, the methods and systems disclosed herein may further include an application for developing a strategy for development of online presence content, the application accessing the content cluster data store and having a set of tools for exploring and selecting suggested topics for online presence content generation. In embodiments, the application provides a list of topics that are of highest semantic relevance for an enterprise based on the parsing of the primary online content object. In embodiments, the methods and systems may further include a user interface of the application for presenting a suggestion, wherein the generated suggestion is presented with an indicator of the similarity of the suggested topic to a content cluster topic as calculated by at least one of the models. In embodiments, the methods and systems may further include a user interface of the application for presenting a suggested topic, wherein the user interface facilitates generation of content related to the suggested topic. In embodiments, the user interface includes at least one of key words and key phrases that represent the suggested topic. In embodiments, the at least one of key words and key phrases are used to prompt the user with content for generation of online presence content. In embodiments, the online presence content is at least one of website content, mobile application content, a social media post, a customer chat, a frequently asked question item, a product description, a service description and a marketing message. In embodiments, the user interface for generation of content includes a plurality of suggested topics, each associated with an indicator of the similarity of a given suggested topic to a content cluster topic as calculated by at least one of the models.

In embodiments, the data storage facility is a cloud-based storage facility. In embodiments, the data storage facility is a distributed data storage facility.

In embodiments, the primary online content is a web page of an enterprise. In embodiments, the primary online content is a social media page of an enterprise.

In embodiments, the methods and systems may further include an application for developing a strategy for development of online presence content, the application accessing the content cluster data store and having a set of tools for exploring and selecting suggested topics for online presence content generation, wherein the application further accesses the content of a customer relationship management system. In embodiments, the application includes a user interface for developing content regarding a suggested topic for presentation in a communication to a customer, wherein selection of a suggested topic for presentation to a customer is based at least in part on a semantic relationship between the suggested topic as determined by at least one of the models and at least one data record relating to the customer stored in the customer relationship management system.

Also provided herein are methods and systems for automated discovery of topics for interactions with customers of an enterprise, including methods and systems that assist various functions and roles within an enterprise in finding appropriate topics to draw customers into relevant conversations and to extend the conversations in a way that is relevant to the enterprise and to each customer. Automated discovery of relevant content topics may support processes and workflows that require insight into what topics should be written about, such as during conversations with customers. Such processes and workflows may include development of content by human workers, as well as automated generation of content, such as within automated conversational agents, bots, and the like. Automated discovery may include identifying concepts that are related by using a combination of analysis of a relevant item of text (such as core content of a website, or the content of an ongoing conversation) with an analysis of linking (such as linking of related content). In embodiments, this may be performed with awareness at a broad scale of the nature of content on the Internet, such that new, related topics can be automatically discovered that further differentiate an enterprise, while remaining relevant to its primary content. The new topics can be used within a wide range of enterprise functions, such as marketing, sales, services, public relations, investor relations and other functions, including functions that involve the entire lifecycle of the engagement of a customer with an enterprise.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosures and the following detailed description of certain embodiments thereof may be understood by reference to the following figures:

FIGS. 31-35 are block diagrams illustrating examples of computing environment wherein one or more of the provisions set forth herein may be implemented.

DETAILED DESCRIPTION

Overall System

Figure 1A:
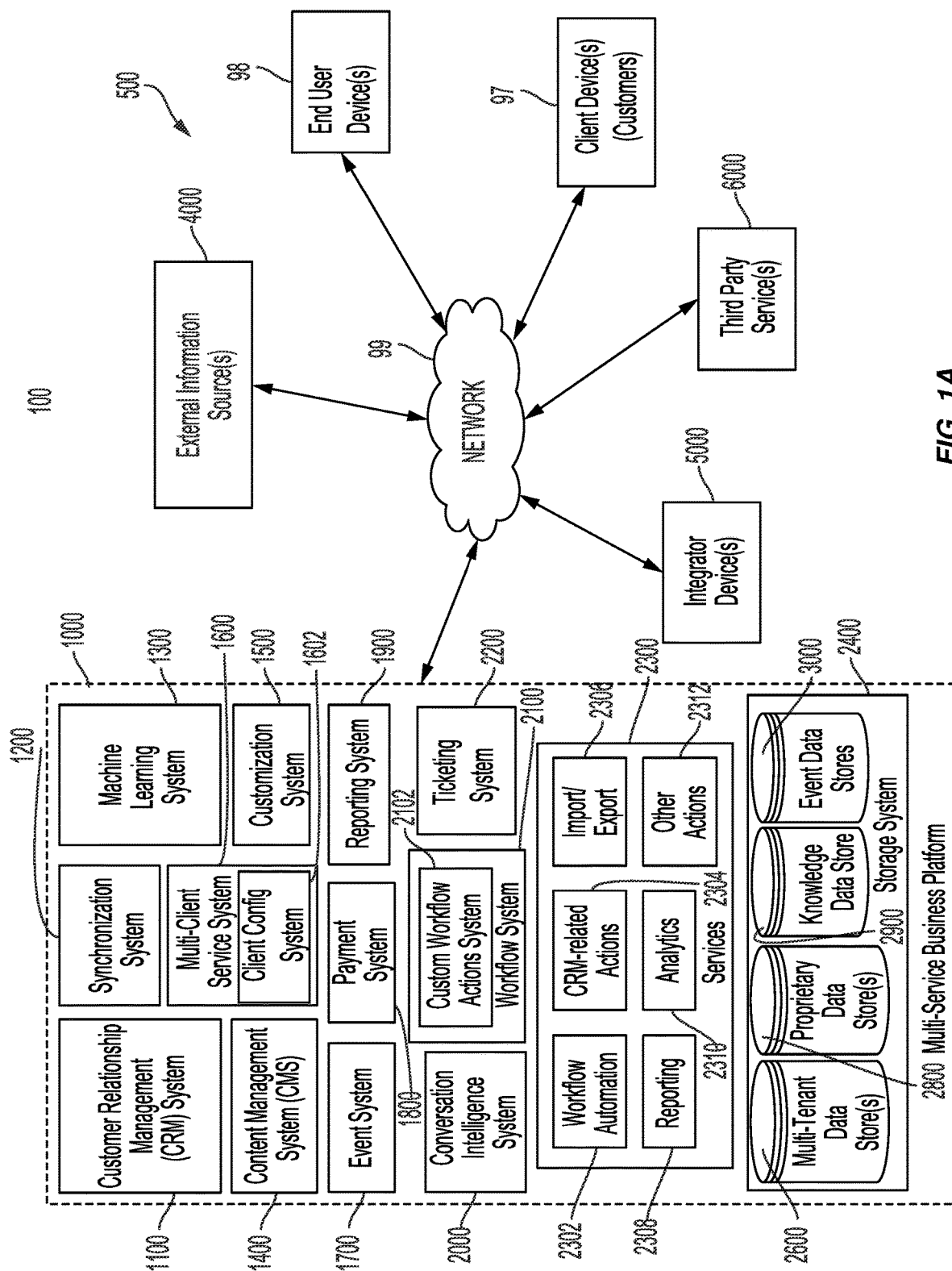
FIGS. 1A-1E are block diagrams illustrating examples of computing environment wherein one or more of the provisions set forth herein may be implemented.
Figure 1B:
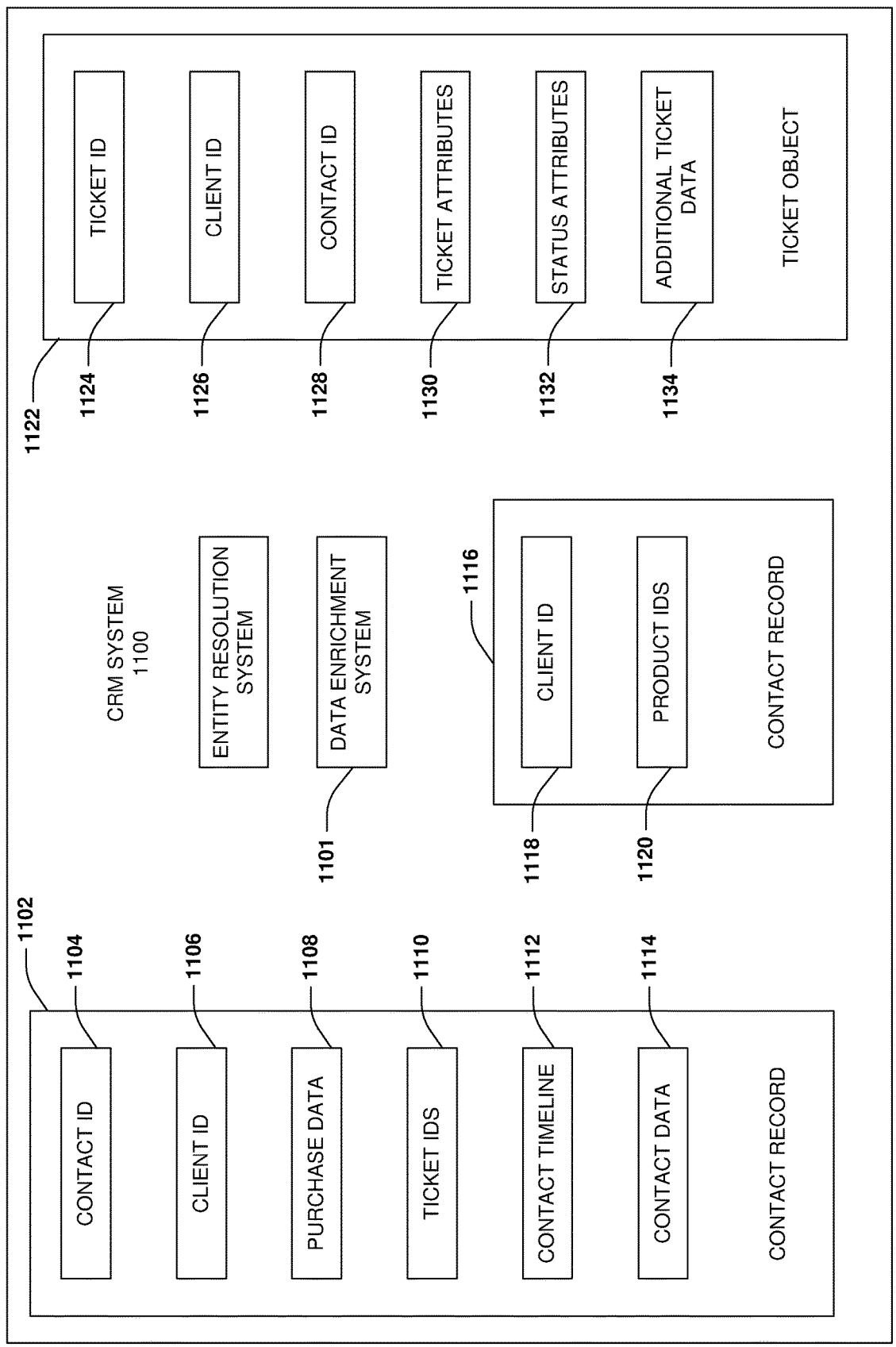
Figure 1C:
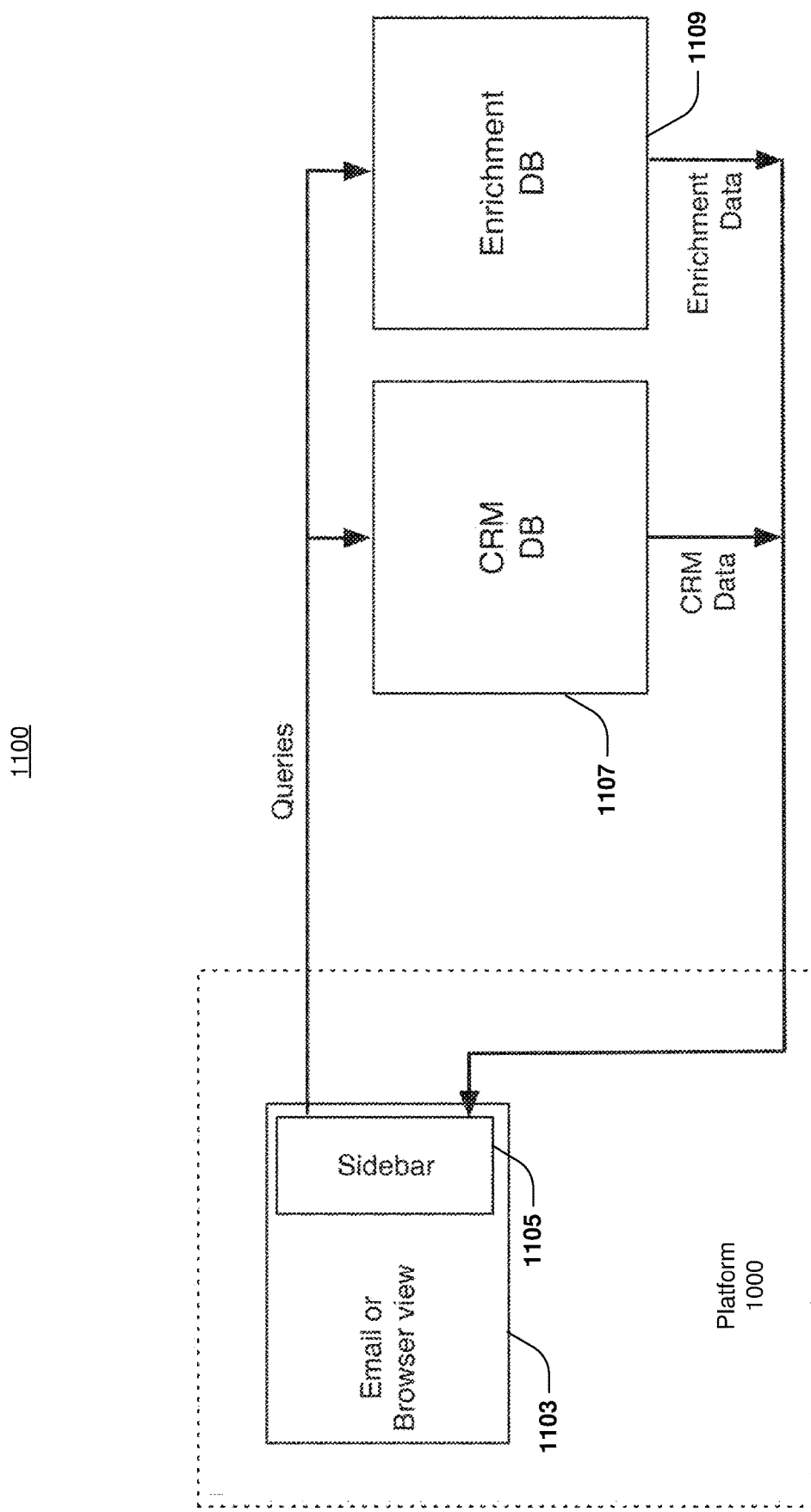

FIG. 1 illustrates an example environment 100 including a multi-service business platform 1000 (referred to herein also as multi-tenant distributed system or multifunction business platform ("platform") or framework system. The platform 1000 may communicate with various systems, devices, and data sources according to example embodiments of the disclosure.

The platform 1000 may serve the needs of multiple clients who in turn use the system to provide services, support, and the like for their customers or end users. The platform 1000 includes a Customer Relationship Management (CRM) System 1100, a synchronization system 1200, an Artificial Intelligence (AI)/Machine Learning (ML) system ("AI/ML system") 1300, a content management system (CMS) 1400, a customization system 1500, a multi-client servicing system 1600, an event system 1102, a payment system 1800, a reporting system 1600, a conversational intelligence system 2000, a workflow system 2100 having a custom workflow actions system 2102, an entity resolution system 2200, a services module 2300 and a storage system 2400.

The services module 2300 includes a workflow automation service 2302, a CRM related action service 2304, an import/export service 2306, a reporting service 2308, an analytics service 2310 and other services 2312. Other services 2312 may include, for example, filtering used to search, filter, and list objects (e.g., contact objects) that may be used with other objects and/or create lists for other types of objects. In some examples, other services 2312 may include reporting, permissioning, auditing, user-defined calculations, and aggregations.

The storage system 2400 includes one or more multi-tenant data stores 2600, one or more proprietary data stores 2800, one or more knowledge graph data structures 2900 and one or more event data stores 3000. Custom objects and/or core objects may include information that may be stored in the multi-tenant data stores 2600 of the storage system 2400. The custom objects and/or core objects as well as possible relationships (e.g., associations) between objects may be stored in an ontology of the knowledge data structure 2900.

The platform 1000 may communicate with external systems and data sources via a communication network 99 (e.g., Internet, public network, private network, etc.). Specifically, the multi-service business platform 1000 may communicate with a user device(s) 98 who is using the one or more systems of the platform 1000 (e.g. CRM 1110, customization system) 1500 to reach their customers who are accessing the user side of the platform 1000 (content, ticketing system, etc.) via one or more user device(s) 98. The platform 1000 may allow the client 97 to track various activities of their customers (users 98) for purposes of sales and marketing (e.g. using custom objects).

The platform 1000 may refer to a computing system that provides customer service solutions for any number of different clients. As used herein, a client may refer to an organization (e.g., a business, a government agency, a non-profit, and the like) that engages in some form of commercial or service-related activity, whereby the platform 1000 may provide a customized or semi-customized customer service solution to service the customers of the client. In embodiments, the platform 1000 is a multi-tenant platform, such that the system serves the needs of multiple clients, who in turn use the system to provide service, support and the like to their own customers. As used herein, the term "service" should be understood to encompass, except where context indicates otherwise, any of a wide range of activities involved in providing services to customers and others, such as via various workflows of a business, including providing services for value, servicing goods, updating software, upgrading software, providing customer support, answering questions, providing instructions of use, issuing refunds or returns, and many others. As used herein, except where context indicates otherwise, a customer may refer to an entity or individual that engages with the client (e.g., a purchaser of a product or service of the client, a user of the client's software platform, and the like), and the term "customer" should be understood to encompass individuals at different stages of a relationship with a client, such as individuals/organizations who are being targeted with marketing and promotional efforts, prospects who are engaged in negotiations with sales people, customers who have purchased a product, and users of the product or service (such as individuals within a customer organization). Furthermore, as will be discussed in further detail, the term "contact" is used to describe organizational entities or individuals that do engage with, may engage with, or previously engaged with the client. For example, a "contact" may refer to a sales lead, a potential customer, a closed customer (e.g., purchaser, licensee, lessee, loan recipient, policy holder, or the like), and/or a previous customer (e.g., a purchaser that needs service or may review the organization). In this way, the platform 1600 may help track a contact through an entire contact lifecycle (e.g., from the time the contact first comes to the attention of the client as a lead (such as when the client opens a promotional email or clicks on a promotional offer) until the end of the lifecycle of the client's offering(s)). It should be noted that the term contact may refer to a customer, but also to individuals and organizations that may not qualify as "customers" or users of a client.

The platform 100 may also communicate with one or more external information sources 4000 that may include company information or data on customers, products, sales, third party data, resource description framework (RDF) site summary (RSS) feeds or really simple syndication (RSS) feeds, telemetrics (e.g., from email, websites, app usage), and the like with respect to custom objects. The platform 1000 may also communicate with third party service(s) 6000 (e.g., third party applications, websites, data lakes and warehouses, etc.) via network 99.

The platform 1000 may also communicate with integrator device(s) 5000. Integrator devices 5000 may refer to user devices 98 used by third-party integrator users that may create and may define a series of custom objects that may be integrated with other objects in the multi-service business platform 1000 and may be offered to users of the multi-service business platform 1000. The platform 1000 may include APIs (as described in the disclosure) that a user may use to define custom objects and integrate those custom objects into the CRM system 1100 and thereby into the platform 1000. These same APIs may be available to integrator users to do the same thing. The integrator users may define a series of custom objects, then the integrator users may define object definitions. When a client installs that integration into their instance of the platform 1000, the client may then start creating instances of custom objects defined by the integrators.

CRM System

FIG. 2. Illustrates a functional diagram of the CRM System in accordance with an aspect of the present disclosure. In an aspect, the CRM 1100 maintains records of contacts and interactions associated with a particular customer or potential customer, including relevant corporate information, named individuals in significant roles, purchasing history, etc. In an aspect, the CRM system 1100 supports a consistent set of features and information is structured, so that individuals may be associated with corporate roles, and attributes such as progress status may be associated with objects such as product orders. Controlled change procedures may be provided to, as examples, provide auditable logs of information change activity, or to require particular authority to make such changes.

As shown in FIG. 2, the CRM 1100 is configured to access, associate and manage objects which are associated with potential and existing contacts (or customers) which create value to the client user 97 who is using the platform 1000. Contact objects may be considered as people who may communicate with the client 97 (e.g., anyone who may interact with business) such as customers or prospective customers of the business (e.g., people who may convert on a form, people who contact chat team of business, and/or people who met business team at an event). Each contact object may be defined with properties (e.g., a name of the contact, a phone number of the contact, an email address of the contact, a physical address of the contact, a title of the contact, and the like). Contacts may work at companies such that company objects may also be important to represent in data. Company objects may be defined as organizations or businesses that may communicate with a user's organization. Each company object may include properties such as a company name, an address of the company (e.g., main location, headquarters, or the like), and other suitable properties.

A deal object may be considered opportunities that may be available from interactions with contacts (e.g., contact objects) and/or companies (e.g., company objects). Deal objects may be defined as and represent transactions that may be typically between two businesses. Each deal object may include properties such as a sale made by a customer to a company via a contact. Some examples of deal objects may include the amount of a deal (e.g., deal_amount), an estimated close date for a deal (e.g., estimated_close_date), and a likelihood to close a deal (e.g., likelihood_to_close). Likelihood to close may be determined from machine learning. For example, machine learning may be used to take previously closed deals and may create a model around what types of properties (e.g., attributes) and objects may create a highly likely result to close and then may output values based on this predictive machine learning.

In an aspect, ticket objects may be considered as customer deals, requests for support or help (e.g., service ticket that may relate to a service request that may be issued by a company to a user via a contact). Some examples of properties for ticket objects may include date ticket was opened (e.g., date_opened), priority of ticket, last date custom replied to ticket (e.g., last_date_customer_replied), last date rep replied to ticket (e.g., last_date_rep_replied), and the like.

The CRM 1100 of the platform 1000 is configured to include associations between core and customized objects. For example, each association may be a directed association, such that a respective association may define a type of relationship from a first object to a second object. For example, an association between a contact object and a company object may be "works for" such that the contact object "works for" (association) the company object. When an instance of the contact object (e.g., the contact object instance identifies Bob as a contact) may be associated with an instance of the company object (e.g., the company object instance may identify "Acme Corp." as a the company) with a "works for" association, then the individual indicated by the company object instance may be defined in the customer databases as working for the company indicated in the company object instance (e.g., Bob works for Acme Corp.).

In example embodiments, two objects may be associated using one or more different types of associations and the associations may be directed in both directions (e.g., association and inverse association). An inverse association of the association may be created automatically for every association. For example, the association in one direction may be "works for" and the inverse association may be "employs" which may be created for the same association automatically. This same association may be viewed from the contact object and viewed from the company object such that the association may be defined as the contact object "works for" (association) the company object or the company object "employs" (inverse association) the contact object. The associations may be between the same types of objects and/or between different types of objects. For example, in continuing the example of the company object and the contact object, a contact object instance may indicate that the company defined by the company object instance may employ the individual defined by the contact object instance vis-à-vis the "employs" association (e.g., Acme Corp employs Bob) and that the individual works for the company vis-à-vis the "works for" association (e.g., Bob works for Acme Corp).

In some example embodiments, two objects may have multiple associations in the same direction. Continuing the example of the contact object and the company object, a contact object may be associated with a company object by a "works for" association, a "previously worked for" association, a "sells to" association, and/or other suitable types of associations. Similarly, the company object may be associated with a contact object with an "employs" association, a "previously employed" association, a "buys from" association, and/or other suitable types of associations. In this way, different types of relationships between instances of objects may be defined within the customer's databases.

In example embodiments, objects may also have the same object type directed associations. For example, a contact object may be associated to itself with one or more directed associations, such as a "is supervised by" association, a "supervises" association, or the like. For example, if Bob and Alice may work for the same company and Alice may supervise Bob, then an instance of a contact object that may define Bob may be associated with a contact object instance that may identify Alice with a "is supervised by" association (e.g., Bob "is supervised by" Alice) and/or Alice's contact object instance may be associated with Bob's contact object instance with a "supervises" association (e.g., Alice "supervises" Bob).

As shown in FIG. 2, the contact data record 1100 may include a contact ID 1104, a client ID 1106, a purchase data 1108, ticket IDs 1110, a contact timeline 1112, and contact data 1114. It is noted that in an aspect, the contact record 1102 may be used across multiple platforms, such that the contact record 1102 defines data relevant to the contact through the lifecycle of the contact (e.g., from new lead and/or buyer through customer service). In an example aspect, the client's customer service function may be integrated with the sales arm of the client's business. For example, the contact record 1102 corresponds to a warehouse manager (a contact or end user 98) that purchased an industrial furnace from an HVAC business (a client 97) may identify or otherwise reference the dates on which the warehouse manager was first contacted, all communications sent between the manager and the HVAC business, a product ID of the furnace, and any tickets that have been initiated by the contact on behalf of the warehouse, and the like. Thus, in some embodiments, the integration of the client's sales and marketing data with the client's customer service infrastructure allows a client-specific service system to address issues with a more complete view of the contact's data and reduces the need for APIs to connect typically unconnected systems (e.g., invoicing system, CRM, contact database, and the like). The foregoing database object is provided for example. Not all the data types discussed are required and the object may include additional or alternative data types not herein discussed.

The contact identifier (or "contact ID") 1104 may be a unique value (e.g., string or number) that uniquely identifies the contact (user 98) from other contacts which the client 98 has a probable or existing business relationship with. It is noted that in an aspect, the client ID 1106 is specific to a relationship between a contact 98 and a client 97, whereby the contact may only relate to a single client, although the contact may related to more than one client.

If a certain individual interacts with multiple clients, then the contact may have multiple contact records associated therewith (i.e., one for each client, where the contact is a customer of different clients (businesses) for the respective products or services of the businesses). The client ID 1106 indicates the client to which the contact corresponds. In embodiments, the client ID 1106 may be a reference to the client record 1116 (e.g., client database record). In this way, the client ID 1106 defines the relationship between the contact end user and the client.

In an aspect, purchase data 1108 indicates some or all of the purchases made by the contact end user for a respective client. In an aspect, the purchase data 1108 may represent one or more products and/or services purchased by the contact and the dates on which such products or services were purchased from the client. In some embodiments, the products and services may be presented by product IDs which are unique identifiers for each product/service that is offered by the client.

The ticket IDs 1110 indicate any tickets that have been issued with respect to the client. In embodiments, the ticket IDs 1110 include any tickets, resolved or unresolved, that have been issued with respect to the contact for a particular client. In an embodiment, the ticket IDs 1110 may only include the tickets IDs 1110 that are still open. More details about ticket IDs 1110 are discussed below with regard to the ticketing system.

In an aspect, the contact timeline 1112 represents data relating to a timeline documenting the contact end user's interaction with the client. The contact timeline may include data from the point in time when the contact was solicited as a lead, when purchases were made by the contact, when tickets were generated on behalf of the contact, when communications were sent to the contact, and the like.

In an aspect, contact data object 1114 may include any data that is relevant to the contact end user customer with respect to a particular client of the platform 1000. The contact data 1114 may include demographic data (e.g., age and sex), geographic data (e.g., address, city, state, country), conversation data (e.g., references to communications that were engaged in with the client), contact information (e.g., phone number, email address, user name), and the like. Contact data may further include information such as a date that the contact was entered into the system, lifecycle state (what is the current relationship with the contact-current customer, lead, or service only), last purchase date, recent purchase dates, on boarding dates, in-person visit dates, last login, last event, last date a feature was used, demos presented to the contact, industry vertical of the contact, a role of the contact, behavioral data, net promoter score of the contact, and/or a contact score (e.g., net value of the contact to the client or a net promoter score).

Accordingly, contact data 1114 and the timeline data 1112 can be configured to provide a rich history of all interactions of the contact end user and the client 98 over the lifecycle of their relationship. As a result, an individual, such as a salesperson or service professional, of the client 97 using the platform 1000 can understand and reference that history for one or more end user to provide relevant communications to them.

In an aspect, the client record 1116 may include the client ID 1106 and one or more product IDs 1120. The client ID 1106 may be a unique value (e.g., string or number) that uniquely identifies the client from other clients that have accounts in the platform 1100. The product IDs 1120 identify/reference products (e.g., goods, services, software) that are offered by the client 97. The product ID 1120 of a product may reference a product record (not shown) that includes data relating to the product, including warranty data, serial numbers, descriptions, product names and the like. The foregoing database object is provided for example. Not all the data types discussed are required and the object may include additional or alternative data types not herein discussed.

Referring to FIG. 2, a ticket database record or ticket object 1122 is utilized and managed by the CRM system 1100 of the platform 1000 in accordance with an aspect of the present disclosure. In an aspect, the ticket database record 1122 may include a ticket ID 1124, the client ID 1106, a contact ID 1102, one or more ticket attributes 1130, one or more status attributes 1132, and other additional ticket data 1134. In an aspect, the ticket object 1122 stores data associated with the types of ticket attributes that may be used to identify, track, and/or manage a ticket issued to an end user contact 98 on behalf of the client 97. The ticket ID 1124 is a unique value (e.g., string or number) that uniquely identifies each ticket from other tickets that may be associated with contacts 98 of the client 97. In a ticket object 1122, the client ID 1106 is a value that indicates the client 97 with respect to which the ticket was issued. As can be appreciated, the client ID 1126 may point to the client database record 1116 and/or the contact record 1102 for a particular client 97. The contact ID 1128 uniquely identifies the contact 98 that initiated the ticket for the particular client 97. As can be appreciated, the contact ID 1128 may point to the client database record 1116 of the contact that initiated the ticket.

The ticket attributes 1130 may include or reference any data tied to the ticket. As discussed, the ticket attributes may include default ticket attributes and/or custom ticket attributes. Examples of default ticket attributes may include a ticket priority attribute (e.g., high, low, or medium), a ticket subject attribute (e.g., what is the ticket concerning), a ticket description attribute, a pipeline ID attribute, a creation date attribute, a last update attribute, and the like. The custom ticket attributes may depend on the customizations of the customer contact 98 for a particular client 97.

In an example, the ticket attributes 1130 may be customized to include a ticket type attribute 1130 indicating a type of the ticket (e.g., service request, upgrade request, refund request, lost items, etc.), a contact sentiment attribute indicating whether a sentiment score of a contact (e.g., whether the contact is happy, neutral, frustrated, angry, and the like). In an aspect, the ticket status attribute 1132 may include a sentiment or tone of the contact throughout the timeline, feedback from the contact, a contact score of the client, and the like. In an aspect, the product ID 1120 attribute indicates a product to which the ticket corresponds, a contact frequency attribute indicating a number of times a contact has been contacted, a media asset attribute indicating media assets (e.g., articles or videos) that have been sent to the contact during the ticket's lifetime, and the like.

In an aspect, the ticket attributes 1130 may further include the ticket status attribute 1132. The ticket status attribute 1132 can indicate a status of the ticket, whereby the status may be defined with respect to the ticket pipeline for the client 97. For example, example statuses may include: ticket is opened but not acted upon, waiting for customer response, at a chatbot stage, at service specialist, at visit stage, at refund state, issue resolved, and the like.

In an aspect, the ticket object 1122 may include additional ticket data 1134 in accordance with the CRM system 1100 of the present platform. In embodiments, the additional ticket data 1134 may include or reference the specialist or specialists that have helped service the ticket (e.g., employee IDs), any notes entered by specialists, a number of notes entered by the specialists, a list of materials that have been sent to the contact during attempts to resolve the issue, and the like. In an aspect, the additional ticket data 1134 may include references to transcripts of conversations with the contact over different mediums or knowledge base articles referred to during the handling of a ticket. For example, the additional ticket data 1134 may include or reference conversations had with a chatbot, over email, telephone call, in a WhatsApp message, SMS text message, social media posts, and/or other communications with the client's customer service specialist. The additional ticket data 1134 may additionally or alternatively include analytics data.

In an aspect, the additional ticket data 1134 may include or reference a ticket timeline (not shown) in accordance with the CRM system 1100. In an aspect, a ticket timeline may indicate all actions taken with respect to the ticket and when those actions were taken by the client 97. In an aspect, the ticket timeline may be defined with respect to a client's ticket pipeline and/or workflows managed by the client 97. The ticket timeline 1134 may identify when the ticket was initiated, when different actions defined in the workflow occurred (e.g., chatbot conversation, sent link to FAQ, sent knowledge base article, transferred to customer service specialist, made house call, resolved issue, closed ticket, and the like).

The ticket timeline 1134 of a ticket record 1122 may be updated each time a contact user 98 interacts with the client's 97 platform 1000 instance a for a particular ticket. In this way, many different types of information can be extracted from the ticket timeline (or the ticket record in general). For example, the following information may be extracted: How long a ticket took to come through the pipeline (e.g., how much time was needed to close the ticket); how many interactions with the system did the contact have; how much time passed until the first response was provided; how long did each stage in the pipeline take; how many responses were sent to the contact; how many communications were received from the contact; how many notes were entered into the record; and/or how many documents were shared with the contact.

Customization

As will be discussed in more detail below, the platform 1000 may include a customization system 1500 which gives client users 97 the ability to create custom objects and have the flexibility of creating any type of custom object relevant to their business without being restricted to the core objects. This allows for clients to customize usage of the framework more closely to their business with regard to marketing, sales, and/or customer service. This also may allow for improved and faster development of new custom object types by clients and/or developers of the framework. The ability to create custom objects within the multi-service business platform may speed up development of new types of custom objects for the platform. In some examples, the customization system may be a separate system from the multi-service business platform and may communicate with the multi-service business platform (e.g., via external application programming interfaces (APIs)).

Various services of the multi-service business platform may be applied and/or used with custom objects. For example, some services that may be applied include workflow automation 2302 (FIG. 1), wherein an example is automating based on changes to core objects and based on added custom objects or changes to custom objects and/or core objects. For example, the workflow automation 2302 may be used to add verbs (automation actions) with respect to nouns (e.g., custom objects). Another service 2300 includes a reporting service 2308, such as creating and displaying reports on any custom objects along with core objects), CRM-related actions 2304 (e.g. to manage the CRM 1100), analytics 2310 (e.g., get analytics for custom objects), import/export 2306 from/to third party services and/or databases, and/or other actions or services 2312 (e.g. filtering used to search, filter, list contact objects used with custom objects, create lists for custom objects). In example embodiments, other services 2312 may include, but are not limited to, reporting, permissioning, auditing, user-defined calculations, and/or aggregations.

Custom objects may be defined as purposely non-prescriptive objects (e.g., flexible/customizable in contrast from fixed core objects). A client 97 may create custom objects relevant to their business and the user's business needs. The custom objects may provide an alternative where objects of interest to businesses may not fit smoothly within core objects (e.g., not necessarily fit as contacts, companies, deals, and/or tickets). The user may create custom objects that may be particularly useful to one or more services (e.g., workflows, reporting) of the multi-service business platform as described in the disclosure.

Each custom object or custom object definition may include an object type, properties (e.g., some properties may be set on an instance), and possible associations. In example embodiments, custom objects and/or types of custom objects may include products, goods such as devices/machines (e.g., cars, drones, boats, mobile phones, etc. such that these devices/machines custom objects may be used to track details about ownership, service, cost of devices/machines), business services, shipments (e.g., may be used to store data about fulfillment of orders that may be intended to be sent out), applications (e.g., may be used to store data that tracks progress of an application), projects (e.g., may be used to store data about work or deliverables), locations/stores (e.g., may be used to store granular data about companies and their many physical locations such as store locations and/or company headquarters location), customer locations (e.g., may be locations of customers that buy products and/or services from user's business), events (e.g., may be used to store and track physical or online events a company holds), listings (e.g., may be used to store data about real estate listings for a real estate company), referrals (e.g., may be used to link two things together to notate a referral or referrer), and the like. Some businesses may have unique relationships from operating in an agency type model that the businesses may want to identify, monitor, and/or track using custom objects.

Custom objects may provide users with the ability to model their business. For example, custom objects may allow users to model their own version of contacts, companies, deals, and/or tickets or any other type of object for their businesses that may allow the users to customize what they want for objects and/or object types. The custom objects may be used with the multi-service business platform such that the upstart of the platform may provide various functionality for usage of these custom objects. When a user may build a custom object, the user may utilize all services (e.g., features) of the platform such that the user (e.g., user's business) may use these services throughout the platform towards relevant custom objects that may match user's business needs.

In some examples, users may create custom objects with respect to usefulness with services of the multi-service business platform. For example, an auto manufacturer user may create car or vehicle custom objects that may fit into the auto manufacturer's business workflows (e.g., workflow automation) that may be used on the platform. In another example, a user may choose to add custom objects that may be particularly useful with reporting service for user's business needs.

In general, this ability to create custom objects provides increased and improved customizability across the multi-service business platform. This provides several advantages to the platform as described in the disclosure. For example, some advantages may include customization for users with respect to their business industry or field, specific customization towards each user's business itself such that one user in a business industry (e.g., car industry) may have different custom object needs with respect to another user in the same business industry, increased speed of development of various new types of objects by users and by developers of the multi-service business platform, etc.

Using a yoga business as an example (e.g., where the user may be a yoga business owner), the user may create custom objects towards their yoga business (e.g., where the yoga business may include multiple studios that may be staffed with multiple instructors that may teach different classes that may be taught to students in accordance with the instructors' respective schedules). In this example, a user (e.g., a user affiliated with the yoga studio or a third-party consultant) may create (e.g., via a GUI) a set of custom objects that relate to the yoga business, including defining the properties of each custom object. For example, the custom objects created may be studio objects, class objects, instructor objects, student objects, and schedule objects. Each studio custom object may include properties such as address of studio, rent of studio, and date when studio opened (e.g., date_opened). Each class custom object may include properties such as name of class, price of class, and schedule of class. Each instructor custom object may include properties such as date when instructor was hired (e.g., date_hired), latest certification date of instructor (e.g., latest_certification_date), certification expiration date of instructor (e.g., certification_expiration_date), and number of classes taught by instructor (e.g., number_of_classes_taught). Each student custom object may include properties such as date joined by student (e.g., date_joined), number of classes attended by student (e.g., number_of_classes_attended), date last attended a class by student (e.g., date_last_attended_a_class), total lifetime value of student (e.g., total_lifetime_value), credit of student, address of student, and phone number of student.

In an aspect, the client 97 may define a set of associations between objects (e.g., custom objects and/or core objects). This yoga example may include several examples of associations. For example, one association may be "class_taught_by" which may be between the custom object instructor and/or a contact object (e.g., where contact may be instructor) and the class custom objects that the instructor teaches. Another example association may be "taught_at_location" which may be an association between the class custom object and the studio custom objects based on where a particular class may be held (e.g., may be determined from address or location information properties of studio custom objects). In another example, the "taught_at_location" association may be an association between the instructor custom object and the studio custom objects based on at which yoga studios a particular instructor teaches. There may be other associations created between instructor custom objects and core objects (e.g., contact objects) as well as student custom objects and core objects (e.g., contact objects). This may allow for actions to be taken based on these associations such as emails to be sent to instructors and students based on the associations of instructor custom objects and student custom objects with contact objects.

In example embodiments, AI/ML system 1300 of the platform 1000 may be used with custom objects to determine a likelihood to attend based on custom objects and properties that may be created. For example, the multi-service business platform may provide prompts for a user to define inputs into a machine learning model, e.g., the user may submit via prompts several properties (e.g., how often does student attend, how many classes is student signed up for, subscription plan, etc.) that may impact whether a student may be likely or unlikely to attend a class and the machine learning model may be used to perform calculations based on these inputs. In other example embodiments, the machine learning model may determine insights (e.g., properties relating to attendance may be determined) as data may be received from instances of the occurrence of actions relating to instances of the custom objects. For example, instances of associations between the object instances (e.g., between custom object instances and/or core object instances) may be used to determine these properties (e.g., based on properties of the association instances).

In the yoga example, an integrator 5000 may have a company that builds CRM integration for yoga studios. This company may not be a yoga studio itself but may provide the CRM integration. For example, the integrator 5000 may define a set of custom objects (including properties) that may be used by yoga studios or other fitness class-based businesses. The custom objects may include a studio custom object, an instructor custom object, a student custom object, a class custom object, and a schedule custom object. In this example, any client of the platform 1000 that operates a yoga studio (or other fitness, class-based business) may use the custom objects defined by the integrator (e.g., for a fee to the integrator) when on-boarding their business to the platform 1000. For example, the yoga studio users (e.g., from yoga studio businesses) may install integration (e.g., CRM integration from the integrator user) to be used on the platform 1000. After integration, the yoga studio users may be able to take advantage of the custom objects (e.g., custom definitions of the custom objects) created by the integrator user such as the "yoga class" custom object, the "yoga instructor" custom object, and the "yoga student" custom object. The yoga studio users may also have access to the services 2300 of the platform 1000 such as reporting 2308 (e.g., user reports), workflow automation 2302 (e.g., user workflows), etc. that may be used with these custom objects. It may be as if each yoga studio user may rely on the integration from the integrator user such that the integration may be packaged with the custom objects and definitions for users of the platform 1000.

Data Enrichment System

In an aspect, the CRM system 1100 is configured with capabilities to track a wider range of business interactions among vendors and customers. For example, the enhanced features include logging of email communications between employees of the two or more firms, logging that a customer has opened an email, customer interactions with the vendor website, customer submission of web forms such as surveys, requests for information, and questionnaires, social media mentions by the customer contact, and significant company news events.

In an aspect, the data enrichment system stores the enrichment in one or more data stores (e.g. multi-tenant data store(s) 2600, Proprietary Data Store(s) 2800, Knowledge Data Store(s) 2900 and/or Event Data Store(s) 3000. This enhanced data can alternatively be stored separately on another service (e.g., as a different web based service) and interact with and provide data to the CRM system to allow for more relevant interactions between sales agents and potential customers.

In various embodiments, the enrichment database 1109 of the data enrichment system 1101 provides such functionality described above. The database 1109 may, in some instances, be implemented as a canonical SQL transaction store, or, in other cases may be a "No SQL" store with more relaxed write constraints. In either case, from the standpoint of the user, the database is accessed as read-only, with data updates rarely modifying existing data elements. Other examples may use a key-value store or other database techniques, using known conventions within the accessing applications to simulate multi-element records and maintain record consistency. Similarly, the interface to the database may be via a network pipe, a named web service, an internal software API, or other equivalent means as known to those familiar with the art. In at least one embodiment, the enrichment database is networked, accessible via public or private Internet connections, and thus may be considered a shared service offering to multiple clients having been provided with appropriate access information.

In at least one embodiment, the enrichment database 1109 is structured so as to provide results associated with two possible query types-corporate data if queried with a domain name such as "mycompany.com", and personal data about an individual if queried with a fully formed email address such as Joe.Smith@mycompany.com. Query results are provided as a sequence of one or more explicitly typed or named data values, representing the data stored in the database associated with the queried term. In an aspect, information in the enrichment database 1109 may be distinguished from that maintained in a conventional CRM 1107 in that it may be obtained asynchronously and in anticipation of user need, rather than solely in response to particular company or individual name queries.

Figure 1D:
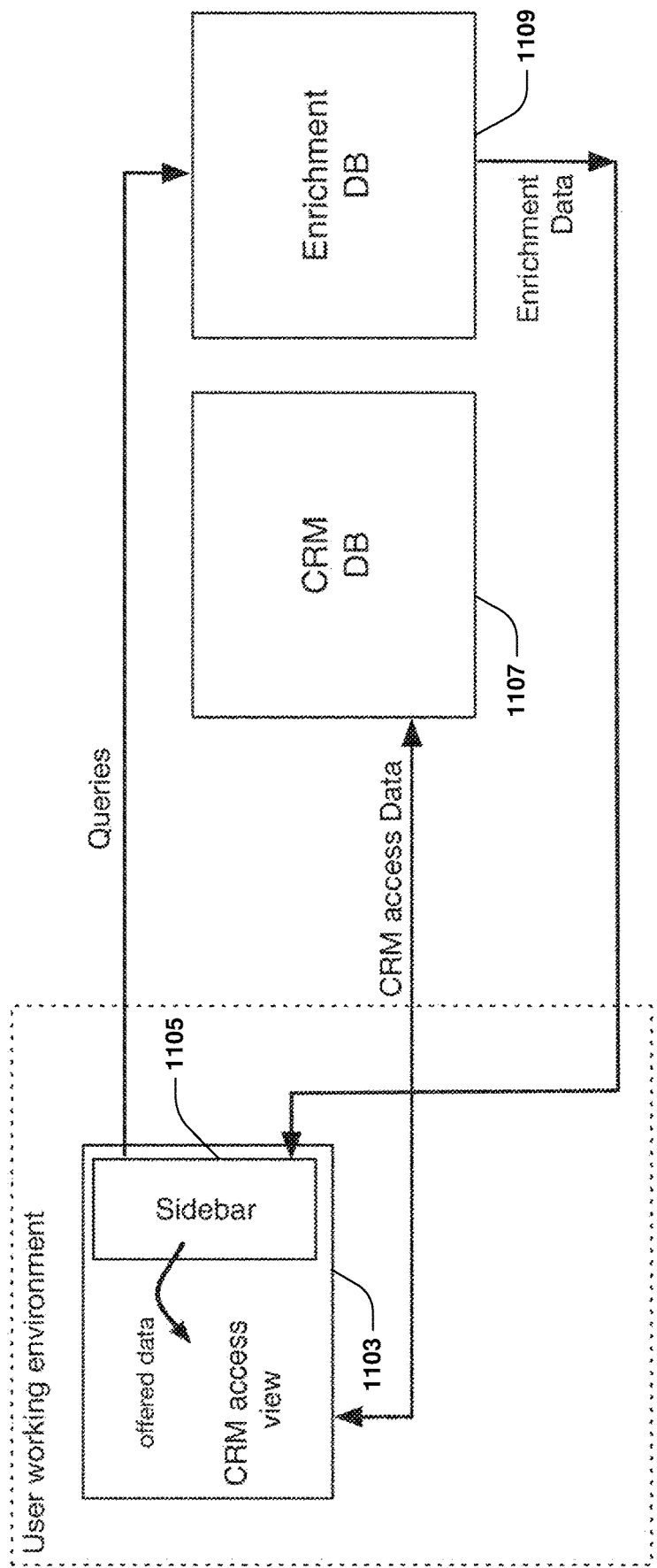
Figure 1E:
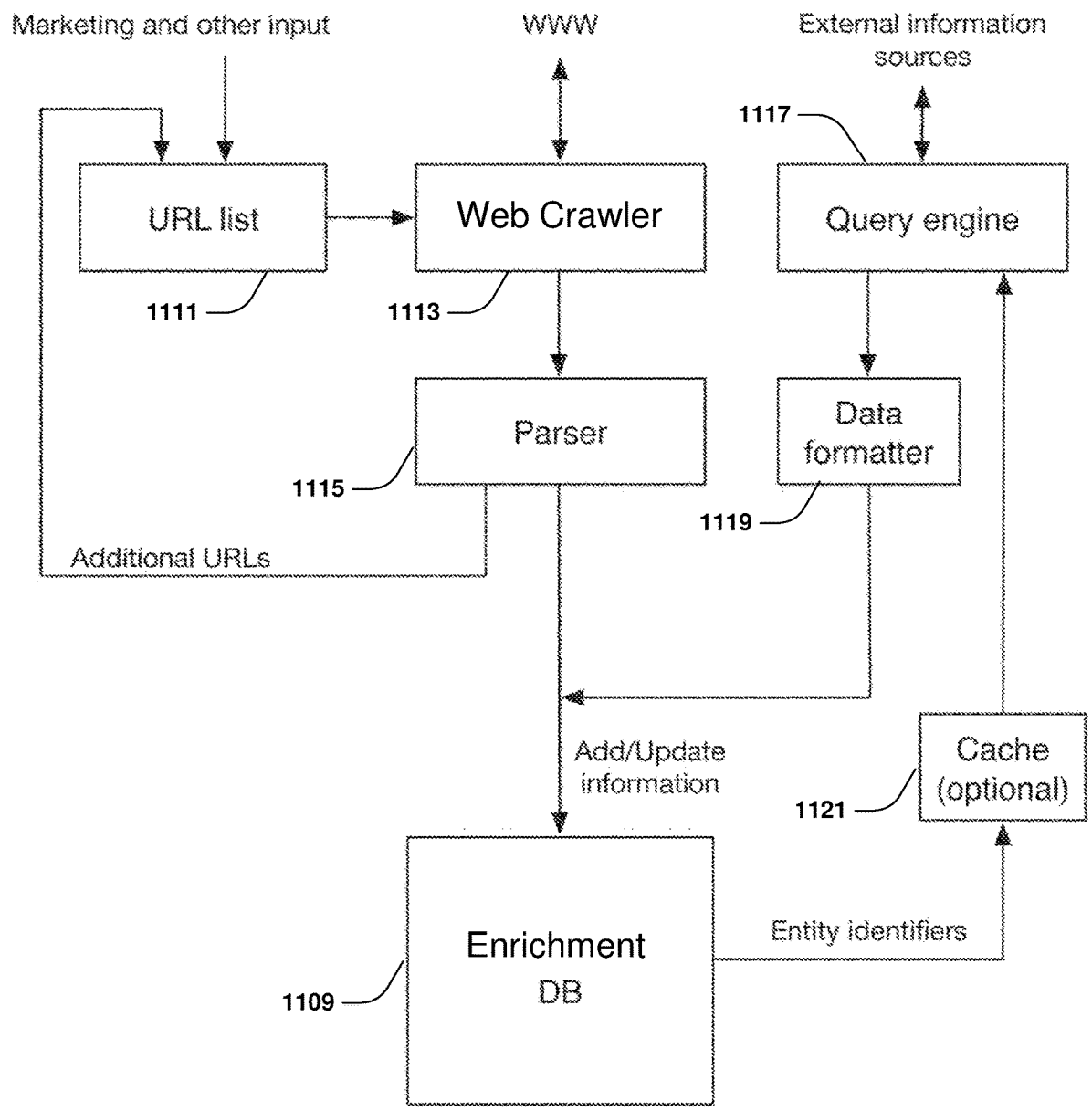

FIG. 1E is a block diagram of the data enrichment system 1101 configured to load Enrichment information into a database from World Wide Web and External information sources. As shown in FIG. 1E, a list of one or more candidate URLs is provided based on marketing, business development, or other input. Using these URLs as seeds, a web spider or crawler (provided by the platform 1000 or a third party service 6000) accesses the web page associated with the candidate URL, and presents the results to a parser 1115.

The parser 1115 attempts to identify elements within the web content that represents desired data types, for example the address, street, city, town, zip code, etc. comprising a corporation's business address. These identified elements are presented to the enrichment database 1109 to be incorporated in records associated with a key value related to, in this example, the corporation (i.e. its domain name.) The parser 1115 also identifies additional URLs 1111 and/or email addresses within the web content, which may be used in subsequent iterations of the web crawler. Thus, a corporate home page may lead to an "About us" page, an "Investors" page, a "Contact" page, an "Our Executives" page, with each of those pages becoming candidates for access by the web spider with subsequent content parsing and updating of the enrichment database 1109. In an aspect, the parser 1115 performs the data extraction automatically, although other embodiments may incorporate semi-automated or manual steps as well. In an aspect, email addresses captured by a corporation web sweep may not be directly used in the same way as a captured URL, either to iterate the web spider operation, or to obtain an individual's information. Instead, other sources of information may be required which can provide relevant user information based on their email address.

As one example, an Internet "White Page" service may be used, which are structured as "email address in, personal information out" and thus could be used directly to look up an individual's background information. However, the quality and reputation of the provided information from such sources may be suspect. As other examples, social networking sites may provide information within their particular domains, and private and for-fee information services also exist providing such services.

Because the access methods required to interact with these disparate information sources are broader and more elaborate than simple "web crawler" behavior, FIG. 1E shows a query engine 1117 configured to provide scripted or programmatic interaction with the selected external information source or sources. The resulting information, which may be in the form of web content or provided as explicit query responses, is presented to a data formatter 1119, which manipulates the data into a form appropriate for storage in the enrichment database 1109. Such a query engine may be used to research corporate information, as well as being a source for information about individuals and/or company level data.

Thus, it is apparent that the information flow for enrichment information may follow two distinct paths; the initial URL is used by the Web crawler to access a web page, which is parsed to identify corporate information to be stored in the enrichment database 1109, which may include the email addresses of various individuals. Optionally, entity identifiers representing either corporations or individuals may subsequently be retrieved from the enrichment database 1109 and presented to the query engine 1117, which accesses external information sources to obtain results processed by the data formatter and stored as corporate or individual information respectively in the enrichment database 1109. In some embodiments, a cache 1121 or storage buffer may be used to hold the identity identifiers for processing by the query engine 1117, eliminating the need for them to be read out of the enrichment database 1109 at the time they are required by the query engine 1117.

Other embodiments may use different strategies to distribute information queries between World Wide Web and other information sources. In some instances, the information sources may be limited to private, for-fee information sources to obtain both corporate and individual information. As one example, the a business wire news feed may be parsed to identify company names in a particular business sector, whereby each company may have been identified being using 3rd party public and/or private databases, with each company and individual identified in the resulting information potentially becoming a research candidate for a subsequent iteration. However, such a limitation may be neither cost-effective nor optimum, given the broad range of timely and freely-available information available on the Web.

In aspect, the World Wide Web sources may provide research corporate information, with the only individual information being maintained in the enrichment database 1109 being that which may be obtained incidentally through such corporate research, as examples those individuals named as a corporate executive or contact person. In an aspect, the platform 1000 supports data types or named data values in both the parser 1115 and the enrichment database 1109 which describe:

Corporate Identification-Public/Private corporate status, company description, company business address, company industry category, number of employees, annual revenue, latitude and longitude of primary company location.

Corporate communications information-Company email address, social media usernames, number of social media followers, social media URL. Corporate page URL, number of fans. Company Bio, company URL. URL of company logo.

Corporate investment-Public/Private status, revenue, number of employees, year of founding, total investment, investor URL, 3rd party data enrichment sites' URL, Company contacts, Related companies, Company news.

In an aspect, the data enrichment system 1101 supports data associated with the company's industry, territory, additional contact email addresses and phone numbers, org charts, website technology, products/services offered, company sentiment, enumeration of current and past funding rounds and investors, significant job and title changes, and partnerships.

Sidebar Application

In at least one embodiment, the platform 1000 is configured to provide one or more sidebar display elements 1105 are implemented. As such, it has access to the information being used to draw the screen, such as the HTML encoded stream comprising a web page, and can detect and extract particular data fields from that encoded stream automatically. In an aspect, a the sidebar 1105 may be used with a conventional web-based email application or may be used for conventional web browsing within the user's working environment. In an aspect, the sidebar is configured to parse URLs, stand-alone domain names such as www.mycompany.com, and email addresses from the displayable browser content and/or the browser address bar. Corporate URLs and domain names are reduced to a canonical form (e.g. absent any subdomain or host elements) to be used as a query term to obtain corporate enrichment information from the Enrichment database and/or the CRM system 1100. An extracted email address may also be used as a query term to obtain individual enrichment information from the enrichment database and/or the CRM system 1100. In an aspect, the Sidebar may be configured to record URLs for which the enrichment database 1109 provides no results. These records may be added to the candidate URL list for addition to the enrichment database in a subsequent iteration of the information gathering process. In an aspect, the sidebar interacts with the enrichment database 1109 as a web service, sending queries and receiving query results, which it then formats into displayable lists within the Sidebar display portion of the screen. Depending on the amount of content and available display area, the display content may be scrolled, or certain portions hidden or tree-truncated until requested by the user.

In another embodiment, the sidebar also interacts with the CRM system 1100, displaying any corporate or individual information stored by the CRM system 1100 as well. Thus, referring again to FIG. 1C, the sidebar component of the user's browser issues queries to one or both of the CRM and enrichment databases, and receives in return CRM and/or Enrichment data which it may display in the sidebar portion of the user's browser window. In cases where enrichment data is available but there is no corresponding CRM information, some embodiments of the sidebar offer an option to create a new CRM record. In an aspect, the sidebar may disclose an "Add to CRM" button where the user is viewing a company's website in their browser and there is no CRM information about that company. In an aspect, the button is provided where the user is composing an email to a recipient, and there is no CRM information about the recipient's company.

One familiar with the art may note that the formatting of information for Sidebar display may equivalently be performed by the queried web service, or by a service intermediary between the Sidebar application and the queried database. Similarly, display formatting may be hard-coded, low coded (discussed below) or configured using CSS or other meta-formatting elements. Logical decision steps may be incorporated into the display formatting to, as non-limiting examples, organize the displayed order of results, hide and reveal certain results, and otherwise maximize the relevance of the displayed sidebar information to the user's current working activity.

Updating CRM Information

Figure 1F:
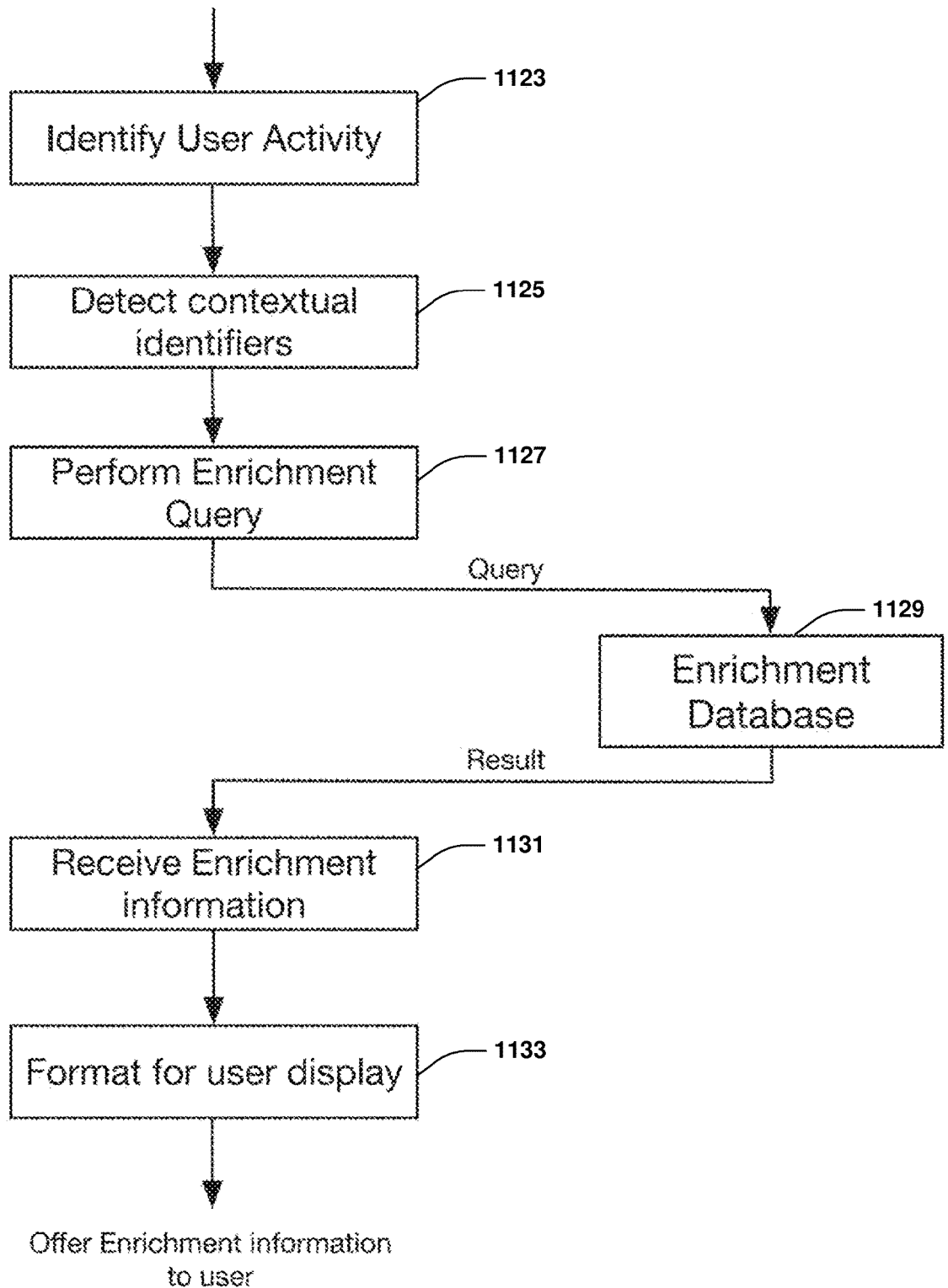
FIG. 1F is a flow chart illustrating an example of a set of operations for performing one or more of the provisions set forth herein.

At least one embodiment in accordance with an aspect facilitates creation of new CRM records. As one example, sidebar display of corporate enrichment data for an entity not having a presence in the CRM may include an "Add to CRM" button. Clicking on that button will transfer the user to a CRM interaction session, allowing the normal CRM tools to be used to create a new entry for that entity. Some embodiments allow the relevant corporate enrichment data to be provided to the CRM session, avoiding the need for manual data entry. One embodiment provides the enrichment data as autocompletion options for CRM fields. Another embodiment provides the Enrichment data in pull-down selection boxes, allowing the user to select the data for automatic entry. Some embodiments match the data types of the Enrichment data and the CRM data entry fields so that only relevant data is presented for selection or use. FIG. 1D shows the offering of enrichment data to a CRM access view as part of such a user interaction session and FIG. 1F is a flow chart of one embodiment of a method.

In some embodiments, a user may perform various activities through a web browser, email client, a CRM access application, etc. (e.g., browse a website, read an email, compose an email, edit CRM objects, etc.). Such activity is identified as user activity, during operation 1123 of FIG. 1F. The user activity is evaluated to detect contextual identifiers, during operation 1125. The contextual identifiers may relate to an action being performed by a user (e.g., writing an email on a particular topic), a context of an object being interact with by the user, etc. During operation 1127, an enrichment query is performed to query an enrichment database 1129. In this way, enrichment information is received from the enrichment database 1129 as a result of the query, during operation 1131. The enrichment information is formatted and displayed to a user, during operation 1133.

Synchronization System

Referring to FIG. 1, the platform 1000 includes the synchronization system 1200 in accordance with the present disclosure. The synchronization system 1200 of the platform 1000 may synchronize some arbitrary custom or default objects outside the platform 1000 to objects stored in the CRM 1100 in the platform 1000. The synchronization system 1200 of the platform 1000 may be used to synchronize core and/or custom objects between external information sources 4000 and/or third party services 6000 and the platform 1000. Custom objects may be configured to synchronize with external objects that exist externally from the platform 1000 (e.g., external to the CRM system 1100/CMS 1400). The synchronization system 1200 of the platform 1000 may be used to sync arbitrary custom objects outside the platform 1000 to objects inside the platform 1000, which may facilitate creation of custom objects and workflows (e.g., using workflow automation 2302).

The synchronization system allows data to be imported and/or exported between the platform 1000 and 3rd party services, wherein the synchronization system allows various platform applications to be updated automatically, (CRM system 1100). The synchronization system 1200 of the platform 1000 may be used to synchronize custom objects between third party services 6000 and the platform 1000. Custom objects may be configured to synchronize with external objects that exist externally from the platform 1000 (e.g., external to the CRM system 1100/CMS 1400). The synchronization system 1200 of the platform 1000 may be used to sync arbitrary custom objects outside the platform 1000 to objects inside the platform 1000, which may facilitate creation of custom objects and workflows (e.g., using workflow automation 2302).

AI/ML System

The platform 1000 includes an artificial intelligence/machine learning system 1300 in accordance with an aspect of the present disclosure. The AI/ML System 1300 can perform various tasks related to machine learning. In embodiments, the AI/ML System 1300 can receive machine learning models 106, process inference requests 11308 received from the platform 1000 using the models 13106, and generate inference outcomes 13110 as a result of processing an inference request 13108. In other examples, the AI/ML System 1300 can collect feedback 13112 from the platform 1000 and reinforce the models based on the feedback 13112. In yet another example, the AI/ML System 1300 can collect data on behalf of the platform 1000, such as from one or more data sources, and/or enhance the targeted features described in an inference request 13108.

The models 13106 are machine learning models trained at least in part using a computer. Examples of the models 13106 may include, but are not limited to, feedforward neural networks, deep neural networks, recurrent neural networks, modular neural networks, other neural networks, statistical models (e.g., linear models and decision trees), probabilistic models (e.g., Gaussian models and Bayesian models), cluster-based machine models, and the like. In an aspect, the models 13106 are received by the AI/ML System 1300, for example, from the platform 1000 or a third party integration 5000. In an aspect, when first received by the AI/ML System 1300, the models 13106 may be untrained. For example, the models 13106 may be configured according to the relative expected importance of weights for certain types of data of the platform 1000. The AI/ML System 1300 can process the models 13106, such as to perform inference using the models 106 and to train the models 13106.

In an aspect, the inference requests 13108 are domain-specific requests for inferences based on a target. A target defines a set of features of the platform 1000. Thus, a target may refer to a collection of one or more data items related to a task for which an inference is requested. An inference request 13108 includes a target and a model identifier. The model identifier indicates one or more of the models 13106 into which the features defined by the target will be fed during the inference. An inference request 13108 may also include a request identifier, which indicates information for uniquely identifying the inference request 13108. An inference request 13108 may also include a request identifier to uniquely identifying the inference request 13108, such as for later use in training the model 13106 associated with the model identifier.

The inference outcomes 13110 are results of inference performed based on the inference requests 13108. An inference outcome 13110 represents the output of a model 13106 after a data set (e.g., a target) is fed into it. The inference outcome 13110 may thus refer to a record representing a prediction, classification, recommendation, and/or other machine learning-based determinations resulting from performing inference for an inference request 13108. In some cases, a number of candidate inference outcomes 13110 can be generated based on different outputs of one or more models 13106 used to process the inference request 13108. In such a case, one of the candidate inference outcomes 110 can be selected as the inference outcome 13110 representing the final output of the inference process. The selected inference outcome 13110 can then be transmitted to the platform 1000.

After an inference outcome 13110 is transmitted to the platform 1000, the feedback 13112 is received from the platform 1000. The feedback 13112 includes an outcome indicating an accuracy of the inference outcome 13110 with respect to a task associated with the corresponding inference request 13108. The accuracy of the inference outcome 13110 as represented by the feedback 13112 may refer to a statistical accuracy based on a number of cases in which the inference outcome 13110 was accurate. Alternatively, the accuracy of the inference outcome 13110 as represented by the feedback 13112 may refer to an efficacy of the inference outcome 13110 is predicting actual results of the task associated with the inference request 13108. The feedback may also include a request identifier for associating the outcome with that inference request 13108.

To use the AI/ML System 1300, the platform 1000 determines a task to be supported. The task may include one or more questions to be answered using machine learning (e.g., "what is the best time at which to send an email to a recipient to ensure at least a thirty percent chance of the recipient opening the email?"), a request for a statistical or other analysis (e.g., "determine the likelihood that a contact will become a customer in ninety days"), or another item for processing.

The user or another user (e.g., a developer) creates and deploys an initial machine learning model 13106, which is received by the AI/ML System 1300. The initial machine learning model 13106 is configured to perform inference against a data set to complete the task to be supported. For example, the initial machine learning model 13106 may be a randomly generated model in which different weights of the model are randomly assigned to learning functions. In other examples, the initial machine learning model 13106 may be generated according to a default distribution in which the same weights of the model are assigned to some or all of the learning functions. Other methodologies and techniques for generating the initial machine learning model 13106 are possible.

After the initial machine learning model 13106 is received at the AI/ML System 1300, the AI/ML System 1300 performs an initial inference using the initial machine learning model 13106, for example, using an initial target received from the platform 1000 (e.g., as part of an initial inference request 13108) or using an initial target already present at the AI/ML System 1300. For example, where the task underlying the initial inference asks what the best time at which to send an email to a recipient to ensure at least a thirty percent chance of the recipient opening the email is, the initial target can include a data set from the software product 104 which can be used to answer that question. For example, the initial target may include the email, the subject line of the email, and the intended recipient.

In response to performing the initial inference, the AI/ML System 1300 generates an inference outcome 110 for the initial inference. The inference outcome 13110 is then transmitted to the platform 1000. After transmitting the inference outcome 13110 to the platform 1000, the AI/ML System 1300 receives feedback 13112 to the inference outcome 13110. The feedback 13112 includes an outcome indicating how accurate the inference outcome 13110 was in processing the task underlying the initial inference. For example, the outcome included in the feedback 13112 can indicate the actual percentage of emails that were opened by the intended recipients during the "best time" indicated in the inference outcome 13110.

The feedback 112 may be received from the platform 1000, for example, by the AI/ML System 1300 sending a request for the feedback 13112 to the platform 1000, by the AI/ML System 1300 pulling the feedback 13112 from the platform 1000 without a request, or by the platform 1000 sending the feedback 13112 in response to a request from the AI/ML System 1300 or without first receiving a request for the feedback 13112 from the AI/ML System 1300.

The AI/ML System 1300 then trains the initial machine learning model 13106 according to the feedback 13112. For example, where the feedback 13112 indicates that the inference outcome 13110 was accurate (e.g., based on a threshold comparison), training the initial machine learning model 13106 can include reinforcing the distribution of weights within the initial machine learning model 13106. However, where the feedback 13112 indicates that the inference outcome 13110 was not accurate, training the initial machine learning model 13106 can include redistributing the weights of the initial machine learning model 13106.

Training the initial machine learning model can include updating the initial machine learning model 13106. Alternatively, training the initial machine learning model 13106 can include producing a new machine learning model based on the initial machine learning model 13106 and the feedback 13112. Regardless of the particular form of the new version of the model 13106 resulting from the training, that new version of the model 13106 may then be used for processing one or more subsequent inference requests 13108. After each given inference request 13108 is processed, the respective version of the model 13106 can be retrained according to the corresponding feedback 13112 received from the platform 1000.

Thus, the AI/ML System 1300 iteratively trains a model 13106 based on the particular version of the model 13106 that was used to process an inference request 13108 and based on the accuracy of the inference outcome 13110 generated in response to the inference request 13108, as represented in the feedback 13112 received from the platform 1000. Further, where the feedback 13112 is received without manual user intervention on the part of the platform 1000, the training of a model 13106 may be automated by the AI/ML System 1300.

In some embodiments, the AI/ML System 1300 can train the initial machine learning model according to the inference outcome 13110 resulting from the initial inference. For example, the AI/ML System 1300 can train the initial machine learning model according to the inference outcome in addition to training the initial machine learning model according to the feedback 13112. In other examples, the AI/ML System 1300 can train the initial machine learning model according to the inference outcome instead of training the initial machine learning model according to the feedback 13112.

In some embodiments, the AI/ML System 1300 may communicate directly with the platform 1000. In an aspect, the platform 1000 can transmit an inference request 13108 to the AI/ML System 1300 through an application programming interface (API) call including a model identifier, a request identifier, and a target. The platform 1000 can later transmit the feedback 13112 to the AI/ML System 1300 through another API call including an outcome and the request identifier. The API calls may correspond to an API framework of the MLAAS, an API framework of the software product 13104, or both.

In some embodiments, an inference request 13108 may include a version identifier indicating a version of a model 13106 to use to process the inference request 13108. For example, where the model identifier included in the inference request 13108 corresponds to the model 13106, but not to the particular version of the model 13106 to use to process the inference request, the version identifier can be used to uniquely identify the correct version of the model 13106. In some such embodiments, the version identifier can be associated with the request identifier, such as to allow the AI/ML System 1300 to identify the correct version of the model 13106 to train upon receipt of the feedback 13112. In some embodiments, the models 13106 have specific use definitions. For example, one or more of the models 13106 can be created for use with a specific tenant of the AI/ML System 1300, a specific user of the software product 13104, a specific context or task presented to the AI/ML System 1300 for evaluation, or the like.

Figure 2A:
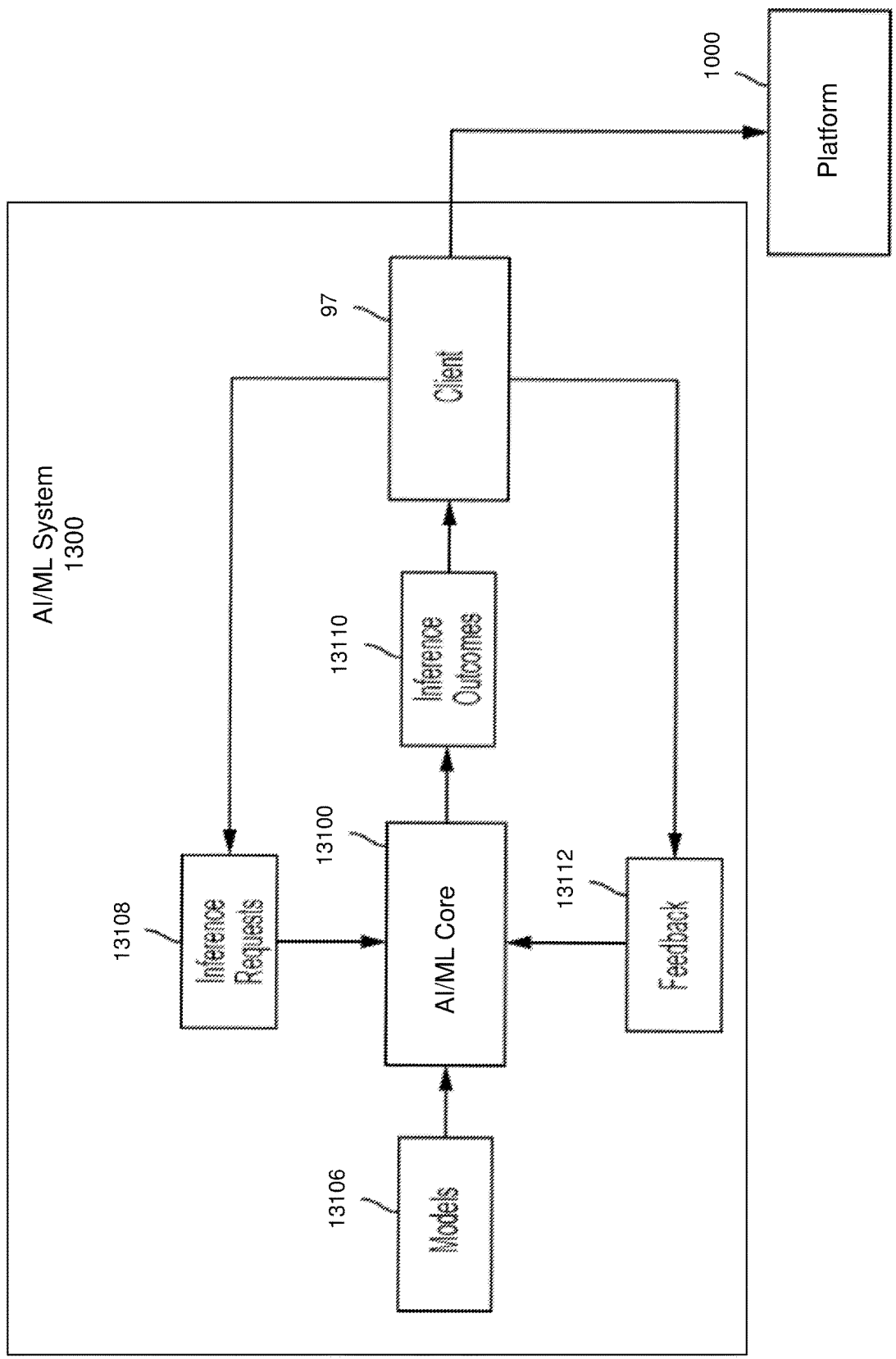
FIGS. 2A-2F are block diagrams illustrating examples of computing environment wherein one or more of the provisions set forth herein may be implemented.
Figure 2B:
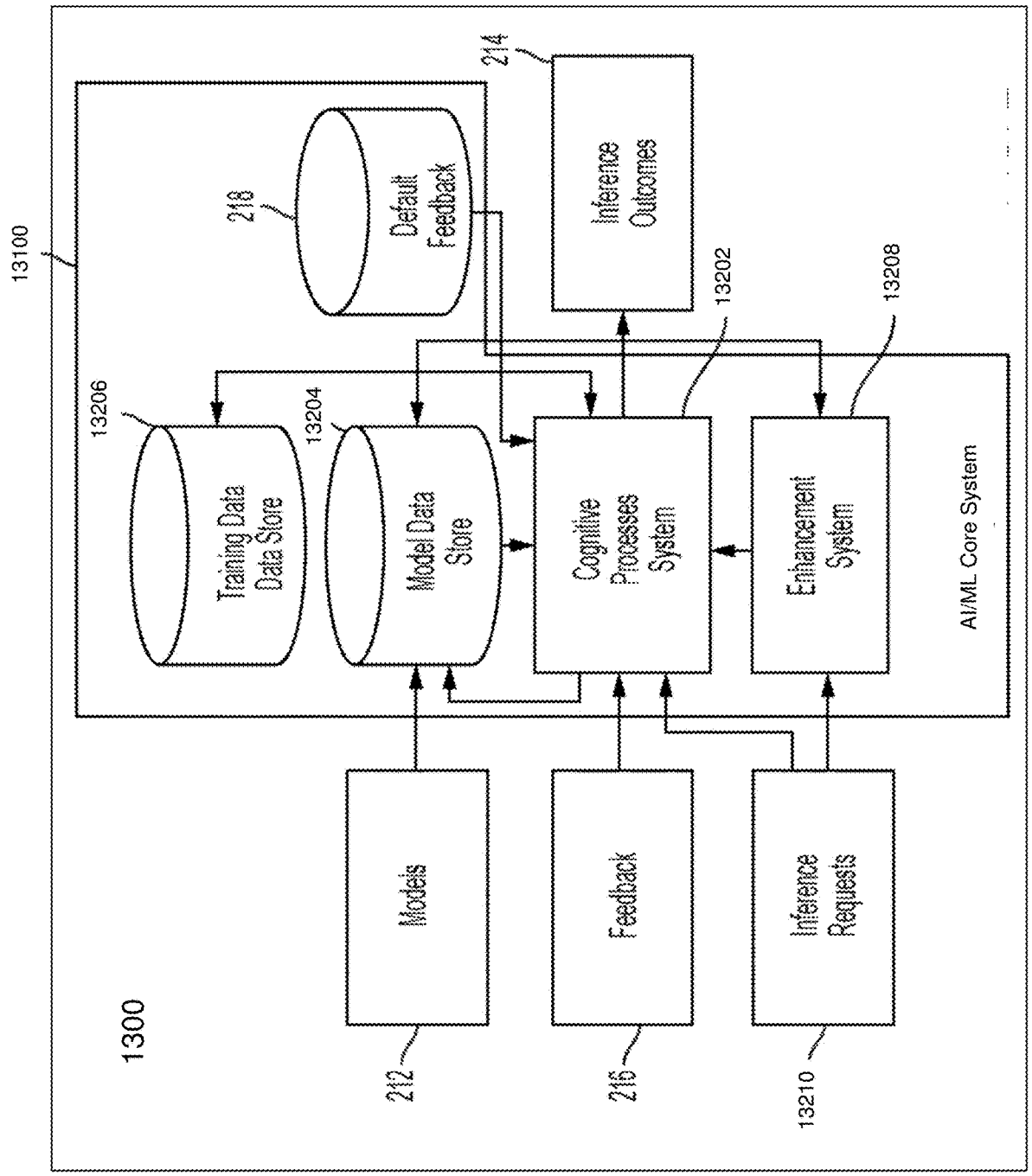

FIG. 2B illustrates a block diagram showing examples of components of an AI/ML System 1300 and inputs and outputs of those components in accordance with an aspect of the present disclosure. The AI/ML System 1300 includes a cognitive processes system 13202, a model data store 13204, a training data data store 13206, and an enhancement system 13208, in an aspect. The cognitive processes system 13202 performs inference and training operations for the AI/ML System 1300. In particular, the cognitive processes system 13202 receives inference requests 13210 (e.g., the inference requests 13108 shown in FIG. 2A) and models 13212 (e.g., the models 13106 shown in FIG. 2A), such as from a client (e.g., the platform 1000 shown in FIG. 2) and/or another source. The cognitive processes system 13202 processes the inference requests 13210 to generate inference outcomes 13214 (e.g., the inference outcomes 13110 shown in FIG. 2A), which may be transmitted to or otherwise made available to the client. The cognitive processes system 13202 later receives feedback 216 (e.g., the feedback 13112 shown in FIG. 2A), such as from the client that made the corresponding inference request 13210. The cognitive processes system 13202 trains the models 13212 according to the feedback 13216.

The model data store 13204 stores models 13212. The model data store 13204 may be a database (e.g., a relational database, an object database, a navigational database, an active database, a spatial database, or the like) or another data storage aspect (e.g., a file library, network cluster, or the like). The model data store 13204 may include a version repository component in which different versions of the models 13212 can be identified and retrieved, such as based on queries received from the cognitive processing system 13202. The model data store 13204 can store the models 13212 themselves and/or data for identifying the models 13212.

The model data store 13204 may store the models 13212 based on the one or more tasks with which the models 13212 are associated. For example, there may be a number of different models used for the task of determining a likelihood that a contact will become a customer. Each of those models may be stored together or in relation to one another within the model data store 13204. For example, each of the models 13212 stored in the model data store 13204 may be given a model identifier. In some cases, where two or more of the models 13212 are used for the same task, those two or more models may be given the same model identifier. Alternatively, each of the models 13212 may be given its own unique model identifier.

An inference request 13210 may include a model identifier, a request identifier, and a target. When the cognitive processes system 13202 receives the inference request 13210, it can use the included model identifier to identify the corresponding model 13212 within the model data store 13204. For example, the cognitive processes system 13202 can generate and transmit a query based on the model identifier included in the inference request 13210 to the model data store 13204. The information retrieved from the model data store 13204 may then be used by the cognitive processes system 13202 to process the inference request 13210. The cognitive processes system 13202 can later use the request identifier to relate information to the inference request 13210, for example, for training the model 13212 identified by the model identifier.

The training data data store 13206 stores training data used by the cognitive processes system 13202 to train the models 13212. The training data data store 13206 may be a database (e.g., a relational database, an object database, a navigational database, an active database, a spatial database, or the like) or another data storage aspect (e.g., a file library, network cluster, or the like). The training data data store 13206 may include a version repository component in which different versions of the training data can be identified and retrieved, such as based on queries received from the cognitive processing system 13202. For example, the versions of training data may correspond to a same model 13212, but different feedback 13216.

The cognitive processes system 13202 can store the feedback 13216 as training data within the training data data store 13206. For example, the outcome from the client can be stored along with the request identifier associated with the inference request 13210, which can lead to the feedback 13216. An instance of training data may thus refer to the paired outcome and request identifier. To retrieve the instance of training data, the cognitive processes system 13202 can query the training data data store 13206 according to the request identifier.

The enhancement system 13208 may, in some cases, receive the inference requests 13210 before the cognitive processes system 13202. In such a case, the enhancement system 13208 processes an inference request 13210 by enhancing some or all of the elements of the request, including the model identifier(s), the features defined by the target of the inference request 13210, the task with which the target is associated, prioritization of the request for processing within the cognitive processes system 13202, and the like. In embodiments, the enhancement system 13208 may enhance the features by determining additional features to include in the target. In embodiments, the enhancement system 13208 may enhance the model identifiers by adjusting at least one of the model identifier, the model version, model inputs, model outputs, model control parameters, and the like. In embodiments, the enhancement system 13208 enhances the inference request by determining a degree of experience with the task associated with the request and based thereon determining a scope of feature enhancement. In embodiments, the enhancement system 13208 enhances processing prioritization of the request so that, for example, the enhancement system and/or the cognitive processes system processes the request (e.g., to enhance the request and/or to generate one or more inferences) before processing other requests that may have been received ahead of the request.

The enhancement system 13208 can determine the additional features by retrieving data related to the features of the target from one or more data sources, such as one or more data sources that are external to the AI/ML System 1300. For example, the enhancement system 13208 may query one or more of a proprietary data store, a third-party data store, or another data source for the additional features. The proprietary data store may be a data store used to store data for operating, running, and/or accessing the software product for which the AI/ML System 1300 generates the inference outcomes 13214. For example, the proprietary data store may be under the control of an entity that also controls the software product. The third-party data store may be a data store controlled by an entity that does not also control the software product or the AI/ML System 1300. The other data sources may include examples not already described. In embodiments, the enhancement system 13208 may determine the additional features by retrieving data related to the features in the request from one or more data sources internal to and/or controlled by the platform, such as one or more data sets including model inputs used by the cognitive processes system in producing one or more inference outcomes prior to receiving the present inference request. Examples may include input values that are not currently determined from the inference request but that were previously used in processing the model identified in the current request by the cognitive processes system 13202, such as a prior instance of the current inference request, an instance of processing the model identifier for a different request, and the like. In embodiments, the enhancement system 13208 may determine additional features by processing information produced by the cognitive processes system, such prior inference outcomes and the like using, for example, the model identified in the inference request, a later version of the model identified in the inference request and the like.

The enhancement system may select among a plurality of data sources from which it may retrieve information for enhancing the target. Selecting among the plurality of data sources may be based on aspects of the request, such as a model identifier(s), a target, a task associated with the target, a requestor of the inference, and the like. In embodiments, a first data set owned by the requestor and a second data set owned by a competitor of the requestor may be accessible to the enhancement system. In a first example, the enhancement system 13208 may recognize that the second data set is for a competitor of the requestor based on metadata associated with the request, the first and second data sets, public competitor information, and the like. The enhancement system may pass over the competitor owned data set when selecting features for enhancing the target. Alternatively, the enhancement system may access the competitor's data set, but may obfuscate the source of the data or may process the competitor's data to make it more generic (i.e., genericize, reduce detail, obfuscate, anonymize, and the like) for use to enhance any request. In embodiments, a model identifier in an inference request may be used as a portion of an index for determining which data sources to use for target feature enhancement. In a model identifier-based data set selection example, a data set having to do with sports interests of users, some of whom may be identified in the request may be unrelated to the model identifier of the request. The determination of whether the sports interest data set is related to the model identifier may be based on metadata associated with the sports interest data set that fails to match use criteria of the model. The determination may be made by the enhancement system comparing data indicating the type of information in the data set (e.g., sports interest data types, such as sport, favorite team, and the like) with information indicating types of inputs that the model identified in the request can best use. If the model inputs are not of a sports interest type, then the sports interest dataset, despite having a strong correlation with user identifiers in the request would not be selected for harvesting enhanced features.

In an aspect, a benefit of that AI/ML System 1300 may have many third-party requestors that are unaffiliated, may come from a wide range of businesses, may have a wide range of tasks to be performed and the like. By tracking relevant information about each request, data set used, inference generated, and the like, an automated process may allow determining aspects of requests that facilitate determining candidate model identifiers, enhancement data sources, and the like automatically. Use of information (e.g., input features) included in unaffiliated requests for the same model identifier may be an additional form of enhancement. In examples, a first request may indicate a first set of features and a second request may indicate a second set of features that only partially overlaps with the first set of features. The requests may indicate the same model (and/or same version of the model). The two sets of features from the two unaffiliated requests may be aggregated as a form of enhancement for producing inferences for either or both requests; thereby providing additional candidate inferences that may be further processed, such as through an inference selection process described elsewhere herein. In embodiments, the systems and methodologies disclosed herein can facilitate plugging into a variety of other sources and by integrating with a product area, the data from the variety of other sources can be deduplicated, which can, in turn, facilitate automatic connectivity with other data sources and the deduplication of that data, as needed.

The enhancement system 13208 includes or otherwise accesses interface definitions for each of the data sources from which it retrieves the additional features. For example, an interface definition may include or otherwise refer to an identifier of the data source and an API of the data source or of a management system of the data source. The data sources accessed using the enhancement system 13208 may not directly relate to the task underlying the inference request. For example, where the inference request 13210 asks whether a particular user of a software product is likely to purchase an upgraded license for the software product, the data sources accessed using the enhancement system 13208 may include data sources related to the history of the user with the software product and related software products, but also data sources related to a profession of the user, an age of the user, and the like. In other examples, where the inference request 13210 asks what the most effective time is to send an email to that particular user, the data sources accessed using the enhancement system 13208 may include data sources indicating a time zone in which the user lives and past email viewing activity, but also data sources indicating the web history of the user. The examples disclosed herein detail additional methodologies, techniques and systems for selecting enhancement feature data sources, such as types of information that may be useful for processing a request. There may be a set of enhancement data source identification cross-references that allows the enhancement system to, for each word, phrase, image and the like expressed in the request (e.g., "user", "upgrade", "license", and the like) determine other related types of information that may be used to enhance the target. As an example, the word "user" describing a task in a request may be matched to such a cross-reference which may produce terms describing enhancement data such as "use history", "age", "profession" and the like. Similarly, "time" may be cross-referenced to "time zone", "time of email viewing activity", and the like.

Where the enhancement system 13208 seeks access to a data source within an application ecosystem of the software product, the enhancement system 13208 may not need to first obtain access permissions from the entity which controls the software product. Similarly, where the enhancement system 13208 seeks access to a data source, which is not within an application ecosystem of the software product, the enhancement system 13208 may need to first obtain such access permissions from the entity which controls that data source.

The enhancement system 13208 can use the features included in the inference request 13210 to determine the additional features. For example, where the target in the inference request indicates the feature of a user identifier, the enhancement system 13208 can query one or more of the external data sources for information related to the user identifier, including, for example, the job title of the user and the education level of the user. In such a case, the external data sources may include a customer relationship management database. The enhancement system 13208 can add those additional features to the target to enhance the inference request 13210.

The enhancement system 13208 may also or instead determine the additional features based on the model identifier of the inference request 13210. For example, a record of a model 13212 stored in the model data store 13204 may include a list of features associated with the model 13212. For example, a model 13212 created to determine content items to recommend to users of a given topic may include features of user identifiers, content identifiers, user preferences, content category types, and the like. This information may be used to further refine which data types and data sources to query for enhancement features.

The enhancement system 13208 may also or instead use information included in the feedback 13216 to determine the additional features to include in the target. For example, an outcome included in the feedback 13216 for an inference request 13210 may indicate that the inference outcome 13214 was inaccurate (e.g., based on a threshold comparison). In such a case, the enhancement system 13208 can be programmed and/or configured to include additional features to train the model 13212, since for example, processing additional features with a model may be known to improve the accuracy of a subsequent inference outcome 13214.

After the enhancement system 13208 enhances the inference request 13210, the enhanced inference request 13210 is passed along to the cognitive processes system 13202. The cognitive processes system 13202 can then process the enhanced inference request 13210 as disclosed herein to generate one or more of the inference outcomes 13214. Using an enhanced inference request 13210 may result in a more accurate inference outcome 13214. For example, the additional features included in the target may more exactly identify the specific details which need to be processed using the applicable one or more models 13212. That is, as a result of the enhancement, the models 13212 can more accurately apply weights to various features to determine one or more of the inference outcomes 13214 that more closely translates to a real-world outcome. The process of enhancement alone may reduce the need for training the one or more machine learning models 13212 at least because each enhanced inference generated may reduce negative feedback regarding inference accuracy. The process of enhancement may also facilitate reduced bias being trained into a machine learning model by relying on a range of features, feature sources, and the like.

Embodiments of the AI/ML System 1300 may differ from what is shown and described with respect to the Figures. In some embodiments, the enhancement system 13208 may be omitted. In some embodiments, the model data store 13204 and the training data data store 13206 may be combined into one data store. For example, the model data store 13204 and the training data data store 13206 may represent sub-spaces in which information for training data and models are stored in a combined data store.

In some embodiments, the AI/ML System 1300 may facilitate automated data collection for both generating inferences and for updating, training, or both, one or more models. In embodiments, the AI/ML System may implement a timeout policy. Such a timeout policy may facilitate capturing inaction as a form of feedback. For example, the timeout policy can specify an amount of time after one or more of the inference outcomes 13214 are transmitted during which the feedback 13216 based on that inference outcome 13214 can be received. In the event the time period elapses, such as because no corresponding feedback 13216 was received, the inference outcome may be discarded or otherwise ignored, and the model 13212 used to produce the one or more inference outcomes 13214 may not be updated or otherwise trained as a result of the inference performed based on the underlying inference request 13210. In embodiments, when the feedback timeout expires, the model may be updated or otherwise trained with a default feedback value, such as a value that is selected from a default feedback data set 13218. This may be beneficial for automating machine learning model training in the AI/ML System 1300, when for example, a task for which the inference is generated and transmitted to the computer may not complete, such as when the task involves a human acting. One or more candidate reasons for the task not completing and/or the feedback not being returned may include, for example, in model control information may be provided or referenced in the inference request; may be learned based on feedback from prior uses of the model; may be undefined, thereby enabling the model to perform randomized learning; and the like. In examples, an inference generated and transmitted to a computer for evaluating a task may provide information regarding a likelihood that a user will reply to an email. The model or the machine learning system may assign a default value of feedback for this task, such as the user did not reply to the email. In embodiments, this default value may be captured in a default feedback data set 13218. This default response may be used in association with the instance of use of the model that was processed to generate an inference to train the model as if the user did not reply to the email.

In some embodiments, the AI/ML System 1300 may purge or ignore certain training data stored in the training data data store 13206. For example, training data that is older than a threshold age may be purged automatically, such as to comply with one or more data retention policies that may be based on protecting privacy of an owner of the information, to comply with legal data retention guidelines, and the like. In other examples, training data that is older than a threshold age may remain in the training data data store 13206, but not be further used for training the models 13212. While this older than a threshold age data may not be used for training, by retaining it, further analysis on historical activities, such as model training related metrics and the like can be produced and/or analyzed.

In some embodiments, the cognitive processes system 13202 performs batch processing of training data stored in the training data data store 13206. For example, on a fixed time interval or otherwise, the cognitive processes system 13202 may be configured to train the models 13212 using training data stored within the training data data store 13206 within a recent time threshold. For example, every other day, the cognitive process system 13202 can perform updates based on training data that has been stored within the last forty-eight hours. Batch processing may provide benefits to an AI/ML System 1300 including reducing costs, providing access to computing resources (e.g., for inference generation and the like) on a timely basis, optimizing use of computing resources for inference requests that share common elements, such as a common model and the like. Batching may also facilitate reduced impact on third-party data sets from which, for example, enhanced features may be retrieved by gathering features for several inference requests with fewer queries of the third-party data set.

Figure 2C:
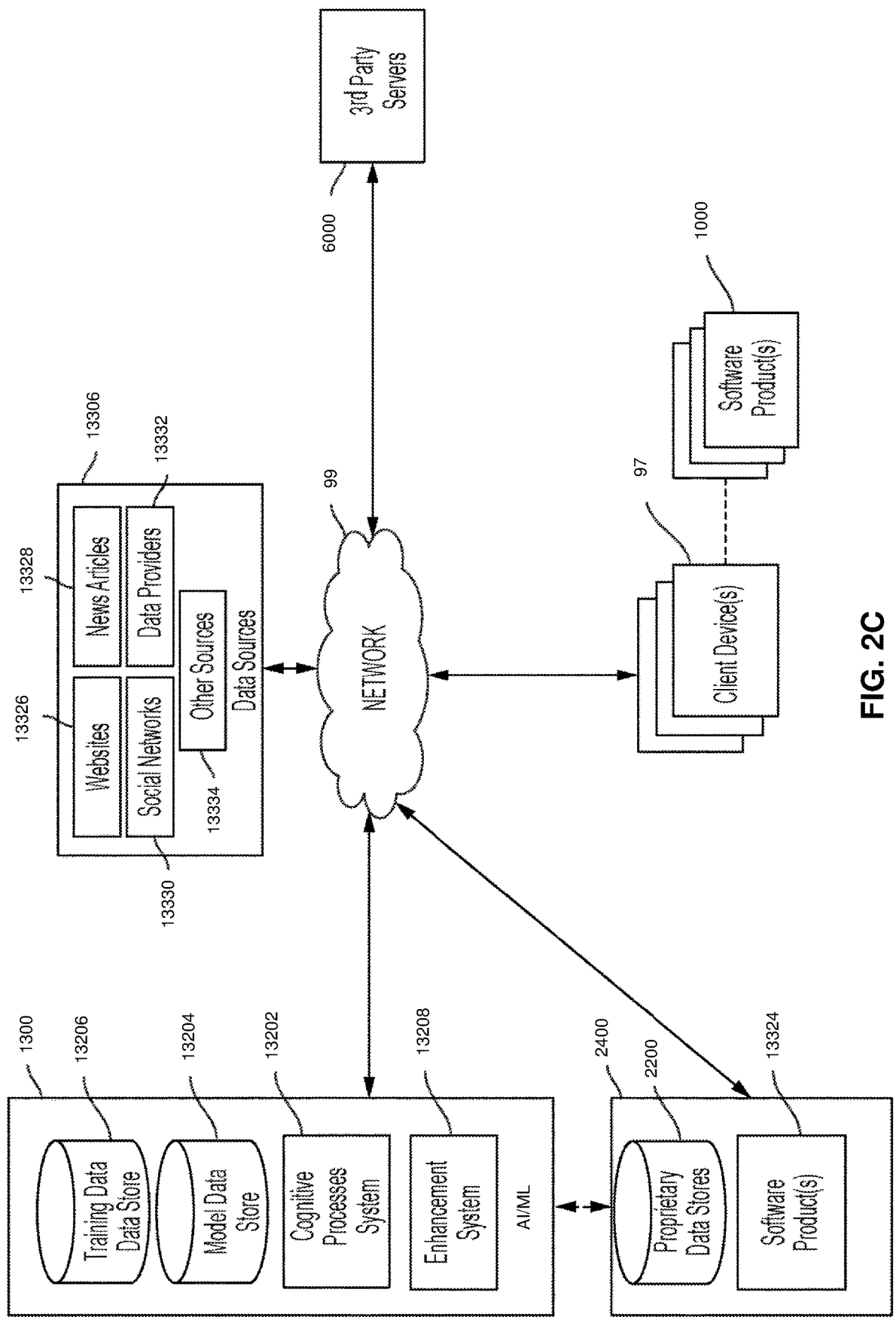

FIG. 2C illustrates a block diagram showing examples of an AI/ML System 1300 implemented within a networked computer system. The AI/ML System 1300 may, for example, be the AI/ML System 1300 shown in FIG. 2 or another AI/ML system. The networked computer system, as shown in FIG. 3, includes the AI/ML System 1300, client devices 97, an application ecosystem, data sources 13306, and third-party servers 6000, which communicate over a network 99.

The AI/ML System 1300 includes a cognitive processes system 13202, a model data store 13204, a training data data store 13206, and an enhancement system 13208, which may, for example. The AI/ML System 1300 receives an inference request from a client device 97 and/or the platform 1000 and processes the inference request to produce an inference outcome using one or more models stored in the model data store 13204. The AI/ML System 1300 may also receive feedback from the client device 97 and/or the platform 1000 and use that feedback to train the one or more models used to process the corresponding inference request. In an aspect, the client devices 97 are not controlled by an entity that controls the AI/ML System 1300. The clients 97 and/or platform 1000 may utilize an API framework of the AI/ML System 1300. For example, an API call can be used to transmit inference requests to the AI/ML System 1300, to request inference outcomes from the AI/ML System 1300, to transmit feedback based on an inference outcome to the AI/ML System 1300, and so forth. As such, the API calls are typically received by the cognitive processes system 13312. In some cases, however, the API calls can be received by the enhancement system 13318, such as where the enhancement system 13318 enhances the features in a target before an inference request is processed.

The data sources 13306 include or otherwise refer to data sources, which are external to the AI/ML System 1300 and external to the platform. The data sources 13306 may, for example, include websites 13326, news articles 13328, social networks 13330, data providers 13332 (e.g., databases maintained thereby), or other sources 13334. The data sources 13306 may, in some cases, be used by the AI/ML System 1300 to enhance the features in a target before an inference request received at the AI/ML System 1300 is processed. For example, the enhancement system 13318 can query one or more of the data sources to determine additional features to include in the target. The enhancement system 13318 can then enhance the target by adding those additional features to it. In some embodiments, a user can define access permissions for specific data sources 13306 to be accessed using the enhancement system 13208. In other examples, the user can configure the enhancement system 13208 to prioritize particular data sources 13306.

The application server, which can be implemented using processing threads, virtual machine instantiations, or other computing features, executes instructions to deliver services of the AI/ML System 1300 to a client device 302. The database server, which may include a storage unit for implementing one or more databases, is accessed by the application server in connection with the delivery of those services of the AI/ML System 1300 to the client device 302. The application server and the database server may be used to instantiate a single tenant instance or a multi-tenant instance of software associated with the services of the AI/ML System 1300. Separate instances of the AI/ML System 1300 may be instantiated for different client devices 302. For example, application servers and database servers used for the AI/ML System 1300 can respectively be implemented using application nodes and database nodes. An application node instantiates a version of the software associated with the services of the AI/ML System 1300 for access and use by a client device 302. A database node instantiates data of that software version for use by the application node.

Figure 2D:
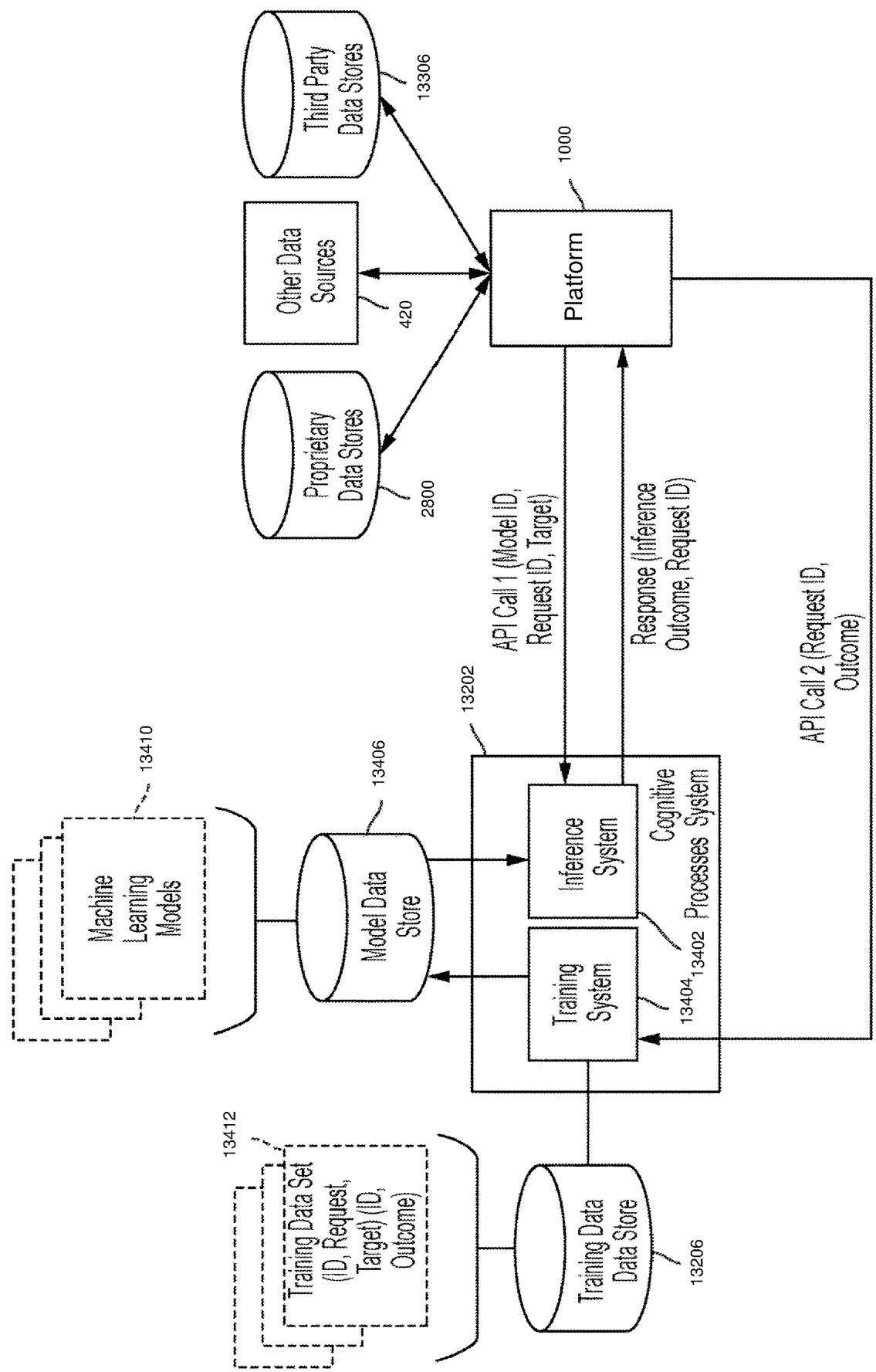
Figure 3:
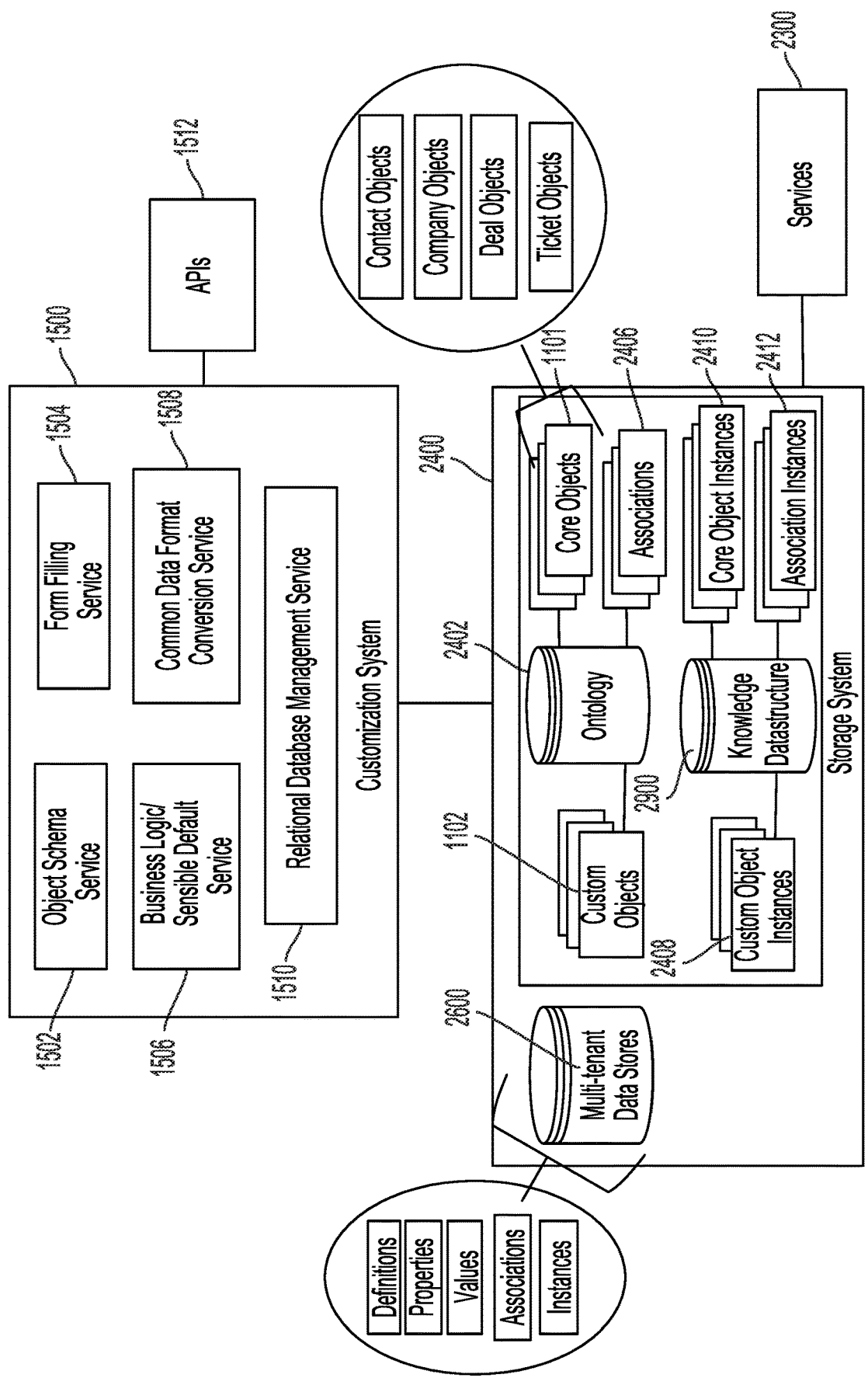
FIGS. 3-5 are block diagrams illustrating examples of computing environment wherein one or more of the provisions set forth herein may be implemented.

FIG. 2D is a block diagram showing example environments of an AI/ML system. The environment includes a cognitive processes system 13202, which may, for example, be the cognitive processes system 13202 shown in FIG. 2C. The cognitive processes system 13202 includes an inference system 13402 and a training system 404. The inference system 13402 includes or otherwise refers to the inference functionality of the cognitive processes system 13202. For example, the inference system 13402 can receive inference requests, process the inference requests, and generate inference outcomes. The training system 13404 includes or otherwise refers to the training functionality of the cognitive processes system 13202. For example, the training system 13404 can train models stored in a model data store 13406 (e.g., the model data store 13204 shown in FIG. 2C), such as based on an output of the inference system 13402 and/or based on feedback received after an inference outcome is transmitted from the inference system 13402. The environment also includes the model data store 13406 and a training data data store 13206 (e.g., the training data data store 13206 shown in FIG. 2C). The model data store 13406 stores records of machine learning models 13410 (e.g., the models 13106 shown in FIG. 2A). The training data data store 13206 stores training data sets 13412 used to train the machine learning models 13410. The cognitive processes system 13202 performs inference and training operations on behalf of a software product 13324. The software product 13324 may be a software product that communicates indirectly with the cognitive processes system 13202, such as through a client (e.g., the software product 1000 and the client 97 shown in FIG. 2C). Alternatively, the software product 13324 may be a software product which communicates directly with the cognitive processes system 13202, such as from within an application ecosystem (e.g., the software product 13324 and the application ecosystem 2400 shown in FIG. 2C).

The software product 13324 can use data from one or more of proprietary data stores 2800, third-party data stores 13306, and/or other data sources 420. For example, the proprietary data stores 2800 may include or refer to data stores internal to an application ecosystem of the software product 13324 (e.g., the proprietary data stores 2200 of the application ecosystem 2400). The third-party data stores 13306 may include or refer to data stores accessible to or third-party servers (e.g., the third-party servers 6000 shown in FIG. 2C). The other data sources 420 may include or refer to data sources other than the proprietary data stores 2800 and the third-party data stores 13306 (e.g., one or more of the data sources 13306 shown in FIG. 2C).

The software product 13324 makes API calls (e.g., using an API framework of the AI/ML System that includes the cognitive processes system 13202) to initiate processing by the cognitive processes system 13202. For example, the software product 13324 (a software product hosted by platform 1000) can make a first API call to transmit an inference request to the inference system 13402. The inference request of the first API call includes a model identifier, a request identifier, and a target. The inference system 13402 can process the inference request of the first API call and then transmit a response to the first API call to the software product 13324. The response to the first API call can include an inference response and the request identifier from the inference request.

The software product 13324 can then make a second API call to transmit feedback to the training system 13404. The feedback of the second API call includes the request identifier from the inference request of the first API call and an outcome corresponding to the inference outcome from the response to the first API call. The training system 13404 can process the second API call to train or generate one or more training data sets 13412 to use for training one or more of the machine learning models 13410.

In processing an inference request (e.g., received in a first API call from the software product), the inference system 13402 can perform pre-processing methodologies, techniques, and the like to identify the features defined by the target in the inference request, for example, feature extraction, entity recognition, or the like. In some cases, performing the pre-processing methodologies, techniques or other systems can include using a task underlying the inference request to determine a series of subtasks, which may be useful to process that task. For example, where the task asks for the best time to send an email to a particular recipient, the subtasks may relate to determining the likelihood that the particular recipient will view the email at certain times. For example, a first subtask may relate to determining that likelihood at a first time of the day, a second subtask may relate to determining that likelihood at a second time of the day, and so forth. Once those features are identified, the inference system 13402 can process the inference request by feeding those features into the model identified by the inference request. Performing inference using the identified model and the identified features can include the inference system 13402 generating a number of inference outcomes as candidates for the inference request and then using a selection strategy to select one of those inference outcomes as the final output of the inference process.

For example, the selection strategy may be a maximum likelihood estimation. In such an example, each of the candidate inference outcomes can be given a score representing a confidence of that candidate inference outcome. The inference system 13402 can use the maximum likelihood estimation to select an inference outcome based on the inference outcome having a highest score amongst the candidate inference outcomes.

In other examples, the selection strategy may be a multi-arm bandit approach. In such an example, the inference system 13402 may select the candidate inference outcome with the greatest predicted outcome. The predicted outcome for a candidate inference outcome is determined as a function of the depth of the data used to generate that candidate inference outcome (e.g., how wide or narrow the value distribution is) and the likelihood that the candidate inference outcome is an accurate outcome for the task underlying the inference request that leads to it (e.g., how high the peak for the distribution is).

The multi-arm bandit approach explores the candidate inference outcomes which have lower peaks in the value distribution, such as to determine whether one of those may be capable of a highest overall peak for the distribution. The multi-arm bandit approach further exploits the highest overall peak for selection as the output inference outcome. For example, the multi-arm bandit approach may use an Epsilon-greedy policy, a Thomson policy, or another policy for exploring and exploiting the values in a candidate inference outcome distribution. Given that the multi-arm bandit approach is used to select an inference outcome, which will then be used to train the one or more models that generated the inference outcome, the multi-arm bandit approach may also be referred to as a contextual multi-arm bandit approach.

For example, an inference request in a first API call to the inference system 13402 can refer to the task of determining a best time at which to send someone an email. The features in the target of the first API call may indicate different ages for the possible email recipients. The inference system 13402 can use a multi-arm bandit approach to process the inference request. The multi-arm bandit approach may initially determine that a particular time is best for most people; however, certain peaks corresponding to specific age groups may merit further exploration. In such an event, the multi-arm bandit approach further iterates on those peaks to determine whether they may actually achieve a higher value than the initially determined best time.

Embodiments of the environment of an AI/ML System 1300 may differ from what is shown and described with respect to FIG. 2D. In some embodiments, the software product 13324 may receive a response to the second API call from the cognitive processes system 13202. For example, the response to the second API call can indicate a result of a training performed based on the contents of the second API call and/or the successful creation of a training data set 412 based on those contents.

In some embodiments, the API calls may be received from a client (e.g., one of the client devices 97 shown in FIG. 2C) rather than from the software product 13324. For example, the client can make a first API call to transmit the inference request, receive the response to the first API call, and make a second API call to transmit the feedback. In some embodiments, the client can also receive a response to the second API call from the cognitive processes system and/or otherwise communicate with the cognitive processes system 13202 on behalf of the software product 13324.

Figure 2E:
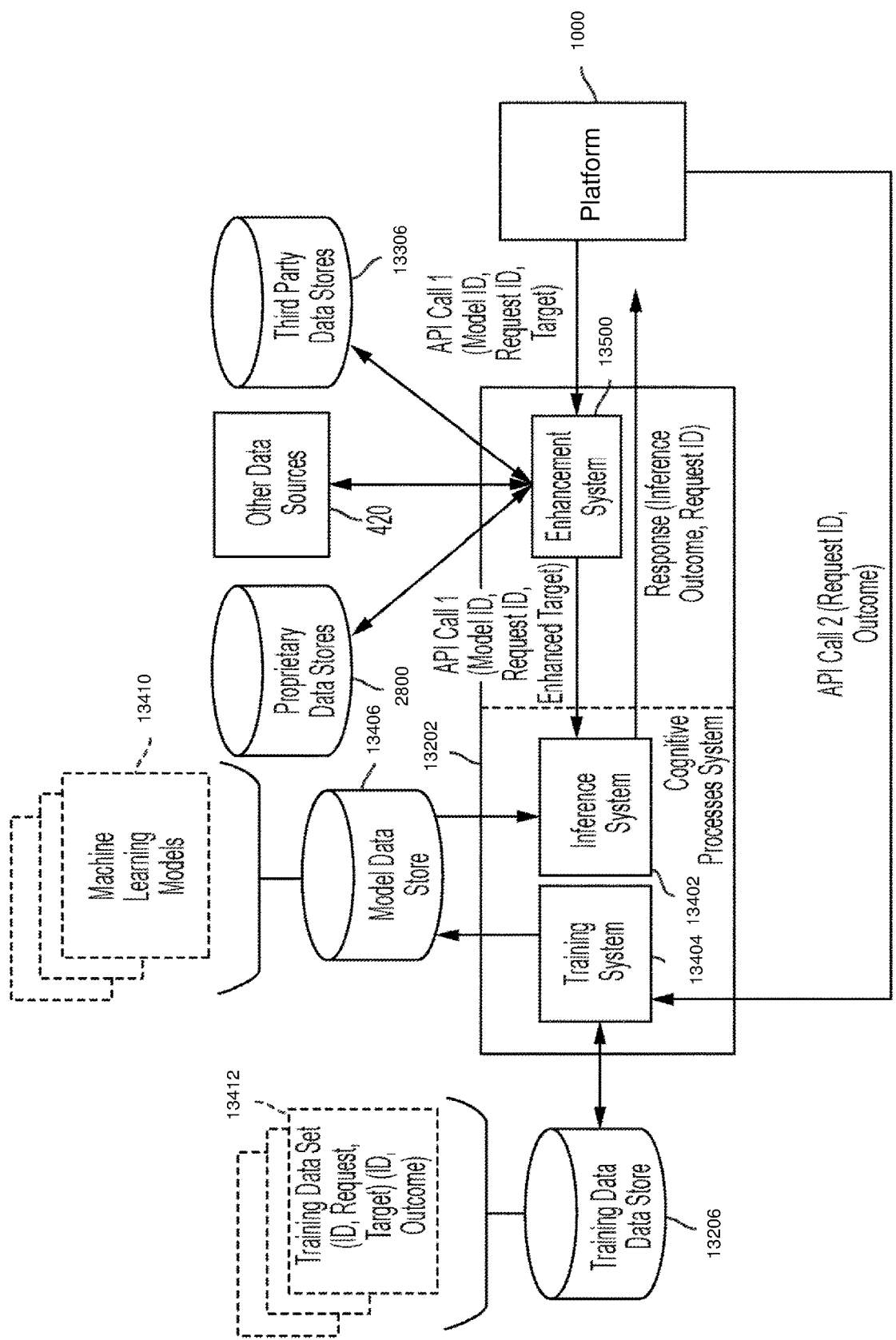

FIG. 2E is a block diagram showing the example environments of FIG. 2D including feature enhancement functionality in accordance with an aspect of the present disclosure. In particular, an enhancement system 13500, which may, for example, be the enhancement system 13500 shown in FIG. 3E or another enhancement system, is introduced within the environment shown in FIG. 2D. The enhancement system 13500 adds the additional features to the target included in the inference request of the first API call to result in an enhanced target. The enhanced target is then passed along from the enhancement system 13500 to the cognitive processes system 13202, such as for processing by the inference system 13402.

For example, the enhancement system 13500 can receive the first API call including the target. The enhancement system 13500 may then query the proprietary data stores 2800, the third-party data stores 13306, and/or the other data sources 420 for additional features to include in the target. After retrieving those additional features from the proprietary data stores 2800, the third-party data stores 13306, and/or the other data sources 420, the enhancement system 13500 enhances the target by adding the additional features to the set of features initially defined in the first API call. The first API call including the enhanced target is then sent from the enhancement system 13500 to the inference system 13402 for processing.

Embodiments of the environment of an AI/ML System may differ from what is shown and described with respect to FIG. 2E. In some embodiments, the first API call including the inference request may include one or more source identifiers for identifying one or more of the data sources to use to enhance the features of the target. For example, the enhancement system 13500 can use the one or more source identifiers in the first API call to determine which of the proprietary data stores 2800, the third-party data stores 13306, and/or the other data sources 420 to query for the additional features. In such an embodiment, a user of the entity which controls the software product may select the proprietary data stores 2800, the third-party data stores 13306, and/or the other data sources 420 which may be used to enhance a given target.

Alternatively, in such an embodiment, the selection of the proprietary data stores 2800, the third-party data stores 13306, and/or the other data sources 420 which may be used to enhance a given target may be automated, for example, by the enhancement system 13500. For example, the enhancement system 13500 can determine which of the proprietary data stores 2800, the third-party data stores 133066, and/or the other data sources 420 to use based on other contents within the inference request (e.g., the model identifier, the target, and/or the request identifier). In other examples, the enhancement system 13500 can determine which of the proprietary data stores 2800, the third-party data stores 13306, and/or the other data sources 420 to use based on recently processed inference requests, statistics indicating the most frequently accessed data sources, or other information which may be accessible to the enhancement system 13500.

Figure 2F:
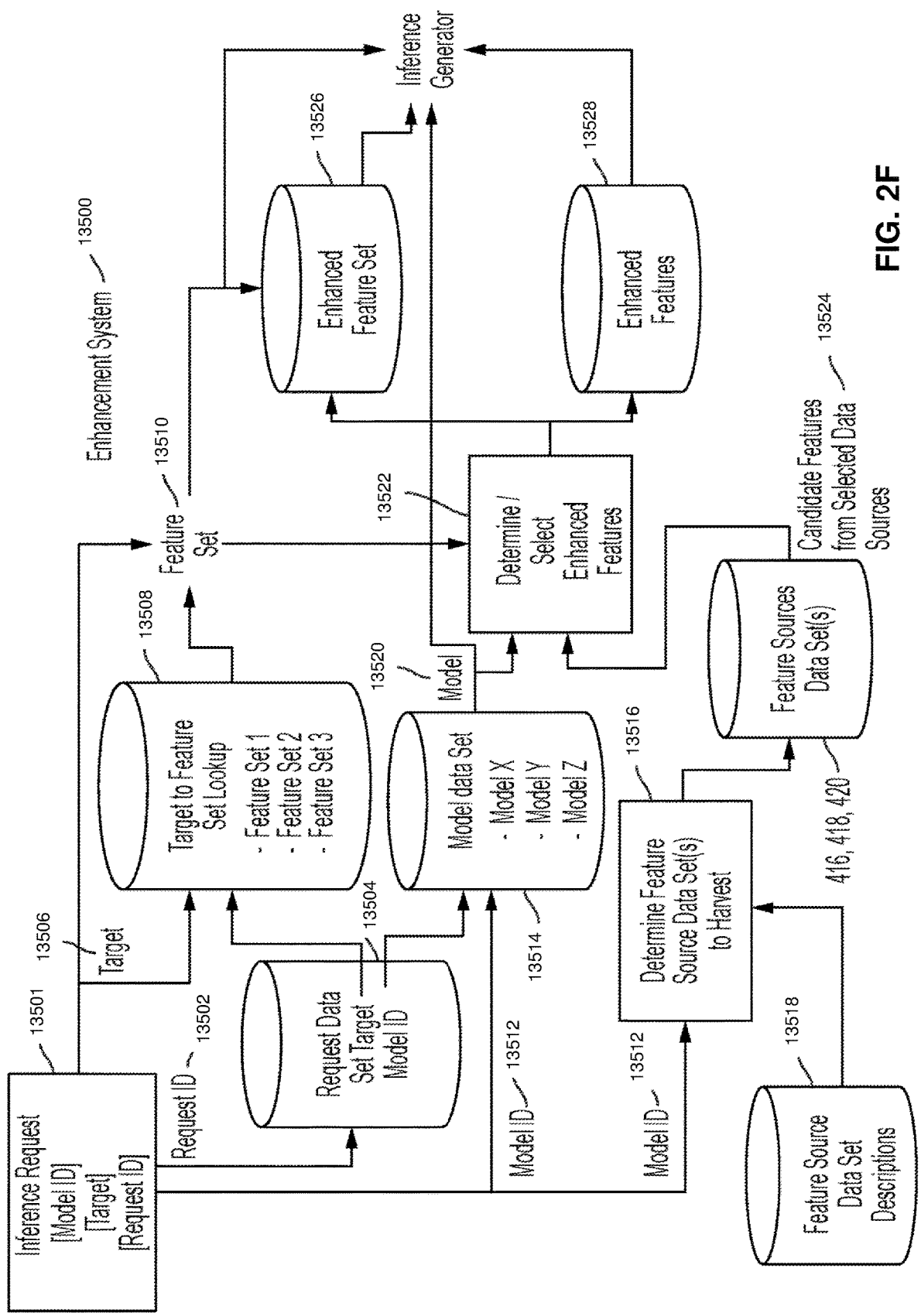

FIG. 2F depicts exemplary embodiments of the enhancement system 13500 in accordance with an aspect of the present disclosure. The enhancement system 13500 may process an inference request 13501 by separately operating on various contents of the inference request 13501, such as the model ID 13512, the target 13506 and the request ID 13502. In embodiments, the request ID 13502 may be processed with a request ID data set that may facilitate retrieving target and model ID information from the request ID alone. This may occur, such as when an earlier request was received by the enhancement system 13500 and a request data set 13504 was produced and/or updated. In embodiments, where the enhancement system 13500 is part of an ecosystem with a computer, such as client device 97 and the cognitive processes system 13202 and the like, request ID may be universally known and/or shared among the participating systems within the ecosystem. In embodiments, the request data set 13504 may be configured by a requestor, by the AI/ML System 1300, by an automated request ID generation process and the like.

At least one of the target 13506 and the target retrieved from the request data set 13504 may be used to access a feature data set 13508 that, for example, may provide access to features for each target 13056 value, such as by associating a feature set "Feature Set 1" to a first target 13056 value and associating feature set "Feature Set 2" to a second target 13056 value; thereby producing a feature set 13510 for use with the inference request 13501. As depicted in FIG. 2F, the feature set 13510 may be received directly with the inference request 13501, such as an array of values associated with the target 13506 included in the inference request 13501.

At least one of the model id 13512 and a model ID produced from the request data set 13504 may be used for determining which enhanced feature set to harvest and which of the available features in the feature set to select. In embodiments, model id 13512 and/or model id from data set 13504 may be processed by the enhancement system 13500 to determine at least one model 13520, such as by selecting a model from model data set 13514 with an index based on one or more of the model id 13512 and the model id of data set 13504.

Selection of an enhancement feature data store may be performed automatically by function 13516 based on, for example, other contents within the inference request (e.g., the model identifier, the target, and/or the request identifier). Also, the function 13516 can determine which of the enhanced feature source data sets (e.g., proprietary data stores 2800, the third-party data stores 13306, and/or the other data sources 420) to use based on recently processed inference requests, statistics indicating the most frequently accessed data sources, or other information which may be accessible to the enhancement system 13500, such as feature source data set descriptions 13518. The selected enhanced feature data stores may represent a set of candidate features for enhancement 13524.

Candidate enhancement features 13524 may be processed with an enhanced feature selection module 13522 that may apply methodologies, techniques, or the like for determining which features in the target to enhance. These methodologies, techniques, or the like may include determining a relative importance, for at least the indicated model, of the requested features. Information about a selected model 13520 may be used to facilitate selecting among the candidate enhancement feature 13524. Features (e.g., inputs to the model 13520) that are heavily weighted in the indicated model 13520 may be enhanced; whereas features that are not weighted or substantively lower in effective weight may not be enhanced. In embodiments, features in the feature set 13510 may be selected to enhance based on term frequency importance methodologies, techniques, or the like that facilitate determining, for a given statement or set of terms/phrases, a relative ranking, (e.g., gross level quantized ranking and the like) of the features. In examples, a term that appears often in historical requests for a given model identifier (or at least a type of model identified in the request) may be more likely to be enhanced than a term that occurs sparsely in such requests. Other methodologies, techniques, or the like for feature importance may be used as well, such as terms that appear to be important for a given task, a given requester and the like (e.g., a term that is specific to an industry, such as a form of jargon for the industry) may be targeted for enhancement independent of the frequency of use and/or the weighting of the feature in the indicated model. In embodiments, methodologies, techniques, or the like include determining which features enhance may include basing enhancement for a target are features in the target that have been used often as a source for enhancement in prior enhancements (e.g., prior iterations, unaffiliated requests, and the like).

Additionally, the enhancement system 13500 may recommend additional/alternate models for generating inferences based on aspects of the request, such as the model identifier, the target, the task, an identity of the requestor and the like. In an aspect, a request may identify a first model; however, the enhancement system may determine that a newer and/or enhanced model (or version thereof) is available and recommended for producing inferences, such as if the indicated model has been deemed to be obsolete for generating new inferences. This example may have little to do with the particulars of the request other than perhaps the apparent age of the indicated model. However, the recommended replacement model may require features (inputs) for best processing that are not present in the request 13501. Therefore, the enhancement system 13500 may use other methodologies, techniques, or the like for enhancing target feature sets, such as those noted herein for ensuring that all or at least a minimum number of model inputs/input types that the model can process are included in the inference feature set. For completeness, the AI/ML System 1300 may produce inferences for the indicated model (with and/or without an enhanced target set) and a determined alternate/enhanced model and present one or more of the produced inferences to the requestor and the like. The enhancement system 502 may further produce an enhanced feature set 13526 by, for example, combining the feature set 13510 and the features selected by the enhancement feature selection module 113522. Alternatively, the enhancement system 13500 may produce an enhanced features set 13528 that may be provided to the cognitive processes system 13202 for inference generation, and the like.

In an aspect, the AI/ML system 1300 utilizes data distributions for a selection strategy to process inference requests. Specifically, in an experiment, the distributions of values from inferences performed using a multi-armed bandit approach as the selection strategy after 50 trial inferences. Three value peaks are shown in which a rightmost peak corresponding to the x-axis value of 0.8 is the highest peak in the distribution. The multi-arm bandit approach for selecting the inference outcome may explore the other two peaks, such as by iterating on those values using one or more machine learning models and evaluating the results of the iteration. After a number of further trials are completed, the multi-arm bandit approach may indicate to exploit the highest peak of the distribution, so as to select a candidate inference outcome corresponding to that highest peak.

In another experiment, distributions of values from inferences were performed using a multi-armed bandit approach as the selection strategy after 500 trial inferences. The change in the peak values of the distribution represent the changes in the distribution after 450 further trials were iteratively conducted after the distribution was graphed. As compared to the distribution discussed above, the values for the two leftmost peaks were shown to have lowered in comparison to the rightmost peak, which remained the highest peak in the distribution. As such, the candidate inference outcome associated with that rightmost peak may have been selected as the inference outcome to indicate to a software product and/or to a client in response to an inference request. This is because that candidate inference outcome has been predicted, based on the iterative trials, to result in the most accurate results amongst the candidate inference outcomes. To further describe some embodiments in greater detail, reference is next made to examples of methodologies, techniques, or the like that may be performed by or using an AI/ML system 1300 in accordance with an aspect of the present disclosure.

Figure 2G:
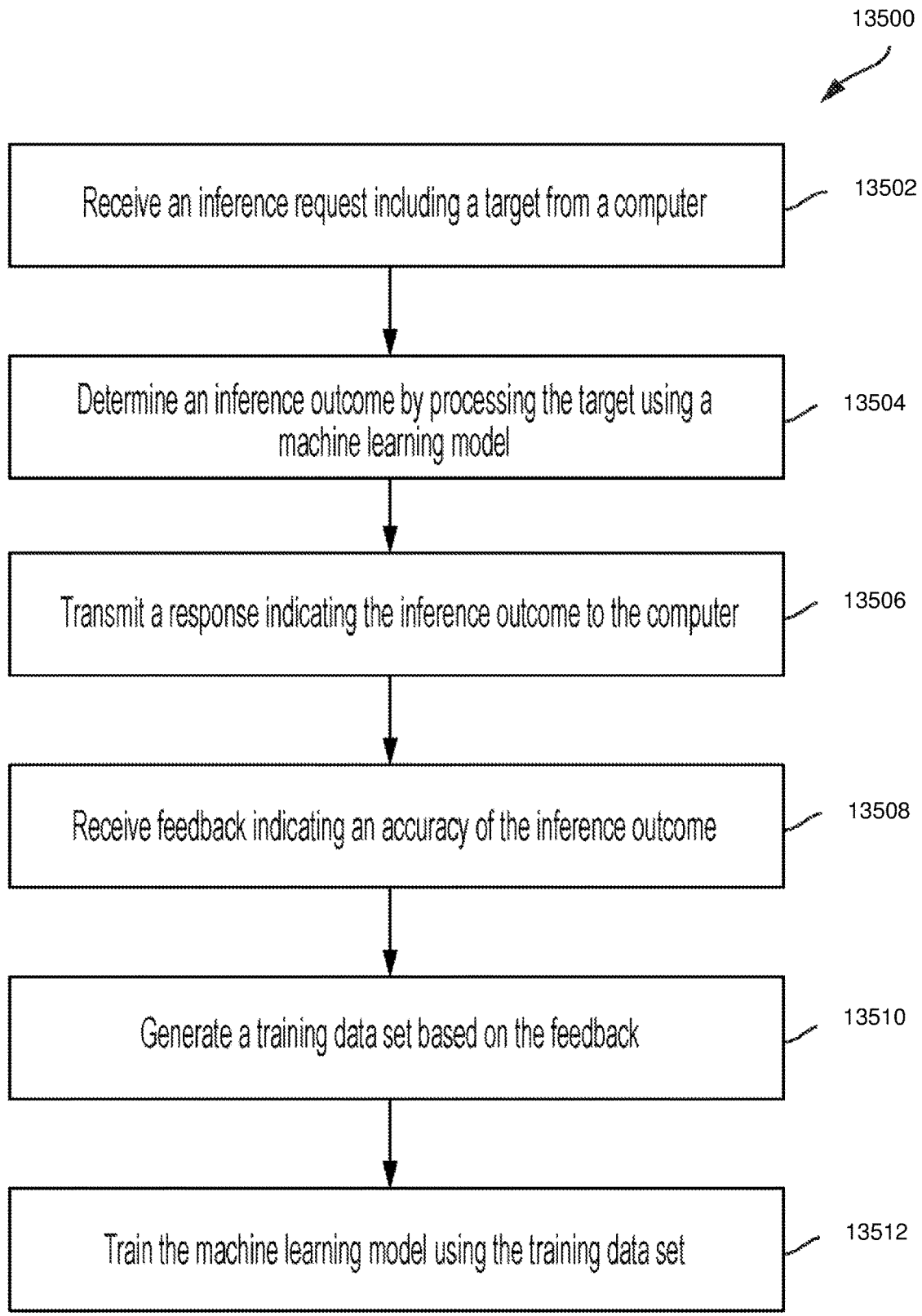
FIG. 2G is a flow chart illustrating an example of a set of operations for performing one or more of the provisions set forth herein.

FIG. 2G illustrates a flowchart showing examples of a method 13500 for processing an inference request and updating a machine learning model using an AI/ML system. At step 13502, an inference request is received from the platform 1000. The inference request includes a target defining a set of features related to a task to be processed by the AI/ML system 1300. The computer may be a computer used for a software product supported by a cognitive processes system of the AI/ML system 1300. Alternatively, the computer may be a client associated with a software product supported by the cognitive processes system. The inference request can be received in an API call made to the cognitive processes system. The inference request may further include a request identifier for uniquely identifying the inference request and the contents thereof. At step 13504, an inference outcome is determined by processing the target using one or more machine learning models of the AI/ML System 1300. Determining the inference outcome can include generating a plurality of candidate inference outcomes based on different processing of the target using one or more of the machine learning models identified by the inference request. A selection strategy can then be used to select one of the candidate inference outcomes as the inference outcome. For example, the selection strategy can be a maximum likelihood estimation or a multi-arm bandit approach. At step 13506, a response indicating the inference outcome is transmitted to the computer from which the inference request was received. At step 13508, after transmitting the response to the computer, feedback is received from the computer. That is, a user of the computer may compare the inference outcome against real-world outcomes of the task for which the inference request was made. The accuracy of the inference outcome can be measured according to the results of those comparisons. The feedback includes an outcome that indicates an accuracy of the inference outcome with respect to the task for which the inference request was made. The feedback can be received in an API call made to the cognitive processes system. The feedback can include the request identifier and an outcome indicating the accuracy of the inference outcome with respect to the task. The feedback can be associated with the inference request using the request identifier. At step 13510, a training data set is generated based on the feedback. The training data set includes the outcome and the request identifier as indicated in the feedback. The training data set may also include one or more features used to determine the outcome, such as features of particular relevance to the task underlying the inference request. At step 13512, the one or more machine learning models used to determine the inference outcome are trained using the training data set. Training a machine learning model using the training data set can include identifying a version of the machine learning model used to generate the inference outcome based on the request identifier and training the identified version of the machine learning model using the outcome. In this way, the training of a given machine learning model is limited to using data resulting from an inference performed using the given machine learning model.

In some embodiments, the method 13500 includes enhancing one or more features of the set of features before the inference request is received by the cognitive processes system. For example, an enhancement system of the AI/ML System 1300 can receive the inference request first and enhance it by adding features to the target. Enhancing the one or more features can include determining, based on the model identifier indicated in the inference request, to use one or more additional features for processing the inference request, wherein the one or more additional features are related to the one or more features. The one or more additional features can then be retrieved from one or more data sources and included within the set of features to result in an enhanced target. The enhancement system may then provide the enhanced target to the cognitive processes system to process the inference request.

Figure 2H:
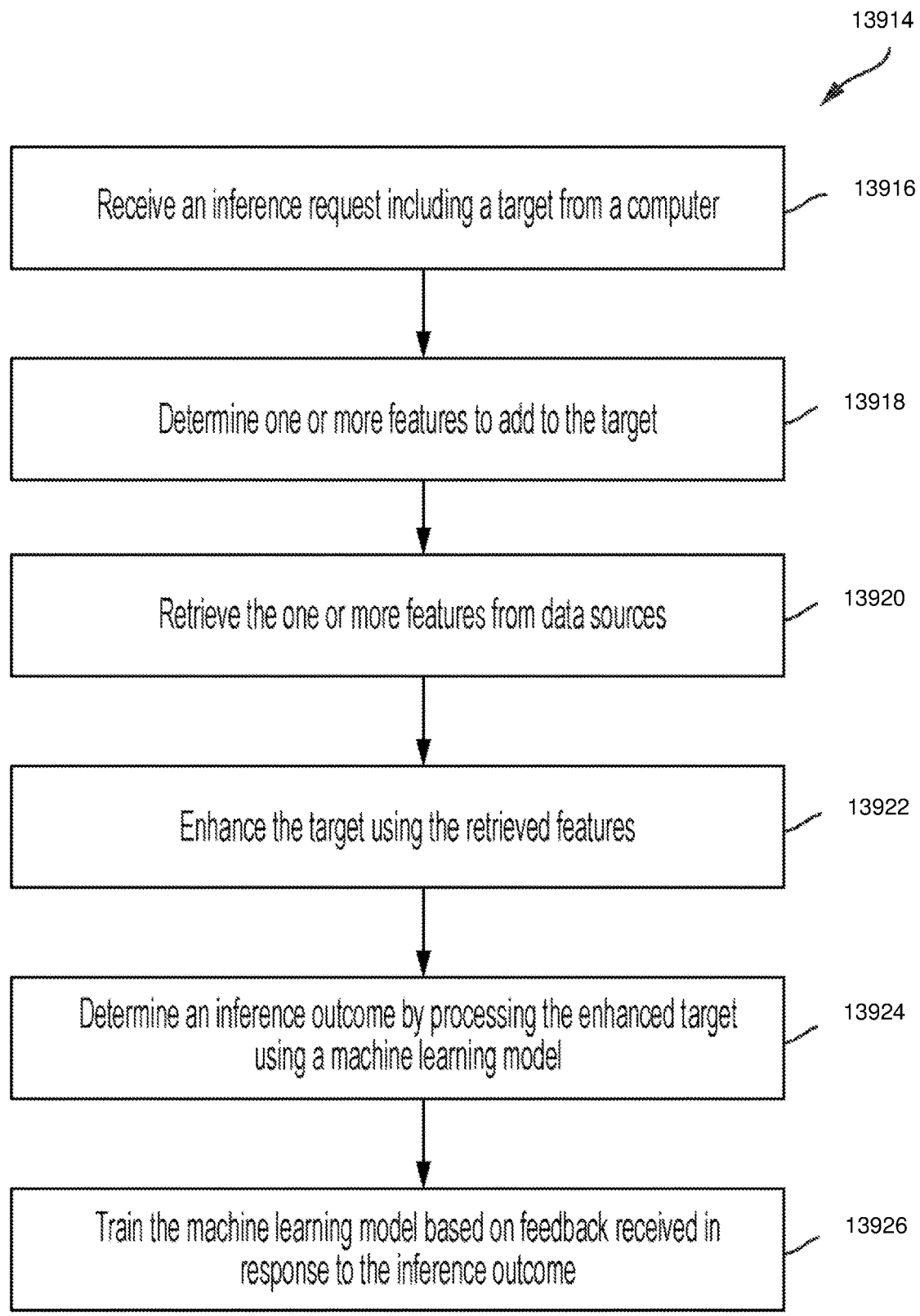
FIG. 2H is a flow chart illustrating an example of a set of operations for performing one or more of the provisions set forth herein.

Referring next to FIG. 2H, the method (step 1000) for enhancing features for processing an inference request and updating a machine learning model using an AI/ML System is shown in accordance with an aspect of the present disclosure. At 13916, an inference request is received from a computer. The inference request includes a target defining a set of features related to a task to be processed by the AI/ML system. The computer may be a computer used for a software product supported by the AI/ML system. Alternatively, the computer may be a client associated with a software product supported by the AI/ML system. The inference request can be received in an API call made to the AI/ML system. The inference request may further include a request identifier for uniquely identifying the inference request and the contents thereof. Specifically, the inference request is received by an enhancement system of the AI/ML system. At step 13918, one or more additional features to add to the target are determined by the AI/ML System. The one or more additional features can be determined based on the machine learning models associated with the model identifier of the inference request. Alternatively, the one or more additional features can be determined based on information associated with the features of the target and the task underlying the inference request. For example, where the target includes a set of features with user identifiers and the task relates to determining a number of the users who will become customers within a certain amount of time, the additional features may refer to past accounts or engagements with those users, indications of business dealings with those users, and the like. At step 13920, the one or more additional features are retrieved from one or more data sources. The one or more data sources may include at least one of a proprietary data store, a third-party data store, or another data source. Retrieving the additional features from the data sources can include the enhancement system querying the data sources based on the additional features. The queries can be structured according to the database management systems or other systems used to manage the data sources. Depending on whether a data source is internal to an application system which includes the software product or client from which the inference request was received, the enhancement system may or may not need to obtain access permissions before retrieving the additional features from that data source. At step 13922, the target is enhanced using the retrieved features. Enhancing the target using the retrieved features includes adding those features to the set of features already defined by the target. The enhanced target can then be provided from the enhancement system to the cognitive processes system of the AI/ML system. At step 13924, an inference outcome is determined by processing the enhanced target using one or more machine learning models. Determining the inference outcome can include generating a plurality of candidate inference outcomes based on different processing of the enhanced target using one or more of the machine learning models identified by the inference request. A selection strategy can then be used to select one of the candidate inference outcomes as the inference outcome. For example, the selection strategy can be a maximum likelihood estimation or a multi-arm bandit approach. At step 13926, the one or more machine learning models used to determine the inference outcome are trained using a training data set generated based on feedback to the inference outcome. That is, the inference outcome can be transmitted back to the client or software product from which the inference request was received. Thereafter, the client or software product can transmit feedback including an outcome that can indicate an accuracy of the inference outcome with respect to the task for which the inference request was made. The feedback can be received in an API call made to the cognitive processes system. The feedback can include the request identifier and an outcome indicating the accuracy of the inference outcome with respect to the task. The feedback can be associated with the inference request using the request identifier.

A training data set can then be generated based on the feedback. The training data set includes the outcome and the request identifier as indicated in the feedback. The training data set may also include one or more features used to determine the outcome, such as features of particular relevance to the task underlying the inference request. The one or more machine learning models used to determine the inference outcome are trained using the training data set. Training a machine learning model using the training data set can include identifying a version of the machine learning model used to generate the inference outcome based on the request identifier and training the identified version of the machine learning model using the outcome.

Figure 2I:
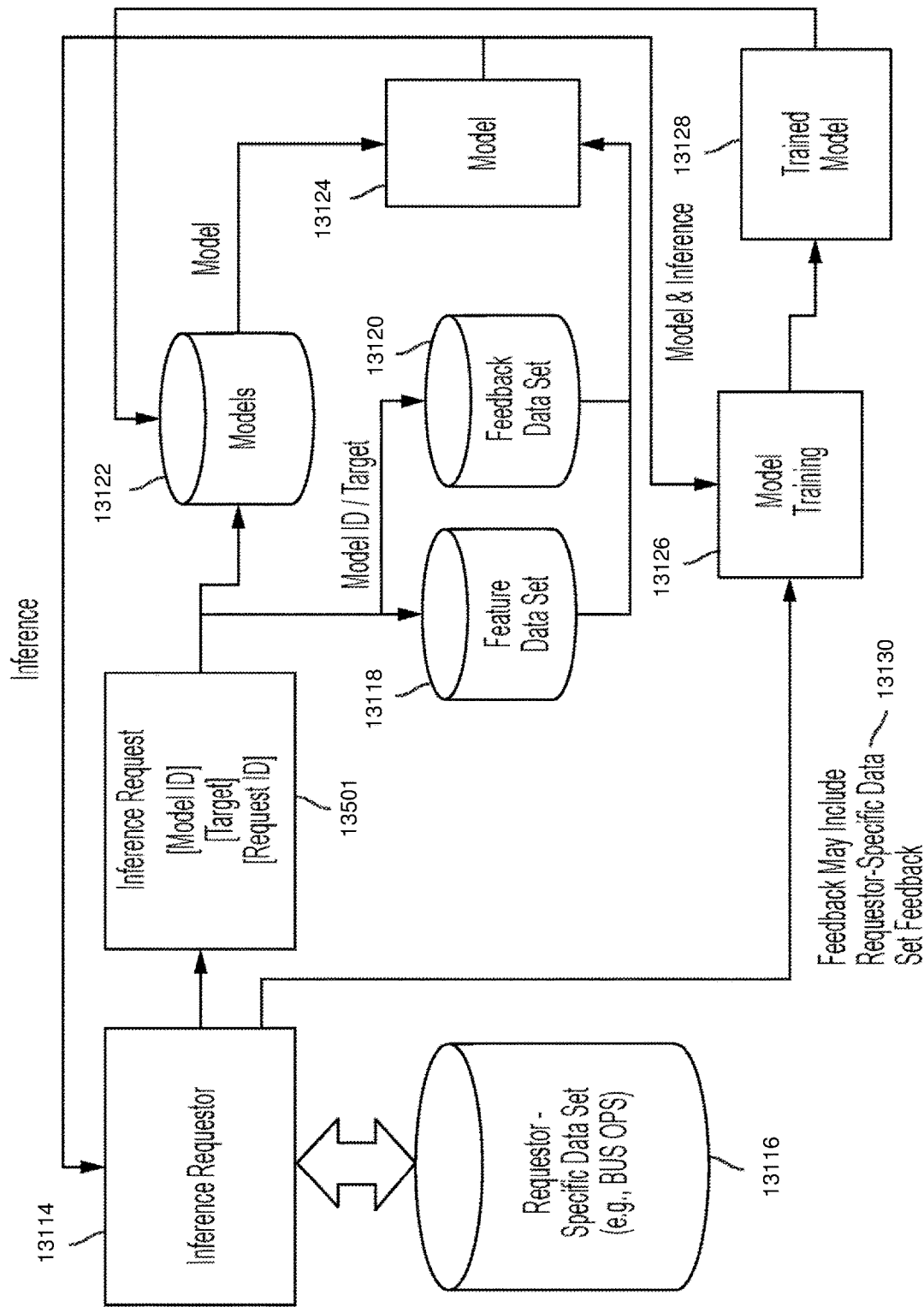
FIG. 2I is a block diagram illustrating an example of a computing environment wherein one or more of the provisions set forth herein may be implemented.

FIG. 2I depicts example embodiments in which the AI/ML System of the a machine learning model is built for processing an inference request without access to a database of the requestor. In embodiments, an information technology system, such as an AI/ML System 1300 as described herein may be configured to build a machine learning model to facilitate machine learning for performing a task of a customer without having access to specifics of the customer, such as having access to a customer-owned database. As shown in FIG. 2I, an inference requestor 13114 may have access to a requestor specific data set 13116, such as a business operations data set, customer list, and the like. The inference requestor 13114 may prepare an inference request 13501 that may include a target and request ID as described elsewhere herein. The inference request 13501 may further optionally include a model ID that may identify a machine learning model that can be selected from a data set of machine learning models 13122. By way of these examples, this model ID may be provided by the inference requestor 13114 or may be determined by the AI/ML System 1300 based on aspects of the request, such as the request ID, the target details, the task to be evaluated, and the like. However determined, a model 13124 for use by the cognitive processes system 13202 may be selected from the model data set 13514 based on only the information in the request 13501. In embodiments, the target and optionally the model ID may be used by the AI/ML System 1300 to retrieve features (e.g., from feature data set 13510, and the like) and/or feedback data (e.g., from feedback data set 13120, and the like) known to the AI/ML System 1300 to facilitate at least one of generating an inference with a model from the model data set 13122 or training the model from the model data set 13122. In embodiments, the inference may be generated and transmitted to the inference requestor 13114 where it may be processed and used to generate feedback 13130, such as requestor-specific data set feedback (optional) to be used for training 13126 the model 13124. In this way, the model 13124, which may be configured for a type of task (e.g., an email related task) may rely on the learning from the feedback 13130 for developing an understanding of aspects of the requestor business and the like without first needing to be configured with requestor-specific data 13116 and the like. In embodiments, a trained model 13128 may be used for further learning, such as by processing a subsequent inference request from the same requestor and the like. In this way, an inference requestor 13114 does not have to perform data culling of their data set 13116 to avoid, for example, providing old, stale information. While a business may desire to retain this information (e.g., customer historical transaction data), the machine learning model generation and training system may, in embodiments, operate without being impacted by this older information and without the inference requestor 13114 having to provide resources to selecting which data in the data set 13116 to hold back, and the like. This process, therefore, releases the inference requestor 13114 from having to become an expert on the machine learning process simply to gain the benefits of machine learning for their business operations.

Figure 2J:
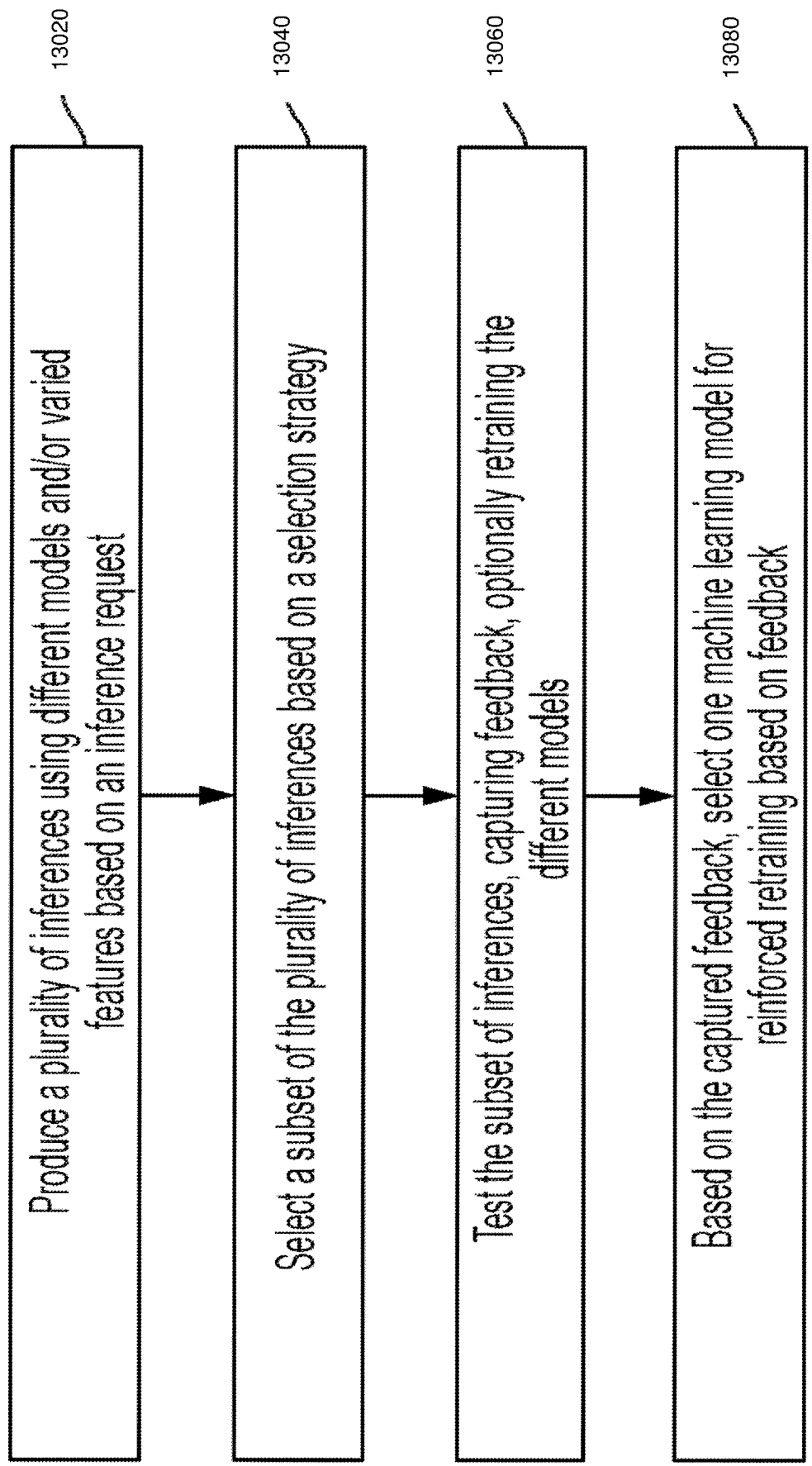
FIG. 2J is a flow chart illustrating an example of a set of operations for performing one or more of the provisions set forth herein.

FIG. 2J depicts exemplary embodiments in which an AI/ML System 1300 is enhanced with and/or facilitates improved with use of an A/B testing system of the platform 1000, wherein the A/B testing system is configured in the CMS System 1400 (FIG. 1). The AI/ML System 1300 may enhance A/B testing through use of the inference selection strategy and the like described elsewhere herein and provide learning-based insights regarding two cases to test in an A/B testing model. The AI/ML System 1300 may integrate features of A/B testing, such as promoting one of the two (A or B) cases to collect data on, for example, acceptance of the promoted case. This can be accomplished by including an A/B testing selection strategy for selecting which of a plurality of inferences to transmit for use in task evaluation as described herein. As an objective of A/B testing is to determine which of two cases produces more favorable results, feedback in the AI/ML System 1300 described herein may be used as input to the inference selection strategy; thereby, using learning from the feedback to accomplish this A/B testing objective. If feedback of a selected inference over time indicates the inference produces desirable results, the inference may, in embodiments, be selected more often. Additionally, the inference may be refined by the feedback; thereby not only providing benefits of A/B testing but also further improving performance through learning methodologies, techniques, and the like, such as machine learning and the like. In the embodiments depicted in FIG. 2J, the cognitive processes system 13202 may produce a plurality of inferences at 13020 using, for example, different models with a given target or various features for a given model or a combination thereof. The set of inferences produced at 13020 may be processed at 13040 with a selection strategy to select a subset of inferences. At 13060, the subset of inference may be tested, such as by capturing feedback on use of each inference that may indicate with of the subset (e.g., which case in an A/B set of inferences is preferred) and optionally retraining a model that produced the inference to improve further the inferences to be tested. In embodiments, based on the captured feedback, in step 13080 one of the machine learning models (e.g., if a plurality of models were used in step 13020) for reinforcing training based on the feedback.

In a first use case example, the AI/ML System 1300 can be deployed for improving document and record search results, such as for content strategy solution. A task underlying an inference request may ask how to improve the likelihood that a search result will be interacted with by a platform user. The AI/ML System 1300 can receive an inference request indicating to use a search-related machine learning model and a target defining features such as queries that may be entered into a search bar, the search history of one or more platform users, the website from which a search is made, and the like. The AI/ML System 1300 processes those features against the identified search-related model to determine an inference outcome which suggests that a search result with any of a list of terms will result in an increased likelihood of interaction. The AI/ML System 1300 can later receive feedback indicating whether users clicked on the search results which included one or more of those terms. That feedback can then be used to further train the search-related model.

As will be discussed below, the AI/ML System 1300 can be configured for predictive lead scoring. For example, predictive lead scoring can refer to separately scoring leads for users and for contexts. The inference request received can relate to the task of determining a likelihood that a particular user customer 97 will make a purchase for some product or service. The target included in the inference request can include features of past user activity, an indication of whether the user has used the platform within a recent time period, an indication of whether the user has opted out of marketing emails, a number of responses to previous emails received from the user, and the like. The AI/ML System 1300 can use a multi-arm bandit approach to determine the inference outcome. For example, the multi-arm bandit approach may explore several different options to determine possible scores for the user. The option (e.g., the candidate inference outcome) having the highest score based on the processing using the appropriate machine learning model can indicate the likelihood of that user making the subject purchase. Later, feedback indicating whether the user made the subject purchase can be received by the AI/ML System 1300 and used to train the applicable machine learning model.

In another use case example, the AI/ML System 1300 can be deployed for send-time optimization, such as to determine an optimal time at which to send an email or to determine a time at which emails should be sent to result in an increased read or response rate. This send-time optimization task can be implemented using automated batch email management, such as which may use an embodiment of the AI/ML systems 1300 disclosed herein to train a machine learning model to optimize the send time of a batch of emails. For example, the AI/ML System 1300 may use a model that determines how and when batches of emails have been sent and consider the read and response rates for those batches of emails. The AI/ML System 1300 may further enhance the features provided, such as based on data sources including survey data for improving email recipient read and response rates. The accuracy of the inference outcome indicating the time to send an email can be measured based on the actual read and response rates for the email. The accuracy or inaccuracy of the inference outcome may then be used to generate a training data set for training the machine learning model, such as to improve the modeling for a next task.

CMS System 1400

Customization System 1500

As referred to previously, the platform 1000 includes a customization system 1500 (FIG. 1) that is configured to create custom objects and create associations for the custom objects (FIG. 2). FIG. 3 illustrates the customization system of the platform in accordance with an aspect of the present disclosure. As shown in FIG. 3, a portion of the multi-service business platform 1000 with specific emphasis on details of the customization system 1500 and the storage system 2400 used to create and manage core default as well as custom objects in accordance with an aspect of the present disclosure. As discussed in further below, any custom object, including its properties, created or modified in and/or by the customization system 1500 may be immediately used by the platform 1000 to execute various tasks for the client 97 and their users 98.

In an aspect as shown in FIG. 3, the customization system 1500 may use application programming interfaces (APIs) 1512 as a computing interface to communicate and interact with users via the user devices 98 and/or integrator users via integrator devices 5000. The customization system 1500 may include and use an object schema service 1502 for providing one or more APIs 1512, such as an object definition API for receiving custom object information from the user devices 98 and/or integrator devices 5000. The object definition API may be a CRM definition API, an object schema API, CustomObject data API, or a new schema API. In an aspect, the client 97 may create the new schema API which may be defined as a form when filling out this API. The object definition API may be used for communicating the custom object information with the customization system 1500 in managing custom objects. These data APIs (e.g., object definition APIs and/or APIs 610) may be "generic data representation" APIs that may be used by users (e.g., via user devices 98), integrator users (via integrator devices 5000), and/or developer engineers (via platform 1000) to express a data model that may exist within the platform 1000.

As shown in FIG. 3, the customization system 1500 may include other services, components, and/or modules that may be used in the process of creating custom objects. For example, the customization system 1500 may receive a user request for a custom object creation including custom object information (e.g., custom object name, an object type, at least one property of the custom object, and an association of the custom object with another object) from a user device 98 via the APIs 1512. For example, the customization system 1500 may include a form filling service 1504 for receiving the custom object information for the custom object from the client. For example, the form filling service 1504 may provide a form (e.g., via a GUI) that may include prompts (e.g., spaces in a form) for the user to submit or input custom object information that may include a name (e.g., fill out name), a label, and basic information such as properties (e.g., description information about properties which may be similar to core value or core structure of metadata for the custom object being defined). Development documents may be used, or the user may use their own client for the form. Accordingly, the client 97 may use the APIs 1512 to create or modify a custom object and then the client 97 may login to the platform 1000 to monitor how custom objects may be integrated with the rest of the platform 1000.

The customization system 1500 may include and may execute a business logic/sensible default service 1506 (e.g., may use business logic and/or sensible defaults) to interpret custom object information in order to convert the custom object information into custom object metadata. The customization system 1500 may include and use a relational database management service 1510 (e.g., structured query language database service) to insert and store the custom object metadata into a relational-type database (e.g., relational database management system).

The customization system 1500 may convert the custom object metadata into language-independent data when creating the custom object. The custom object may be sent in language-independent data form to the user device 98 and/or services of the platform 1000, for use with marketing processes, sales processes, and/or customer service processes. For example, each custom object may be viewed by the user as a record on the user device 98 from the platform 1000. The customization system 1500 may also include a common data format conversion service 1508 that may assist with synchronization and integration of the custom object within the platform 1000 (e.g., integration of the custom object with the services 2300 of the platform 1000). In an aspect, the customization system 1500 may assist with synchronization and integration of the custom object with a third party service 6000.

The customization system 1500 may also communicate and direct changes to data on the storage system 2400 when creating custom objects. Specifically, the multi-tenant data stores 2600 of the storage system 2400 may include definitions, properties, values, instances, and associations for all objects (e.g., including custom objects and core objects). These multi-tenant data stores 2600 may be changed by the customization system 1500 when creating or modifying objects.

The storage system 2400 may include a knowledge data structure 2900 which may also include, at least implicitly, an ontology data store or component 2402. The ontology data store 2402 may include the custom object with other custom objects 1102 and/or core objects 1101 (e.g., contact objects, company objects, deal objects, and/or ticket objects) along with one or more associations 2406 which are added or selected by the client) between the objects. Similarly, the knowledge data structure 2900 may include an instance of the custom object with other custom object instances 2408 and/or core object instances 2410 along with one or more association instances 2412 between the object instances based on monitoring of activities of actual entities corresponding to these objects. Instances of objects (e.g., instances of custom objects 2408 and/or instances of core objects 2410) may be referred to as records.

As shown in FIGS. 1 and 3, the multi-tenant data stores 2600 (e.g., which may include one or more databases) may be updated when adding custom objects. As described in the disclosure, the multi-tenant data stores 2600 of the storage system 2400 may include definitions, properties, values, instances, and associations. In some examples, the multi-tenant data stores 2600 may include a set of data stores that collectively support custom objects and that may be updated by users of the multi-tenant data stores 2600. For example, one data store may be a definitions data store that may be a system of records for storing objects and respective object definitions (e.g., list of core objects and custom objects).

This definition data store may contain and manage definitions of what objects (e.g., custom objects and/or core objects) exist.

This definition data store may include a list of objects, e.g., contacts, companies, deals, tickets, and custom objects (e.g., line items, products, etc.). This list of objects (e.g., custom objects) may also include and relate to any integrations that the user may have installed that define custom objects and any other custom objects that the user may find in their data (e.g., list of the tabs in a spreadsheet for user). Another data store may be a properties data store that may be a system of records for storing properties of custom objects such as tracking properties or attributes of custom objects as well as properties of core objects. Another data store may be a values data store that may be a system of records for tracking values of properties. The larger multi-tenant data stores 2600 may not discriminate based upon a user ID or a custom object itself. In some examples, each data store may include one or more databases.

In an example, for the definition data store, the system of record for what custom object types exists may be a "used car". The properties data store may include properties or attributes that may include color, make, model, year, etc. for the used car custom object. The values data store may refer to the user, particular car, object type (e.g., which may be a car), related ID, property (e.g., car is red), etc. that may be laid out in such a way that the user may be able to dynamically create, edit, and remove values data of custom objects. Also, the user may be able to dynamically create, edit, and remove object properties and the user may dynamically create, edit, and remove properties (e.g., property values) of custom objects. This may provide flexibility immediately in terms of the user creating, editing, and/or removing custom objects, definitions of custom objects, and/or properties of custom objects.

In some example embodiments, the definitions and properties data of the multi-tenant data stores 2600 may be located in a relational-type database such as relational database management system (e.g., structured query language database) such that most of the data may be stored using a JavaScript Object Notation (JSON) (e.g., web-based tool JSON blob) to assist in creating, editing, viewing, formatting, and sharing JSON. The various metadata may be stored as columns for efficient indexing and queries. JSON may be used as data format such that JSON may be an open standard file format and data interchange format that may use text to store and transmit data objects. Other data formats may be used to accomplish the same or similar functionality described in the disclosure. In some examples, the values data store may be run by a non-structured query language (SQL) (NoSQL) or non-relational key value database which may be a similar database.

The multi-tenant data stores 2600 may include database storing metadata about object types, e.g., once metadata may be established and/or instances of custom objects may be created. Another set of APIs may be used for processing instance requests relating to specific instances of custom object. Importing may occur over a representational state transfer (REST) endpoint (e.g., REST API) over Internet as described in more detail below in the disclosure. Data may be written into a database (e.g., vastly horizontally distributed database) such that straight bytes may be written into a distributed file system. In some examples, the bytes may be interpreted using metadata in the relational database (e.g., SQL systems).

In as aspect, the platform 1000 may convert the interpreted data to a JSON representation of data (e.g., human readable or machine readable data) to be sent to a user device (e.g., user device(s) 98) or may be available on the platform 1000 via a user interface of the user device. The horizontally distributed database may be used primarily as a system of record for storing object values as well as association values. In some examples, the relational database (e.g., SQL) may be used for storing property definitions, object definitions, and association definitions. In another example, the horizontally distributed database (e.g., may also be referred to as object instance databases) may include object property values and association instances. The relational databases (e.g., SQL and/or other metadata databases) may include object types, property definitions, and association definitions. The above-described examples of storage for multi-tenant data stores 2600 may be some examples of how data may be stored such that other similar and/or different examples of data storage may be utilized while maintaining core functionality of the platform 1000 and without departing from scope of this disclosure.

In some examples, the platform 1000 may include security functionality, for example, to avoid exposing entirety of multi-tenant data stores 2600 (e.g., platform's object type definition data) to users. Further, in some examples, there may be assumptions about what users may want to do and these assumptions may be internal details. For example, administrators of the platform 1000 may not want a certain object type exposed to the APIs (e.g., search APIs). In another example, as described in the disclosure, business logic/sensible default service 1506 such as sensible defaults may be used by the platform 1000 in accepting a new custom object (e.g., new custom object type definition) and when creating new associations.

The platform 1000 may use a process to configure/update data stores and/or updating one or more databases in the data stores based on custom objects. For example, users may use APIs 1512 that may include representational state transfer (REST) APIs that may be exposed via a network (e.g., network 99 such as the Internet). These APIs (e.g., REST APIs) may be used by users (e.g., via the Internet) to specify different operations that may be invoked to establish data needed that may define a new custom object type and/or may define instances of that new custom object type. The REST APIs may include data APIs (e.g., object definition APIs described in the disclosure) that may be used to receive custom object information from client devices 97, user devices 98 and/or integrator devices 5000.

This process may utilize a wrapper interface such as the object schema service 1502 as described in the disclosure. The user may provide information using the object schema service 602 that may include a name of a custom object, properties of a custom object, and associations of the provided custom object type with other custom object types and/or core object types. Users may submit this information via a web request to the APIs. The customization system 1500 may execute the business logic/sensible default service 1506 (which may contain condensed business logic and/or sensible defaults) to interpret the information and insert necessary data in the relational database management system (e.g., set of SQL tables). These SQL tables may be a type of database where metadata may be stored about object types (specifically types of custom objects). Once the metadata is established, the client may create instances of the custom objects.

In an example where a client 97 affiliated with a drone selling/rental business creates a drone custom object, the client 97 may want to import data relating to several drone products and/or instances of drone products (e.g., information related to millions of drones owned by the business and/or instances of activities related to the drones) into the platform 1000 with different drone IDs and links to different deals that the drones may have been sold or rented under. When this import is executed, a set of APIs may process these instance requests. For importing several drones (e.g., drone information and/or activities related to drone products), the user may invoke operations over REST APIs (e.g., endpoint over the Internet).

The platform 1000 may take information received and may start writing data into another style of database which may be the vastly horizontally distributed database. The platform 1000 may be used to add on more virtual machines and continue to store all user data without impacting performance of the overall platform 1000. This data may be written as straight bytes into what may be essentially a distributed file system. Then, the platform 1000 may interpret the bytes accurately by using the metadata that may be available in a SQL database. When the user may want to fetch this data, the platform 1000 may read all the bytes from the distributed database system. The platform 1000 may interpret what it means to use the data from the SQL systems. Then, the platform 1000 may convert this information or data into a human readable or a machine readable JSON representation of the data and may send it back to clients 97 and/or users 98. Alternatively, the JSON representation may be available through the existing user interface of the platform 1000.

In examples, the platform 1000 may provide a GUI mechanism for a client 97 to login to the platform 1000 to start using the created custom objects with the services 2300 (e.g., framework features such as workflows, reporting). The platform 1000 may direct the usage of the integrated custom objects with various functionality. Simply, by creating the custom objects 1102, the user may immediately be able to utilize all the functionality of the platform 1000 with the created custom objects 1102. For example, the user may use services such as workflow automation tool 2302 and the client 97 may see the option to include and/or use the created custom objects with workflows. The platform 1000 may direct the custom objects 1102 to be used with the services 2300 providing all the automation of services, such as automatically using services with custom objects created. The custom objects 1102 may be account specific such that custom objects may only be used and viewed under one or more client accounts and/or one or more company accounts (e.g., custom object created by owner user of business may only be viewed and used with services by the same owner user). In some examples, the platform 1000 may be an external/visible entity into which users log in. In other examples, the platform 1000 may serve as a backbone of higher-level functionality that may be exposed throughout an application user interface (UI) and external APIs of the platform 1000. For example, as described in the disclosure, a manifestation of this automation integration functionality of the platform 1000 may be with services 2300 (e.g., workflow automation 2302). As described in the disclosure, the platform 1000 may use the synchronization system 1200 for providing custom object synchronization between the customization system 1500 and the services 2300 of the platform 1000.

In an aspect, the platform 1000 may include the customization system 1500 for providing a framework for customized programming. The platform 1000 may be configured in various ways with the customization system 1500 to allow for users to be able to program custom objects 1102. In example embodiments, the customization system 1500 may be a tool whereby a user, an internal developer or team of internal developers, and/or a third-party integrator may define code that may run inside the customization system 1500 of the platform 1000. An added benefit of internal developer teams being able to define new custom object types may be the improved speed from development to shipping of these customized objects to users.

For example, with core objects, release of these objects to users on the platform 1000 may take several months. Using this new process for creating custom objects on the platform 1000, the custom objects and related services may be released to users much sooner and faster such that a user may define and immediately use a new custom object in minutes. The platform 1000 may also provide for the execution and/or use of the custom objects that may be programmed with the services 2300 and/or other systems of the platform 1000. For example, custom objects 1102 may be defined and the platform 1000 may be the execution engine that makes use of the custom objects.

In an aspect, the platform 1000 may be configured such that all users' data may reside within a single system. For example, rather than provisioning dedicated systems for each user, the platform 1000 may be architected to allow for all customer data to co-exist within the same single system. However, the data may be segregated such that the platform 1000 may prevent mixing or transfer of the data (e.g., data from one user is never exposed to another user despite having their data stored in the same system) between instances of the platform 1000. For example, one data store of the multi-tenant data stores 2600 may include all core objects (e.g., CRM objects) and custom objects that may be defined by users, integrator users, and the developers of the platform 1000. For example, a core object (e.g., contact object), a first custom object (e.g., drone custom object), and a second custom object (e.g., yoga class object) may all coexist within the same instance of the platform 1000.

In some examples, data of custom objects and instances of custom objects (e.g., drone custom object data and/or instance data of the drone custom object) may be proprietary data even within the multi-tenant data stores 2600. This proprietary data within the multi-tenant data stores 2600 may be segmented and separated such that the services 2300 of the platform 1000 may be executed on top of the custom objects and/or instances of objects without any need for the platform 1000 to access the proprietary data. For example, when values data of the values data store (and possibly other data of the multi-tenant data stores 2600) may be populated from a user, and knowledge stores 2900 may be created for the individual users based on the populated data. The platform 1000 may then operate on the custom objects and instantiations of the custom objects.

CRM+CMS with Custom Objects

In an aspect, custom objects 1102 may be generated to be used with the customer relationship management (CRM) system 1100, and the content management system (CMS) 1400 that may be based on custom object definitions provided by users. The platform 1000 may also provide for a relationship between custom objects and the content management system (CMS) 1400, whereby custom objects may be shared between them. For example, the CMS 1400 may have a database that clients 97 may use to define data models to drive pages and content in the CMS 1400. Since the building of APIs and systems may be needed for custom objects, the CMS 1400 may also migrate its database objects into the customization system 1500, storage system 2400, and/or other systems of the platform 1000.

Also, when building pages in the CMS 1400, a client may leverage various tags that pull in data from other parts of the platform 1000 when a page may be rendered. For example, one such tag may be "crm_object" which may pull in the specified object into the CMS page when it may be rendered. For example, a client 97 that has a "rental property" custom object may use the CMS 1400 to define a page that may have a list of all "rental properties" that may be available and ready to rent. The client 97 may then define subpages for when a customer clicks on a specific rental property. The content on the defined subpages may be populated from information stored on those custom objects. Thus, in example embodiments, user defined custom objects may be trackable throughout a user account lifecycle beginning in the CMS 1400, through the CRM system 1100, of the platform 1000. In this way, users may be able to obtain insights from their data that may not have been previously available to them.

In an aspect, the platform 1000 may provide mechanisms (e.g., GUIs) and processes for creating and managing associations for the custom objects. For example, the customization system 1500 may allow for the creation of an association definition entry (e.g., the relationship of identification (ID) representing one object type to an ID representing another object type) in a relational database management system (e.g., SQL tables). The association definition entry may have an ID used to associate instances of two object types with one another. This process may use similar techniques used with graph database processes (e.g., graph database management system processes such as Neo4j processes). Different name associations may be between different object types as well as between same object types.

For example, creating an association may first require a definition of a valid association which may also require a unique ID representing one object type and a unique ID representing another object type that may be the object types associated by this association. When a client configures two or more object types be associated (e.g., where one object may be a custom object), then the customization system 1500 of the platform 1000 may create an association definition entry in a relational database management system (e.g., SQL) that may link the custom object type with either another custom object type or a core object as requested. Once the association definition is created, the association definition may be given an association type ID. The association type ID may be used by users to associate specific instances of two object types with one another. For example, associating two custom objects (e.g., associating two custom object instances may be two rows in a table) may start with a request to associate through an associations API 1512. The customization system 1500 of the platform 1000 may then write a row into the vastly horizontally distributed database (e.g., may also be referred to as an associations database) which may include a "fat row" format (e.g., may have the source object ID as the key and every linked object ID of the same object type belonging to an association type which may extend out in a wide row from that object type). This implementation, for example, may be similar to high end sophisticated graph databases such as a graph database management.

In some example embodiments, a qualifier may be added to an association type that may be a name of the association. The platform 1000 may have directed named associations and may expand metadata to more sophisticated metadata based on types of associations defined. In examples, company conduct associations may be used such that there may be different types of the associations (e.g., different named associations such that there may be different names of associations between the same object types).

In example embodiments, each respective association may include an inverse or opposite association that may be created automatically in response to defining the respective association. For example, when a user may create an association type (e.g., sold a car between business and customers), the platform 1000 may automatically create the inverse association type (e.g., "car was sold by") and may give the inverse association the same name as the association. Even though an association may be created such that the user may represent a sale of a car to a customer as the customer "purchased" the car (e.g., when defining the association), the platform 1000 may also automatically create the inverse association in the opposite direction (e.g., the car was "purchased by" the customer) which may be given the same name but a different association type ID. In summary, when an association may be created for a relationship in one direction, the platform 1000 may always automatically create an association in the other direction such that the platform 1000 may support both representations for the association and inverse association which refer to the same relationship between objects.

For example, using the yoga class example, two custom objects may include class and student. An association between these custom objects may be the class having a student that is Bob. An inverse association (e.g., opposite) of the association may be that student Bob may be an attendee or a member of the class (e.g., yoga class B). In summary, the inverse may mean that an association may be from the opposite view which may be from the view of the student or from the view of the class depending on the original association that was created. In this way, the time to process some search results, listing results, and/or other relevant requests may be reduced via the inverse associations.

Figure 4:
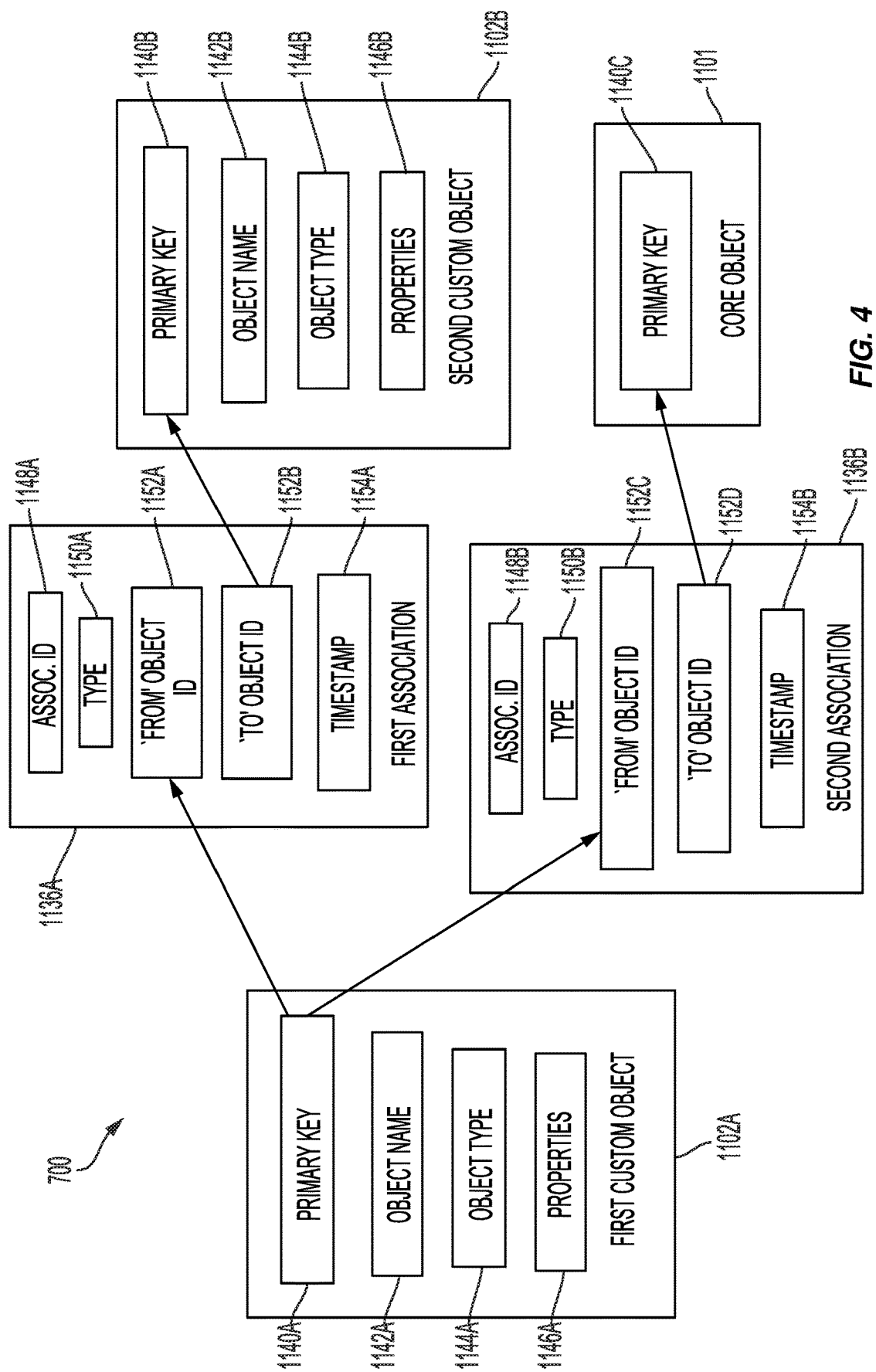

FIG. 4 illustrates how the platform 1000 manages custom and core objects and associates them with one another in accordance with an aspect of the present disclosure. As shown in FIG. 4, a first custom object 1102A associated by the platform 1000 between the first custom object 1102A and other objects (e.g., second custom object 1102B, core object 1101) according to example embodiments of the disclosure. As shown, each custom object 1102A, 1102B may include a primary key 1140, 1142, 1144, 1146 (e.g., directed associations may be defined between pairs of object identifications (IDs) within a context of a portal and object type). The primary key 1140A, 1140B may be used to locate specific objects. In examples, the primary key 1140A, 1140B may include a combination of a portal ID, an object type ID, and an object ID. These three unique identifiers may, in combination, uniquely allow for the ability to find objects. Each custom object 1102A, 1102B may also include a custom object name 1142A, 1142B, a custom object type 1144A, 1144B, and custom object properties 1146A, 1146B. The customization system 1500 may be used to create at least one association (e.g., first association 1136A and/or second association 1136B) for the first custom object 1102A with another object 1102B, 1101 based on the custom object information received (e.g., as received via the form filling service 1504). As shown in FIG. 4, in example embodiments, each association 1136A, 1136B may include an association identification (ID) 1148A, 1148B, an association type 1150A, 1150B, two IDs involved in association (e.g., a 'From' object identification (ID) 1152A, 1152C and a 'To' object identification (ID) 1152B, 1152D), and a timestamp 1154A, 1154B that may refer to when the association may have been created. In examples, the directionality of each association 1136A, 1136B may be indicated by the 'From' object ID 1152A, 1152C and the 'To' object ID 1152B, 1152D. For example, where a directed association between object IDs may be defined, the association in an opposite direction (e.g., inverse association) may also be defined that may result in two associations (e.g., two association records) for pairs of associated objects per association type. In some examples, a user may decide to define associations in terms of hierarchy by defining names of associations (e.g., user may name one association as "Parent" between two objects and/or may name another association as "child" between the same two objects but in the opposite direction) based on their business model. Any further information from each association may be derived from looking up and/or searching for the IDs, the object tables, and/or viewing what property values may be associated with those IDs.

The primary key 1140A of the first custom object 1102A may be directed to either the 'From' object ID 1152A, 1152C or the 'To' object ID 1152B, 1152C based on a defined relationship between the custom object 1102A and another object (e.g., second custom object 1102B or a core object 730). In some examples, this defined relationship may be linked both ways such that two objects may be linked via a same association, e.g., where the first custom object 1102A may be the 'From' (e.g., directed to 'From' object ID 1152A of the first association 1136A) and a second custom object 1136B may be the 'To' (e.g., direct to 'To' object ID 1152B of the first association 1136A) and vice versa where the second custom object 1102B may be the 'From' and the first custom object 1102A may be the 'To' for the same association but from a different perspective. These inverse associations may be automatically created within each association (e.g., same association but may have different IDs distinguishing between association and inverse association) where the inverse association may be referring to the same association but from an inverse perspective of the other object.

For example, where the first custom object 1102A may be a customer and the second custom object 1102B may be a "yoga class" and the first association 1136A may be "class attendance", the same association may be described as "customer" ('From') attended "yoga class" ('To') or "yoga class" ('From') was attended by "customer" ('To'). In another example, where the first custom object 1102A may be a "salesperson" and the second custom object 1102B may be a "vehicle" and the association may be "sold", the same association may be described as "salesperson" ('From') sold (association) "vehicle" ('To') or "vehicle" ('From') was sold by (inverse association) "salesperson" ('To'). In another example, as shown, the first custom object 1102A may relate to the core object 1101 via a second association 1136B. Similar to custom objects, the core object 1101 may also include a name, a type, and properties but for purposes of showing relationships with custom objects, only a core object primary key 1140C is shown in the core object 730. The core object primary key 1140C may be similar to the primary keys 1140A, 1140B. Using the previous example, the first custom object 1102A may be the "salesperson" and the core object 1101 may be a company object (e.g., having an object name, company object type, and company object properties) that may be related by second association 1136B. In this example, where the first custom object 1102A may be a "salesperson" and the core object may be a "company" and the second association 1136B may be "employed by", the same association 1136B may be described as "salesperson" ('From') employed by (association) "company" ('To') or "company" ('From') employs (inverse association) "salesperson" ('To').

For the example of the vehicle and the salesperson, in some examples, absent an inverse association, a request to view who may have sold a particular vehicle may require processing each instance of the salesperson custom object before identifying which salesperson may have sold the particular vehicle. Conversely, with the inverse association, the same request may be processed by fetching the instances of the particular vehicle (e.g., particular vehicle custom object) and identifying the salesperson instances (e.g., instances of salesperson custom objects) via the inverse association ("sold by") between the vehicle record and the salesperson record (e.g., between instances of the particular vehicle custom objects and all instances of salesperson custom objects based on "sold by" inverse association).

In example embodiments, associations such as association instances may include association ID labels 1148A, 1148B that may define relationships but may be dynamic. For example, where a student may become a graduate or an alumnus such that the relationship with a given school may evolve from student to alumni. The association ID label 1148A, 1148B may exist on the details between the two objects but not necessarily on either specific object.

In creating custom objects, the customization system 1500 of the platform 1000 may include safeguards. For example, one safeguard may be a guided service that may assist users in creating quality object types in the schema service. In some examples, part of the guided service may include the customization system 1500 providing requirements for users creating custom objects (e.g., users may be required to define objects). Also, part of the guided service may use the customization system 1500 and the platform 1000 to provide the ability to automatically introduce some relationships (e.g., associations) to core object types. In some examples, there may be a limited number of association types, number of distinct object types, number of specific instances per given object type, etc. that may be provided in prompts to users providing various advantages. For example, the platform 1000 may limit the number of association types that may be created to prevent an overload of the association functionality of the customization system 1500 of the platform 1000. In another example, the platform 1000 may limit the number of distinct object types that may be created to avoid accidentally confusing object types with object instances. In another example, the system may limit the number of specific instances of a given type that may be created to avoid spamming with data through an import process. Other requirements may include the business platform 1000 requiring that users may define a primary display label for objects so that the objects may be represented in a UI.

Referring back to the drone example, the platform 1000 may be used for a business that markets towards customers interested in drone renting (e.g., renting a fleet of drones). The drone business may consider important information to track such as who may be renting drones and point of time of renting. A user from this drone business may use the customization system 1500 of the platform 1000 to create a "drone" custom object that may be associated with core objects (e.g., deal objects and company objects) based on customers renting drones. After creating "drone" custom objects, the user may use the customization system 1500 (e.g., import service) to import drone data having different drone IDs and links to different deals (e.g., via the APIs 1512 of the customization system 1500).

For example, a client may use the platform 1000 to track drones and particularly determine who may rent drones and at what point in time. Accordingly, the client may create a drone custom object that may be linked with systems and services of the platform 1000 (e.g., particularly the CRM system 1100) as to what deal objects the drone custom object may be associated with, what customers may be renting the drones, etc. The services 2300 (e.g., reporting 2308 such as standard reporting and workflow automation 2302) may leverage data that the drone user defined. The drone user may use the customization system 1500 (e.g., generic data representation system) to define whatever data the user may want and relationships between the data.

Then, code or automation may be run against the user's data (e.g., drone-related data from a user's business) in a multi-tenant distributed system (e.g., multi-tenant data stores 2600). Using the multi-tenant data stores 2600 may mean that there may be some separation of user drone data from the rest of the data in the multi-tenant data stores 2600 of the multi-service business platform 1000 such that the platform 1000 may not know that the user that relates to any particular data set thereby providing privacy between data of users and user accounts. Also, the platform 1000 may not be aware of what object type may be used by accounts to uphold the privacy of users. However, the user may still use the platform 1000 to perform actions and operations on the drone custom objects and data as defined by the users that may be exclusively accessed by the drone user accounts (e.g., from drone renting business or client).

In another example, a business may be an auto dealership. The auto dealership may wish to represent particularly important objects on the platform 1000, e.g., vehicles, salespeople, parts suppliers, other suitable elements that may be represented in datastores (e.g., databases of datastores), and the like. In this example, a user of the auto dealership may run their business using a spreadsheet for recording information about the auto dealership business. Tabs of each spreadsheet may refer to inventory (e.g., new inventory and/or used inventory), salespeople, and customers. The user may create custom objects corresponding to these tabs. For example, the user may create custom objects that may include a salesperson custom object, an inventory (e.g., vehicle) custom object, and a customer custom object using the customization system 1500. Each tab may refer to a different custom object or custom object definition that may be created. These custom objects may include properties based on the tabs. For example, each custom object (e.g., custom object definition) may include a collection of properties as described in more detail in the disclosure below as property instances for custom object instances. The user may also create possible associations between these custom objects and other objects (e.g., core objects and/or other custom objects) using the customization system 1500. These custom objects (e.g., custom objects 1102) and associations 2406 (e.g., association instances) may be stored in the ontology 2402 of the knowledge data structure(s) 2900. In general, all this data may be stored in the spreadsheet such that every tab may be a different custom object (e.g., different object definition). Each row of the spreadsheet may be a different object instance (e.g., different custom object instance).

Figure 5:
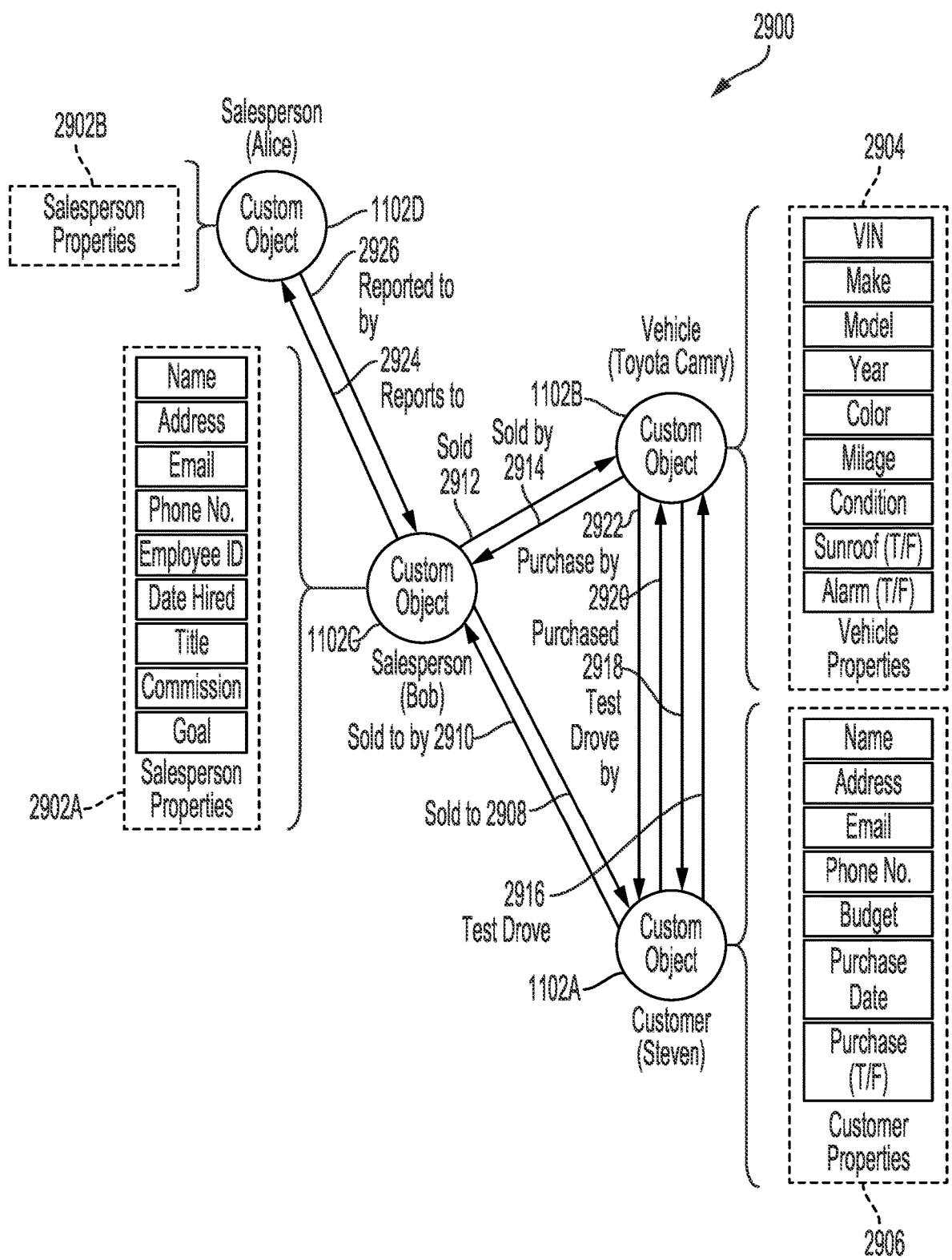

Referring now to FIG. 5, there is shown a visual representation of a portion of an example instance knowledge store 2900 according to an aspect of the present disclosure. In this example, the instance knowledge store 2900 may relate to instances of the custom objects (e.g., from rows of a spreadsheet) that may be based on the created custom objects (e.g., from the tabs of a spreadsheet) for the auto dealership business. The custom object instances may include a salesperson custom object instance (Bob) 1102C, another salesperson custom object instance 1102D (Alice), a customer custom object instance 1102A (John), and an inventory custom object instance 1102B (e.g., vehicle custom object instance such as "Toyota Camry"). These custom object instances may be based on the following custom objects (e.g., custom objects 1102 of the ontology 2402): salesperson custom object, customer custom object, and vehicle custom object. Corresponding defined properties are shown with each custom object instance as well as possible relationships (e.g., associations) between the custom object instances. For example, as properties may be defined when creating custom objects, the salesperson custom object instance 1102C (Bob) may include salesperson properties 2902A (e.g., a name such as "Bob", address, email, phone number, employee ID, date hired, title, commission, and one or more goals such as per year, per quarter, per month) for a particular salesperson. The other salesperson custom object instance 1102D (Alice) may include similar salesperson properties 2902B to the salesperson properties 2902A of the salesperson custom object instance 1102C (Bob). The inventory custom object instance 1102B (Toyota Camry) may include inventory properties (e.g., specifically vehicle properties 2904) as defined when creating the vehicle custom objects. The vehicle properties 2904 (e.g., from car inventory tab of spreadsheet) may include a vehicle identification number (VIN), car make such as Toyota, model such as Camry, year, color, mileage, condition, sunroof (T/F), and alarm (T/F). The customer custom object instance 1102A (John) may include customer properties 2906 as defined when creating the customer custom objects. The customer properties 2906 may include name such as John, address, email, phone number, budget, purchase date, and purchase (T/F). In examples, some of the properties of the custom objects may be added as being set for the custom objects. Properties may be created for each custom object and may be set on an instance. Other properties (e.g., T/F properties) may be added as being flexible or optional depending on instance such that these properties may also be set on an instance such as alarm (T/F) which may refer to whether vehicle "has alarm system" property for inventory custom object but not known until instance occurs. The alarm (T/F) (e.g., "has alarm system") may be true for some cars, false for other cars, and even unknown for some cars based on the vehicle custom object instance 1102B. Accordingly, this type of flexible or optional property information may be left empty (e.g., similar to leaving a cell empty in spreadsheet) such that this property information may be filled in as instances occur. As activities occur relating to any one of these custom objects (e.g., custom objects 1102) and associations 2406 (e.g., association instances) of the ontology (e.g., the ontology 2402), the instance knowledge data structure (instance knowledge store 2900) may be generated creating instances of these custom objects (e.g., custom object instances 2408) along with association instances (association instances 2412) directly corresponding to the activities that occurred (e.g., a Toyota Camry vehicle was sold by salesperson Bob to customer Steven). In this example, rows in the spreadsheet may refer to instances of the custom objects.

In an example, as shown in FIG. 5, there are several association instances 2908, 2912, 2918, 2920, 2924 between the different custom object instances that may be based on the possible associations defined in the ontology (e.g., associations 2406 of the ontology 240). These association instances 2908, 2912, 2918, 2920, 2924 may be added to the instance knowledge store 2900 as activities occur relating to any one of the associations 2406 between custom objects 1102 of the ontology 2402. For example, an association instance between the salesperson custom object instance 1102C (Bob) and another salesperson custom object instance 1102D (Alice) may be "reports to" association instance 2924 (or, for example, "is supervised by" association instance as described in the disclosure) such that the other salesperson custom object instance 1102D (Alice) relates to the salesperson custom object instance 1102C (Bob) as a manager. As described in the disclosure, there may be an inverse association (e.g., inverse association instance) created automatically for every association (e.g., association instance). The association and inverse association may be traced bidirectionally. The inverse association for "reports to" association instance 2924 may be "reported to by" association instance 2926 (or, for example, "supervises" association instance as described in the disclosure) such that the other salesperson custom object instance 1102D (Alice) "reported to by" 2926 the salesperson custom object instance 1102C (Bob). The salesperson custom object instance 1102C (Bob) may relate to the inventory (e.g., vehicle) custom object instance 1102B (Toyota Camry) by a "sold" association instance 2912 such that the salesperson custom object instance 1102C (Bob) "sold" 2912 the vehicle custom object instance 1102B (Toyota Camry). The inverse association for "sold" 2912 association instance may be "sold by" association instance 2926 such that the vehicle custom object instance 1102B (Toyota Camry) may be "sold by" 2926 the salesperson custom object instance 1102C (Bob). The salesperson custom object instance 1102C (Bob) may relate to the customer custom object instance 1102A (Steven) by a "sold to" association instance 2908 such that the salesperson custom object instance 1102C (Bob) "sold to" 2908 the customer custom object instance 1102A (Steven). The inverse association for "sold to" association instance 2908 may be "sold to by" association instance 2910 such that the customer custom object instance 1102A (Steven) may be "sold to by" 2910 the salesperson custom object instance 1102C (Bob). The customer custom object instance 1102A (Steven) may relate to the inventory (e.g., vehicle) custom object instance 1102B (Toyota Camry) by a "purchased" association instance 2920 such that the customer custom object instance 1102A (Steven) "purchased" 2920 the vehicle custom object instance 1102B (Toyota Camry). The inverse association for "purchased" association instance 2920 may be "purchased by" association instance 2922 such that the vehicle custom object instance 1102B (Toyota Camry) may be "purchased by" 2922 the customer custom object instance 1102A (Steven). The customer custom object instance 1102A (Steven) may also relate to the vehicle custom object instance 1102B (Toyota Camry) by a "test drove" association instance 2918 such that the customer custom object instance 1102A (Steven) "test drove" 2916 the vehicle custom object instance 1102B (Toyota Camry).

The inverse association for "test drove" association instance 2916 may be "test drove by" association instance 2918 such that the vehicle custom object instance 1102B (Toyota Camry) may be "test drove by"2918 the customer custom object instance 1102A (Steven). In an example, the customer (e.g., referring to customer custom object instance 1102A (Steven)) may decide to trade-in or sell their purchased vehicle (e.g., referring to the same vehicle custom object instance 1102B (Toyota Camry)) back to the same salesperson (e.g., referring to the salesperson custom object instance 1102C (Bob)) such that new association instances may be added automatically with respect to and between these different custom objects.

In some examples, advanced reporting, as described in the disclosure, may be used with the auto dealership. For example, a user may want to know a home and zip code of the customers who are buying the most cars from the salesperson (Bob). The user may select all the associated sales for the salesperson (Bob). For those sales, the user may then select the associated customers and for those selected customers, the user may access or obtain their zip codes. The advanced reporting service may aggregate by zip code and count the number of instances of zip code. This may involve a standard style SQL query but may be advanced in terms of the query or by tooling which may be used in building these reports by advanced reporting.

For example, a graphical user interface (GUI) may be used such as an object definition GUI that may be presented to a user where the user may define schemas of their custom objects. In defining schemas of a custom object, the user may provide an object name (e.g., may describe type of object) and properties of the custom object. In this example, the subscriptions may refer to a type of custom objects such that subscription custom objects may be created in the GUI from directing APIs. The GUI may show an ability to create custom objects and associations (e.g., creating association definitions) that may be handled via external APIs as described in the disclosure. For example, the form filling service 1504 (FIG. 3) may be used with these APIs with respect to GUI. In some examples, the user may view the custom objects along with core objects in a grid view. In this example, the user may select links associated with objects such as custom objects to view their records. This may be expanded across and throughout the multi-service business platform 1000 which may be used by users for their businesses.

In examples, GUIs may be showing instance-level usage throughout a user interface (UI). For example, the GUI of the platform 1000 may display a listing of custom objects with filtering capability services (e.g., search/filter capabilities). In this example, properties of custom objects (e.g., properties of subscription custom objects) may be searched using filtering capability services. In an aspect, the platform's 1000 GUI for custom object workflows may display relate to assigning a proper service package to a subscription. In this example, actions may be shown related to service creation that may involve custom objects. In another example, GUI of the platform 1000 for custom object workflows may relate to sending an email to a customer automatically if the customer may be starting their subscription soon. In this example, actions may be shown related to a subscription start reminder that may involve custom objects. In another example, the GUI of the platform 1000 is configured to display a report with custom objects that may relate to breaking down subscription custom object types. In another aspect, the GUI of the platform is configured to display reporting with custom objects that may relate to breaking down subscription terms by subscription owner. These reporting examples may include options for clients to configure charts based on type of charts and/or data that may be included in charts as relating to one or more custom objects.

In an aspect, the platform 1000 utilizes other custom object API examples 1512 such as relating to customer relationship management (CRM) objects. For example, a CRM objects API 1512 (e.g., public API) may be able to represent and organize data based on business requirements. Specifically, the CRM objects API 1512 may be created to define and manage custom objects. Users and/or integrators may use the CRM objects API 1512 to define custom objects, properties, associations, and/or leverage the platform 1000 to increase business. Custom objects may be specific to a portal. The custom objects may exist with core objects (e.g., contacts, companies, deals, and/or tickets) in the multi-service business platform 1000. Custom objects and custom properties may be defined to organize and represent business data for a company or industry. Custom objects may be linked and/or associated to the core objects or other custom objects.

In example embodiments, a custom object may be defined by defining a custom object type and property definitions. This defining process may also include defining association definitions with core objects 1101 (e.g., contact objects) and/or custom objects 1102. By default, the property type and field type may be a string and text, respectively (e.g., a property may exist under properties to be specified as various code terminology). As part of the schema, there may be association definitions automatically created between the custom object and email, meeting events, notes, tasks, calls, and conversation sessions. Custom objects may be retrieved (e.g., retrieved as meta-type custom objects, fully qualified named custom objects, and/or portal-specific custom objects). Related object schema may be modified. Once a custom object is defined, in some examples, the name and labels (singular and plural) may not be changed. Properties of the custom object may be modified after creation. Custom objects may be associated with core objects (e.g., contact, company, deal, or ticket objects) or other custom objects. Custom objects may be deleted after all object instances of a same or similar type are deleted (e.g., custom object type may be deleted after all object instances of the same or similar type, associations, and custom object properties may be deleted). In examples, custom objects 1102 may be associated with core objects 1101 or other custom objects.

In example embodiments, when creating or updating properties for custom objects, both type and field type values may be required. The "type" value may determine the type of the property (e.g., a string or a number). The field type property may determine how the property may appear in the platform 1000 or on a form (e.g., as a plain text field, a dropdown menu, or a date picker). There are various examples of how type and field type may be configured for properties on new custom objects. Values for field type and compatible field type values may include enumeration (e.g., string representing a set of options), date (e.g., representing a specific day, month, and year), date time (e.g., representing day, month, year, and time of day), string (e.g., plain text strings), and/or number (e.g., value containing numeric digits such as one decimal). Other field type values may include Boolean checkbox (e.g., input that may allow users to select either "Yes" or "No" as used in a form displaying a single checkbox), checkbox (e.g., a list of checkboxes that may allow a user to select multiple options from a set of options allowed for the property), date (e.g., date value that may be displayed as a date picker), file (e.g., allows for file to be uploaded to a form such as stored and displayed as a URL link to the file), number (e.g., string of numbers in decimal or scientific notation), radio (e.g., input that may allow users to select one of a set of options allowed for the property which may be displayed as a set of radio buttons when used in a form), select (e.g., dropdown input that may allow users to select one of a set of options allowed for the property), text (e.g., plain text string that may be displayed as a single line text input), and/or text area (e.g., plain text string that may be displayed as a multi-line text input).

In an aspect a custom object process may include creation of a custom object schema (e.g., object type, properties, and associations). The custom object schema may be fetched. A custom object instance may be created. An association may be created between the custom object instance and an existing contact. A new association definition may be created between the custom object and a ticket object. A new property definition may be created. The object schema may be updated with the new property.

In example embodiments, the platform 1000 may provide marketing and sales functionality for communicating with customers, tracking interest, and/or offering possible deals based on inventory. For example, where the client is a car dealership, object schema may be created to define and represent car inventory in the platform 1000. There may be attributes of the car that may be stored. The car may be represented as having the following properties: condition (new or used): enumeration, Date received (at a dealership): date, Year: number, Make: string, Model: string, VIN: string, Color: string, Mileage: number, Price: number, and/or Notes: string. To connect with a potential customer, a relationship between core contact objects and the custom car object may be defined. By defining an association between the contact (core object) and the car (custom object), the platform 1000 may be utilized to communicate with potential buyers and track progress on a potential deal. Once a data model may be finalized, the object schema may be created using the API. This may define the custom object and its properties as well as its association with other core objects (e.g., contact objects). A property group relating to car information may be created. Some object properties may be created when creating the schema. Additional properties may be added, and the object schema may be updated at a later time.

The custom object process for creation of the custom object schema may be applied to the car dealership example. For example, an object schema related to cars may be fetched. An object instance may be created which may allow for the use of the platform 1000 to communicate with potential customers, track potential interest, and offer possible deals for them based on inventory (e.g., creating a new custom car object instance and associating this instance with an existing contact object instance). A new object identification (ID) may be used for associations created such as the association between the custom car object and an existing contact. Objects and properties may be retrieved as needed. An association may be created to an object instance. For example, with the new object ID and a target contact ID, the platform 1000 may be used to create an association between the new car instance and the contact. As described in the disclosure, associations may be described in both directions or bidirectionally (e.g., between car and contact such that each association may relate to the car's association or relationship to the contact in one direction as well as the contact's association or relation to the car in the other direction). There may be a new association definition. For example, the platform 1000 may be used to track services performed on cars sold. The platform 1000 may further use tickets to log any maintenance performed. A new relationship between custom car objects and core ticket objects may be created by creation of a new association. There may be a new property definition. For example, maintenance packages may be offered to customers (e.g., oil change every 5 k miles) which may be tracked by adding a new property. A new field may show up in a sidebar interface of the platform 1000 as a secondary property which may provide quick identification of a level of service when a car goes into a car shop.

In an aspect, properties may show up in reports, workflows, imports, profile page, etc. Specifically, there may be a listing page GUI that may show a listing of all the object instances for a type. In this page, the user may shift from one object type to other object types that may be defined in this portal. For example, there may be a subscriptions custom object and services object. There may be several instances of services. If a user clicks into an individual profile for each service, the user may view different fields. Each and every single one of these fields may be a property in the multi-tenant data store that may be related to the object definition for the corresponding custom object. In another example, if a user goes to settings and goes to properties, the user may go into service properties and may create a new property for the service custom object (e.g., custom object definition). Then, when the user goes back to the services, the user may then be able to add the property as a column in this table, may drill in and add the property as an item that the user may want to view, and the user may start reading and writing data from that property which may be from the CRM side. When the client goes into automation and defined workflows, the client may request that they want a workflow from scratch, e.g., a service-based workflow. For the triggers and the actions on this service-based workflow, the user may have access to all these properties that may have been previously defined. If the user went in and added a new property, the new property may show up in this list, and the user may trigger logic based on values of the "service" custom objects.

Additionally, in some examples, the user may filter on associated custom objects. For example, if a service instance may be associated with a deal. The user may filter on the associated deal information by leveraging associations with custom objects. If the associations are not defined and in the knowledge structure 2900, then the user may not leverage them in workflows. In summary, anytime users load a part of the platform 1000, the platform 1000 may pull in the knowledge structure 2900 and then may expose or may hide different services (e.g., features) based on the data that may be stored therein. If properties exist, then they may show up. If associations to other custom objects and other object types may exist, then those associations may be visible within the platform 1000. For example, when going into the listing tool of the platform 1000, a user may create a list. This may function similarly to how the user may view this function in workflows. It may be visible throughout the software such that the platform 1000 may pull in the knowledge structures 2900 throughout the platform 1000 so that the client may then leverage the instance data throughout the platform 1000

Figure 6:
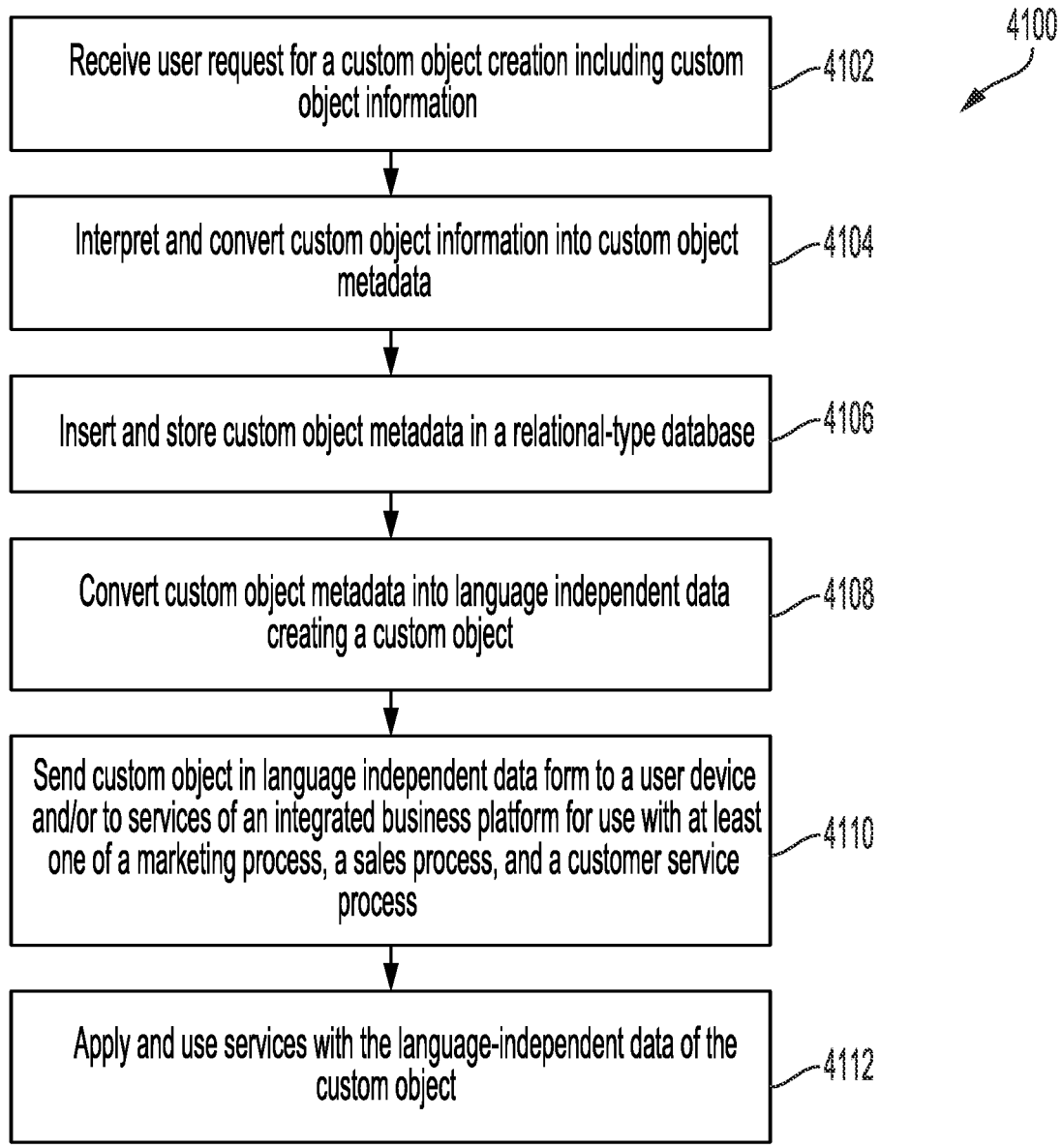
FIG. 6 is a flow chart illustrating an example of a set of operations for performing one or more of the provisions set forth herein.

FIG. 6 illustrates a flow chart including a set of operations of a process 4100 for creating a custom object according to an aspect of the present disclosure. In this example, a user request for a custom object creation including custom object information 4102 may be received. The custom object information may be interpreted and converted into custom object metadata 4104. The custom object metadata may be inserted and stored into a relational-type database 4106. The custom object metadata may be converted into language-independent data creating a custom object 4108. The custom object in language-independent data form may be sent to a user device and/or one or more services of a multi-service business platform for use with a marketing process, a sales process, and/or a customer service process 4110. Services may be applied and used with language-independent data of the custom object 4112.

Referring back to FIG. 1, the platform 1000 may include the services 2300 (e.g., features) that may be used with and customized for interacting with custom objects. As new instances of the services 2300 may be added or instances of the services 2300 may be changed, the platform 1000 may automatically apply the added and/or changed instances of the services 2300 to all custom objects. The platform 1000 may also automatically integrate use of all custom objects with any new services that are added to the services 2300.

In another example, a user may be from a yoga business. In this example, the user may create the following custom objects that may include studio custom objects, class custom objects, instructor custom objects, student custom objects, and schedule custom objects as described in the disclosure. The user may use the customization system 1500 of the platform 1000 to create these custom objects. The user may also use the other systems and the services 2300 of the platform 1000 for assisting with management of their yoga business (e.g., especially the use of custom objects in the yoga business). For example, the yoga user may use the workflow automation 2302 (e.g., workflows) to send out a "special" to students who may have not attended a specific class more than 90 days ago. Using the workflow automation 2302 (e.g., workflows tool), the user may create a "student" workflow. Enrollment criteria may be that the student may have attended at least one class and the date the student last attended was more than 90 days ago. An action for this workflow may be to email the contact record (e.g., contact information in properties such as email) associated with the student a discount for a new package of classes. This workflow may be updated and kept in sync automatically as students attend classes in real time and/or periodically as time passes. For example, the user may use reporting 2308 to find out how many classes students may be attending. Using reporting 2308 (e.g., reporting tool), the user may build a histogram of student counts by number of classes attended. A CRM-related action 2304 may include searching capabilities that may be used with CRM records. The search may be used by the user to create a public listing of all classes and locations so students may be able to view and access what classes may be available and may sign up to attend online. A search page may be supported by a CRM search engine of this CRM-related action 2304 (e.g., search) which may support defining well-formed queries against a data set. For example, a search may be a query such as "Show me all classes at a specific location that are taught by instructor X and are held on weeknights". The user may use import/export services 2306 (e.g., importing and/or exporting properties from external data source(s) such as external information source(s) to the platform 1000). In this example, the user may specifically use an import service. For example, when the client (e.g., owner of yoga business) starts using the platform 1000, the client may need to import data when creating custom objects. After the client defines the custom objects, the user may leverage the import tool in the CRM to import all of their data (e.g., yoga business data from external information sources 4000) in a comma-separated values (CSV) file form or other standard form into the platform 1000.

Another action 2312 of the services 2300 may be a listing service (e.g., a listing tool or a lists tool). The user may use the listing tool to create a list of all instructors who need to be re-certified. Using the listing tool, the user may define a list of all instructors whose certification may be 90 days from expiring. A manager of the yoga business may then connect with any instructors on that list and may ensure that the listed instructors may get re-certified. This list may be automatically updated and kept in sync in real time and/or updated periodically as time passes. Another action 2312 or service that may be used by the user may be a public API. For example, as the yoga business grows and becomes more sophisticated, the yoga business may want to develop their own programs that may run in-house that may leverage the data stored on the platform 1000. For example, the platform 1000 (e.g., specifically the customization system 1500 of the platform 1000) may include custom object APIs that may allow for the user to read and write object data from a custom object datastore of the multi-tenant data stores 2600. Any services (e.g., features) of the platform 1000 may automatically take newly written data into account. Another action 2312 or service that may be used by the user may be permissions (e.g., custom object permission service or system). As the yoga business or company grows, the yoga company may need to hide sensitive information about units from different agents. By leveraging the custom object permission service, the user of the yoga company may effectively partition what data specific reps may access and edit. For example, the user (e.g., yoga company user, which may be an administrator user) may use this permissions service to hide classes taught by one instructor from another instructor.

Another action 2312 or service that may be used by may be advanced reporting. For example, the yoga business or company may want to leverage more sophisticated business intelligence tools. Data in a custom objects data store (e.g., of the multi-tenant data stores 2600) may be automatically synced into a platform instance (e.g., platform instance that may be from a third party hosted and managed database) that may then be used to drive advanced queries and joins. For example, all the same information may be mirrored and/or copied into the third party hosted and managed database (e.g., using third party service 6000) that may be leveraged to do efficient analytic queries. Most of the CRM may be meant to be real time or near real time as possible so that as users may make changes to properties of their objects, workflows may be updated, reports may be updated, lists may be updated, content may be updated, etc. For more advanced reporting, where real time may be less important, data may be shared with a third party hosted and managed database where users may then perform SQL-style queries into the data set. Whenever a user may define a new custom object or install an integration that may bring in custom objects, the user may then leverage this advanced SQL style query against that data set. With this link to a third party hosted and managed database, the multi-service business platform 1000 may provide hosted data warehousing solutions for users. Users may then join their data sets that they already have in third party hosted and managed databases with the data of the multi-service business platform 1000 (e.g., storage system 2400), which may provide an expansion of users' data.

Another action 2312 or service that may be used by the user may be internal listing and profile pages. All objects (e.g., specifically custom objects) may be defined in the custom object data store (e.g., of the multi-tenant data stores 2600) that may have internal listing pages and profile pages out of the box. This may make it relatively easy for a user to view and/or have access to all of the instances of the custom object that the user may have created and interact with the related data.

Referring to FIG. 1, the platform 1000 may include a reporting system 1900 that allows users to create different types of visual reports using various data sources associated with a client's business. In example embodiments, the reporting system 1900 may allow users to generate visual reports that incorporate data collected with respect to core objects and/or custom objects, thereby providing for multi-dimensional custom reports. The custom event reporting may generate reports using disparate data that was collected, derived, generated, and/or otherwise obtained by the various services of the platform 1000 (e.g., CRM 1100, CMS 1400, payment system 1800, event system 1102, and/or the like) based on the common object definitions that may be applied across the platform. In some example embodiments, the custom event reporting may implement or leverage a unified analytics pipeline such that all event reporting may be based on that pipeline (e.g., utilizing common infrastructure).

The platform 1000 may include an event system 1700 in accordance with an aspect of the present disclosure. The event system 1700 may be configured to monitor for and record the occurrence of events. In some example embodiments, the event system 1700 may be configured to maintain unified events that are tracked across several systems of the platform 1000. In some of these example embodiments, event records may track all the different types of events that may occur with respect to a particular type of object such that the event record provides a log of all instances of different types of events that occurred with respect to the object. The event system 1700 may fit with several of the services in this disclosure including reporting aspects and triggering of workflows and actions as related to default and custom objects.

The platform 1000 may include instances of custom objects that may be used to perform customer-defined analytics (e.g., analytics 2310) across the CRM system 1100 and the CMS 1400. The multi-service business platform 1000 may include a common infrastructure such that all objects (new, old, core, and custom objects) may be tracked via a unified analytics pipeline. The custom analytics may be associated with CRM/CMS based on custom object definitions that may be provided by users. The custom analytics may be used with a unified analytics pipeline such that all event reporting may be based on that pipeline (e.g., utilizing common infrastructure).

The platform 1000 may generate custom actions that may operate on or with respect to instances of the custom objects 1102. The custom actions may be part of another system that may reside within the platform 1000. The platform 1000 may be built on top of the customization system 1500 (e.g., custom object data system) and may not be aware of workflows or their custom actions. The custom actions may be based on objects being considered nouns and actions being considered verbs such that automation of the platform 1000 may allow for verbs as actions may be added easily along with adding nouns as custom objects. The platform 1000 may include APIs such that any user may write their own extensions (e.g., using Lambdas or serverless functions). For example, custom actions may be new types of actions that may be implemented due to creation of new custom objects (e.g., new actions tracked based on new custom objects).

The platform 1000 may provide custom object filtering. For example, custom objects may include a set of custom properties that may be used to filter instances of the custom objects based on values of the respective custom properties. Examples of custom object filtering may include list segmentation, filtering, and searching across custom object types and being able to automate off changes (e.g., changes in custom objects and/or core objects).

The platform 1000 may include custom objects that may be configured to support a custom application architecture of a user that may connect with the CRM system 1100/CMS 1400 of the multi-service business platform 1000. The multi-service business platform 1000 may be an arbitrary platform that may act on arbitrary objects to do arbitrary actions and sync to arbitrary systems and may get the benefit of various capabilities. In an example, the CMS 1400 may be made front end to the CRM system 1100 (e.g., under protection of login) such that a user may view what they need in the CMS 1400. The custom application may be any type of application, e.g., a web application. For example, a yoga studio business may include custom objects such as schedule objects, class objects, "my calendar" (gigantic web application) that may be built on top of the CMS 1400 and the CRM system 1100 such that users may build and present CMS-driven apps integrated with the multi-service business platform 1000.

Payments

As shown in FIG. 1, the platform 1000 may support a custom application architecture of a user that may integrate with a payment processing service or system 1800 and may connect with the CRM system 1100/CMS 1400 such that a payment processing service may feed payment data to the CRM system 1100 and the CMS 1400 of the platform 1000 in real-time. In example embodiments, the payment system 1800 is configured to establish payment sessions for customers with third-party payment processors on behalf of clients of the platform 1000. The payment processing service may, for example, assist a manufacturing company in creating invoices for its customers and may initiate payment sessions with a third-party payment processor that allows the customers to pay the amounts indicated in the invoices directly via the third-party payment processor. In this way, the platform 1000 may not have to request, receive, or securely store sensitive payment information from the client's customers, while still being involved in the payments' workflows. Using this payment processing service, customers may easily go onto a website and make a purchase similar to other purchasing sites. The payment processing service may be used with business to business (B2B) transactions, e.g., custom objects for B2B; custom actions for B2B; and tight integration between objects in a B-commerce framework (e.g., product catalog may be in the CRM, the website may be in the CMS, payments may be immediately reflected in the CRM and deal records, custom objects may be shipping and/or tracking, etc.).

The platform 1000 may include an attribution reporting tool of the reporting system 1600 which may be an extremely powerful tool that may leverage a measure of efficacy of effort. For example, a user's business may have website visitors that may be reviewing web pages, may be filling out forms, etc. and the user's business may have sales reps making calls. All these actions by visitors and by members of the business may be measured by how effective each of these individual touch points was in order to have some outcomes (e.g., closing deal). Attribution reporting may take all these different inputs which may be happening in the platform 1000 (e.g., the CRM system 1100 of the multi-service business platform 1000) and may weight them using different models. The weighting may be prescriptive or customizable. When prescriptive, weighting may be based on some industry standard attribution models that may be built (e.g., W model or a U model or an "all touch" model may be used). These standard attribution models may focus on what may be the weighting percentages that may be attributed to specific touch points which may be the first interaction some customers have with the business or it may be the way that customers became a contact in CRM (e.g., these may be important touch points that users may want to add or increase weight for). In another example, weighting may use an AI/ML powered model utilized by the AI/ML system 1300 which may take in various actions that may be happening and may try to determine what may actually be the most likely property along the same customer journey (e.g., may use ML model that may be indicative of user's business process). Then, the attribution reporting may report on which may be the most valuable touch points along a customer's journey through the process till outcome (e.g., closing a deal). Custom objects may fit in with attribution reporting such that custom objects may be the output of this attribution system. The platform 1000 may include an attribution engine for providing these functionalities. The attribution engine may be able to leverage custom objects as the output, which may mean all services and/or systems described in the disclosure may also be utilized. For example, this attribution reporting may be used alongside other services such as custom object reporting. There may be workflows that may be triggered based on the attribution engine which may be a result of the fact that custom objects are the way that various data may be processed on the platform 1000.

As shown in FIG. 1, the platform includes an event record system 1700 in accordance with an aspect of the present disclosure. The platform 1000 is configured to allow the client to define event records that correspond to custom objects (e.g., a yoga studio event record or a vehicle event record) and/or associate existing event records to custom objects (or certain properties thereof). In an aspect, the user may select a custom object and may define the types of events that may occur with respect to the custom object, such that the custom object may be the primary object of the new event record. In some example embodiments, the user may select from a predefined list of event types, such as "sale" event, "ticket opening" event, "payment" event, or the like. Additionally or alternatively, the user may define new event types and may define one or more properties of each event type. In an aspect, the user may define the associations that give rise to the event or other actions that occur that may trigger the event. In some example embodiments, a user may define a new type of event and may associate the event with one or more types of event records (e.g., contact event record, company event record, ticket event record, product event record, or the like). For example, each event may occur with respect to one or more object types that may be associated with each respective event. In example embodiments, the user may define a set of event property types that may be tracked and may define a data type (e.g., int, string, Boolean, decimal, date, time, or the like) for each type of event property. In example embodiments, the platform 1000 may update the ontology 2402 (e.g., ontology datastore) to reflect the new type of event and/or may update schemas of one or more object event records to reflect the new event type that is being tracked with respect to one or more respective object types. In some example embodiments, the platform 1000 may receive one or more event source selections from the user, where the event sources may indicate a third-party data source that may be monitored for event instances.

In example embodiments, the platform 1000 may further configure a custom listening thread that listens for a new event type, for example, from an event source identified by the configuring user. In these example embodiments, a listening thread may monitor an event source (or multiple event sources) for event instances, whereby the event system 1700 may update the event data store(s) 3000 and/or the instances knowledge structure 2900 when such events are detected. For example, the listening thread may listen for actions, such as a contract being e-signed by a contact and/or a payment being received from the contact to update the "contact" event record (and any other implicated event records).

In example embodiments, events may be recorded in event records that may be stored in the event data store(s) 3000 within the storage system 2400. In example embodiments, an event record may provide a log of one or more types of events that may be recorded in relation to respective instances of a particular type of object. For example, a "contact" event record may be one type of event record. The "contact" event record may track events with respect to a contact such that the contact event record may track instances of the contact receiving an email, the contact responding to an email, the contact viewing the client's website, the contact submitting a form to the client, the contact purchasing a product, the contact initiating a ticket with respect to a purchase made by the contact, the contact requesting a refund, the contact being issued a refund, the contact leaving a review, the contact closing a ticket, and/or the like.

In an aspect, the event system 1700 may store or reference each instance of each type of event. Thus, if a contact is sent multiple emails, a corresponding instance of a contact event record may identify each time the contact was sent an email from the client (e.g., from a salesperson or an automated message). Furthermore, in some example embodiments, an event record may store properties for each type of event that may be tracked. In example embodiments, the properties of an event record may include a timestamp (e.g., date and/or time), an event identifier, one or more associations to different objects, and any other suitable properties (e.g., default properties or customer defined properties that may be tracked throughout the platform). Continuing the "contact" event record example, the properties of each instance of an email sent to the client may include a timestamp indicating when the email was sent and an association that indicates from whom the email was sent. Similarly, the contact event record may track each of the contact's purchase events, whereby each purchase made by the contact may be recorded in the contact event record with a time stamp and an association to an instance of the product and/or service that was purchased by the contact.

Figure 7:
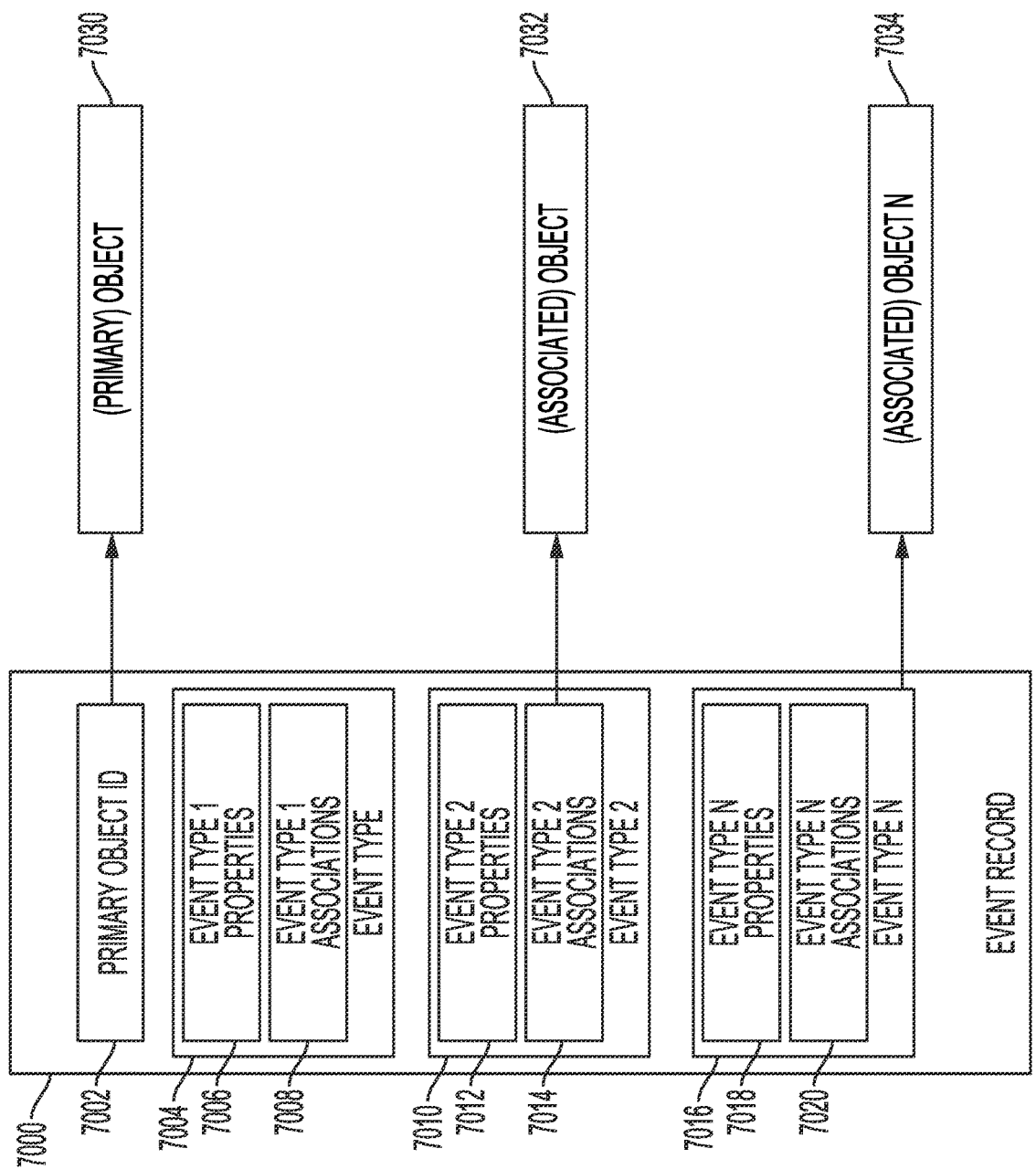
FIGS. 7-9 are block diagrams illustrating examples of computing environment wherein one or more of the provisions set forth herein may be implemented.

FIG. 7 illustrates an example schema of an event record 7000 in accordance with an aspect of the present disclosure. In the illustrated example, the event record 7000 may include a reference 7002 to a primary object 7030. The reference 7002 to the primary object 7030 may indicate the object (e.g., core object or custom object) to which the events being tracked in the event record 7000 correspond. For instance, the primary object 7030 may be a contact object, a company object, a ticket object, a deal object, a product object, a service object, a custom object defined by a client, and/or the like. Thus, when a new instance of an event record 7000 is created in relation to an instance of an objection (e.g., contact, ticket, deal, company, or the like), the created event record instance may be associated with a respective object instance corresponding to the instance of the primary object 7030 (e.g., contact, ticket, deal, company, or the like). In this way, events relating to the instance of the core object, the custom object, or the like may be tracked in the newly created event record instance.

In example embodiments, an event record 7000 may log N different types of events (e.g., first event type 7004, second event type 7010 . . . , Nth event type 7016), where each type of event may represent different respective actions that may occur with respect to the subject of the primary object of the event record. Put another way, an event record 7000 relating to a particular thing (e.g., a contact, a company, a salesperson, a ticket, a deal, a product, a service, a yoga studio, a car dealership, a subscription, or the like) may define trackable actions that may occur with respect to the thing. For example, with respect to a contact, a non-limiting example of event types (e.g., event type 1, event type 2, event type N) that may be logged in a "contact" event record 7000 may include, but may not be limited to: visits to the client's website by a particular contact, the contact being contacted by a sales person, the contact contacting the client, an offer being made to the contact, a deal being closed with the contact, an offer being rejected by the contact, a form being submitted by the contact, the electronic message being sent to a contact, the contact opening the electronic message (e.g., email), the contact clicking on a link in an electronic message, the contact responding to an electronic message, the contact sharing a link contained in an electronic message, the contact engaging on a social media post, the contact interacting with an online advertisement, the contact opening a ticket, the contact leaving feedback, the contact closing a ticket, the contact requesting a refund, the contact being issued a refund, and the like.

As may be appreciated, different types of event records 7000 correspond to different types of objects and will therefore include different, but potentially overlapping sets of event types. For each event type, the event record 7000 instance may log (e.g., store or index) instances of each time a respective type of event occurred with respect to an instance of the primary object. Thus, in some example embodiments, the event records 7000 may track the lifecycle of an object (via instances thereof), such as a customer lifecycle (or "contact lifecycle"), a product lifecycle, a deal lifecycle, a ticket lifecycle, and/or the like. In example embodiments, the instances of respective event types logged in an instance of an event record may be stored in a sequential manner (e.g., according to timestamps of the instances of a particular event type). For example, in some example embodiments, each event type in a respective event record may include a data structure such as an array or linked list, where each respective instance of the event type may be represented as an entry in the data structure.

In example embodiments, each event type (e.g., event types 7004, 7010, 7016) logged in an event record 7000 may include a set of event properties (e.g., event properties 7006, 7012, 7018) and a set of zero or more associations (e.g., associations 7008, 7014, 7020). In example embodiments, the event properties may include a timestamp that indicates a date and/or time at which an instance of the event occurred. Additionally, the event properties of a particular event type may further include additional metadata, such as a geolocation corresponding to the event and/or other contextual data. In example embodiments, the properties of each event instance may also include a unique event ID that identifies the event instance from other event instances of the same type, such that a single event may be referenced by multiple event record instances.

In an aspect, the associations of a particular event type may indicate how a type of event may relate to two or more different objects. For example, a contact may purchase a vehicle from a client business (e.g., a car dealership). Thus, an event instance (e.g., tracked in an event record instance) corresponding to the purchase of the vehicle may be associated both with a contact object and a vehicle object, whereby both a contact event record and a vehicle event record may both log the event instance (e.g., based on a timestamp and/or a unique event ID). In this example embodiment, the contact event record instance associated with the customer that purchases the vehicle may reference the contact object instance of the customer as the primary object 7030 and may reference the vehicle object instance of the purchased vehicle as an associated object for at least one event type 7004 (e.g., a "purchased" event type). Similarly, the vehicle event record instance corresponding to the purchased vehicle may reference the vehicle object instance of the vehicle as the primary object 7030 and may reference the contact object instance of the customer as an associated object 7032 for at least one event type 7010 (e.g., a "purchased by" event type). There may be any N number of other associated objects 7034 (related to Nth event type 7016). In this way, the object's relating to a client's business may be tracked and reported on in a unified and/or customizable manner, such that the respective event records may represent a single source of truth throughout the various lifecycles associated with the client's business.

In example embodiments, the event system 1700 may be configured to monitor for and log events that may occur in relation to a set of objects (e.g., core objects and/or custom objects) defined by the user. As discussed, a user may define a custom object (or multiple custom objects) and may define the events that occur with respect to the custom object and other objects (custom objects, core objects, and/or standard objects) that may be related to the client's business via the customization system 1500. In defining the custom objects, the user may also define the properties of the custom objects and sources for the types of data represented by the properties. In example embodiments, event instances corresponding to the custom object may be detected and recorded when data is received from a specific source. In some of these example embodiments, the event system 1700 may instantiate and execute listening threads that may listen to various services 2300 of the platform 1000 (e.g., payment services, ticketing services, CRM services, CMS services, machine-learning services, geolocation services, identity resolution services, telemetry services, and/or the like) and/or external event sources for particular types of data and may update the event data store(s) 3000 and/or the knowledge structure 2900 based on the data obtained from the various services 2300. For example, if a user has defined a vehicle object (e.g., vehicle custom object 1102B) and configured the event system 1700 to log "test drive events" (2916, 2918) with respect to the vehicle custom object 1102B (and a contact object or a "customer" custom object 1102A), when a contact test drives a particular vehicle, the event system 1700 may log the test drive event (e.g., date, time, test drive length, and/or the like) and associate the event with a vehicle event record instance corresponding to the particular vehicle. In this example, the event system 1700 may implement an event listening thread that receives a data stream from a CRM service, a workflow service, and/or an enterprise resource planning (ERP) service and listens for specific types of data that may indicate that a particular person has test drove a particular make of vehicle (e.g., sales person entries or notes entered into a CRM or an automated entry generated by a workflow service). It is noted that while the foregoing example relates to a custom object, the event system 1700 may track events associated with a default set of objects in a similar manner. In some example embodiments, the event system 1700 may log the test drive event in the knowledge structure 2900 via an association between the vehicle instance and the contact instance. It is noted that the other services 2300 may also include third party event sources that may be accessed via application programming interfaces (APIs) and/or webhooks.

Events may include various types of events that relate to different facets of a client's business. In example embodiments, events may include a standard set of events that are tied to the CRM system 1100, the CMS 1400, the multi-client service system 1600, a payment system 1800, and/or the like. For example, with respect to the CRM system 1100, example events may include instances of potential customers (which may be also referred to as "contacts") visiting a client's website, a potential customer being contacted by a salesperson, a potential customer contacting the client, an offer being made to the potential customer, a deal being closed with the potential customer, an offer being rejected by the potential customer, a form being submitted by a contact, and the like. With respect to the CMS 1400, examples of events may include an electronic message being sent to a contact, a contact opening an electronic message, a contact clicking on a link in an electronic message, a contact responding to an electronic message, a contact sharing a link contained in an electronic message, and the like. Examples of service-related events may include an initiation of a new ticket by a customer, a customer service representative contacting the customer, an action being taken with respect to the ticket, an issue corresponding to the ticket being resolved, a ticket being closed, feedback being provided by a customer, and the like. With respect to the payment system 1800, example types of events that may be related to payments may include a credit card payment being processed, an Automated Clearing House (ACH) payment being processed, a one-time payment being processed, a payment being made for a subscription, a deposit being processed, a refund being processed, a payment being declined, and the like.

In some embodiments, the platform 1000 may include, integrate with, or otherwise share data with a CRM or the like. As used in this disclosure, the term CRM may refer to sophisticated customer relations management platforms (e.g., HubSpot), an organization's internal databases, and/or files such as spreadsheets maintained by one or more persons affiliated with the organization). In some embodiments, the platform 1000 provides a unified database (e.g., a proprietary database 2800) in which a contact record serves as a primary entity for a client's sales, marketing, service, support and perhaps other activities, such that individuals at a client who interact with the same customer at different points in the lifecycle, involving varied workflows, have access to the contact record without requiring data integration, synchronization, or other activities that are necessary in conventional systems where records for a contact are dispersed over disparate systems. In embodiments, data relating to a contact may be used after a deal is closed to better service the contact's needs during a service phase of the relationship. For example, a contact of an invoicing software platform (e.g., the CFO of the company) may have initially been entered into a CRM as a lead. The contact may have subscribed to the software platform, thereby becoming a customer. The contact (or another contact affiliated with the client) may later have an issue using a particular feature of the invoicing software and may seek assistance. The platform 1000 may provide a customer service solution on behalf of the invoicing software, whereby the platform 1000 may, for example, provide one or more interfaces or means to request service. Upon receiving a service request from the contact, the platform 1000 may have access to data relating to the contact from the time the contact was a lead through the service period of the relationship. In this way, the platform 1000 may have data relating to the communications provided to the contact when the contact was just a lead, when the deal was closed, and after the deal closed. Furthermore, the platform 1000 may have information regarding other contacts of the client, which may be useful to addressing a customer-service related issue of the contact.

In embodiments, a client, via a client device 97, may customize its customer service solution, such that the customer-service solution is tailored to the needs of the client and its customers. In embodiments, a client may select one or more customer service-related service features (or "service features" or "services") and may provide one or more customization parameters corresponding to one or more of the service features. Customization parameters can include customized ticket attributes, service-related content (or "content") to be used in the course of customer service, root URLs for populating a knowledge structure 2900, customer service workflows (or "workflows") 2102, and the like. For example, a client, via the client device 97, may provide selections of one or more features and capabilities enabled in the platform 1000 as described throughout this disclosure (e.g., automated content generation for communications, automated chat bots, AI-generated follow up emails, communication integration, call routing to service experts, and the like) via a graphical user interface (e.g., a drop-down menu, a button, text box, or the like). The client 97 may also use the platform 1000 to find and provide content that may be used to help provide service or support to its contacts (e.g., articles that answer frequency asked questions, "how-to" videos, user manuals, and the like) via a graphical user interface (e.g., an upload portal). The client may further provide information relating to the updated content, such as descriptions of the content, a topic heading of the content, and the like. This can be used to classify the media content in a knowledge data structure as further described throughout this disclosure, and ultimately to help identify content that is relevant to a customer service issue, support issue, or the like. A client may additionally or alternatively define one or more customer service workflows via a graphical user interface (e.g., a visualization tool that allows a user to define a customer service workflows of the organization). A service workflow may define a manner by which a particular service-related issue or set of service related issues are to be handled by a client-specific service system 1600. For example, a service workflow for a particular client may define when a customer should be provided a link to content (e.g., useful articles or FAQs) to help the contact solve an issue, when a client is to be routed to a human service expert, when to send a technician, when to send follow-up communications, and the like). In embodiments, a workflow may be defined with respect to a ticket pipeline. The platform 1000 may utilize the client's customization parameters to deploy a client-specific customer service system. In this way, the customer service offerings of each respective client may be tailored to the business of the client, rather than a one-size-fits-all solution for all clients, irrespective of their business needs.

The platform 1000 provided herein enables businesses to undertake activities that encourage growth and profitability, including sales, marketing and service activities. Among other things, as a user of the platform, a business user is enabled to put customer service at a high level of priority, including to recruit the business user's customers to help in the growth of the business. In embodiments, enabling customer service involves and enables various interactions among activities of a business user that involve service, marketing, sales, among other activities. In some embodiments, the platform 1000 is configured to manage and/or track customer service issues using customer-service tickets (also referred to as "tickets") via the ticketing system 2200.

A ticket may be a data structure that corresponds to a specific issue that needs to be addressed for a contact by or on behalf of the client. Put another way, a ticket may correspond to a service-related process, or any other process or workflow that has a defined start and finish (e.g., resolution). For example, a particular type of ticket used to support an on-line shopping client may be issued when a contact has an issue with a package not being received. A ticket in this example would relate to an issue with the delivery of the contact's package. The ticket may remain unresolved until the contact receives the package, is refunded, or the package is replaced. Until the ticket is resolved, the ticket may remain an open ticket, despite the number of times the contact interacts with the system.

In embodiments, tickets may have attributes. The attributes may include default attributes and/or custom attributes. Default ticket attributes are attributes that are included in any ticket issued by the platform 1000. Custom attributes are attributes that are selected or otherwise defined by a client for inclusion in tickets issued on behalf of the client. A client 97 may define one or more different types of tickets that are used in the client's client-specific service system. Examples of default ticket attributes, according to some implementations of the platform 1000, may include (but are not limited to) one or more of a ticket ID or ticket name attribute (e.g., a unique identifier of the ticket), a ticket priority attribute (e.g., high, low, or medium) that indicates a priority of the ticket, a ticket subject attribute (e.g., what is the ticket concerning), a ticket description (e.g., a plain-text description of the issue to which the ticket pertains) attribute, a pipeline ID attribute that indicates a ticket pipeline to which the ticket is assigned, a pipeline stage attribute that indicates a status of the ticket with respect to the ticket pipeline in which it is being processed, a creation date attribute indicating when the ticket was created, a last update attribute indicating a date and/or time when the ticket was last updated (e.g., the last time an action occurred with respect to the ticket), a ticket owner attribute that indicates the contact that initiated the ticket, and the like. Examples of custom ticket attributes are far ranging, as the client 97 may define the custom ticket attributes, and may include a ticket type attributing indicating a type of the ticket (e.g., service request, refund request, lost items, etc.), a contact sentiment attribute indicating whether a sentiment score of a contact (e.g., whether the contact is happy, neutral, frustrated, angry, and the like), a contact frequency attribute indicating a number of times a contact has been contacted, a media asset attribute indicating media assets (e.g., articles or videos) that have been sent to the contact during the ticket's lifetime, and the like.

In an aspect, the multi client system 1600 includes a client configuration system 1602 allows a client (e.g., a user affiliated with a client) to customize a client-specific service system, and configures and deploys the client-specific service system based on the client's customizations. In embodiments, the client configuration system 1602 presents a graphical user interface (GUI) to a client user via a client device 97. In embodiments, the GUI may include one or more drop down menus that allows users to select different service features (e.g., chat bots, automated follow up messages, FAQ pages, communication integration, and the like). Alternatively, a user affiliated with a client may select one of multiple packages (e.g., "basic", "standard", "premium", or "enterprise"), where each package includes one or more service features and is priced accordingly. In these embodiments, the service features in a respective package may be cumulative, overlapping, or mutually exclusive. In scenarios where the packages are mutually exclusive, a client may select multiple packages.

Once a service feature is selected, a user affiliated with the client may begin customizing one or more aspects of the service feature (assuming that the selected service feature is customizable). It should be noted that some service features allow for heavy customization (e.g., workflow definitions, pipeline definitions, content uploads, email templates, conversation scripting, and the like), while other service features do not allow for any customization or for minimal customization (e.g., custom logos).

In embodiments, the client configuration system 1602 is configured to interface with the client devices 97 to receive customization parameters from respective clients corresponding to selected service features. As mentioned, customization parameters may include ticket attributes for client-specific tickets, service-related content (also referred to as "content" or "media assets") to be used in the course of customer service, root URLs for populating the knowledge data structure 2900, ticket pipeline definitions, customer service workflows (or "workflows") definitions, communication templates and/or scripts, and the like.

In embodiments, the client configuration system 1602 is configured to allow a client (e.g., a user affiliated with a client) to configure one or more different types of tickets that are used to record, document, manage, and/or otherwise facilitate individual customer service-related events issued by contacts of the client. For example, a client can customize one or more different types of tickets and, for each different type of ticket, the custom ticket attributes of the ticket. In embodiments, the client configuration system 1602 presents a GUI to a user affiliated with the client via the client device 97 that allows a user to configure ticket objects, which are used to generate instances of tickets that are configured according to the client's specifications. The user may command the client configuration system 1602 to create a new ticket object, via the GUI. In doing so, the client may define, for example, the type of ticket, the different available priority levels, a pipeline that handles the ticket, and/or other suitable information. For example, using a menu or a text input box, the user can designate the type of ticket (e.g., "refund request ticket") and the different available priority levels (e.g., low or high). In embodiments, the client configuration system 1602 may allow a user to designate a pipeline to which the ticket is assigned. Alternatively, the pipeline may be defined in a manner, such that the ticket management system 2200 listens for new tickets and assigns the ticket to various pipelines based on the newly generated ticket and information entered in by the user.

In embodiments, the client 97 may further configure a ticket object by adding, removing, modifying, or otherwise updating the custom attributes of the ticket object. In embodiments, the GUI presented by the platform 1000 may allow the user to define new attributes. The GUI may receive an attribute name and the variable type of the attribute (e.g., an integer, a flag, a floating point, a normalized score, a text string, maximum and minimum values, etc.) from the user via the GUI (e.g., using a menu and/or a text input box). In embodiments, the GUI may allow the user to define the manner by which the attribute value is determined. For example, the user may designate that a value of an attribute may be found in a specific field or fields of a specific database record, answers from the client in a live chat or chat bot transcript (e.g., extracted by an NLP system), and the like. The ticket management system 2200 may utilize such definitions to populate the attributes of new ticket instances generated from the ticket object. The GUI may allow a user to modify or otherwise edit the attributes of the ticket. For example, a user may rename a ticket type, add or delete attribute types, modify the data types of the different ticket attributes, and the like.

The client configuration system 1602 may configure and deploy a client-specific service system. In embodiments, the platform 1600 implements a microservices architecture, whereby each client-specific service system may be configured as a collection of coupled services. In embodiments, the client configuration system 1602 may configure a client-specific service system data structure that defines the microservices that are leveraged by an instance of the client-specific service system data structure (which is a client-specific service system). A client-specific service system data structure may be a data structure and/or computer readable instructions that define the manner by which certain microservices are accessed and the data that is used in support of the client-specific service system. For example, the client-specific service system data structure may define the microservices that support the selected service features and may include the mechanisms by which those microservices are accessed (e.g., API calls that are made to the respective microservices and the customization parameters used to parameterize the API calls). The client configuration system 1602 may further define one or more database objects (e.g., contact records, ticket records, and the like) from which database records (e.g., SQL database records) are instantiated. For example, the client configuration system 1602 may configure ticket objects for each type of ticket, where each ticket object defines the ticket attributes included in tickets having the type. In embodiments, the client configuration system may include any software libraries and modules needed to support the service features defined by the client in the client-specific service system data structure. The client-specific service system data structure may further include references to the proprietary database 2800 and/or the knowledge data structure 2900, such that a deployed client-specific service system may have access to the proprietary database 2800 and the knowledge structure 2900.

In embodiments, the client configuration system 1602 may deploy a client-specific service system based on the client-specific service system data structure. In some of these embodiments may instantiate an instance of the client-specific service system from the client-specific service system data structure, whereby the client-specific service system may begin accessing the microservices defined in the client-specific service system data structure. In some of these embodiments, the instance of the client-specific service system is a container (e.g., kubernetes) and the client-specific service system data structure is a container image. In these embodiments, the container is configured to access the microservices, which may be containerized themselves.

As shown in FIG. 1, the ticket management system 2200 manages various aspects of a ticket. The ticket management system 2200 may generate new tickets, assign tickets to new tickets to respective ticket pipelines, manage pipelines including updating the status of tickets as the ticket moves through the various stages of its lifecycle, managing workflows, and the like. In some embodiments, the ticket management system 2200 is implemented as a set of microservices, where each microservice performs a respective function.

In embodiments, the ticket management system 2200 is configured to generate a new ticket on behalf of a client-specific service system. In some of these embodiments, the ticket management system 2200 may listen for requests to generate a new ticket (e.g., an API call requesting a new ticket). The request may include information needed to generate the new ticket, including a ticket type, a subject, a description, a contact identifier, and/or the like. The request may be received in a number of different manners. For example, a request may be received from a contact request (e.g., a contact fills out a form from the client's website or a website hosted by the platform 1000 on behalf of the client), a chat bot (e.g., when a contact raises a specific issue in a chat with the chat bot), via a customer service specialist (e.g., the client calls a service specialist and the service specialist initiates the request), and the like. In response to receiving a ticket request, the ticket management system 2200 generates a new ticket from a ticket object corresponding to the ticket type. The ticket management system 2200 may include values in the ticket attributes of the ticket based on the request, including the ticket type attribute, the subject attribute, the description attribute, the date/time created attribute (e.g., the current date and/or time), the last update attribute (e.g., the current date and/or time), the owner attribute (e.g., the contact identifier), and the like. Furthermore, in some embodiments, the ticket management system 2200 may assign a ticket to a ticket pipeline of the client-specific service system and may update the pipeline attribute to indicate the ticket pipeline to which it was assigned and the status attribute to indicate the status of the ticket (e.g., "new ticket"). In embodiments, the ticket management system 2200 may store the new ticket in the proprietary database 2800 (e.g., a ticket database).

In embodiments, the ticket management system 2200 manages ticket pipelines and triggers workflows defined in the ticket pipelines. In some embodiments, the ticket management system 2200 is configured to manage the ticket pipelines and trigger workflows using a multi-threaded approach. In embodiments, the ticket management system 2200 deploys a set of listening threads that listen for tickets having a certain set of attribute values. In these embodiments, each time a ticket is updated in any way (e.g., any time a ticket attribute value is newly defined or altered), each listening thread determines whether the attribute values indicated in the updated ticket are the attribute values that the listening thread is listening for. If the listening thread determines that the attribute values indicated in the updated ticket are the attribute values that the listening thread is listening for, the listening thread may add the ticket to a ticket queue corresponding to the listening thread. For example, a listening thread may listen for tickets having a ticket attribute that indicates that a communication was sent to a contact requesting further information. In response to identifying a ticket having a ticket attribute that indicates that the communication was sent to the contact, the listening thread may add the ticket to the ticket queue. Once in the ticket queue, the ticket management system 2200 may update the ticket status attribute of the ticket, and may trigger one or more workflows defined with respect to the ticket status. For example, a workflow may trigger the client-specific system to schedule a follow up email if no response is received from the contact within a period of time (e.g., three days).

In some embodiments, the ticket management system 2200 manages workflows on behalf of a client-specific service system. In some embodiments, the ticket management system 2200 is configured to manage workflows using a multi-threaded approach. In embodiments, the ticket management system 2200 deploys a set of workflow listening threads that listen for tickets having a certain set of attribute values. In these embodiments, each time a ticket is updated in any way (e.g., any time a ticket attribute value is newly defined or altered), each workflow listening thread determines whether the attribute values indicated in the updated ticket are the attribute values that the workflow listening thread is listening for. If the workflow listening thread determines that the attribute values indicated in the updated ticket are the attribute values that the workflow listening thread is listening for, the listening thread may add the ticket to a ticket queue corresponding to the workflow listening thread. Once a ticket is added to a ticket queue corresponding to the workflow listening thread, the ticket management system 2200 may execute the workflow with respect to the ticket. For example, during a conversation with a chat bot, a workflow listening thread may listen for a sentiment attribute value that indicates that the contact is frustrated. When the chat bot (e.g., using Natural Language Processing (NLP) determines that the contact is frustrated (e.g., the sentiment score is below or above a threshold), the chat bot may update the sentiment attribute of a ticket corresponding to the contact to indicate that the contact is frustrated. In response, a workflow listening thread may identify the ticket and add it to its queue. Once in the queue, the workflow may define actions that are to be performed with respect to the ticket. For example, the workflow may define that the ticket is to be routed to a service-specialist. In this example, the contact may be routed to a service-specialist, which may include updating the status of the ticket and providing any relevant ticket data to the service-specialist via a service-specialist portal.

Conversation System—2000

In embodiments, the conversation system 2000 is configured to interact with a human to provide a two-sided conversation. In embodiments, the conversation system 2000 is implemented as a set of microservices that can power a chat bot. The chat bot may be configured to leverage a script that guides a chat bot through a conversation with a contact. As mentioned, the scripts may include a decision tree that includes rules that trigger certain responses based on an understanding of input (e.g., text) received from a user. For example, in response to a contact indicating a troubleshooting step performed by the contact, the script may define a response to output to the contact defining a next step to undertake. In some embodiments, the rules in a script may further trigger workflows. In these embodiments, the chat bot may be configured to update a ticket attribute of a ticket based on a trigged rules. For example, in response to identifying a troubleshooting step performed by the contact, the chat bot may update a ticket corresponding to the contact indicating that the client had unsuccessfully performed the troubleshooting step, which may trigger a workflow to send the contact an article relating to another troubleshooting step from the client's knowledge base.

In embodiments, the conversation system 2000 may be configured to implement natural language processing to effectuate communication with a contact. The conversation system 2000 may utilize machine learned models (e.g., neural networks) that are trained on service-related conversations to process text received from a contact and extract a meaning from the text. In embodiments, the models leveraged by the conversation system 2000 can be trained on transcripts of customer service live chats, whereby the models are trained on both what the customer is typing and what the customer service specialist is typing. In this way, the models may determine a meaning of input received from a contact and the chat bots may provide meaningful interactions with a contact based on the results of the natural language processing and a script.

In embodiments, the conversation system 2000 is configured to relate the results of natural language processing with actions. Actions may refer to any process undertaken by a system. In the context of customer service, actions can include "create ticket," "transfer contact to a specialist," "cancel order," "issue refund," "send content," "schedule demo," "schedule technician," and the like. For example, in response to natural language processing speech of a contact stating: "I will not accept the package and I will just send it back," the conversation system 2000 may trigger a workflow that cancels an order associated with the contact and may begin the process to issue a refund.

In embodiments where the platform 1000 supports audible conversations, the conversation system 2000 may include voice-to-text and text-to-speech functionality as well. In these embodiments, the conversation system 2000 may receive audio signals containing the speech of a contact and may convert the contact's speech to a text or tokenized representation of the uttered speech. Upon formulating a response to the contact, the conversation system 2000 may convert the text of the response to an audio signal, which is transmitted to a contact user device 1680.

In an aspect, the platform may have a feedback system configured to receive and/or extract feedback regarding interactions with a contact. The feedback system may receive feedback in any suitable manner. For example, a client-specific service system may present a contact with questions relating to a ticket (e.g., "was this issue resolved to your liking?" or "on a scale of 1-10 how helpful was this article?") in a survey, during a chat bot communication, or during a conversation with a customer service specialist. A contact can respond to the question and the feedback system can update a contact's records with the response and/or pass the feedback along to the machine learning system 1608. In some embodiments, the feedback system may send surveys to contacts and may receive the feedback from the contacts in responsive surveys.

In embodiments, the client configuration system 1602 provides a GUI by which clients can customize aspects of their respective feedback systems. For example, the client configuration system 1602 may allow a user of a client to define events that trigger a request for feedback from a contact, how long after a particular triggering event to wait until requesting the feedback, what mediums to use to request the feedback (e.g., text, phone call, email), the actual subject matter of respective requests for feedback, and/or the look and feel of the requests for feedback. The user can define surveys, including questions in the survey and the potential answers for the questions. Examples of GUIs that allow a client to customize its feedback system are provided below.

In embodiments, the conversational intelligence system 2000 along with its feedback system may be configured to extract feedback from an interaction with a contact. In these embodiments, the feedback system may perform tone and/or sentiment analysis on a conversation with a contact to gauge the tone or sentiment of the contact (e.g., is the contact upset, frustrated, happy, satisfied, confused, or the like). In the case of text conversations, the feedback system can extract tone and/or sentiment based on patterns recognized in text. For example, if a user is typing or uttering expletives or repeatedly asking to speak with a human, the feedback system may recognize the patterns in the text and may determine that the user is likely upset and/or frustrated. In the case of audible conversations, the feedback system can extract features of the audio signal to determine if the contact is upset, frustrated, happy, satisfied, confused, or the like. The feedback system may implement machine learning, signal processing, natural language processing and/or other suitable techniques to extract feedback from conversations with a contact.

In embodiments, the proprietary database(s) 2800 may store and index data records. In embodiments, the proprietary database(s) 2800 may store contact records, client records, and/or ticket records. The proprietary database(s) 2800 may store additional or alternative records as well, such as product records, communication records, deal records, and/or employee records. In embodiments, the knowledge structure 2900 includes a client's knowledge base which refers to the set of media assets (e.g., articles, tutorials, videos, sound recordings) that can be used to aid a contact of the client. The knowledge base of a client may be provided by the client (e.g., uploaded by a user via an upload portal) and/or crawled on behalf of the client by the client configuration system 1602 (e.g., in response to receiving a root URL to begin crawling). In embodiments, media assets may be assigned topic headers that indicate the topics to which the media asset pertains. In this way, a link to a media asset may be displayed in relation to a topic heading and/or may be used by customer service specialists when providing links to a contact seeking assistance with an issue pertaining to the respective topic.

In embodiments where the knowledge structure 2900 structures the client knowledge base 1624, the knowledge structure 2900 may store relationship data relating to the knowledge base 1624 of a client. In embodiments, the knowledge structure 2900 may be the knowledge data structure discussed above. In embodiments, the knowledge structure 2900 includes nodes and edges, where the nodes represent entities and the edges represent relationships between entities. Examples of types of entities that may be stored in the knowledge structure 2900 include articles, videos, locations, contacts, clients, tickets, products, service specialists, keywords, topics, and the like. The edges may represent logical relationships between different entities.

In some examples, the client configuration system 1602 may present a GUI that allows users to upload articles, videos, tutorials, and other content. the knowledge base may refer to a collection of articles, videos, sound records, or other types of content that may be used to assist a contact when dealing with an issue. The contents in a knowledge base may be provided to a contact in a variety of different manners, including by a customer-service specialist (e.g., during a live chat or in a follow-up email), by a chat bot, or from a help page (e.g., a webpage hosted by the platform 1000 or the client's website). In some embodiments, the GUI allows a user to designate one or more root URLs that allow the platform 1000 to crawl a website for media assets and/or retrieve media assets. In some embodiments, the client configuration system 1602 may utilize the root URL to generate the knowledge structure 2900 (or portion thereof) that references the media assets used in connection with a client's service system. In some embodiments, the GUI may further allow a user to define topic headings to which the content is relevant or directed. For example, the user may provide the topics via a text string or may select topics from a menu or series of hierarchical menus. In embodiments, the topic headings may be used to organize the uploaded content in the client's help page and/or to assist in selection of the content when assisting a contact.

In another example, the client configuration system 1602 may present a GUI that includes a pipeline definition element. In embodiments, a pipeline definition element allows a user to visually create a ticket pipeline. In some of these embodiments, the GUI may allow a user to define one or more stages of a ticket pipeline, and for each stage in the pipeline, the user may further define zero or more workflows that are triggered when the ticket reaches the particular stage in the pipeline. In embodiments, the user may define the various stages of a ticket pipeline and may define the attributes (and values thereof) of a ticket that corresponds to each stage. For example, the user may define a new ticket stage and may define that the ticket should be in the new ticket stage when a new ticket is generated but before any further communications have been made to the contact. The user may then define a second stage that indicates the ticket is waiting for further response from the client and may further define that the ticket should be in the "waiting for contact" stage after a new ticket notification has been sent to the client, but before the client has responded to the request (which may be part of the client's customer service requirements). The user may configure the entire pipeline in this manner.

In embodiments, the client configuration system 1602 along with the workflow system 2100 may allow a user to create new and/or update workflows by defining different service-related workflow actions (also referred to as "actions") and conditions that trigger those actions. In some embodiments, a workflow may be defined with respect to a ticket.

For example, the user affiliated with a cable or internet service provider (or "ISP") can define an action that notifies a customer when a new ticket is generated (e.g., generates and sends an email to the user that initiated the ticket). In this example, the GUI may be configured to allow the user to define the type or types of information needed to trigger the condition and/or other types of information that may be requested from the customer before triggering the email (e.g., the nature of the problem or reason for calling). The GUI may also allow the user to provide data that may be used to generate the email, such as an email template that is used to generate the email. Continuing this example, the user may define another action that routes the user to a human service specialist and one or more conditions that may trigger the action, such as unresolved issues or client requests. The user can add the action and conditions to the workflow, such that when the condition or conditions are triggered, the customer is routed to a live service specialist.

The client configuration system 1602 may allow a client to configure other service features without departing from the scope of the disclosure. For example, in embodiments, the client configuration system 1602 may allow a user to upload one or more scripts that a chat bot may utilize to communicate with contacts. These scripts may include opening lines (e.g., "hello, how may we assist you today") and a decision tree that defines dialog in response to a response from the contact (or lack of response). In some embodiments, the decision tree may designate various rules that trigger certain responses, whereby the rules may be triggered as a result of natural language processing of input received from the contact.

Figure 8:
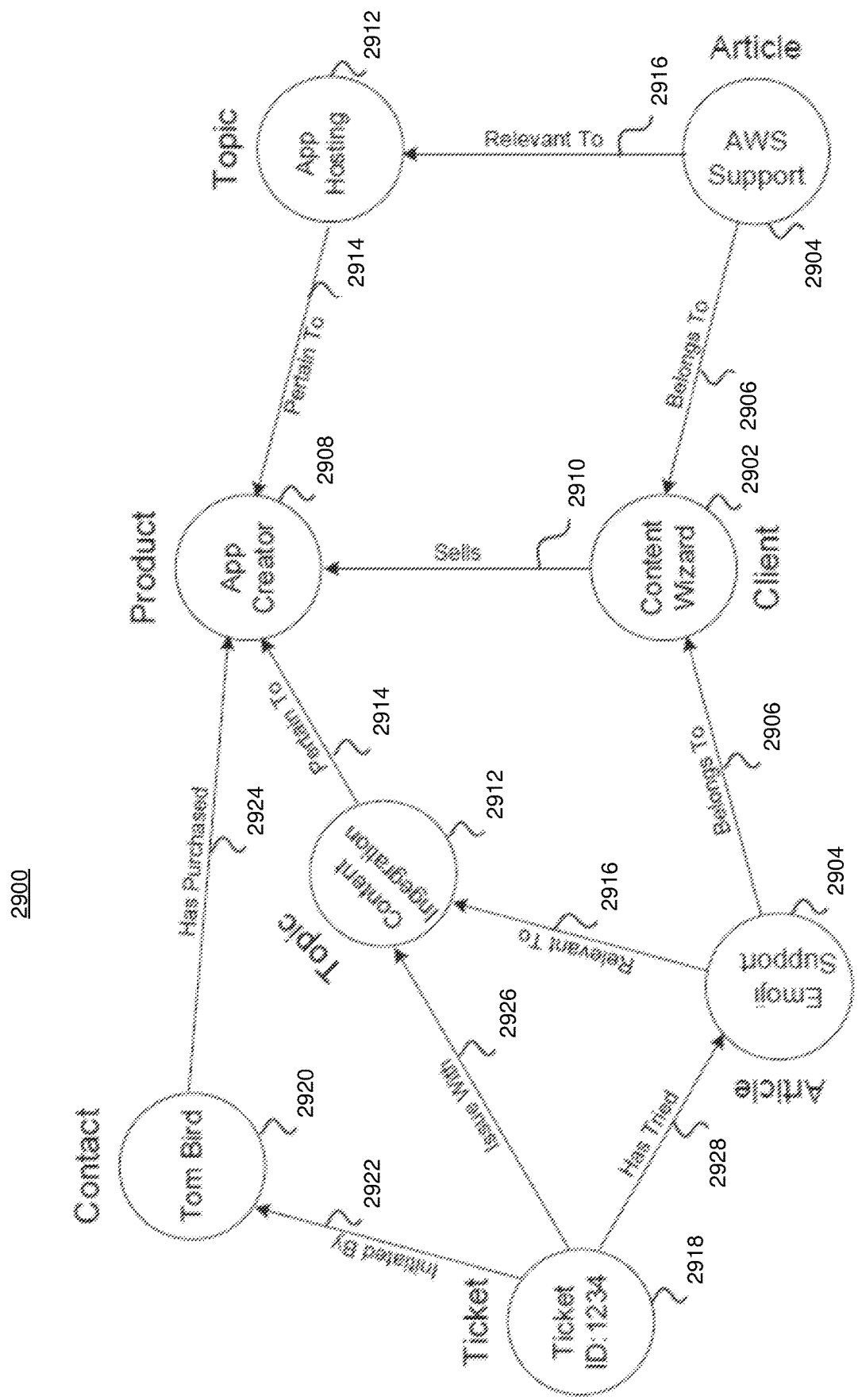

FIG. 8 illustrates an example visualization of a portion of the knowledge structure 2900, which is one mechanism among various alternatives (including tables, key-value pairs, directed graphs, clusters, and the like) for representing objects and relationships among objects handled by the platform 1000, including contact objects, tickets, content objects (such as for communications), client objects, timeline objects, and many others. In the example of FIG. 8, the knowledge structure 2900 illustrates a segment of information relating to a knowledge base of a client that includes multiple media assets (e.g., articles).

In this example in FIG. 8, the client is a company called "Content Wizard" that provides a product called "App Creator." Amongst the topics that are relevant to App Creator are a "content integration" topic and an "app hosting" topic. An article entitled "Emoji Support" is relevant to the "content integration" topic, and an article entitled "AWS Support" is relevant to the "app hosting" topic. The knowledge structure 2900 may organize the client's knowledge base to reflect these relationships. For example, the knowledge structure 2900 may include a client node 2902 that indicates the client "Content Wizard" and article nodes 2904 that correspond to the "Emoji Support" article and the "AWS Support" article. Edges 2906 between the client node 2902 and the respective article nodes 2904 may indicate that the articles are part of the client's knowledge base. Furthermore, a product node 2908 corresponding to the "App Creator" product may be connected to the client node 2902 by an edge 2910 that indicates that Content Wizard sells App Creator. Topic nodes 2912 may connect to a product node 2908 via edges 2914 that indicate a topic that pertains to a product, such that content integration and app hosting are topics that pertain to App Creator. Furthermore, the topic nodes 2912 may be related to the article nodes 2904 (or other media asset nodes) by edges 2916 that indicate an article represented by the article node 2904 is relevant to the related topic.

Furthermore, in embodiments, the knowledge structure 2900 may organize additional data relating to a client. For example, the knowledge structure 2900 may include ticket nodes 2918 and contact nodes 2920. A ticket node 2918 may indicate a ticket that was issued on behalf of the client. A contact node 2920 may represent a contact of the client. In this example, the contact node 2920 may be related to a ticket node 2918 with an edge 2922 that indicates the ticket was initiated by the contact (e.g., ticket #1234 was initiated by Tom Bird). The contact node 2920 may relate to product nodes 2908 with edges 2924 that indicate the contact has purchased a respective product (e.g., Tom Bird purchased App Creator). Furthermore, the ticket node 2918 may relate to topic node 2912 by an edge 2926 that indicates the ticket for an issue with a topic (e.g., an issue with content integration). The ticket node 2918 may further relate to article node 2904 with an edge 2928 indicating that the article has been tried during the servicing of the ticket. It should be appreciated that in these embodiments, additional or alternative nodes may be used to represent different entities in the customer-service workflow, (e.g., status nodes, sentiment nodes, date nodes, etc.) and additional or alternative edges may be used to represent relationships between nodes (e.g., "has the current status", "most recent sentiment was", "was contacted on", "was created on", "was last updated on", etc.).

The knowledge structure 2900 is a powerful mechanism that can support many features of a client-specific service system. In a first example, in response to a service specialist taking a call from the contact for a first time regarding a particular ticket, the client-specific service system 1600 may display a ticket history to the specialist that indicates that the user has purchased App Creator, that the contact's issue is with content integration, and that the contact has been sent the Emoji Support article. In another example, an automated workflow process servicing the ticket may retrieve the ticket node to learn that the contact has already been sent the Emoji Support article, so that it may determine a next course of action. In another example, an analytics tool may analyze all the tickets issued with a particular product and the issues relating to those tickets. The analytics tool, having knowledge of the client workflow, may drill down deeper to determine whether a particular article was helpful in resolving an issue.

In another example, a chat bot may utilize the knowledge structure 2900 to guide conversations with a contact. For instance, in an interaction between Tom Bird and a chat bot, the chat bot may state: "I see that we've sent you the Emoji Support article, were you able to read it?" If Tom Bird indicates that he has read it (e.g., "Yes, I have"), the chat bot may create a relationship between the article node 2904 and the contact node 2920 indicating that Tom Bird has read the article. If Tom Bird indicates that he has not read the article, the chat bot may then send him a link to the article, which may be referenced in the knowledge structure 2900 by, for example, a "web address" entity node. It is appreciated that the full knowledge structure 2900 may contain thousands, hundreds of thousands, or trillions or more of nodes and edges. The example of FIG. 8 is a limited example to demonstrate the utility of the knowledge structure 2900 in a customer service setting. In embodiments, the platform 1600 can maintain separate knowledge data structures 1622 for separate clients or may have the knowledge structure 2900 that stores information relating to all clients.

The platform 1000 may add information to the knowledge structure 2900 in any suitable manner. For example, the client configuration system 1602 may employ a crawling system and an information extraction system, discussed herein. In some embodiments, a crawling system may be seeded with one or more root URLs, from which the crawling system may begin crawling documents. For example, a user can enter a root URL to seed the crawling system. Additionally or alternatively, the client configuration system 1602 can add information to the knowledge structure 2900 as it is provided by the client (e.g., via upload and/or application programming interface (API)) or learned during operation (e.g., via the interactions with the contacts or clients). The client configuration system 1602 may implement any suitable ontology for structuring the knowledge structure 2900. Furthermore, the platform 1600 may add new entity types and relationship types to the knowledge data structure of the ontology as they are discovered and/or become necessary.

Multi-Client Service Platform 1600 (May Need to Move to FIG. 1)

Figure 9:
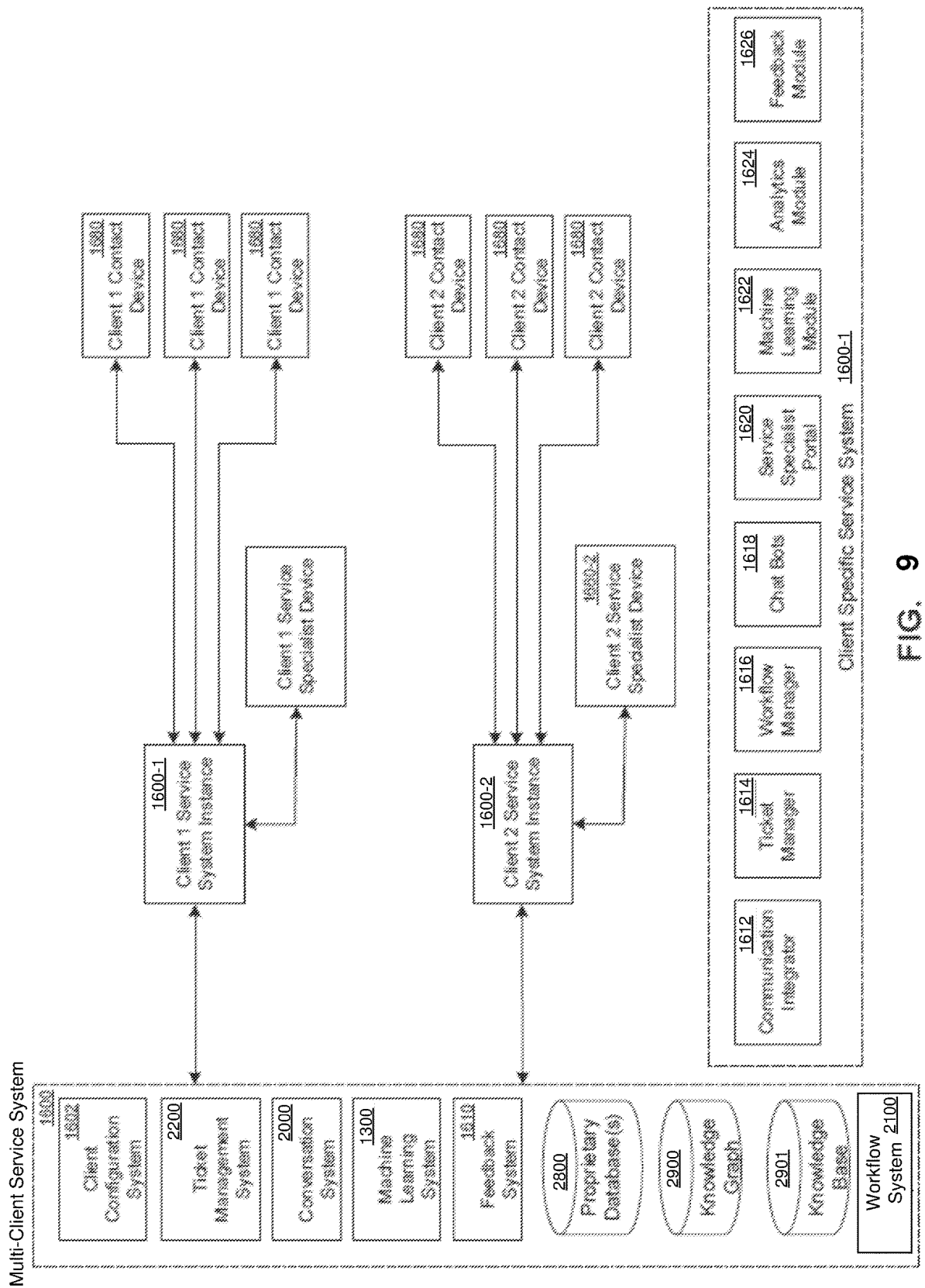

FIG. 9 illustrates an example of the multi-client service platform 1600 (in FIG. 1) deploying at least two separate client-specific service systems 1600. A first client-specific service system 1600-1 is deployed on behalf of a first client and a second client-specific service system 1600-2 is deployed on behalf of a second client. Each client-specific service system 1600 may be configured according to the client's selected service features and customization parameters. Thus, the first client-specific service system 1600-1 may provide a first set of service features, while the second client-specific service system 1600-2 may provide a second set of service features that may be different than the first set of service features. As discussed, the platform 1600 may be implemented according to a microservices architecture. In these embodiments, each client-specific service system 1600 may be configured to access a respective set of microservices. While some microservices will be used by all client-specific service systems 1600 (e.g., authentication microservices, database services, etc.), other microservices may be accessed by a client-specific service system 1600 only if the client has selected service features that are supported by the other microservices. In some of these embodiments, the client-specific service systems 1600 may be configured to access a set of APIs that leverage the microservices of the multi-client service platform 1600.

In an example configuration, a client-specific service system 1600 may include and/or may leverage one or more of a communication integrator 1612, a ticket manager 1614, a workflow manager 1616, chat bots 1618, service specialist portals 1620, a machine learning module 1612, an analytics module 1624, and/or a feedback module 1626. Depending on the service features selected by a client, the system 1600 may not include one or more of the foregoing components. In embodiments, each client-specific service system 1600 may also access one or more proprietary databases 2800, the knowledge structure 2900, and/or the knowledge base 2901. In embodiments, each client-specific service system 1600 may have client specific proprietary databases 2800, knowledge structure 2900, and/or knowledge base 2901 that only the client-specific service system 1600 may access. Alternatively, one or more proprietary databases 1620, the knowledge structure 2900, and/or the knowledge base 2901 may be shared amongst client-specific service systems 1600. In embodiments, a client-specific service system 1600 may include one or more APIs that allow the client to integrate one or more features of the client-specific service system 1600 in the client's websites, enterprise software, and/or applications. For example, a client website may include a chat feature, whereby the chat bot 1618 interacts with a contact through a chat bot interface (e.g., a text-based chat client) via an API that services the client website.

In embodiments, a communication integrator 1612 integrates communication with a contact over different mediums (e.g., chat bots, specialists, etc.), including the migration of the contact from one medium to another medium (e.g., website to chat bot, chat bot to specialist, website to specialist, etc.). In embodiments, the communication integrator 1612 may access one or more microservices of the platform 1600, including the microservices of the conversation system 2000. For example, in response to a contact engaging with the client's website, the communication integrator 1612 may access a chat bot microservice of the conversation system 2000, which then instantiates the chat bot 1618 that effectuates communication with the contact via a chat bot interface.

In embodiments, the communication integrator 1612 may be configured to determine when or be instructed (e.g., by the workflow manager 1616) to migrate a communication with a contact to another medium, and may effectuate the transfer to the different medium. For example, after a determination that the chat bot 1618 is ineffective in communicating with the contact, the communication integrator 1612 may transfer the contact to a customer service specialist portal 1620, where the contact can converse with a human (e.g., via a text-based chat client or by telephone). In embodiments, the communication integrator 1612 may operate in tandem with the machine learning module 1622 to determine when to migrate a contact to another communication medium. For example, if the machine learning module 1622 determines the text being typed by the contact indicates a frustration or anger on behalf of the contact, the communication integrator 1612 may instruct a chat bot to send a message stating that the case is being transferred to a specialist and may effectuate the transfer. In effectuating the transfer, the communication integrator 1612 may provide a snapshot of the contact's data and the ticket data to the specialist via, for example, the service specialist portal 1620.

In some embodiments, the communication integrator 1612 monitors each current communication session between a contact and the client-specific service system 1600. For example, the communication integrator 1612 may monitor open chat bot sessions, live chats with specialists, phone calls with specialists, and the like. The communication integrator 1612 may then determine or be instructed to migrate the communication session from a first medium to a second medium. In embodiments, the communication integrator 1612 or another suitable component may monitor the content of a communication session (e.g., using speech recognition and/or NLP) to determine that a communication session is to be transferred to a different medium. In the latter scenario, the other component may issue an instruction to the communication integrator 1612 to transfer the communication to another medium. In response, the communication integrator 1612 may retrieve or otherwise obtain information that is relevant to the current communication session, including a ticket ID, contact information (e.g., username, location, etc.), the current issue (e.g., the reason for the ticket), and/or other suitable information. This information may be obtained from the proprietary databases 1620 and/or the knowledge structure 2900 accessible to the client-specific service system 1600. The communication integrator 1612 may then transfer the communication session to a different medium. In some embodiments, the sequence by which a communication session is transferred (e.g., escalating from a chat bot to a specialist or escalating from a text-based chat to a phone call) is defined in a custom workflow provided by the client. The communication integrator 1612 may feed the obtained data to the medium. For example, if being transferred to a specialist, the communication integrator 1612 may populate a GUI of the specialist with the ticket information (e.g., ticket ID and current issue), contact information, the ticket status, transcripts of recent conversations with the contact, and/or the like. The communication session may then commence on the new medium without the contact having to provide any additional information to the platform 1000.

In embodiments, the ticket manager 1614 manages tickets with respect to a ticket pipeline on behalf of the client. In embodiments, the ticket manager 1614 of the client-specific service system 1600 leverages the microservices of the ticket management system 2200 of the multi-client service platform 1600 to create, modify, track, and otherwise manage tickets issued on behalf of the client.

In embodiments, the ticket management system 2200 may create tickets on behalf of a respective client. The ticket management system 2200 may create a ticket in response to a number of different scenarios. For example, the ticket management system 2200 may create a ticket when a contact accesses the client's website and reports an issue or makes a customer service request. In this example, the contact may provide identifying information (e.g., name, account number, purchase number, email, phone number, or the like), a subject corresponding to the issue (e.g., a high level reason for initiating the ticket), and a description of the issue. In another example, the ticket management system 2200 may create a ticket in response to contact calling or messaging a customer service specialist with an issue, whereby the customer service specialist requests the new ticket. In this example, the customer service specialist may engage in a conversation (via a text-based chat, a video chat, or a phone call) with the contact and based on the conversation may fill out a ticket request containing identifying information (e.g., name of the contact, account number, purchase number, email of the contact, phone number of the contact, or the like), a subject corresponding to the issue (e.g., a high level reason for initiating the ticket), and a description of the issue. In another example, the ticket management system 2200 may receive a request to create a ticket from a chat bot. In this example, the chat bot may engage in a conversation (via a text-based chat or a phone call) with the contact in accordance with a script, whereby the script prompts the contact to provide identifying information (e.g., name of the contact, account number, purchase number, email of the contact, phone number of the contact, or the like), a subject corresponding to the issue (e.g., a high level reason for initiating the ticket), and a description of the issue. In response to the contact providing this information to the chat bot, the chat bot may issue a request to create a new ticket containing the provided information (e.g., using a ticket request template).

In response to a ticket request, the ticket manager 1614 may generate a new ticket based on the information contained in the request. In embodiments, the ticket manager 1614 may select a ticket object from a set of ticket objects that are customized by the client and may request a new ticket from the ticket management system 2200 using a microservice of the ticket management system 2200. For example, the ticket manager 1614 may select a ticket object based on the subject corresponding to the issue. The ticket manager 1614 may provide the request for the new ticket to the ticket management system 2200, whereby the ticket manager 1614 includes the ticket type, the identifying information, the subject, the description, and any other relevant data with the request. The ticket management system 2200 may then generate the new ticket based on the information provided with the request and may include additional attributes in the new ticket, such as a ticket status, a date/time created attribute, a last updated attribute, and the like. In creating the new ticket and setting the status of the ticket to a new ticket, the ticket management module 2200 may add the new ticket to a ticket pipeline of the client.

In embodiments, the ticket manager 1614 may manage one or more ticket pipelines of the client. As discussed, the ticket management system 2200 may run a set of pipeline listening threads that listen for changes to specific attributes of a ticket, whereby when a ticket pipeline listening thread identifies a ticket having attribute values that it is listening for, the ticket pipeline listening thread adds the ticket to a queue corresponding to the ticket pipeline listening thread. Once in the queue, the ticket is moved to a new stage of the pipeline, and the status attribute of the ticket may be updated to reflect the new stage. For example, a ticket pipeline of an ISP client may include the following stages: new ticket; in communication with contact; troubleshooting issue; obtaining feedback; and ticket closed. Once the ticket is created, it is moved into the new ticket stage of the pipeline. The new ticket stage of the pipeline may include one or more workflows that may be performed for tickets in the new ticket stage (e.g., send notification email to contact, assign to a customer service specialist, instruct customer service specialist to contact the contact, etc.). As the workflows are executed, the ticket attributes of a ticket may change, such that a pipeline listening thread may determine that a customer service specialist has reached out to the contact. In this example, the pipeline listening thread may move the ticket into a queue corresponding to the "in communication with contact" stage of the ticket pipeline.

In embodiments, the workflow manager 1616 (1632 in FIG. 1) performs tasks relating to the execution of workflows. As discussed, a workflow defines a set of actions to be undertaken when performing a service-related task in response to one or more conditions being met. In some scenarios, a workflow may be defined with respect to a pipeline stage. In these scenarios, a workflow may be triggered with respect to a ticket only when the ticket is in the respective stage. Furthermore, a workflow includes a set of conditions that trigger a workflow (whether the workflow is defined with respect to a ticket pipeline or independent of a ticket pipeline). In embodiments, the determination as to whether a workflow is triggered is based on the attributes of a ticket. As discussed, the ticket management system 2200 may deploy workflow listening threads that listen for tickets that meet the conditions of a particular workflow. Upon determining that a ticket meets the conditions of a workflow (or put another way, a ticket triggers a workflow), the workflow listening thread adds the ticket to a workflow queue corresponding to the workflow listening thread.

In embodiments, the workflow manager 1616 of the workflow system 2100 may execute workflows and/or facilitate the execution of workflows of a client. In some embodiments, the workflow manager 1616 may be implemented in a multi-threaded manner where the different threads serve respective workflows. For each workflow, the workflow manager 1616 (e.g., a workflow manager thread) may dequeue a ticket from the workflow queue of the workflow. The workflow manager 1616 may then perform actions defined in the workflow and/or may request the execution of actions defined in the workflow from another component (e.g., a microservice). For example, a client may configure the ticket pipeline to include a workflow where a notification email is sent to the contact initiating the contact. Upon a new ticket being generated the workflow manager 1616 may retrieve an email template corresponding to new ticket notifications, may generate the notification email based on the email template and data from the ticket and/or a contact record of the intended recipient, and may send the email to the contact. In another example, a workflow may define a series of actions to be performed after a ticket is closed, including sending a survey and following up with the recipient of the survey who does not respond within a period of time. In this example, the workflow manager 1616 may instruct the feedback module 1626 to send a survey to the contact indicated in the ticket. If the feedback is not received within the prescribed time, the workflow manager 1616 may instruct the feedback module 1626 to resend the survey in a follow up email. The workflow manager 1616 may perform additional or alternative functions in addition to the functions described in the disclosure without departing from the scope of the disclosure.

In embodiments, the chat bot 1618 may be configured to engage in conversation with a human. The chat bot 1618 may utilize scripts, natural language processing, rules-based logic, natural language generation, and/or generative models to engage in a conversation. In embodiments, an instance of a chat bot 1618 may be instantiated to facilitate a conversation with a contact. Upon a contact being directed to the chat bot 1618 (e.g., by the communication integrator 1612), the system 1600 may instantiate the new chat bot 1618. The system 1600 may initialize the chat bot 1618 with data relating to the contact. In embodiments, the system 1600 (e.g., the communication integrator 1612) may initialize the chat bot 1618 with a script that is directed to handle a particular type of conversation, a contact ID of a contact, and/or a ticket ID referencing a ticket initiated by the contact. For example, when a contact visits the client's webpage, an instance of a chat bot may be instantiated (e.g., by the communication integrator 1612), whereby the instance of the chat bot 1618 uses a script written for interacting with contacts coming to the client's page with service-related issues and a contact ID of the contact if available. In embodiments, the chat bot 1618 may obtain information from the proprietary database 2800 and/or the knowledge structure 2900 to engage in the conversation. Initially, the chat bot 1618 may use a script to begin a conversation and may populate fields in the script using information obtained from the proprietary database 2800, the knowledge structure 2900, a ticket ID, a contact ID, previous text in the chat, and the like. The chat bot 1618 may receive communication from the contact (e.g., via text or audio) and may process the communication. For example, the chat bot 1618 may perform natural language processing to understand the response of the user. In embodiments, the chat bot 1618 may utilize a rules-based approach and/or a machine learning approach to determine the appropriate response. For example, if the chat bot 1618, based on the contact's ticket history asks the contact if he is having an issue with content integration and the contact responds by typing "Yes, I can't get emoji to show up in my app," the chat bot 1618 may rely on a rule that states: if no content has been sent to the contact, then send relevant content. In this example, the chat bot 1618 may retrieve an article describing how to integrate emoji into an application and may send a link to the article to the contact (e.g., via a messaging interface or via email). In another example, the chat bot 1618 may provide a ticket timeline to the machine learning module 1612, which in turn may leverage a neural network to determine that the best action at a given point is to send a particular article to the contact. In this example, the chat bot 1618 may retrieve the article recommended by the machine learning module 1622 and may send a link to the article to the contact. In embodiments, the chat bot 1618 may utilize data from the knowledge structure 2900 to provide content and/or to generate a response. Continuing the previous example above, the chat bot 1618, in response to determining that the next communication is to include a link to an article, may retrieve (or may request that another component retrieve) a relevant article or video based on the knowledge structure 2900. Having the topic/type of issue, the chat bot 1618 can identify articles or content that are related to the product to which the ticket corresponds that are relevant to the topic/type of issue. The chat bot 1618 can then provide the content to the contact (e.g., email a link or provide the link in a chat interface). In some embodiments, the chat bot 1618 can also use the knowledge structure 2900 to formulate responses to the contact. For example, if the user asks about a particular product, the chat bot 1618 can retrieve relevant information relating to the product from the knowledge structure 2900 (e.g., articles or FAQs relating to the product). The chat bot 1618 may be configured to understand the ontology of the knowledge structure 2900, whereby the chat bot 1618 can query the knowledge data structure to retrieve relevant data. For example, in response to a question about a particular product, the chat bot 1618 can retrieve data relating to the product using the product ID of the product, and may use its knowledge of the different types of relationships to find the answer to the contacts questions.

In embodiments, the chat bots 1618 may be configured to escalate the ticket to a specialist (e.g., via the communication integrator 1612) when the chat bot 1618 determines that it is unable to answer a contacts question (e.g., the results of NLP are inconclusive) or when the chat bot 1618 and/or based on tone and/or sentiment analysis (e.g., the chat bot determines that the contact is becoming upset, angry, or frustrated). In embodiments, tone or sentiment analysis can be performed as a part of the natural language processing that is performed on the contact's communications, such that a tone or sentiment score is included in the output of the natural language processing. In these embodiments, the chat bot 1618 may help conserve resources of a client, by serving as a triage of sorts when handling a ticket. When the ticket is unable to be resolved by the chat bot 1618, a workflow may require that the next step is to migrate the conversation to a service-specialist. In such a situation, the communication integrator 1612 may migrate the contact in accordance with the workflow manager's determination. For example, the communication integrator 1612 may transfer the contact to a service specialist, whereby the service specialist communicates with the contact via a live chat and may view relevant contact information and/or ticket information via the service specialist portal 1620.

The service specialist portal 1620 may include various graphical user interfaces that assist a service specialist when interacting with a contact or otherwise servicing a ticket of a contact. In embodiments, the service specialist portal may include chat interfaces, visualization tools that display a specialist's open tickets and/or various communication threads, analytics tools, and the like. Upon a contact and/or ticket being routed to a service specialist, the communication integrator 1612 may provide the specialist with all relevant data pertaining to the contact and/or the ticket. The communication integrator 1612 may retrieve this information from the proprietary database(s) 1620 and/or the knowledge structure 2900. In an example, the communication integrator 1612 may display the ticket timeline of the ticket (e.g., when events along the ticket manager 1614 were undertaken) in the service specialist portal 1620, the purchase history of the contact, any communications with the contact, and/or any content sent to the contact into a graphical user interface that displays relevant information to the specialist.

AI/ML Tie in to 1600

In embodiments, the AI/ML System 1300 may operate to perform various machine learning tasks related to the multi-client service system 1600. In some embodiments, the machine learning module 1612 may be configured to leverage the microservices of the machine learning system 1608 of the platform, whereby the machine learning system 1608 may provide various machine learning related services, including training models for particular clients based on training data or feedback data associated with the client. In this way, the machine learning module 1612 may be said to train and/or leverage machine learned models (e.g., neural networks, deep neural networks, convolutional neural networks, regression-based models, Hidden Markov models, decision trees, and/or other suitable model types) to perform various tasks for the client-specific service system 1600.

In embodiments, the machine learning module 1612 may train and deploy models (e.g., sentiment models) that are trained to gauge the sentiment and/or tone of the contact during interactions with the system 1600. The models may receive features relating to text and/or audio and may determine a likely sentiment or tone of the contact based on those features. For example, a first contact may send a message stating "Hey guys, I really love my new product, but this is broken;" and a second contact may send a message stating "Hey, I hate this product." Based on features such as keywords (e.g., "love," "broken," and "hate"), message structure, and/or patterns of text, a model may classify the first message as being from a likely pleased contact and in a polite tone, while it may classify the second message as being from a likely angry customer and in a direct tone. This information may be stored as an attribute in a ticket record and/or provided to a chat bot or a service specialist. Tone and sentiment scores may also be fed to the analytics system 1614 and/or feedback system. For example, the analytics module 1624 may utilize tone and sentiment when determining contact scores, which may indicate an overall value of the contact to the client.

In embodiments, the machine learning module 1612 can train a sentiment model using training data that is derived from transcripts of conversations. The transcripts may be labeled (e.g., by a human) to indicate the sentiment of the contact during the conversation. For example, each transcript may include a label that indicates whether a contact was satisfied, upset, happy, confused, or the like. The label may be provided by an expert or provided by the contact (e.g., using a survey). In embodiments, the machine learning module 1612 may parse a transcript to extract a set of features from each transcript. The features may be structured in a feature vector, which is combined with the label to form a training data pair. The machine learning module 1612 may train and reinforce a sentiment model based on the training data pairs. As the client-specific service system 1600 records new transcripts, the machine learning module 1612 may reinforce the sentiment model based on the new transcripts and respective labels that have been assigned thereto. The machine learning module 1612 can train and/or deploy additional or alternative models as well. In embodiments, the machine learning module 1612 can train models used in natural language processing. In these embodiments, the models may be trained on conversation data of previously recorded/transcribed conversations with customers.

Analytics Module 1624

In embodiments, the analytics module 1624 in FIG. 9 may analyze one or more aspects of the data collected by the system 1600. In embodiments, the analytics module 1624 calculates a contact score for a contact that is indicative of a value of the contact to the client. The contact score may be based on a number of different variables. For example, the contact score may be based on a number of tickets that the user has initiated, an average amount of time between tickets, the sentiment of contact when interacting with the system 1600, an amount of revenue resulting from the relationship with the contact (or the entity with which the contact is affiliated), a number of purchases made by the contact (or an affiliated entity), the most recent purchase made by the contact, the date of the most recent purchase, a net promoter score (e.g., feedback given by the contact indicating how likely he or she is to recommend the client's product or products to someone else) and the like. In embodiments, the contact score may be based on feedback received by the feedback module 1626. The contact score may be stored in the contacts data record, the knowledge structure 2900, and/or provided to another component of the system (e.g., a chat bot or the service specialist portal 1620).

In embodiments, the analytics module 1624 may generate a contact score of a contact using a contact scoring model. The contact scoring model may be any suitable scoring model (e.g., a regression-based model or a neural network). In embodiments, the analytics module 1624 may generate a feature vector (or any other suitable data structure) corresponding to the contact and may input the feature vector to the scoring model. The analytics module 1624 may obtain contact-related data from the contact record of the contact, the knowledge data structure, or other suitable sources. The types of contact-related data may include, but are not limited to, a total amount of revenue derived from the contact, a number of purchases made by the contact, an amount of loyalty points (e.g., frequent flyer miles) held by the contact, a status (e.g., "gold status" or "platinum status") of the contact, an amount of time since the contact's most recent purchase, a number of tickets that the contact has initiated, an average amount of time between tickets from the contact, and/or the average sentiment of contact when interacting with the system (e.g., a normalized value between 0 and 10 where 0 is the worst sentiment, such as angry or rude). In embodiments, the analytics module 1624 may normalize or otherwise process one or more of the contact-related data items. For example, the analytics module 1624 may determine the average sentiment of the contact and may normalize the sentiment on a scale between 0 and 10. The analytics module 1624 may then feed the feature vector to the contact scoring model, which determines and outputs the contact score of the contact based on the feature vector.

In embodiments, the contact scoring model is a machine learned model that is trained by the machine learning module 1612. The contact scoring model may be trained in a supervised, unsupervised, or semi-supervised manner. For example, the contact scoring model may be given training data pairs, where each pair includes a feature vector corresponding to a contact and a contact score of the contact. In embodiments, the contact score in a training data pair may be assigned by an expert affiliated with the client and/or the multi-client service platform 1600.

In embodiments, the analytics module 1624 may also collect and analyze data regarding the efficacy of certain actions. For example, the analytics module 1624 may gauge the effectiveness of certain articles or videos, scripts used by chat bots, models used by chat bots, calls handled by customer service specialists, and the like. In embodiments, the analytics module 1624 may rely on a ticket's timeline and/or feedback received from the contact (e.g., surveys or the like), and/or feedback inferred (e.g., sentiment or tone) from the contact to determine the effectiveness of certain actions in the workflow of a client. For example, the analytics module 1624 may determine that certain workflow actions almost always (e.g., >90%) result in a contact escalating the ticket to another communication medium when dealing with a particular type of problem. In a more specific example, a client that is an ISP may first provide a contact with an article describing how to troubleshoot a problem, regardless of the problem. The analytics module 1624 may determine that when the ticket relates to a detected but weaker signal, contacts almost always escalate the ticket to a specialist. The analytics module 1624 may also determine that when the ticket relates to no signal being detected, the troubleshooting article typically resolves the ticket.

In an aspect, the feedback module 1626 is configured to obtain or otherwise determine feedback from contacts. Feedback may be related to a purchase of a product (e.g., a good or service) and/or the customer. In embodiments, feedback may be obtained directly from a contact using, for example, surveys, questionnaires, and/or chat bots. The feedback collected by the feedback module 1626 may be stored in a contact record of the contact providing feedback, provided to the analytics module 1624, used as training data for reinforcing the machine learned models utilized by the client-specific service system 1600, and the like.

In embodiments, the feedback module 1626 may be configured to execute feedback related workflows, such that certain triggers cause the feedback module 1626 to request feedback from a contact. Examples of triggers may include, but are not limited to, purchases, repurchases, client visits to the contact, service technician visits, product delivery, the ticket initiation, ticket closure, and the like. In another example, a lack of feedback could be a trigger to request feedback. Furthermore, different triggers may trigger different feedback workflows (e.g., a first survey is sent to a contact when an issue is resolved over the phone and a second survey is sent to a contact after a technician visits the contact). A feedback workflow may define when to send a feedback request to a contact, what medium to use to request the feedback, and/or the questions to ask to the contact. Customer attributes of the contacts can also be used to determine a feedback workflow for a customer. Examples of customer attributes may include, but are not limited to, date the contact became a customer, lifecycle state, last purchase date, recent purchase date, on-boarding date, last login, last event, last date a feature was used, demos, industry vertical, role, demographic, behavioral attributes, a net promoter score of the contact, and a lifetime value.

In some embodiments, the feedback module 1626 may be trained (e.g., by the machine learning module 1622) to determine the appropriate time to transmit a request for feedback. In embodiments, the feedback module 1626 is trained to determine the appropriate communication channel to request feedback (e.g., email, text message, push notification to a native application, phone call, and the like). In embodiments, the feedback module 1626 is trained to determine the appropriate questions to ask in a feedback request.

In embodiments, the feedback module 1626 is configured to extract feedback from customer communications. For example, the feedback module 1626 may analyze interactions with contacts to determine a contact's implicit and/or explicit feedback (e.g., whether the contact was satisfied, unsatisfied, or neutral). In an example, the feedback module 1626 system may analyze text containing the phrase "this product is horrible." In this example, the feedback module 1626 may determine that the contact's feedback towards the product is bad.

In embodiments, the feedback module 1626 may be configured to display feedback to the client. The feedback module 1626 may present feedback of contacts individually. For example, the feedback module 1626 may display a GUI that allows a user to view the various contact providing feedback and a synopsis of the contact (e.g., a contact score of the contact, a name of the contact, and the like). The user can click on a particular contact to drill down on their feedback, or a contact profile page.

Figure 10:
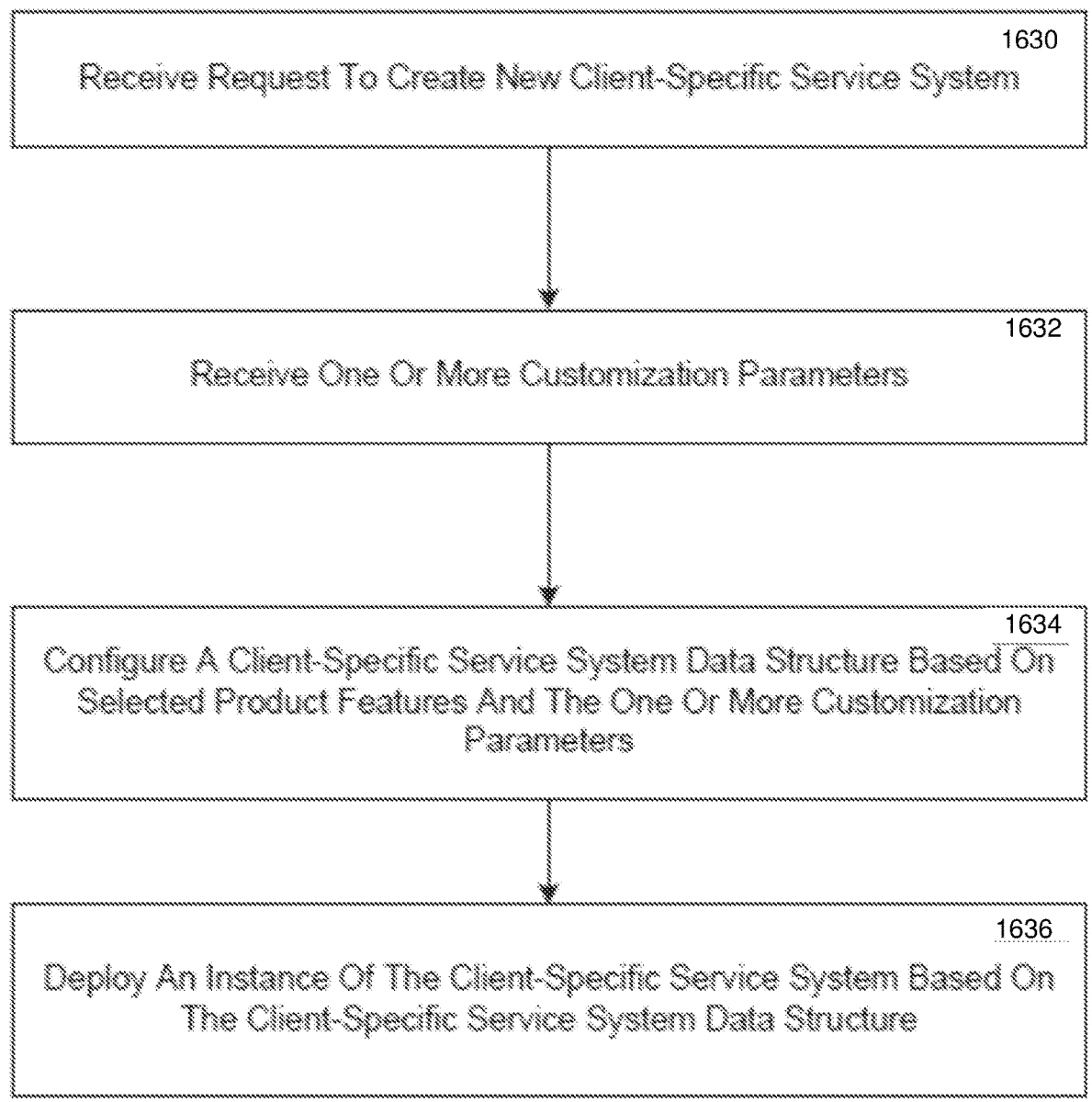
FIG. 10 is a flow chart illustrating an example of a set of operations for performing one or more of the provisions set forth herein.

Referring now to FIG. 10, an example set of operations for deploying a client-specific service system, according to one or more embodiments of the disclosure. The method may be executed by one or more processors of the multi-client service platform 1000. The method may be performed by other suitable systems as well without departing from the scope of the disclosure. At 1630, the multi-client service platform 1600 receives a request to create a new client-specific service system 1600. The request may be initiated via a graphical user interface presented to a user affiliated with the client or by a salesperson affiliated with the multi-client service system. The request may include one or more service features which the client would like to incorporate into its client-specific service system. For example, the client may opt from one or more of a ticket support, ticket workflow management, multiple ticket workflows, email/chat and ticket integration, customized email templates, knowledge structure support, conversation routing, customer service website that includes recommended content (e.g., articles or videos on solving common problems), a chat bot (text-based and/or audio-based), automated routing to service specialists, live chat, customer service analytics, customized reporting, and the like. A user affiliated with a client may select the service features to be included in the client-specific service system from, for example, a menu or may subscribe to one or more bundled packages that include respective sets of service features.

At 1632, the system may receive one or more customization parameters. In embodiments, a client user may provide one or more customization parameters via one or more GUIs. The types of customization parameters that a client may provide depends on the services that the client has enlisted. The types of customization parameters may include custom ticket attributes, client branding (e.g., logos or photographs), root URLs to generate a knowledge data structure on behalf of the client, topic headings for organizing a client's customer service page, media assets to be included under each respective topic heading, ticket pipeline definitions, workflow definitions, communication templates for automated generation communications, scripts to initiate conversations with a contact using a chat bot, telephone numbers of the client's service specialist system, survey questions and other feedback mechanisms, different types of analytics that may be run, and the like.

Customize Tickets Via Ticket Management System 2200

Referring back to the ticket manager 1614 of the ticket management system 2200, a client may customize tickets used in its client-specific service system. In these embodiments, the client may define one or more new ticket objects, where each ticket object may correspond to a different type of ticket. For example, a first ticket object may correspond to tickets used in connection with refund requests and a second ticket object may correspond to tickets that are used in connection with service requests. Thus, if defining more than one ticket object, a client may assign a ticket type to a new ticket object. In embodiments, a ticket object includes ticket attributes. The ticket attributes may include default ticket attributes and custom ticket attributes. The default ticket attributes may be a set of ticket attributes that must remain in the ticket.

Examples of default ticket attributes, according to some implementations of the platform 1600, may include (but are not limited to) one or more of a ticket ID or ticket name attribute (e.g., a unique identifier of the ticket), a ticket priority attribute (e.g., high, low, or medium) that indicates a priority of the ticket, a ticket subject attribute (e.g., what is the ticket concerning), a ticket description (e.g., a plaintext description of the issue to which the ticket pertains) attribute, a pipeline ID attribute that indicates a ticket pipeline to which the ticket is assigned, a pipeline stage attribute that indicates a status of the ticket with respect to the ticket pipeline in which it is being processed, a creation date attribute indicating when the ticket was created, a last update attribute indicating a date and/or time when the ticket was last updated (e.g., the last time an action occurred with respect to the ticket), a ticket owner attribute that indicates the contact that initiated the ticket, and the like. Custom ticket attributes are attributes that a user may define, for example, using a GUI. Examples of custom ticket attributes are far ranging, as the client may define the custom ticket attributes, and may include a ticket type attributing indicating a type of the ticket (e.g., service request, refund request, lost items, etc.), a contact sentiment attribute indicating whether a sentiment score of a contact (e.g., whether the contact is happy, neutral, frustrated, angry, and the like), a contact frequency attribute indicating a number of times a contact has been contacted, a media asset attribute indicating media assets (e.g., articles or videos) that have been sent to the contact during the ticket's lifetime, and the like.

In some scenarios, a client may elect to customize one or more ticket pipelines for handling tickets by the client-specific service system 1600, whereby a user affiliated with the client may define one or more ticket pipelines. In some embodiments, the multi-client service platform 1000 may present a GUI that allows the user to define various workflow stages (e.g., "ticket created", "waiting for contact", "routed to chat bot", "routed to service specialist", "ticket closed", and the like). For each stage, the user may define one or more conditions (e.g., ticket attribute values) that correspond to the respective stage. In this way, a ticket meeting the one or more conditions of a respective stage may be moved to that stage. For each stage of the pipeline, the user may define one or more workflows or actions that are performed.

In some scenarios, a client may elect to define one or more workflows using the workflow manager 1616 of the workflow system 2100. The workflows may be defined with respect to a stage of a pipeline or independent of a pipeline. A workflow may include one or more actions. Thus, a user affiliated with a client may select one or more actions of a workflow. For example, the user may select actions such as "create ticket", "send message", "send email", "route to chat bot", "route to specialist", "define custom action", and the like. In the instance where a user elects to define a custom action, the user may provide further details on how the client-specific service is to respond. For example, the user may select that an article is to be sent to a contact upon a specific type of problem indicated in a newly created ticket. The user may further define the conditions that trigger the workflow. In embodiments, the user may define these conditions using ticket attribute values that trigger the workflow.

In some scenarios, a client may elect to have the client-specific service system 1600 generate automated messages on behalf of the client to contacts in connection with an issued ticket. In these scenarios, a user affiliated with the client may define communication templates that are used to generate automated messages (e.g., SMS messages, emails, direct messages, and the like) to contact. For example, the client may elect to have automated messages be sent to contacts at various points during the workflow. The multi-client service platform 1000 may present a graphical user interface that allows a user to upload or enter the message template. In response to receiving the communication template, the multi-client service platform 1000 may store the message template and may associate the template with the workflow item that uses the template.

In some instances, the user may define one or more topic headings, and for each topic heading may upload or provide links to a set of media assets (e.g., articles and/or videos) that relate to the heading. In some embodiments, the media assets may be used to recommend additional media assets from a series of crawled websites and/or a knowledge data structure. For example, the system may identify media assets having a high degree of similarity (e.g., cosine similarity) to the media assets provided by the user. In these embodiments, the system may output the recommended media contents to the user, such that the user may select one or more of the media contents for inclusion with respect to a topic heading.

In some scenarios, a client may elect to have a client-specific service system 1600 request feedback from contacts during one or more stages of a workflow. In some embodiments, the multi-client service platform 1600 may present a GUI to a user affiliated with the client that allows the user to design a survey or questionnaire, including any questions and choices that may be presented to the responder. The GUI may also allow the user to customize other aspects of the survey or questionnaire. For example, the user may provide branding elements that are presented in or in relation to the survey or questionnaire. In embodiments, the user may feedback workflows that define when a survey or questionnaire is to be sent to a user and/or the communication medium used to send the survey or questionnaire to a user.

In some scenarios, a client may elect to have a client-specific service system 1600 route contacts to a telephone call with a service specialist. In some of these embodiments, a user affiliated with the client may provide routing data that can route a contact to a service specialist. For example, the user may provide a phone number associated with a call center or a roster of service specialists and their direct phone numbers and/or extensions.

At step 1634 in the process illustrated in FIG. 10, the platform 1000 may configure a client-specific service system data structure based upon the selected service features and the one or more customization parameters. In embodiments, the platform 1000 implements a microservices architecture, whereby each client-specific service system may be configured as a collection of connected services. In embodiments, the platform 1000 may configure a client-specific service system data structure that defines the microservices that are leveraged by an instance of the client-specific service system data structure (which is a client-specific service system). A client-specific service system data structure may be a data structure and/or computer readable instructions that define the manner by which certain microservices are accessed and the data that is used in support of the client-specific service system. For example, the client-specific service system data structure may define the microservices that support the selected service features and may include the mechanisms by which those microservices are accessed (e.g., API calls that are made to the respective microservices and the customization parameters used to parameterize the API calls).

The platform 1000 may further define one or more database objects (e.g., contact records, ticket records, and the like) from which database records (e.g., SQL database records) are instantiated. For example, the client configuration system 1602 may configure ticket objects for each type of ticket, where each ticket object defines the ticket attributes included in tickets having the type. In embodiments, the platform 1000 may include any software libraries and modules needed to support the service features defined by the client in the client-specific service system data structure. The client-specific service system data structure may further include references to the proprietary database(s) 2800, the knowledge structure 2900, and/or knowledge base 2901, such that a deployed client-specific service system may have access to the proprietary database 2800, the knowledge structure 2900, and/or the knowledge base 2901.

At step 1636 in the process illustrated in FIG. 10, the platform 1000 may deploy the client-specific service system 1600. In embodiments, the platform 1000 may deploy an instance (or multiple instances) of the platform 1600 based on the client-specific service system data structure. In some embodiments, the platform 1600 may instantiate an instance of the client-specific service system from the client-specific service system data structure, whereby the client-specific service system 1600 may begin accessing the microservices defined in the client-specific service system data structure. In some of these embodiments, the instance of the client-specific service system is a container and the client-specific service system data structure is a container image. For example, in embodiments where the client-specific service system data structure is a container, the multi-client service platform 1600 may install and build the instance of the client-specific service system 1600 on one or more servers. In these embodiments, the container is configured to access the microservices, which may be containerized themselves. Once deployed, the client-specific service system 1600 may begin creating tickets and performing other customer-service related tasks, as described in the disclosure.

Referring to the service specialist portal 1620 shown in FIG. 9, the portal 1620 may display a graphical user interface portal which displays relevant ticket information to a specialist (or other client), as well as information relating to the contact that initiated the ticket. The GUI can include a graphical representation of the ticket's timeline (e.g., email sent), and detailed notes about different contact points with the contact. The GUI may show the name and information of a contact, a date on which the ticket was issued, what articles were opened by a contact with respect to the ticket, communications that were undertaken with the contact, etc. The GUI tat may be used to impart relevant data to a service specialist, such as a portal that provides a list of a specialist's assigned tickets. The specialist can view recent messages sent or received by the specialist, and may drill down into a particular conversation. Upon drilling down into a conversation, the GUI can display relevant information of the contact in relation to a text based communication session with the contact. In an aspect, on the side of the display relevant ticket and contact data are displayed to the specialist, including a name of the contact, a phone number and email address of the contact, a date on which the contact became a contact, a lifecycle stage of the contact, and links to any tickets that the contact may have open.

In an aspect, a GUI that may be presented to a specialist or another service-related employee (e.g., a supervisor) of the client 97. The GUI can be a ticket overview which displays a set of open tickets and where the tickets are with respect to the client's ticket pipeline. In this example arrangement, the specialist or supervisor can view tickets that are new, tickets that are awaiting communication from the contact, tickets that have progressed to the email stage, tickets that have been resolved, and tickets that have been closed. Each ticket assigned to the specialist may be displayed in a respective card, whereby the card provides a synopsis of the ticket (e.g., date created, contact name, and general issue). In this view, a specialist can click on a ticket card to drill down to view the details of a particular ticket. In response to a user selection of a particular card, the communication integrator 1612 may retrieve a ticket record corresponding to the ticket represented by the selected card and may output information relating to the ticket in a GUI.

In an example, the GUI allows a user to drill down on the feedback of individual contacts. In the example, the user can click on a particular contact and the GUI may display the feedback provided by the contact. In an aspect, the GUI displays the contact's feedback arranged on a timeline. In an aspect, the GUI displays individual cards that are related to various feedback events from the contact. The cards may also display at least a portion of the feedback (e.g., scores, text, and the like). The GUI further allows the user to view the tickets of the contact, the lifecycle history of the contact, a contact history of the contact, a last time the contact contacted the client, and the like.

In an aspect, the platform 1000 allows a user corresponding to a client to customize different aspects of the client's respective feedback system. For example, the GUI may allow the user to define the properties of a contact that is to receive a request for feedback and when to send the feedback request. In an aspect, the GUI allows the user to define the properties of a contact that is to receive a request for feedback and when to send the feedback request. The GUI may also allow a user to customize the types of questions asked (e.g., score an aspect of the client's business, ask for questions for determining a net promoter score, follow up questions and the like), the actual content of the questions, and the look and feel of the feedback request. For example, the GUI allows a user to customize the types of questions asked, the actual content of the questions, and the look and feel of the feedback request.

In embodiments, the analytics module 1624 can be configured to output various analytics related statistics and information to the client via a GUI. For example, the analytics module 1624 can present a GUI that indicates statistics relating to feedback received from contacts. For example, a GUI may display a breakdown of the net promoter scores of the contacts of a particular client. In an aspect, the GUI may display statistics relating to articles in a knowledge data structure, which may indicate the respective usefulness of the individual articles.

In an aspect, the client may provide certain customization parameters to the platform 1000 via the GUI. For example, the GUI may allow users to upload content to the platform 1600 for inclusion in the knowledge structure 2900 that may be used in connection with a client specific service system. In the GUI, a user may provide a root URL, whereby the root URL may be used by the platform 1000 to crawl and/or extract information from a series of webpages starting with the webpage indicated by the root. The GUI may further allow the user to designate a language that the knowledge structure 2900 will support. The GUI may allow a user to customize a support page that is deployed on behalf of the client. In embodiments, the GUI may allow the user to provide customizations for a desktop-based browser, a tablet-based browser, and/or a mobile-based browser. In embodiments, the GUI may allow the user to upload or otherwise provide an icon that appears in the browser tab of a contact landing on the client's support page and/or a logo of the client that is presented in the support page or other related pages. In an example, the GUI presents a preview of the client's support page, which includes a search bar, topic headers, and articles that link to content (e.g., articles and/or videos). In embodiments, a client may define the topic headers via the GUI and may select/upload the content to include with respect to each topic header. In an aspect, the GUI is configured for viewing analytics data related to uploaded content (e.g., how many views of the article and the average amount of time spent viewing the article). In this example GUI, a user can view analytics related to articles or other media assets (e.g., videos) that relate to customer service. In this way, a client can determine whether its contacts are clicking on the presented content and, if so, how engaged the average contact is by a respective media asset.

In an aspect, the platform 1000 provides a GUI that allows a client to customize service workflows with respect to one or more ticket pipelines. In an example, the GUI presents a ticket pipeline that defines a set of triggering conditions that automate the processing of a ticket, such as the ticket reaching a "new ticket" status when a customer initiates a new ticket, a ticket reaching "waiting on contact" status when customer is expected to make contact with the client, a "waiting on us" status when the client is expected to take action to close the ticket, and a "closed" status when the ticket is closed. The foregoing statuses are provided for a non-limiting example of a ticket pipeline. For each status, the user is presented with the option of defining a workflow when a ticket is in that status. In an aspect, the user can elect to define a workflow with respect to the "new" ticket status. The user is presented with a menu that allows the user to create a new custom task or to automatically send a ticket notification (e.g., an email indicating the generation of a new ticket). In another example, the GUI presents a menu with additional options that are organized based on the action type, whereby the user can select an action from a set of actions presented in the menu. The example menu of actions includes creating a new task, sending a ticket notification, adding a delay, creating a task, sending an internal email, sending an internal SMS, sending an internal SMS message, and the like. In another example, the user can select selected the ticket notification action, and the GUI will presents the client with the option to draft an email template. In the example, the user provides the email template, including template fields such as "Ticket ID" that may be populated with the ticket ID of the newly generated ticket. The client can then create a workflow action with respect to the new ticket status. The GUI displays the workflow action with respect to the corresponding new ticket status.

Referring back to FIG. 1, the platform includes a content management system 1400 in accordance with an aspect of the present disclosure. With reference to FIG. 1, in embodiments of the disclosure, the content management system 1400 enables automated development, deployment, and management of content, typically for an enterprise, that is adapted to support a variety of enterprise functions, including marketing strategy and communications, website development, search engine optimization, sales force management, electronic commerce, social networking, and others. Among other benefits, the content development platform 1400 uses a range of automated processes to extract and analyze existing online content of an enterprise, parse and analyze the content, and develop a cluster of additional content that is highly relevant to the enterprise, without reliance on conventional keyword-based techniques.

Figure 11:
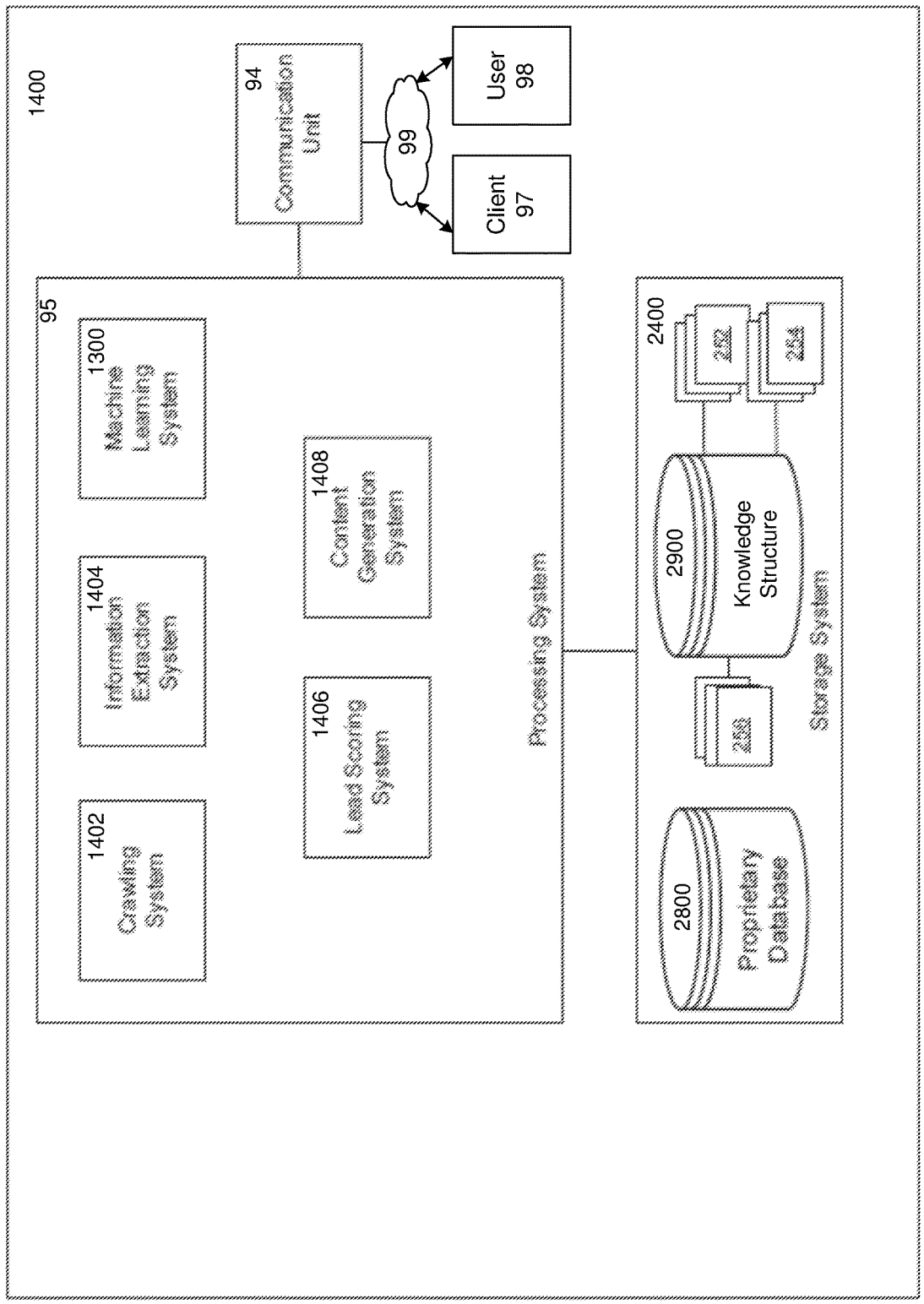
FIGS. 11-15 are block diagrams illustrating examples of computing environment wherein one or more of the provisions set forth herein may be implemented.
Figure 12:
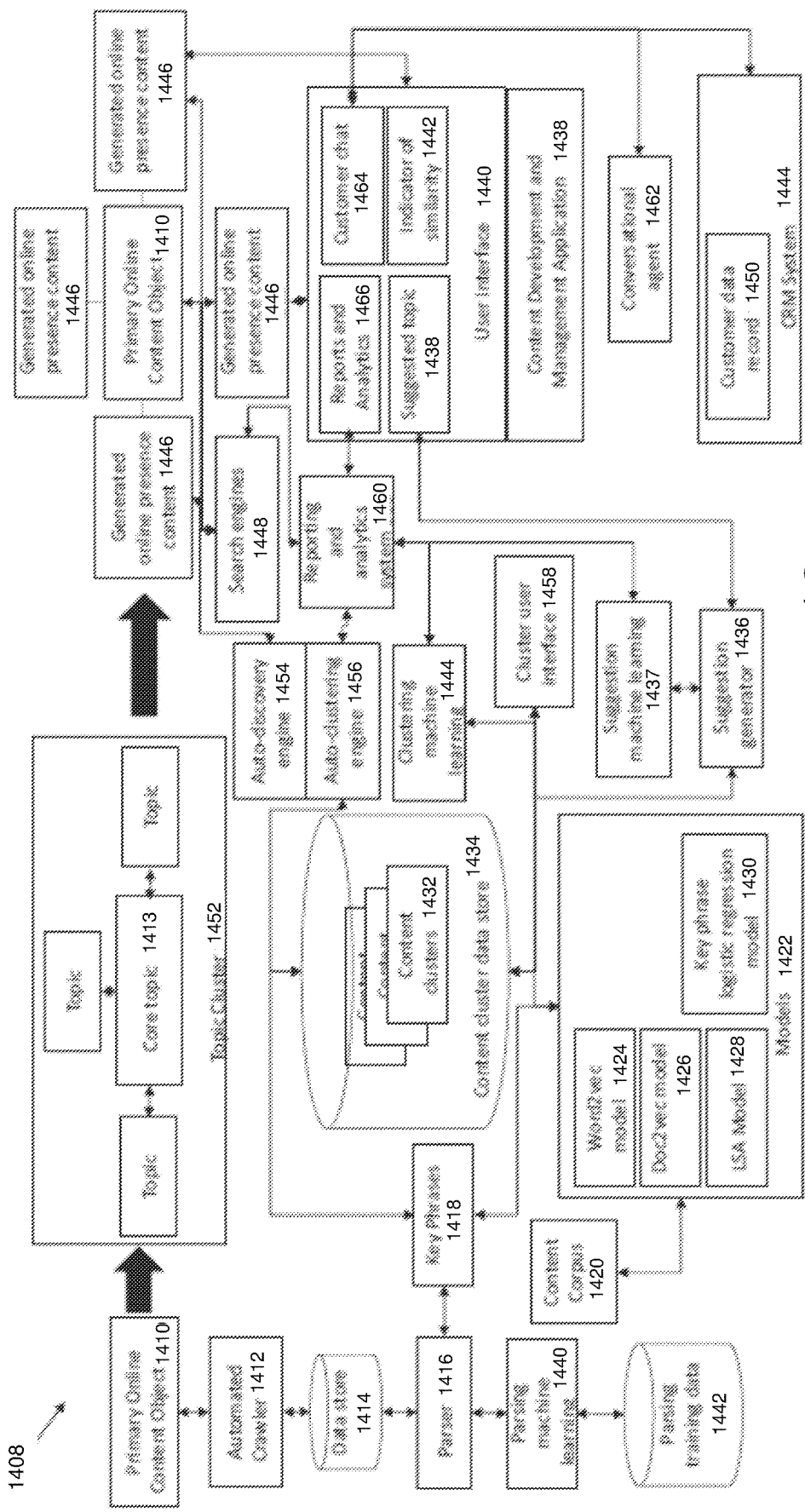

FIG. 11 illustrates an example of the content management system 1400 in accordance with an aspect of the present disclosure. As shown in FIG. 11, the CMS system 1400 may include, but is not limited to: a crawling system 1402 that implements a set of crawlers that find and retrieve information from an information network (e.g., the Internet); an information extraction system 1404 that identifies entities, events, and/or relationships between entities or events from the information retrieved by the crawling system 1402; one or more proprietary databases 2800 that store information relating to organizations or individuals that use the directed content system 200; one or more knowledge structures 2900 representing specific types of entities (e.g., businesses, people, places, products), relationships between entities, the types of those relationships, relevant events, and/or relationships between events and entities. In an aspect, the machine learning system 1300 that learns/trains classification models that are used to extract events, entities, and/or relationships, scoring models that are used to identify intended recipients of directed content, and/or models that are used to generate directed models; a lead scoring system 1406 that scores one or more organizations and/or individuals with respect to a content generation task, the lead scoring system referencing information in the knowledge data structure; and a content generation system 1408 that generates content of a communication to a recipient in response to a request from a client to generate directed content pertaining to a particular objective, wherein the recipient is an individual for which the leading scoring system has determined a threshold level of relevance to the objective of a client. The directed content system 200 uses the understanding from the machine learning system 1300 to generate the directed content.

Referring to FIG. 11, the content generation system 1408 may generally facilitate processing of a primary online content object 1410, such as a main web page of an enterprise, to establish a topic cluster 1452 of topics that are relevant to one or more core topics 1413 that are found in or closely related to the content of the primary online content object 102, such as based on semantic similarity of the topics in the topic cluster 1452, including core topics 1413, to content within the primary online content object 1410. The platform 100 may further enable generation of generated online presence content 1446, such as reflecting various topics in the topic cluster 1452, for use by marketers, salespeople, and other writers, or content creators on behalf of the enterprise.

In embodiments, the content development platform 1400 includes methods and systems for generating a cluster of correlated content from the primary online content object 1410. In embodiments, the primary online content object 1410 is a web page of an enterprise. In embodiments, the primary online content object 1410 is a social media page of an enterprise. In the embodiments described throughout this disclosure, the main web page of an enterprise, or of a business unit of an enterprise, is provided as an example of a primary online content object 1410 and in some cases herein is described as a "pillar" of content, reflecting that the web page is an important driver of business for the enterprise, such as for delivering marketing messages, managing public relations, attracting talent, and routing or orienting customers to relevant products and other information. References to a web page or the like herein should be understood to apply to other types of primary online content objects 1410, except where context indicates otherwise. An objective of the content development platform 1400 may be to drive traffic to a targeted web page, in particular by increasing the likelihood that the web page may be found in search engines, or by users following links to the web page that may be contained in other content, such as content developed using the content development platform 1400.

In an aspect, the present systems, data configuration architectures and methods allow an improvement over conventional online content generation schemes. As stated before, traditional online promotional content relied on key word placement and on sympathetic authorship of a main subject (e.g., a website) and corresponding secondary publications (e.g., blogs and sub-topical content related to the website), which methods rely on known objective and absolute ranking criteria to successfully promote and rank the website and sub-topical content. In an increasingly subjective, personalized and context-sensitive search environment, the present systems and methods develop canonical value around a primary online content object such as a website. In an aspect, a cluster of supportive and correlated content is intelligently generated or indicated so as to optimize and promote the online work product of a promoter (e.g., in support of an agenda or marketing effort). In an example, large numbers of online pages are taken as inputs to the present system and method (e.g., using a crawling, parallel or sequential page processing machine and software).

As shown in simplified FIG. 11, a "core topic" 1413 or main subject for a promotional or marketing effort, related to one or more topics, phrases, or the like extracted based on the methods and systems described herein from a primary online content object 1410, may be linked to a plurality of supporting and related other topics, such as sub-topics. The core topic 1413 may comprise, for example, a canonical source of information on that general subject matter, and preferably be a subject supporting or justifying links with other information on the general topic of a primary online content object 1410. In embodiments, visitors to a site where a generated online content 1446 is located can start at a hyperlinked sub-topic of content and be directed to the core topic 1413 within a page, such as a page linked to a primary online content object 1410 or to the primary online content object 1410 itself. In an example, the core topic 1413 can be linked to several (e.g., three to eight, or more) sub-topics. A recommendation or suggestion tool, to be described further below, can recommend or suggest sub-topics, or conversely, it can dissuade or suggest avoidance of sub-topics based on automated logic, which can be enabled by a machine learned process. As will be discussed herein, a content strategy may be employed in developing the overall family of linked content, and the content strategy may supersede conventional key word based strategies according to some or all embodiments hereof.

In embodiments, the system and method analyze, store and process information available from a crawling step, including for a given promoter's website (e.g., one having a plurality of online pages), so as to determine a salient subject matter and potential sub-topics related to the subject matter of the site. Associations derived from this processing and analysis are stored and further used in subsequent machine learning based analyses of other sites. Data derived from the analysis and storage of the above pages, content and extracted analytics may be organized in an electronic data store, which is preferably a large aggregated database and which may be organized, for example, using SQL or a similar format.

As shown in FIG. 1, elements for extracting key phrases from a primary online content object, a content cluster data store 1434 that stores clusters of topics, and a content development and management application 1438 having a user interface that allows users to develop content. Within the platform 1000, key phrases 1418 are extracted from the primary online content object 1410 and are processed, such as using a variety of models 118, resulting in one or more content clusters 1432 that are stored in a content cluster data store 1434. The clusters may comprise the topic clusters 1452 that are semantically relevant to core topics reflected in the primary online content object 1410, as indicated by the key phrases. The models 1422, which may access a corpus of content extracted by crawling a relevant set of pages on the Internet, are applied to the key phrases 1418 to establish the clusters, which arrange topics around a core topic based on semantic similarity. From the content clusters 1432 a suggestion generator 1436 may generate one or more suggested topics 1438, which may be presented in a user interface 1440 of a content development management application 1438 within which an agent of an enterprise, such as a marketer, a salesperson, or the like may view the suggested topic 1438 and relevant information about it (such as indicators of its similarity or relevancy as described elsewhere herein) and create content, such as web pages, emails, customer chats, and other generated online presence content 1446 on behalf of the enterprise. Within the interface 1440, the resulting generated online presence content 1446 may be linked to the primary online content object 1410, such that the primary online content object 1410 and one or more generated online presence objects 1446 form a cluster of semantically related content, such that visitors to any one of the objects 1410, 1446 may be driven, including by the links, to the other objects 1410, 1446. In particular, the platform 100 enables the driving of viewers who are interested in the topics that differentiate the enterprise to the online presence content, such as the main web pages, of the enterprise. Performance of the topics may be tracked, such as in a reporting and analytics system 1460, such that performance-based suggestions may be provided by the suggestion generator 1436, such as by suggesting more suggested topics 1438 that are similar to ones that have driven increases in traffic to the primary online content object 1410.

The system and method are then capable of projection of the crawled, stored and processed information, using the present processing hardware, networking and computing infrastructure so as to generate specially formatted vectors, e.g., a single vector or multiple vectors. The vector or vectors may be generated according to a Word2vec model used to produce word embeddings in a multi-layer neural network or similar arrangement. Those skilled in the art may appreciate that further reconstruction of linguistic contexts of words are possible by taking a body of content (e.g., language words) to generate such vector(s) in a suitable vector space. Said vectors may further indicate useful associations of words and topical information based on their proximity to one another in said vector space. Vectors based on other content information (e.g., phrases or documents, which can be referred to as Phrase2vec or Document2vec herein) may also be employed in some embodiments. Documents or pages having similar semantic meaning would be conceptually proximal to one another according to the present model. In this way, new terms or phrases or documents may be compared against known data in the data store of the system and generate a similarity, relevance, or nearness quantitative metric. Cosine similarity or other methods can be employed as part of this nearness determination. The similarity may be translated into a corresponding score in some embodiments. In other aspects, said score may be used as an input to another process or another optional part of the present system. In yet other aspects, the output may be presented in a user interface presented to a human or machine. The score can further be presented as a "relevance" metric. Human-readable suggestions may be automatically generated by the system and method and provided as outputs, output data, or output signals in a processor-driven environment such as a modern computing architecture. The suggestions may in some aspects provide a content context model for guiding promoters (e.g., marketers) towards a best choice of topical content to prepare and put up on their websites, including suitable and relevant recommendations for work products such as articles and blog posts and social media materials that would promote the promoters' main topics or subjects of interest or sell the products and services of the marketers using the system and method.

In an aspect, the present system and method allow for effective recommendations to promoters that improve the link structure between existing content materials such as online pages, articles and posts. In another aspect, this allows for better targeting of efforts of a promoter based on the desired audience of the efforts, including large groups, small groups or even individuals.

Implementations of the present system and method can vary as would be appreciated by those skilled in the art. For example, the system and method can be used to create a content strategy tool using processing hardware and special machine-readable instructions executing thereon. Consider as a simple illustrative example that a promoter desires to best market a fitness product, service or informational topic. This can be considered as a primary or "core topic" about which other secondary topics can be generated, which are in turn coupled to or related to the core topic. For example, weightlifting, dieting, exercise or other secondary topics may be determined to have a favorable context-based relevance to the core topic. Specific secondary sub-topics about weightlifting routines, entitled, e.g., 'Best weightlifting routines for men' or 'How to improve your training form' (and so on) may be each turned into a blog post that links back to the core topic web page.

In some embodiments, when a user uses the content strategy tool of the present system and method the user may be prompted to select or enter a core (primary) topic based on the user's own knowledge or the user's field of business. The tool may use this, along with a large amount of crawled online content that was analyzed, or along with extracted information resulting from such crawling of online content and prior stored search criteria and results, which is now context-based, to validate a topic against various criteria.

In an example, topics are suggested (or entered topics are rated) based on the topics' competitiveness, popularity, and/or relevance. Those skilled in the art may appreciate other similar criteria which can be used as metrics in the suggestion or evaluation of a topic.

Competitiveness can comprise a measure of how likely a domain (Web domain) would be ranked on "Page 1" for a particular term or phrase. The lower the percentile ranking, the more difficult it is to rank for that term or phrase.

Popularity as a metric is a general measure of a term or phrase's periodic (e.g., monthly) search volume from various major search engines. The greater this percentage, the more popular the term or phrase is.

Relevance as a metric generally indicates how close a term or phrase is to other content put up on the user's site or domain. The lower the relevance, the further away the term or phrase is from what the core topic of the site or domain is. This can be automatically determined by a crawler that crawls the site or domain to determine its main or core topic of interest to consumers. If relevance is offered as a service by embodiments of the present system and method a score can be presented through a user or machine interface indicating how relevant the new input text is to an existing content pool.

Timeliness of the content is another aspect that could be used to drive content suggestions or ratings with respect to a core topic. For example, a recent-ness (recency) metric may be used in addition to those given above for the sake of illustration of embodiments of the system and method.

Therefore, analysis and presentation of information indicating cross relationships between topics becomes effective under the present scheme. In embodiments, these principles may be additionally or alternatively applied to email marketing or promotional campaigns to aid in decision making as to the content of emails sent to respective recipients so as to maximally engage the recipients in the given promotion. Other possible features include question classification; document retrieval; passage retrieval; answer processing; and factoid question answering. Note that the present concepts can be carried across languages insofar as an aspect hereof provides for manual or automated translation from a first language to a second language, and that inputs, results and outputs of the system can be processed in one or another language, or in a plurality of languages as desired.

Some embodiments hereof employ a latent semantic analysis (LSA) model, encoded using data in a data store and programmed instructions and/or processing circuitry to generate an output comprising an association between various content by the promoter user of the system and method. LSA is being applied here to analyze relationships between a (large) set of documents and the data contained therein. In one embodiment machine learning may be used to develop said association output or outputs.

Figure 13:
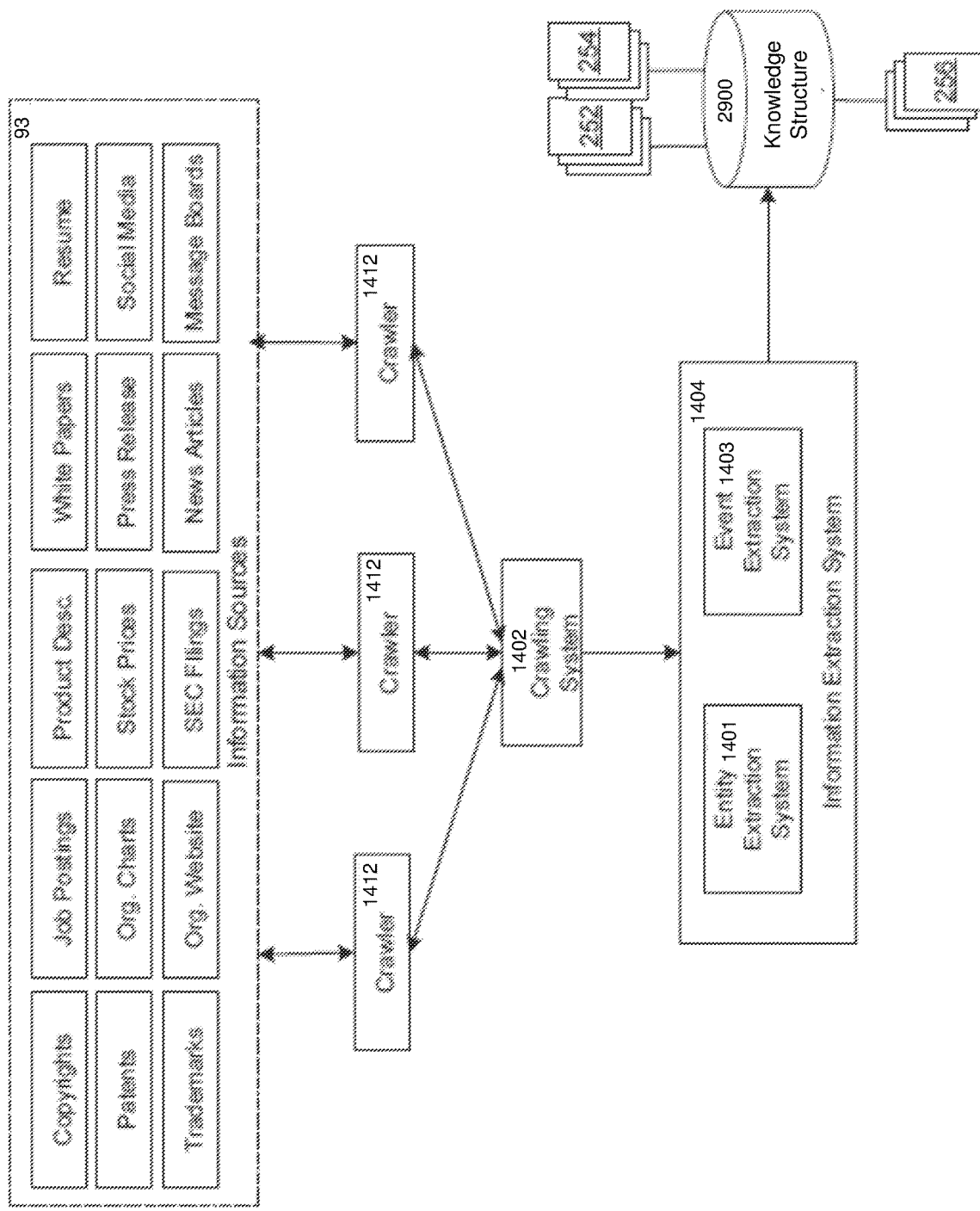

As shown in FIG. 13, content development platform 100 includes integration of a customer relationship management system 1444 with other elements of the platform according to one or more embodiments of the disclosure. In embodiments, the generated online content object 1446 may comprise messaging content for a customer interaction that is managed via a customer relationship management system 158. In embodiments, the customer relationship management system 1444 may include one or more customer data records 1450, such as reflecting data on groups of customers or individual customers, including demographic data, geographic data, psychographic data, data relating to one or more transactions, data indicating topics of interest to the customers, data relating to conversations between agents of the enterprise and the customers, data indicating past purchases, interest in particular products, brands, or categories, and other customer relationship data. The customer data records 1442 may be used by the platform 100 to provide additional suggested topics 1438, to select among suggested topics 1438, to modify suggested topics 1438, or the like. In embodiments, the CRM system 1444 may support interactions with a customer, such as through a customer chat 1464, which in embodiments may be edited in the user interface 1440 of the content development and management application 150, such as to allow a writer, such as an inside salesperson or marketer who is engaging in a customer chat 1464 with the customer to see suggested topics 1438 that may be of interest to the customer, such as based on the customer data records 1442 and based on relevancy of the topics to the main differentiators of the enterprise.

In embodiments, a conversational agent 1462 may be provided within or integrated with the platform 1000, such as for automating one or more conversations between the enterprise and a customer. The conversational agent 1462 may take suggested topics from the suggestion generator 1436 to facilitate initiation of conversations with customers around topics that differentiate the enterprise, such as topics that are semantically relevant to key phrases found in the primary online content object 1410. In embodiments, the conversational agent 1462 may populate the customer chat 1464 in the user interface 1440, such as providing seed or draft content that a writer for the enterprise can edit.

In embodiments, the methods and systems may include an automated crawler 1412 that crawls the primary online content object 1410 and storing a set of results from the crawling in a data storage facility 1414. In embodiments, the data storage facility is a cloud-based storage facility, such as a simple storage facility, and/or on a web service platform. In embodiments, the data storage facility is a distributed data storage facility. In embodiments, the automated crawler 1412 crawls one or more domains associated with an enterprise customers' content (e.g., the customer's portal, main web page, or the like) as the primary online content object 1410 to identify topics already in use on those sites and stores the pages in a data storage facility, with metadata in a database (e.g., a SQL database). The content development platform 1000 may include a parser 1416 that parses the stored content from the crawling activity of the automated crawler 1412 and generates a plurality of the key phrases 1418 and a content corpus 1420 from the primary online content object 1410. The content development platform 1000 may include, use, or integrate with one or more of a plurality of models 1422 for processing at least one of the key phrases 1418 and the corpus 1420.

In embodiments, the models 1422 may include one or more of a word2vec model 1424, a doc2vec model 1426, a latent semantic analysis (LSA) extraction model, an LSA model 1428, and a key phrase logistic regression model 1430, wherein the processing results in a plurality of the content clusters 1432 representing topics within the primary online content object 102. In embodiments, the platform 1000 may take content for the primary online content object 102, such as a website, and extract a number of phrases, such as a number of co-located phrases, based on processing the n-grams present in the content (e.g., unigrams, bi-grams, tri-grams, tetra-grams, and so on), which may in the LSA model 1428, be ranked based on the extent of presence in the content and based on a vocabulary that is more broadly used across a more general body of content, such as a broad set of Internet content. This provides a vector representation of a website within the LSA model 1428. Based on crawling with the automatic crawler 1412 of over millions if pages on the public internet (seeking to ignore ignoring those pages that are light on content), an LSA model 1428 has been trained using machine learning, using a training set of more than 250 million pages, such that the LSA model 1428 is trained to understand associations between elements of content.

In embodiments, the one or more models 1422 include the word2vec model 1432 or other models (e.g., doc2vec 1426 or phrase2vec) that projects crawled-domain primary online object content 1410, such as from customers' domains, into a single vector. In embodiments, the vector space is such that documents that contain similar semantic meaning are close together. The application of the word2vec model 1432 and the doc2vec model 1426 to the vector representation of primary online content object 1410 (e.g., website) to draw vectors may result in a content-context model based on co-located phrases. This allows new terms to be compared against that content context database to determine how near it is to the enterprise's existing primary online content objects 1410 (e.g., webpages), such as using cosine similarity. That similarity may then be converted into a score and displayed through the UI, such as displaying it as a "Relevancy" score. Ultimately, the content context model may be used to give recommendations and guidance for how individuals can choose good topics to write about, improve the link structure of existing content, and target marketing and other efforts based on their audiences' individual topic groups of interest. In embodiments, the plurality of models 1422 used by the platform may comprise other forms of model for clustering documents and other content based on similarity, such as a latent semantic indexing model, a principal component analysis model, or the like. In embodiments, other similar models may be used, such as a phrase2vec model, or the like.

An objective of the various models 1422 is to enable clustering of content, or "topic clusters 1452" around relevant key phrases, where the topic clusters 1452 include semantically similar words and phrases (rather than simply linking content elements that share exactly matching keywords). Semantic similarity can be determined by calculating vector similarity around key phrases appearing in two elements of content. In embodiments, topic clusters may be automatically clustered, such as by an auto-clustering engine 1456 that manages a set of software jobs that take web pages from the primary online content object 1410, use a model 1422, such as the LSA model 1437 to turn the primary online content object 1410 into a vector representation, project the vector representation on to a space (e.g., a two-dimensional space), perform an affinity propagation that seeks to find natural groupings among the vectors (representing clusters of ideas within the content), and show the groupings as clusters of content. Once groups are created, a reviewer, such as a marketer or other content developer, can select one or more "centers" within the clusters, such as recognizing a core topic within the marketer's "pillar" content (such as a main web page), which may correspond to the primary online content object 1410. Nodes in the cluster that are in close proximity to the identified centers may represent good additional topics about which to develop content or to which to establish links; for example, topic clusters can suggest an appropriate link structure among content objects managed by an enterprise and with external content objects, such as third-party objects, where the link structure is based on building an understanding of a semantic organization of a cluster of topics and mirroring the other content and architecture of links surrounding a primary online content object 1410 based on the semantic organization.

The content development platform 1400 may include a content cluster data store 1434 for storing the content clusters 1432. The content cluster data store 1434 may comprise a SQL database or other type of database. The content cluster data store 1434 may store mathematical relationships, based on the various models 118, between content objects, such as the primary online content object 1410 and various other content objects or topics, which, among other things, may be used to determine what pages should be in the same cluster of pages (and accordingly should be linked to each other). In embodiments, clusters are based on matching semantics between phrases, not just matching exact phrases. Thus, new topics can be discovered by observing topics or subtopics within semantically similar content objects in a cluster that are not already covered in a primary online content object 1410. In embodiments, an auto-discovery engine 1454 may process a set of topics in a cluster to automatically discover additional topics that may be of relevance to parties interested in the content of the primary online content object 1410.

In embodiments, topics within a cluster in the content cluster data store 1434 may be associated with a relevancy score (built from the models 1422), which in embodiments may be normalized to a single number that represents the calculated extent of semantic similarity of a different topic to the core topic (e.g., the center of a cluster, such as reflecting the core topic of the primary online content object 1410, such as a main web page of an enterprise). The relevancy score may be used to facilitate recommendations or suggestions about additional topics within a cluster that may be relevant for content development.

The content development platform may include a suggestion generator 1436 for generating, using output from at least one of the models, a suggested topic 1438 that is similar to at least one topic among the content clusters and for storing the suggested topic 1438 and information regarding the similarity of the suggested topic 1438 to at least one content of the clusters 1432 in the content cluster data store 1434. Suggested topics 1438 may include sub-topic suggestions, suggestions for additional core topics and the like, each based on semantic similarity (such as using a relevancy score or similar calculation) to content in the primary online content object 1410, such as content identified as being at the center of a cluster of topics. Suggestions may be generated by using the keyphrase logistic regression model 1430 on the primary online content object 1410, which, among other things, determines, for a given phrase that is similar to the content in a cluster, how relatively unique the phrase is relative to a wider body of content, such as all of the websites that have been crawled across the broader Internet. Thus, through a combination of identifying semantically similar topics in a cluster (e.g., using the word2vec model 1424, doc2vec model 1426, and LSA model 124) and identifying which of those are relatively differentiated (using the keyphrase logistic regression model 1428), a set of highly relevant, well differentiated topics may be generated, which the suggestion generator 1436 may process for production of one or more suggested topics 1438.

In embodiments, the parser 1416 uses a parsing machine learning system 1440 to parse the crawled content. In embodiments, the parsing machine learning system 1440 iteratively applies a set of weights to input data, wherein the weights are adjusted based on a parameter of success, wherein the parameter of success is based on the success of suggested topics 1438 in the online presence of an enterprise. In embodiments, the machine learning system is provided with a parser training data set 1442 that is created based on human analysis of the crawled content.

In embodiments, the platform 100 uses a clustering machine learning system 1444 to cluster content into the content clusters 130. In embodiments, the clustering machine learning system 1444 iteratively applies a set of weights to input data, wherein the weights are adjusted based on a parameter of success and the parameter of success is based on the success of suggested topics in the online presence of an enterprise. In embodiments, the clustering machine learning system 1444 is provided with a training data set that is created based on human clustering of a set of content topics.

In embodiments, the suggestion generator 1436 uses a suggestion machine learning system 1437 to suggest topics. In embodiments, the suggestion machine learning system 1437 iteratively applies a set of weights to input data, wherein the weights are adjusted based on a parameter of success, and the parameter of success is based on the success of suggested topics in the online presence of an enterprise. In embodiments, the suggestion machine learning system 1437 is provided with a training data set that is created based on human creation of a set of suggested topics.

In embodiments, the methods and systems disclosed herein may further include a content development and management application 1438 for developing a strategy for development of online presence content, the application 1438 accessing the content cluster data store 1434 and having a set of tools for exploring and selecting suggested topics 1438 for online presence content generation. In embodiments, the application 1438 provides a list of suggested topics 1438 that are of highest semantic relevance for an enterprise based on the parsing of the primary online content object. In embodiments, the methods and systems may further include a user interface 1440 of the application 1438 that presents a suggestion, wherein the generated suggestion is presented with an indicator of the similarity 1442 of the suggested topic 1438 to a topic in the content clusters 1432 as calculated by at least one of the models 1422.

In embodiments, the content development and management application 1438 may include a cluster user interface 1458 portion of the user interface 1440 in which, after the primary online content object 1410 has been brought on board to the content development platform 1400, a cluster of linked topics can be observed, including core topics in the primary online content object 1410 and various related topics. The cluster user interface 1458 may allow a user, such as a sales or marketing professional, to explore a set of topics (e.g., topics that are highly relevant to a brand of the enterprise and related topics) which, in embodiments, may be presented with a relevancy score or other measures of similarity, as well as with other information, such as search volume information and the like. In embodiments, the cluster user interface 1458 or other portion of the user interface 1440 may allow a user to select and attach one or more topics or content objects, such as indicating which topics should be considered at the core for the enterprise, for a brand, or for a particular project. Thus, the cluster framework embodied in the cluster user interface 1458 allows a party to frame the context of what topics the enterprise wishes to be known for online (such as for the enterprise as a whole or for a brand of the enterprise).

The content development and management application 1438 may comprise a content strategy tool that encourages users to structure content in clusters based on the notion that topics are increasingly more relevant than keywords, so that enterprises should focus on owning a content topic, rather than going after individual keywords. Each topic cluster 1452 may have a "core topic," such as implemented as a web page on that core topic. For example, on a personal trainer's website, the core topic might be "weightlifting." Around those core topics 1413 should be subtopics (in this example, this might include things like "best weightlifting routines" or "how to improve your weightlifting form"), each of which should be made into a blog post that links back to the core topic page.

When users use the content development and management application 1400, or content strategy tool, the user may be prompted to enter a topic based on the user's own knowledge of the enterprise. The content development and management application 1438 or tool may also use information gleaned by crawling domains of the enterprise with the automated crawler 1412, such as to identify existing topic clusters on their site (i.e., the primary online content object 1410). For each identified core topic, the topic may be validated based on one or more metrics or criteria, (e.g., competitiveness, popularity, relevancy, or the like). In embodiments, a relevancy metric may be determined based on cosine similarity between a topic and the core topic, and/or based on various other sources of website analytics data. Competitiveness may comprise a measure of how likely a domain or the primary online content object 1410 is to rank highly, such as on a first page of search engine results, for a particular word, phrase, or term. The lower the percentage on this metric, the harder it will be to achieve a high rank for that term. This may be determined by ranking metrics, reflecting the primary online content object's 1410 domain authority, absent other factors. Popularity may comprise a general measure of a topic's monthly search volume or similar activity level, such as from various search engines. The higher the percentage, the more popular the term. This may be obtained from public or private sources, such as with data in broad ranges of 1-1000, 1000-10000, etc. Relevancy may comprise a metric of how close a topic, phrase, term or the like to other content, such as topic already covered in other domains of a user, or the like. The lower the relevancy, the further away a given term is from what an enterprise is known for, such as based on comparison to a crawl by the automated crawler 1412 of the enterprise's website and other domains. Relevancy may be provided or supported by the content context models 1422 as noted throughout this disclosure.

As the models 1422 analyze more topics, the models learn and improve, such that increasingly accurate measures may be provided as relevancy and the like. Once the user has selected a topic, the user may be prompted to identify subtopics related to that topic. Also, the platform 1000 may recommend or auto-fill subtopics that have been validated based on their similarity to the core topic and based on other scoring metrics. When the user has filled out a cluster of topics, the platform 1000 may alert the user to suggested links connecting each subtopic page to a topic page, including recommending adding links where they are currently absent. The content development and management application 1438 may also allow customers to track the performance of each cluster, including reporting on various metrics used by customers to analyze individual page performance. The content development and management application 1438 or tool may thus provide several major improvements over our current tools, including a better "information architecture" to understand the relationship between pieces of content, built-in keyword validation, and holistic analysis of how each cluster of topics performs.

In embodiments, the user interface 1440 facilitates generation of generated online presence content 1446 related to the suggested topic 1438. In embodiments, the user interface 1440 includes at least one of key words and key phrases that represent the suggested topic 1438, which may be used to prompt the user with content for generation of online presence content. In embodiments, the generated online presence content is at least one of website content, mobile application content, a social media post, a customer chat, a frequently asked question item, a product description, a service description and a marketing message. In embodiments, the generated online presence content may be linked to the primary online content object 1410, such as to facilitate traffic between the generated online presence content and the primary online content object 1410 and to facilitate discovery of the primary online content object 1410 and the generated online presence content 1446 by search engines 1448. The user interface 1440 for generating content may include a function for exploring phrases for potential inclusion in the generated online presence content 1446; for example, a user may input a phrase, and the platform 100 may use a relevancy score or other calculation to indicate a degree of similarity. For example, if a topic is only 58% similar to a core topic, then a user might wish to find something more similar. User interface elements, such as colors, icons, animated elements and the like may help orient a user to favorable topics and help avoid unfavorable topics.

In embodiments, the application 1438 may facilitate creation and editing of content, such as blog posts, chats, conversations, messages, website content, and the like, and the platform may parse the phrases written in the content to provide a relevancy score as the content is written. For example, as a blog is being written, the marketer may see whether phrases that are being written are more or less relevant to a primary online content object 1410 that has been selected and attached to an enterprise, a project, or a brand within the platform 1000. Thus, the content development and management application 1438 may steer the content creator toward more relevant topics, and phrases that represent those topics. This may include prompts and suggestions from the suggestion generator 1436. The user interface 1440 may include elements for assisting the user to optimize content, such as optimizing for a given reading level and the like. The user interface 1440 may provide feedback, such as confirming that the right key phrases are contained in a post, so that it is ready to be posted.

In embodiments, the application 1438 for developing a strategy for development of the generated online presence content 1446 may access content cluster data store 1434 and may include various tools for exploring and selecting suggested topics 1438 for generating the generated online presence content 1446. In embodiments, the application 1438 may further access the content of the customer relationship management (CRM) system 1110. In embodiments, the application 1438 includes a user interface 1440 for developing content regarding a suggested topic 1438 for presentation in a communication to a customer, wherein selection of a suggested topic 1438 for presentation to a customer is based at least in part on a semantic relationship between the suggested topic as determined by at least one of the models 1422 and at least one customer data record 1442 relating to the customer stored in the customer relationship management system 1110.

The platform 1000 may include, be integrated with, or feed the reporting and an analytics system 1460 that may provide, such as in a dashboard or other user interface, such as, in a non-limiting example, in the user interface 1440 of the content development and management application 1400, various reports and analytics such as various measures of performance of the platform 1000 and of the generated online content object 1446 produced using the platform 1000, such as prompted by suggestions of topics.

In embodiments, the platform 1000 may track interactions across the life cycle of engagement of an enterprise with a customer, such as during an initial phase of attracting interest, such as through marketing or advertising that may lead to a visit to a website or other primary online content objects 1410, during a process of lead generation, during conversations or engagement with the customer (such as by chat functions, conversational agents, or the like), during the process of identifying relevant needs and products that may meet those needs, during the delivery or fulfillment of orders and the provision of related services, and during any post-sale follow-up, including to initiate further interactions. By integration with the CRM system 1100 of an enterprise, the platform 1000 may provide measures that indicate what other activities of or relating to customers, such as generation of leads, visits to web pages, traffic and clickstream data relating to activity on a web page, links to content, e-commerce and other revenue generated from a page, and the like, were related to a topic, such as a topic for which the generated online content object 1446 was created based on a suggestion generated in the platform 1000. Thus, by integration of a content development and management application 1438 and the CRM system 1100, revenue can be linked to the generated online presence content 1446 and presented in the reporting and analytics system.

In an aspect, the analytics system 2310 is configured to aggregate and display a wide range of analytics by topic cluster (such as a core topic and related topics linked to the core topic in the cluster), rather than by web page, so that activities involved in generating the content in the cluster can be attributed with the revenue and other benefits that are generated as a result. Among these are elements tracked in the CRM system 1100, such as contact events, customers (such as prospective customers, leads, actual customers, and the like), deals, revenue, profit, and tasks.

In embodiments, the platform 1000 may proactively recommend core topics, such as based on crawling and scraping existing site content of an enterprise. Thus, also provided herein is the auto-discovery engine 1454, including various methods, systems, components, modules, services, processes, applications, interfaces and other elements for automated discovery of topics for interactions with customers of an enterprise, including methods and systems that assist various functions and roles within an enterprise in finding appropriate topics to draw customers into relevant conversations and to extend the conversations in a way that is relevant to the enterprise and to each customer. Automated discovery of relevant content topics may support processes and workflows that require insight into what topics should be written about, such as during conversations with customers. Such processes and workflows may include development of content by human workers, as well as automated generation of content, such as within automated conversational agents, bots, and the like. Automated discovery may include identifying concepts that are related by using a combination of analysis of a relevant item of text (such as core content of a website, or the content of an ongoing conversation) with an analysis of linking (such as linking of related content). In embodiments, this may be performed with awareness at a broad scale of the nature of content on the Internet, such that new, related topics can be automatically discovered that further differentiate an enterprise, while remaining relevant to its primary content. The new topics can be used within a wide range of enterprise functions, such as marketing, sales, services, public relations, investor relations and other functions, including functions that involve the entire lifecycle of the engagement of a customer with an enterprise.

As noted above, customers increasingly expect more personalized interactions with enterprises, such as via context-relevant chats that properly reflect the history of a customer's relationship with the enterprise. Chats, whether undertaken by human workers, or increasingly by intelligent conversational agents, are involved across all of the customer-facing activities of an enterprise, including marketing, sales, public relations, services, and others. Content development and strategy is relevant to all of those activities, and effective conversational content, such as managed in a chat or by the conversational agent 1462, needs to relate to relevant topics while also reflecting information about the customer, such as demographic, psychographic and geographic information, as well as information about past interactions with the enterprise. Thus, integration of the content development and management platform 1000 with the CRM system 1100 may produce appropriate topics within the historical context of the customer and the customer's engagement with the enterprise.

For example, in embodiments, tickets or tasks may be opened in the CRM system 1100, such as prompting creation or modification of content and objects, such as based on customer-relevant suggestions, via the content development and management application 150, such as content for a conversation or chat with a customer (including one that may be managed by the conversational agent 1462 or bot), content for a marketing message or offer to the customer, content to drive customer interest in a web page, or the like. In embodiments, a customer conversation or the customer chat 1464 may be managed through the content development and management application 1400, such as by having the chat occur within the user interface, such that an agent of the enterprise, like an inside salesperson, can engage in the chat by writing content, while seeing suggested topics 138, indicators of relevance or similarity and the like. In this context, relevance indicators can be based on scores noted above (such as reflecting the extent of relevance to core topics that differentiate the enterprise), as well as topics that are of interest to the customer, such as determined by processing information, such as on historical conversations, transactions, or the like, stored in the CRM system 1100. In embodiments, to facilitate increased, the customer chat 1464 may be populated with seed or draft content created by an automated conversational agent 1462, so that a human agent can edit the content into a final version for the customer interaction.

In embodiments, the models 1422 (collectively referred to as one or more content context models), and the platform 1000 more generally, may enable a number of capabilities and benefits, including helping users come up with ideas of new topics to write about based on a combination of the content cluster data store 1434, a graph of topics for the site or other content of the enterprise, and one or more analytics. This may help writers find gaps in content that should be effective, but that are not currently written about. The models 1422, and platform 1000 may also enable users to come up with ideas about new articles, white papers and other content based on effective topics. The models 1422, and platform 1000 may also enable users to understand effectiveness of content at the topic level, so that a user can understand which topics are engaging people and which aren't. This may be analyzed for trends over time, so a user can see if a topic is getting more or less engagement. The models 1422 and platform 1000 may also enable users to apply information about topics to at the level of the individual contact record, such as in the customer relationship management system 1110, to help users understand with what content a specific person engages. For example, for a user "Joe," the platform 1000, by combining content development and management with customer relationship management, may understand whether Joe is engaging more in "cardio exercise" or "weightlifting." Rather than only looking at the aggregate level, user may at the individual level for relevant topics. Development of content targeted to an individual's topics of interest may be time-based, such as understanding what content has recently been engaged with and whether preferences are changing over time.

The models 1422 and the platform 1000 may also enable looking at cross relationships between topics. For example, analytics within the platform 100 and on engagement of content generated using the platform 1000 may indicate that people who engage frequently with a "cardio" topic also engage frequently with a "running" topic. If so, the platform 1000 may offer suggested topics that are interesting to a specific person based on identifying interest in one topic and inferring interest in others.

The models 1422, and platform 1000 may also enable development of email content, such as based on understanding the topic of the content of an email, an email campaign, or the like. This may include understanding which users are engaging with which content, and using that information to determine which emails, or which elements of content within emails, are most likely to be engaging to specific users.

In an embodiment, the user interface displays one or more activities resulting from the use of the platform is reported to a marketer or other user. Among other metrics that are described herein, the user interface can report on what customers, such as ones to be entered into or already tracked in the CRM system 1110, have had a first session of engagement with content, such as a web page, as a result of the content strategy, such as where the customers arrive via a link contained in a sub-topic or other topic linked to a core topic as described herein.

The present concepts can be applied to modern sophisticated searching methods and systems with improved success. For example, in a context-sensitive or personalized search request, the results may be influenced by one or more of the following: location, time of day, format of query, device type from which the request is made, and contextual cues.

In an embodiment, a topical cluster comprising a core topic and several sub-topics can be defined and refined using the following generalized process: 1. Mapping out of several (e.g., five to ten) of the topics that a target person (e.g., customer) is interested in; 2. Group the topics into one or more generalized (core) topics into which the sub-topics could be fit; 3. Build out each of the core topics with corresponding sub-topics using keywords or other methods; 4. Map out content ideas that align with each of the core topics and corresponding sub-topics; 5. Validate each idea with industry and competitive research; and 6. Create, measure and refine the data and models and content discovered from the above process. Any disclosed steps are not intended to be limiting or exhaustive, as those skilled in the art might appreciate alternate or additional steps suiting a given application. One or more steps may also be omitted or combined into one step, again, to suit a given application at hand.

In some embodiments, a system and method are provided that can be used to provide relevancy scores (or quantitative metrics) as a service. Content generation suggestions can also be offered as a service using the present system and method, including synonyms, long tail key words and enrichment by visitor analytics in some instances.

In embodiments, the methods and systems disclosed herein include methods and systems for pulling information at scale from one or more information sources. In embodiments, the crawling system 1402 may obtain information from external information sources 230 accessible via a communication network 280 (e.g., the Internet), a private network, the proprietary database 208 (such as a content management system, a customer relationship management database, a sales database, a marketing database, a service management database, or the like), or other suitable information sources. Such methods and systems may include one or more crawlers, spiders, clustering systems, proxies, services, brokers, extractors and the like, using various information systems and protocols, such as Representational State Transfer (REST), Simple Object Access Protocol (SOAP), Remote Procedure Call (RPC), Real Time Operating System (RTOS) protocol, and the like. Such methods, systems, components, services and protocols are collectively referred to herein as "crawlers," or a "set of crawlers," except where context indicates otherwise.

Referring back to FIG. 11, the information extraction system 1404 may pull relevant information from each of a variety of data sources (referred to in some cases herein as streams), parse each stream to figure out the type of stream, and optionally apply one or more explicit parsers to further parse specific streams based on the type or structure of the stream. Some streams with defined, static structures allow for direct extraction of information of known types, which can be inserted into the knowledge data structure or other data resource without much further processing. In other cases, such as understanding what event happened given a headline of a news article, more processing is required to develop an understanding of the event that can be stored for further use. Certain events are of particular interest to sales and marketing professionals because they tend to be associated with changes in an organization that may increase or decrease the likelihood that an entity or individual will be interested in a particular offering. These include changes in management, especially in "C-level" executives like the CEO, CTO, CFO, CMO, CIO, CSO or the like and officer-level executives like the President or the VP of engineering, marketing or finance, which may indicate directional changes that tend to lead to increased or decreased purchasing.

In embodiments, the machine learning system 1300 may be configured to learn to parse unstructured data sources to understand that a specific type of event has occurred, such as an event that is relevant to the likelihood that an organization or individual will be interested in a particular offering. Relevant types of events for which particular machine learning systems 1300 may be so configured may include, in addition to changes in management, attendance at trade shows or other industry events, participation in industry organizations like consortia, working groups and standards-making bodies, financial and other events that indicate growth or shrinking of a business, as well as other events described throughout this disclosure.

The machine learning system 1300 is configured to perform machine learning tasks. Learning tasks may include, but are not limited to, training machine learned models to perform specific tasks and reinforcing the trained models based on feedback that is received in connection with the output of a model. Examples of tasks that can be performed by machine learned models can include, but are not limited to, classifying events, classifying entities, classifying relationships, scoring potential recipients of messages, and generating text. Depending on the task, certain types of machine learning may be better suited to a particular task than others. Examples of machine learning techniques can include, but are not limited to, decision tree learning, clustering, neural networks, deep learning neural networks, support vector machines, linear regression, logistic regression, naïve Bayes classifiers, k-nearest neighbor, k-means clustering, random forests, gradient boosting, Hidden Markov models, and other suitable model architectures.

In embodiments, the machine learning system 1300 may be configured to learn to identify and extract information about events. In some embodiments, the machine learning system 1300 may be configured to train event classification models (e.g., neural networks). An event classification model may refer to a machine learned model that is configured to receive features that are extracted from one or more documents and that output one or more potential events that may be indicated by the documents (or features thereof). Examples of features that may be extracted are words or sequences of words contained in a document or set of documents, dates that are extracted from the documents, sources of the documents, and the like.

In embodiments, the machine learning system 1300 trains event classification models that identify events that indicate growth of a business, such as new job postings, financial reports indicating increased sales or market share, jobs reports indicating increased employment numbers, announcements indicating opening of new locations, and the like. Such events, because (among other reasons) they tend to be good indicators of available budgets for acquisition of goods and services, may be relevant to sales and marketing professionals of organizations who provide offerings that assist with growth, such as recruiting services, information technology systems, real estate services, office fixtures and furnishings, architecture and design services, and many others.

In embodiments, the machine learning system 1300 trains event classification models that identify events that indicate changing needs of a company, such as C-level hires, layoffs, acquisitions, mergers, bankruptcies, product releases, and the like. Such events tend to be good indicators of companies that may require new services, as the changing of company needs tend to correlate to implementations of new software solutions or needs for specific types of services or employees. These types of events may be of interest to businesses such as construction companies, software companies, staffing companies, and the like.

In embodiments, the machine learning system 1300 trains event classification models that identify events that tend to indicate that a business is flat, shrinking or failing, such as a decrease or lack of increase in job postings, financial reports indicating flat or decreased sales or market share, reports indicating decreased employment numbers, reports of lay-offs, reports indicating closing of locations, and the like. Such events may be relevant to sales and marketing professionals of organizations who provide offerings that assist with turnaround efforts, such as sales coaching services, bankruptcy services, and the like.

In embodiments, the machine learning system 1300 trains models that are configured to parse job postings of an entity to determine the nature of an organization's hiring as an indicator of need for particular types of goods and services. Among other things, job postings tend to be fairly truthful, as inaccurate information would tend to adversely impact the process of finding the right employees. In embodiments, the machine learning system 1300 may include a classifier that learns, based on a training data set and/or under human supervision, to classify job postings by type, such that the classified job postings may be associated with indicators of specific needs of an organization (which itself can be determined by a machine learning system that is trained and supervised). The needs can be stored, such as in the knowledge structure 2800 and/or in a customer relationships management or other databases as described throughout this disclosure and the documents incorporated by reference herein, such as to allow a sales and marketing professional to find appropriate recipients for an offering and/or configure communications to recipients within organizations that have relevant needs.

In embodiments, the machine learning system 1300 trains models that are configured to parse news articles mentioning an entity or individuals associated with an entity to find events that are indicators of need for particular types of goods and services. News articles tend to be challenging, as they are typically unstructured and may use a wide range of language variations, including jargon, shorthand, and word play to describe a given type of event. In embodiments, the machine learning system 1300 may specify a frame for the kind of event that is being sought, such as a specific combination of tags that characterize the event. For example, where the machine learning system 1300 needs to be configured to discover events related to a management change, a frame can be specified seeking the name of a person, a role within the management structure of a company, a company, and an action related to that role. In embodiments, parsers may be configured for each of those elements of the frame, such that on a single pass of the article the machine learning system 1300 can extract names, roles (e.g., "CEO" or "VP Finance" among many others), companies (including formal names and variants like initial letters and stock symbols) and actions (e.g., "retired," "fired," "hired," "departs" and the like). In embodiments, names may include proper names of individuals (including full names, partial names, and nicknames) known to serve in particular roles, such as reflected in a customer relationship management database (such as described throughout this disclosure or in the documents incorporated by reference herein) that may be accessed by the machine learning system to assist with the parsing.

The machine learning system 1300, which may be trained using a training data set and/or supervised by one or more humans, may thus learn to parse unstructured news articles and yield events in the form of the frame, which may be stored in the knowledge structure 2900, such as at nodes associated with the organization and/or the individuals mentioned in the articles. In turn, the events may be used to help sales and marketing professionals understand likely directions of an enterprise. For example, among many other examples, the hiring of a new CTO may indicate a near-term interest in purchasing new technology solutions.

The machine learning system 1300 may train event classification models in any suitable manner. For example, the machine learning system 1300 may implement supervised, semi-supervised, and/or unsupervised training techniques to train an event classification model. For example, the machine learning system 1300 may train an event classification model using a training data set and/or supervision by humans. In some instances, the machine learning system 1300 may be provided with a base event classification model (e.g., a generic or randomized classification model) and training data containing labeled and unlabeled data sets. The labeled data sets may, for example, include documents (or features thereof) that describe thousands or millions of known events having known event types. The unlabeled data sets may include documents (or features thereof) without any labels or classifications that may or may not correspond to particular events or event types. The machine learning system 1300 may initially adjust the configuration of the base model using the labeled data sets. The machine learning system 1300 may then try identifying events from the unlabeled data sets. In a supervised environment, a human may confirm or deny an event classification of an unlabeled data set. Such confirmation or denial may be used to further reinforce the event classification model.

Furthermore, as the system 1000 operates to extract events from information obtained by the crawling system 1402, the machine learning system 1300 may utilize the classification of said event classifications, the information used to make the entity classifications, and any outcome data resulting from the event classifications to reinforce the event classification model(s). Such event classification models may be trained to find various indicators, such as indicators of specific industry trends, indicators of need and the like.

In embodiments, the machine learning system 1300 is configured to train entity classification models. An entity classification model may be a machine learned model that receives one or more documents (or features thereof) and identifies entities indicated in the documents and/or relationships between the documents. An entity classification model may further utilize the knowledge data structure as input to determine entities or relationships that may be defined in the one or more documents. The machine learning system 1300 may train entity classification models in a supervised, semi-supervised, and/or unsupervised manner. For example, the machine learning system 1300 may train the entity classification models using a training data set and/or supervision by humans. In some instances, the machine learning system 1300 may be provided with a base entity classification model (e.g., a generic or randomized classification model) and training data containing labeled and unlabeled data sets. The labeled data sets may include one or more documents (or the features thereof), labels of entities referenced in the one or more documents, labels of relationships between the entities referenced in the one or more documents, and the types of entities and relationships. The unlabeled data sets may include one or more documents (or the features thereof), but without labels. The machine learning system 1300 may initially train the base entity classification model based on the labeled data sets. The machine learning system 1300 may then attempt to classify (e.g., classify entities and/or relationships) entities and/or relationships from the unlabeled data sets. In embodiments, a human may confirm or deny the classifications output by an entity classification model to reinforce the model.

In embodiments, the machine learning system 1300 is configured to train generative models. A generative model may refer to a machine learned models (e.g., neural networks, deep neural networks, recurrent neural networks, and the like) that are configured to output text given an objective (e.g., a message to generate a lead, a message to follow up a call, and the like) and one or more features/attributes of an intended recipient. In some embodiments, a generative model outputs sequences of three to ten words at a time. The machine learning system 1300 may train a generative model using a corpus of text. For example, the machine learning system 1300 may train a generative model used to generate professional messages may be trained using a corpus of messages, professional articles, emails, text messages, and the like. For example, the machine learning system 1300 may be provided messages drafted by users for intended objective. The machine learning system 1300 may receive the messages, the intended objectives of the messages, and outcome data indicating whether the message was successful (e.g., generated a lead, elicited a response, was read by the recipient, and the like). As the directed content system 200 generates and sends messages and obtains outcome data relating to those messages, the machine learning system 1300 may reinforce a generative model based on the text of the messages and the outcome data.

In embodiments, the machine learning system 1300 is configured to train recipient scoring models. A lead scoring model may be a machine learned model (e.g., a regression model) that receives features or attributes of an intended recipient of a message and a message objective and determines a lead score corresponding to the intended recipient. The lead score indicates a likelihood of a successful outcome with respect to the message. Examples of successful outcomes may include, but are not limited to, a message is viewed by the recipient, a response message is sent from the recipient, an article attached in the message is read by the recipient, or a sale is made as a result of the message. The machine learning system 1300 may train the lead scoring model 1300 in a supervised, semi-supervised, or unsupervised manner. In some embodiments, the machine learning system 1300 is fed a training data set that includes sets of triplets, where a triplet may include recipient attributes (e.g., employer, role, recent events, location, and the like), a message objective (e.g., start a conversation, make a sale, generate a website click), and a lead score assigned (e.g., by a human) to the triplet given the attributes and the message objective. The machine learning system 1300 may initially train a model based on the training data. As the lead scoring model is deployed and personalized messages are sent to users, the machine learning system 1300 may receive feedback data 1472 from a recipient device 270 (e.g., message was ignored, message was read, message was read and responded to) to further train the scoring model.

The machine learning system 1300 may perform additional or alternative tasks not described herein. Furthermore, while the machine learning system 1300 is described as training models, in embodiments, the machine learning system 1300 may be configured to perform classification, scoring, and content generation tasks on behalf of the other systems discussed herein.

FIG. 13 illustrates an example of the crawling system 1402 and the information extraction system 1404 maintaining the knowledge structure 2900, whereby the crawling system 1402 and the information extraction system 1404 may operate to obtain information from one or more information sources 93 and to update the knowledge structure 2900 based on the obtained information. In FIG. 13, a set of crawlers 1412 obtain (e.g., crawling and/or downloading) information relating to entities and events from various information sources 93.

In embodiments, the set of crawlers 1412 are controlled/directed by the crawling system 1402 to identify documents that may contain information regarding entities, events, and relationships. Types of entities include, but are not limited to, organizations (e.g., companies), people, governments, cities, states, countries, dates, populations, markets, sectors, industries, roles, and products. Information about organizations may be obtained from, for example, company news articles, job postings, SEC filings, organizational charts, press releases, and any other digital documents relating to organizations such as patents, trademarks, blog posts, mentions in forums, market reports, internal documents, company websites, and social media. Information about people may be obtained from, for example, resumes (e.g., education, prior experience), scientific publications, patents, and any other digital documents such as contact information, news mentions, social media pages, blog posts, and personal websites.

In embodiments, the crawlers 1412 crawl Internet websites to obtain documents. Internet websites may include, but are not limited to, sites that include company news articles, job postings, SEC filings, patents, trademark registrations, copyrights, blog posts, mentions in forums, market reports, internal documents, company websites, and social media, as well as sites that include information about people, which may include, but are not limited to, education (such as schools attended, degrees obtained, programs completed, locations of schooling and the like), prior experience (including job experience, projects, participation on boards and committees, participating in industry groups, and the like), scientific publications, patents, contact information, news mentions, social media, blog posts, and personal websites. Information may be extracted from websites via a variety of techniques, including but not limited to explicit selection of specific data fields (e.g., from .JSON), automatic extraction of data from raw website code (e.g., from HTML or XML code), or automatic extraction of data from images (e.g., using OCR or image classifiers) or video of websites (e.g., using video classifiers). The crawlers 1412 may employ various methods to simulate the behavior of human users, including but not limited to simulating computer keyboard keystrokes, simulating computer mouse movement, and simulating interaction with a browser environment. The crawlers 1412 may learn to simulate interaction with websites by learning and replicating patterns in the behavior of real website users.

In operation, the crawling system 1402 may seed one or more crawlers 1412 with a set of resource identifiers (e.g., uniform resource identifiers (URIs), uniform resource locators (URLs), application resource identifiers, and the like). The crawler 1412 may iteratively obtain documents corresponding to the seeded resource identifier (e.g., an HTML document). In particular, the crawler 1412 may parse the obtained documents for links contained in the documents that include additional resource identifiers. The crawler 1412 may then obtain additional documents corresponding to the newly seeded resource identifiers that were identified from the parsed documents. The crawler 1412 may continue in this manner until the crawler does not find any new links. The crawler 1412 may provide any obtained documents to the crawling system 1402, which can in turn dedupe any cumulative documents. The crawling system 1402 may output the obtained documents to the information extraction system 1404.

In embodiments, the information extraction system 1404 may receive documents obtained from the crawlers 1412 via the crawling system 1402. The information extraction system 1404 may extract text and any other relevant data that represents information about a company, an individual, an event, or the like. Of particular interest to users of the directed content platform 200 disclosed herein, such as marketers and salespeople, are documents that contain information about events that indicate the direction or intent of a company and/or direction or intent of an individual. These documents may include, among many others, blog posts from or about a company; articles from business news sources and others; securities filings (e.g., 10K filings in the US); patent, trademark and/or copyright filings; job postings; and the like. The information extraction system 1404 may maintain and update the knowledge structure 2900 based on the extracted information, as well as any additional information that may be interpolated, predicted, inferred, or otherwise derived from the extracted information and/or a proprietary database 208.

In embodiments, the information extraction system 1404 (e.g., the entity extraction system 1403 and the event extraction system 1403) may discover and make use of patterns in language to extract and/or derive information relating to entities, events, and relationships. These patterns may be defined in advance and/or may be learned by the system 1000 (e.g., the information extraction system 1404 and/or the machine learning system 1300). The information extraction system 1404 may identify a list of words (and sequences of words) and/or values contained in each received document. In embodiments, the information extraction system 1404 may use the language patterns to extract various forms of information, including but not limited to entities, entity attributes, relationships between respective entities and/or respective events, events, event types, attributes of events from the obtained documents. The information extraction system 1404 may utilize natural language processing and/or machine learned classification models (e.g., neural networks) to identify entities, events, and relationships from one or more parsed documents. For example, a news article headline may include the text "Company A pleased to announce a deal to acquire Company B." In this example, an entity classification models may be able to extract "Company A" and "Company B" as business organization entities because the classification model may have learned that the term "deal to acquire" is a language pattern that is typically associated with two companies. Furthermore, an event classification model may identify a "company acquisition event" based on the text because the event classification model may have learned that the term "deal to acquire" is closely associated with "company acquisition events." Furthermore, the event classification model may rely on the terms "Company A" and "Company B" to strengthen the classification, especially if both Company A and Company B are both entities that are known to the system 1000. In embodiments, the information extraction system 1404 may derive new relationships between two or more entities from a newly identified event. For example, in response to the news article indicating Company A has acquired Company B, the information extraction system 1404 may infer a new relationship that Company A owns Company B. In this example, a natural language processor may process the text to determine that Company A is the acquirer and Company B is the acquisition. Using the event classification of "company acquisition event" and the results of the natural language processing, the information extraction module 1404 may infer that Company B now owns Company A. The information extraction system 1404 may extract additional information from the news article, such as a date of the acquisition.

In some embodiments, the information extraction system 1404 may rely on a combination of documents to extract entities, events, and relationships. For example, in response to the combination of i) a publicly available resume of Person X indicating that Person X works at Company C, and ii) a press release issued by Company B that states in the body text "Company B has recently added Person X as its new CTO," the information extraction system 1404 may extract the entities Person X, Company B, Company C, and CTO. The name of Person X and Company C may be extracted from the resume based on language patterns associated with resumes, while the names of Company B and Person A, and the role CTO may be extracted from the press release based on a parsing and natural language processing of the sentence quoted above. Furthermore, the information extraction system 1404 may classify two events from the combination of documents based on natural language processing and a rules-based inference approach. First, the information extraction module 1404 may classify a "hiring event" based on the patterns of text from the quoted sentence. Secondly, the information extraction module 1404 may infer a "leaving event" with respect to Company C and Person X based on an inference that if a person working for a first company is hired by another company, then the person has likely left the first company. Thus, from the combination of documents described in the disclosure, the information extraction module 1404 may infer that Person X has left Company C (a first event) and that Company B has hired Person X (a second event). Furthermore, in this example, the information extraction module 1404 may infer updated relationships, such as Person X no longer works for Company C and Person X now works for Company B as a CTO.

In some embodiments, the information extraction system 1404 may utilize one or more proprietary databases 2800 to assist in identifying entities, events, and/or relationships. In embodiments, the proprietary databases 2800 may include one or more databases that power a content relationship management system (not shown), where the database stores structured data relating to leads, customers, products, and/or other data relating to an organization or individual. This structured data may indicate, for example, names of customer companies and potential customer companies, contact points at customer companies and potential customer companies, employees of a company, when a sale was made to a company (or individual) by another company, emails that were sent to a particular lead from a company and dates of the emails, and other relevant data pertaining to the CRM 1100. In these embodiments, the information extraction system 1404 may utilize the data stored in the proprietary databases 2800 to identify entities, relationships, and/or events; to confirm entities, relationships, or events; and/or to refute identifications of entities, relationships, and/or events.

As shown in FIG. 11, the entity extraction system 1403 parses and derives entities, entity types, entity attributes, and entity relationships into a structured representation based on the received documents. The entity extraction system 1403 may employ natural language processing, entity recognition, inference engines, and/or entity classification models to extract entities, entity types, entity attributes, entity relationships, and relationship metadata (e.g., dates on which the relationship was created). In embodiments, the event extraction system 1403 may use known parsing techniques to parse a document into individual words and sequences of words. The event extraction system 1403 may employ natural language processing and entity recognition techniques to determine whether any known entities are described in a document. In embodiments, the event extraction system 1403 may utilize a classification model in combination with natural language processing and/or an inference engine to discover new entities, the entities' respective types, relationships between entities, and the respective types of relationships. In embodiments, the entity extraction system 1403 may extract entity attributes from the documents using natural language processing and/or an inference engine. In embodiments, the inference engine may comprise conditional logic that identifies entity attributes (e.g., If/Then statements that correspond to different entity attributes and relationships). For example, the conditional logic may define rules for inferring an employer of an individual, a position of an individual, a university of an individual, a customer of an organization, a location of an individual or organization, a product sold by an organization, and the like. The entity extraction system 1403 may employ additional or alternative strategies to identify and classify entities and their respective relationships.

In embodiments, the event extraction system 1403 is configured to parse and derive information relating to events and how those events relate to particular entities. For example, news articles, press releases, and/or other documents obtained from other information sources may be fed to the event extraction system 1403, which may identify entities referenced in the documents based on the information contained in the news articles and other documents. The event extraction system 1403 may be further configured to classify the events according to different event types (and subtypes). The event extraction system 1403 may be configured to extract event attributes, such as from the headline and the body of a news article or another document, such as a press release, resume, SEC filing, trademark registration, court filings, and the like. Event types may include, but are not limited to, mergers and acquisitions, client wins, partnerships, workforce reductions or expansions, executive announcements, bankruptcies, opening and closing of facilities, stock movements, changes in credit rating, distribution of dividends, insider selling, financial results, analyst expectations, funding events, security and data breaches, regulatory and legal actions, product releases and recalls, product price changes, project initiatives, budget and operations changes, changes in name or contact, changes in how products and services are represented or described, award wins, conference participations, sponsoring activities, new job postings, promotions, layoffs, and/or charitable donations. Examples of event attributes may include entities that are connected to the event, a time/date when the event occurred, a date when the event occurred, a geographic area where the event occurred (if applicable), and the like. The event extraction system 1403 may employ event classification models, natural language processing, and/or an inference engine to identify and classify events. In embodiments, the event extraction system 1403 may receive entity information, including entity values (e.g., a name of a person or company, a job title, a state name) and entity types extracted by the entity extraction system 1403 to assist in the event classification. In embodiments, an event classification model may receive entity information along with the features of a document to identify and classify events. Drawing from the example of Company A acquiring Company B, an event classification model may receive the entity types of Company A and Company B, the features of the document (e.g., results of parsing and/or natural language processing), as well as a source of the document (e.g., news article from a business focused publication) to determine that the sentence fragment "a deal to acquire" corresponds to a company acquisition event, as opposed a real property purchase event or a sports trade event (both of which may also correlate to "a deal to acquire"). The event extraction system 1403 may employ additional or alternative strategies to identify and classify events. In embodiments, the information extraction system 1404 structures the information into structured representations of respective entities, relationships, and events. In embodiments, the information extraction system 1404 updates the knowledge structure 2900 with the structured representations.

Figure 14:
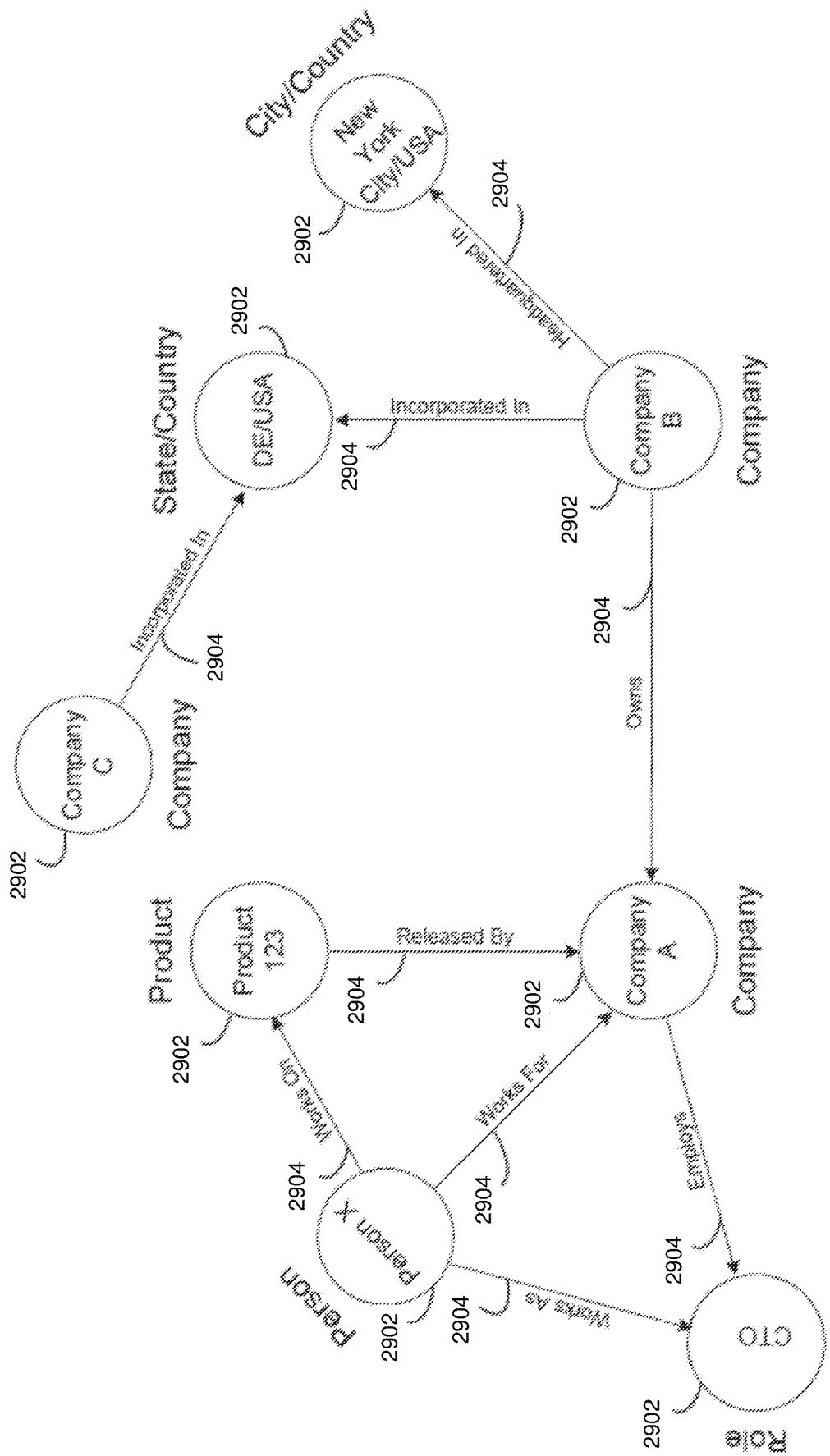

FIG. 14 is a visual representation of a portion of an example knowledge data structure 2900 representation in accordance with an aspect of the present disclosure. In embodiments, structured representations in the knowledge structure may be represented by nodes and edges. In the illustrated example, the knowledge structure 2900 includes entity nodes 2902 that represent entities (e.g., companies, people, places, roles, and the like). In the example, the edges 2904 that connect entity nodes 2902 represent relationships between the entities represented by the entity nodes 2902 connected by a respective edge 2904.

In embodiments, each entity node 2902 in the knowledge structure 2900 may correspond to a specific entity that is known to the system 1000 and/or identified by the entity extraction module 1401. In some embodiments, each entity node 2902 is (or points to) an entity record that includes information relating to the entity represented by the entity node, including an entity identifier (e.g., a unique value corresponding to the entity), an entity type of the entity node (e.g., person, company, place, role, product, and the like), an entity value of the entity (e.g., a name of a person or company), and entity data corresponding to the entity (e.g., aliases of a person, a description of a company, a classification of a product, and the like).

In embodiments, each edge 2904 in the knowledge structure 2900 may connect two (or more) entity nodes 2902 to define a relationship between two (or more) entities represented by the entity nodes 2902 connected by the edge 2904. In embodiments, edges in the graph may be (or point to) relationship records 2904 that respectively define a relationship identifier (a unique identifier that identifies the relationship/edge), a relationship type between two or more entities that defines the type of relationship between the connected entities (e.g., "works for," "works as," "owns," "released by," "incorporated in," "headquartered in," and the like), relationship data (e.g., an entity identifier of a parent entity node and entity identifier(s) of one or more child entity nodes), and relationship metadata (e.g., a date on which the relationship was created and/or identified). In this way, two entity nodes 2902 that are connected by an edge 2904 may describe the type of relationship between the two entity nodes. In the illustrated example, an entity node 2902 of Company A is connected to an entity node 2902 of Delaware/USA by an edge 2904 that represents an "incorporated in" relationship type. In this particular instance, the entity node 2902 of Company A is the parent node and the entity node 2902 of Delaware/USA is the child node by way of the directed "incorporated in" edge 2904.

In some embodiments, the knowledge structure 2900 may further include event nodes (not shown). Event nodes may represent events that are identified by the event extraction system 1403. An event node may be related to one or more entity nodes 2902 via one or more edges 2904, which may represent respective relationships between the event and one or more respective entities represented by the one or more entity nodes connected to the event node. In some embodiments, an event node may be (or point to) an event record 256 that corresponds to a specific event, which may define an event identifier (e.g., a unique value that identifies the event), an event type (e.g., a merger, a new hire, a product release, and the like), and event data (e.g., a date on which the event occurred, a place that the event occurred, information sources from which the event was identified, and the like).

In the case that the information extraction system 1404 identifies a new entity, event, and/or relationship, the information extraction system 1404 may store the structured representations of new entity, relationship, and/or event in the knowledge structure 2900. In cases of known entities, events, and/or relationships, the information extraction system 1404 may reconcile any newly derived data in the respective structured representations with data already present in the knowledge structure 2900. Updating entities, events, and/or relationships in the knowledge structure 2900 may include deleting or replacing structured relationships and/or changing data corresponding to entities, events, and/or relationships in the knowledge structure 2900. Drawing from the example of Company A acquiring Company B above, the relationship between the two entities (Company A and Company B) may be represented by a parent entity node 2902 of Company A, a child node 2902 of Company B, and an "owns" edge 2904 connecting the two entity nodes that indicates the relationship type as parent node "owns" child node. Drawing from the example of Person X, the information extraction system 1404 may update the knowledge structure 2900 by deleting or replacing the edge 2904 defining the relationship between the entity node 2902 of Person X and the entity node 2902 of Company C, such that there is no longer an edge between the entity nodes of Person X and Company C or a previously defined edge (not shown) between the two entity nodes may be replaced with an edge 2904 that indicates a "used to work for" relationship between the parent node of Person X and the child entity node of Company C. Furthermore, in this example, the information extraction system 1404 may update the knowledge structure 2900 to include a first edge 2904 indicating a "works for" relationship between a parent node 2902 of Person X and a child node 2902 of Company B, thereby indicating that Person X works for Company B. The information extracting system 1404 may further include a second edge 2904 indicating a "works as" relationship between the parent node 2902 of Person X and a child node 2904 of a CTO Role, which may be related back to Company B by an "employs" role.

Figure 15:
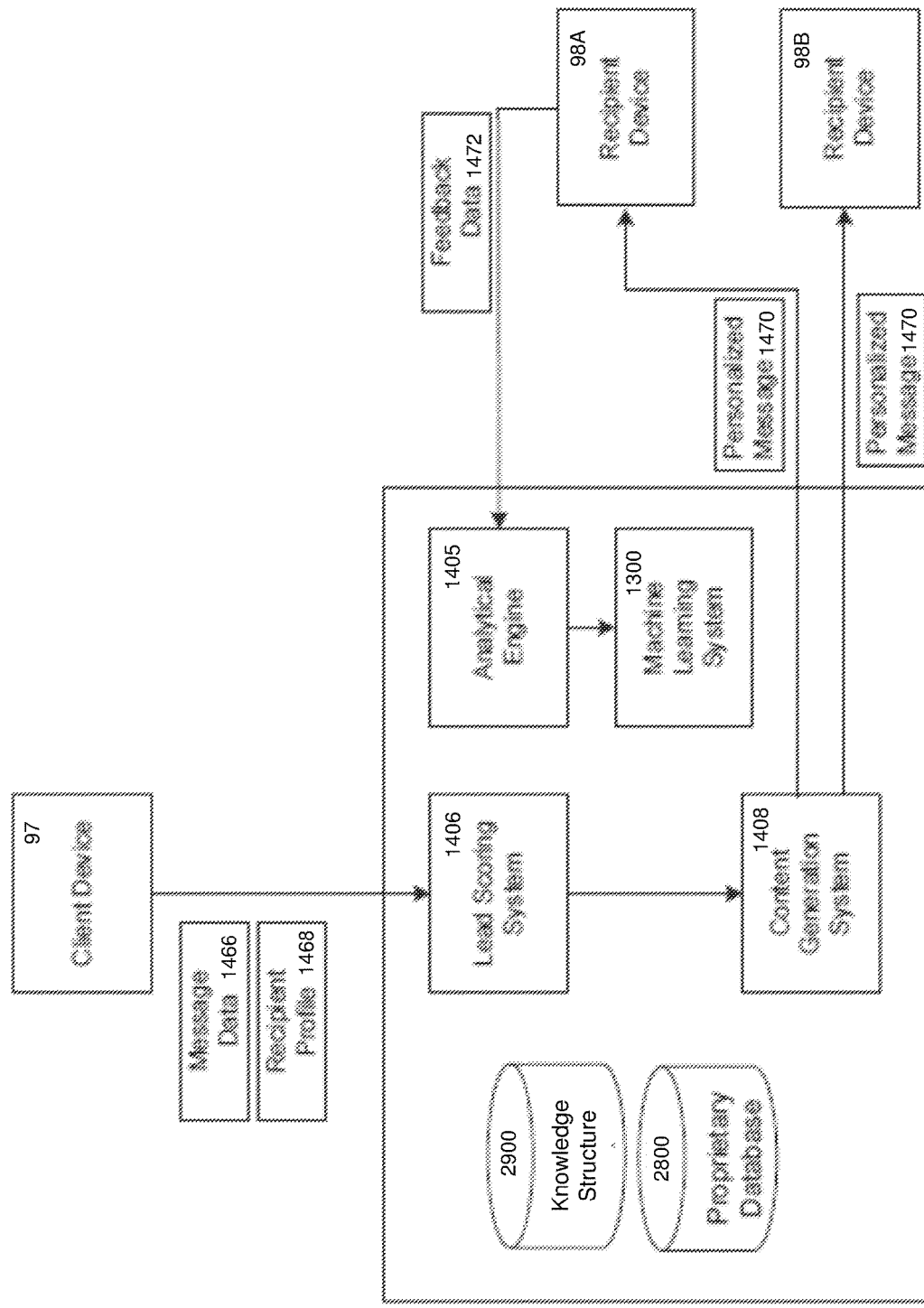
Figure 16:
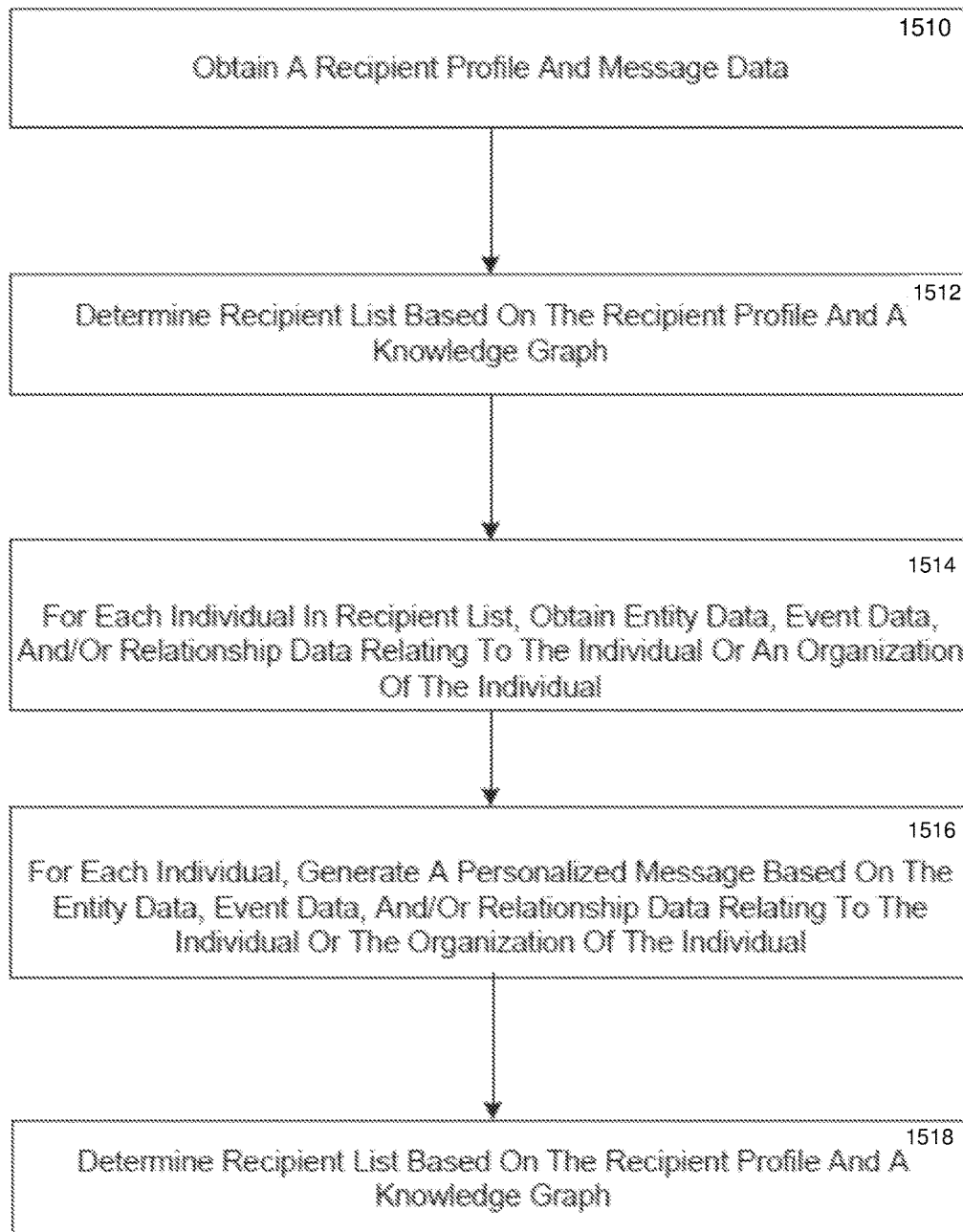
FIG. 16 is a flow chart illustrating an example of a set of operations for performing one or more of the provisions set forth herein.

As shown in FIG. 15, the platform 1000 includes a lead scoring system 1406 and the content generation system 1408 for identifying intended recipients of messages and generating personalized messages for the one or more intended recipients. Traditionally, marketers and salespeople rely on bulk emails that are created by populating contact information from a database into a block of free text that has fields for elements that will be retrieved from the database and inserted into the text at the position of the fields. For example, an email template may say "Hi {First name}, . . . ", and first names from the database will be inserted at the point of the {First name} field. The methods and systems disclosed herein enable substantial improvement and enhancement of such templated emails by making available, at large scale, a range of information that is not typically available during bulk email generation. This includes publicly available information about recipients that may serve to personalize or customize the email in a way that makes the message more likely to have a positive outcome (e.g., opened, responded to, closes a deal, and the like).

The lead scoring system 1406 and the content generation system 1408 of the platform 1000 may utilize the knowledge structure 2900 and/or the proprietary databases 2800, as well as a message data 1466 and a recipient profile 1468 to identify intended recipients and to generate personalized messages 1470 for the intended recipients. A personalized message 1470 may refer to a message that includes content that is specific to the intended recipient or the organization of the intended recipient. It is noted for purposes of distinguishing from traditional templated bulk messages, merely including a recipient's name, address, or organization name in one or more template fields does not constitute a personalized message 1470 in-and-of-itself.

Referring to FIG. 15, the message data 1466 may refer to any information that relates to the messages that a user wishes to have sent. In embodiments, the message data 1466 may include an objective of the email. For example, the objective of an email may be to open a dialogue, make a sale, renew a subscription, have a recipient read an article, and the like. As is discussed below, the message data 1466 may be received from a user via a client device 97 and/or may be generated for the user by the systems described herein. In embodiments, message data may include a message template that includes content that is to be included in the body of the message. For example, a message template may include the name of the "sender," a description of the sender's business, a product description, and/or pricing information. A message template may be created by the user (e.g., using the content management system disclosed elsewhere herein) or may be retrieved by the user and sent from the client device. A message template may include fields to be filled by the content generation system 1408 with information, including content that is generated by the content generation system 1408 based on information selected from the knowledge structure 2900. In some embodiments, the system may automatically infer or generate message templates from historical data provided by the user and/or other users of the system 200. Historical data may include, but is not limited to, historical communication data (e.g., previously sent messages) and/or historical and current customer relationship data, such as the dates, amounts, and attributes of business transactions. In some embodiments, the system 1400 may further rely on the objective of a message to generate the template.

In embodiments, a recipient profile 1468 may include, among many other examples, information about an ideal recipient, including but not limited to work location, job title, seniority, employer size, and employer industry. The recipient profile 1468 may be provided by a user via a client device 97 and/or may be determined using machine learning based on an objective of the message or other relevant factors. In the latter scenario, the machine learning system 1300 may determine which types of information are relevant for predicting whether a recipient will open and/or respond to a message. For example, the machine learning system 1300 may receive, determine, and/or otherwise obtain feedback data 1472 from recipient user devices 98A. Feedback data 1472 may indicate, for example, whether a message was opened, whether a link in the message was clicked, whether an attachment in the message was downloaded or viewed, whether a response was elicited, and the like.

In some scenarios, a user may have a good sense of the type of recipient that the user believes would be interested in the user's offering. For example, a user may wish to sell a new software suite to CTOs of certain types of organizations (e.g., hospitals and health systems). In such cases, a user may optionally input the recipient profile 1468 and the message data 1466 into the system via a client device 97. In additional or alternative embodiments, the recipient profile 1468 may be generated by machine learned models based on, for example, outcomes relating to personalized messages previously generated by the system 1400 and/or the objective of the message.

In embodiments, the lead scoring system 1406 is configured to identify a list of one or more intended recipients of a message based on the recipient profile 1468 (whether specified by a user or generated by machine learning). In embodiments, the lead scoring system 1406 may filter the most relevant entities in the knowledge structure 2900 using the ideal recipient profile and create a recipient list. The recipient list may indicate a list of people that fit the recipient profile. In some embodiments, the lead scoring system 1406 may determine a lead score for each person in the recipient list, whereby the lead score indicates a likelihood that a personalized message 1470 sent to that person will lead to a successful outcome. In embodiments, the lead scoring system 1406 may use historical and current data provided by the user and/or other users of the system to assess the probability that each recipient in the recipient list will respond to the user's message, and/or will be interested in knowing more about the user's offering, and/or will purchase the user's offering. The historical and current data used to evaluate this likelihood may include the events and conditions experienced by recipients and their employers around the time they made similar decisions in the past, the timing of those events, and their co-occurrence.

In some implementations, the lead scoring system 1406 retrieves information relating to each person indicated in the recipient list from the knowledge structure 2900. The information obtained from the knowledge structure 2900 may include information that is specific to that person and/or to the organization of the user. For example, the lead scoring system 1406 may obtain a title of the person, an education level of the person, an age of the person, a length of employment by the person, and/or any events that are associated with the person or the organization of the person. The lead scoring system 1406 may input this information to the lead scoring model, which outputs a lead score based thereon. The lead scoring system 1406 may score each person in the recipient list. The lead scoring system 1406 may then rank and/or filter the recipient list based, at least in part, on the lead scores of each respective person in the list. For example, the lead scoring system 1406 may exclude any people having lead scores falling below a threshold from the recipient list. The lead scoring system 1406 may output the list of recipients to the content generation system 1408.

In embodiments, determining which recipients (referred to in some cases as "leads") should receive a communication may be based on one or more events extracted by the information extraction system 1404. Examples of these types of events may include, but are not limited to, job postings, changes in revenue, legal events, changes in management, mergers, acquisitions, corporate restructuring, and many others. For a given recipient, the lead scoring system 1406 may seek to match attributes of an individual (such as a person associated with a company) to an extracted event. For example, in response to an event where Company A has acquired Company B, the attributes of an individual that may match to the event may be "works for Company B," "Is a C-level or VP level executive," and "Lives in New York City." In this example, a person having these attributes may be receptive to a personalized message 1470 from an executive headhunter. In this way, the lead scoring system 1406 may generate the list of intended users based on the matches of attributes of the individual to the extracted event. In some embodiments, the lead scoring system 1406 may generate the list of the intended users based on the matches of attributes of the individual to the extracted event given the subject matter and/or objective of the message.

Content Generation System

In embodiments, the content generation system 1408 receives a recipient list and generates a personalized message 1470 for each person in the list. The recipient list may be generated by the lead scoring system 1406 or may be explicitly defined by the user. The content generation system 1408 may employ natural language generation techniques and/or a generative model to generate directed content that is to be included in a personalized message. In embodiments, the content generation system 1408 may generate directed content for each intended recipient included in the recipient list. In generating directed content for a particular individual, the content generation system 1408 may retrieve information that is relevant to the individual from the knowledge structure 2900 and may feed that information into a natural language generator and/or a generative model of the AI/ML System 1300. In this way, the content generation system 1408 may generate one or more instances of directed content that is personalized for the user.

For example, the content generation system 1408 for an individual that was recently promoted at a company that recently went public may include the following instances of directed content: "Congratulations on the recent promotion!" and "I just read about your company's IPO, that's great news!" In embodiments, the content generation system 1408 may merge the directed content with any parts of the message that is to be common amongst all personalized messages. In some of these embodiments, the content generation system 1408 may merge the directed content for a particular intended recipient with a message template to obtain a personalized message for the particular intended recipient.

In embodiments, the content generation system 1408 may obtain the proper contact information of an intended recipient and may populate a "to" field of the message with the proper contact information. Upon generating a personalized message, the content generation system 1408 may then output the personalized message. Outputting a personalized message may include transmitting the personalized message to an account of the intended recipient (e.g., an email account, a phone number, a social media account, and the like), storing the personalized message in a data store, or providing the personalized message for display to the user, where the user can edit and/or approve the personalized message before transmission to the intended recipient. A respective personalized message 1470 may be delivered to a recipient indicated in the recipient list using a variety of messaging systems including, but not limited to, email, short message service, instant messaging, telephone, facsimile, social media direct messages, chat clients, and the like.

In embodiments, the content generation system 1408 may utilize certain topics of information when generating directed content that can be included in an email subject line, opening greeting, and/or other portions of a message to make a more personal message for a recipient. For example, the content generation system 1408 may utilize topics such as references to the recipient's past (such as to events the recipient attended, educational institutions the recipient attended, or the like), to the recipient's relationships (such as friends or business relationships), to the recipient's affinity groups (such as clubs, sports teams, or the like), and many others. In a specific example, the content generation system 1408 may generate directed content that references the recipient's college, note that the sender observed that the recipient attended a recent trade show, and ask how the recent trade show went. In embodiments, the content generation system 1408 may retrieve information from the knowledge structure 2900 regarding an intended recipient and may provide that information to a natural language generator to obtain directed content that may reference topics that a recipient may be receptive to.

In embodiments, the machine learning system 1300 can learn which topics are most likely to lead to successful outcomes. For example, the machine learning system 1300 may monitor feedback data 1472 to determine which messages are being opened or responded to versus which messages are being ignored. The machine learning system 1300 uses such feedback data 1472 to determine topics that are more likely to lead to successful outcomes.

Events of particular interest to salespeople and marketers may include events that indicate a direction of the recipient's business, such as the hiring of a C-level executive, the posting of job openings, a significant transaction of the business (such as a merger or acquisition), a legal event (such as the outcome of a litigation, a foreclosure, or a bankruptcy proceeding), and the like. Acquiring such information from public sources at scale is challenging, as sources for the information are often unstructured and ambiguous. Accordingly, a need exists for the improved methods and systems provided herein for retrieving information from public sources at scale, recognizing information that may be relevant or of interest to one or more recipients, developing an understanding the information, and generating content for communication to one or more recipients that uses at least a portion of the information.

Building the knowledge structure 2900 may be an automated or semi-automated process, including one where machine learning occurs with supervision and where content derived from crawled documents is merged for an entity once confidence is achieved that the content in fact relates to the entity. As the knowledge structure 2900 grows with additional content, the presence of more and more content enriches the context that can be used for further matching of events, thus improving the ability for the platform 1000 to ascribe future events accurately to particular entities and individuals. In embodiments, one or more knowledge structures 2900 of individuals and entities may be used to seed the knowledge structure 2900 of the system 200, such as a knowledge structure 2900 from a CRM database, or a publicly available database of organizations and people. In embodiments, if a user realizes that an article is not really about the company they expected, the user can flag the error; that is, the process of linking articles to entities can be human-supervised.

Using the above methods and systems, a wide range of content, such as news articles and other Internet content, can be associated in the knowledge structure 2900 with each of a large number of potential recipients, and the recipients can be scored based on the matching of attributes in the knowledge structure 2900 to desired attributes of the recipients reflected in the recipient profile 1468. For example, all CTOs and VPs of engineering who have started their jobs in the last three months can be scored as the most desired recipients of a communication about a new software development environment, and a relevant article can be associated with each of them in the knowledge structure 2900.

Once a set of recipients is known, the CMS system 1400 may assist with generation of relevant content, such as targeted emails, chats, text messages, and the like. In such cases, the CMS system 1400 composes a personalized message 1470 for each recipient in the recipient list by combining a selected message template with information about the recipient and the recipient's organization that is stored in the knowledge structure 2900. The information about a recipient and/or the recipient's organization may be inserted into a message template using natural language generation and/or a generative model to obtain the personalized message. The content generation system 1408 may use statistical models of language, including but not limited to automatic summarization of textual information to generate directed content based on the information about the recipient and/or the recipient's organization. In embodiments, the content generation system 1408 may merge the directed content into a message template to obtain the personalized message for a recipient.

In embodiments, a range of approaches, or hybrids thereof, can be used for natural language generation. In some cases, the knowledge structure 2900 may be monitored and maintained to ensure that the data contained therein is clean data. Additionally, or alternatively, the content generation system 1408 can be configured to use only very high confidence data from the knowledge structure 2900 (e.g., based on stored indicators of confidence in respective instances of data). Being clean for such purposes may include the data being stored as a certain part of speech (e.g., a noun phrase, a verb of a given tense, or the like). Being clean may also include being stored with a level of confidence that the data is accurate, such as having an indicator of confidence that it is appropriate to use abbreviations of a business name, that is appropriate to use abbreviated terms (e.g., "CTO" instead of "Chief Technology Officer"), or the like. In embodiments, where data in the knowledge structure 2900 may not be of sufficient structure or confidence, a generative model may be used to generate tokens (e.g., words and phrases) from the content (e.g., information from news articles, job postings, website content, etc.) in the knowledge structure 2900 associated with an organization or individual, whereby the model can be trained (e.g., using a training set of input-output pairs) to generate content, such as headlines, phrases, sentences, or longer content that can be inserted into a message.

In an aspect, the platform 1000 each respective personalized message may be sent with a message tracking mechanism to a respective recipient of the recipient list. A message tracking mechanism may be a software mechanism that causes transmission of feedback data 1472 to the system 1400 in response to a certain triggering action. For example, a message tracking mechanism may transmit a packet indicating an identifier of the personalized message and a timestamp when the recipient opens the email. In another example, a message tracking mechanism may transmit a packet indicating an identifier of the personalized message and a timestamp when a recipient downloads an attachment or clicks on a link in the personalized message.

In embodiments, the feedback data 1472 corresponding to personalized messages sent by the system 1400 and potential responses to the personalized messages 1470 may be received by the platform 1000 and analyzed by the analytical engine 1405. The analytical engine 1404 may utilize the feedback data 1472 to identify feedback data 1472 corresponding to the personalized messages 1470 sent by the system 200. Potential responses to those personalized messages 1470 may include, but is not limited to, whether the message 1470 was opened, whether an attachment was downloaded, whether a message was responded to, tracking information, language of a potential response from the recipient, and any other information contained explicitly or implicitly in the message communications such as the time and day the message was sent, opened and replied to, and the location where the message was read and replied to. The analytical engine 1405 may perform language and/or content tests on the feedback data 1472. Language and content tests may include, but are not limited to, A/B testing, cohort analysis, funnel analysis, behavioral analysis, and the like. The results from the analytical engine 1405 may be presented to the user. The presentation of the results can be achieved using a variety of methods including, but not limited to, a web-based dashboard, reports or summary emails. In presenting the results of the analytical engine 1405 with respect to a set of personalized messages sent on behalf of a user to the user, the user may then take appropriate actions to refine his or her recipient profile 1468 and/or message template 1466. In embodiments, the CMS system 1400 may take appropriate actions by modifying future personalized messages using the results of language and content tests. The system 1400 may furthermore take appropriate actions to refine the ideal recipient profile.

In an aspect, the analytical engine 1405 may pass the feedback data 1472 to the AI/ML system 1300, whereby AI/ML system 1300 may use the feedback data 1472 to reinforce one or more models trained by the AI/ML system 1300. In this way, the AI/ML system 1300 can determine what types of recipients correlate to higher rates of successful outcomes (e.g., are more likely to open and/or respond to a personalized message), what type of events correlate to higher rates of successful outcomes, what time frames after an event correlate to higher rates of successful outcomes, what topics in the directed content correlate to higher rates of successful outcomes, and the like.

As noted above, the platform 1000, using the AI/ML system 1300, may be used to help salespeople and marketers, such as to send automatically generated emails promoting an offering, where the emails are enriched with information that shows awareness of context and includes information of interest to recipients who match a given profile. The emails are in particular enriched with text generated from the knowledge structure 2900 in which relevant information about organizations and individuals, such as event information, is stored.

In embodiments the CMS 1400 may generate subject lines, blog post titles, content for emails, content for blog posts, or the like, such as phrases of a few words, e.g., less than 5 words, about 6-8 words, about 10 words, about 15 words, a paragraph, or more, up to and including a whole article of content. In embodiments, where large amounts of reference data are available (such as where there are many articles about a company), it is possible to generate full articles. In other cases, shorter content may be generated, as noted above, by training a system to generate phrases based on training on a set of input-output pairs that include event content as inputs and summary words and phrases as outputs. As an example, company descriptions can be retrieved from the internet and used to generate conversational descriptions of companies. Inputs varied by company, as the nature of the data was quite diverse. Outputs were configured to include a noun-phrase and a verb-phrase, where the verb phrase was constrained to be in a given tense. In embodiments, a platform and interface are provided herein in which one or more individuals (e.g., curators), may review input text (such as of company websites, news articles, job postings, and other content from the knowledge structure 2900) and the individuals can enter output text summarizing the content of the inputs in the desired form (noun phrase, verb phrase). The platform 1000 may enable the client 97 to review content from the knowledge data structure 2900 as well as to search an information network, such as the CRM system 1100 or the Internet, to find additional relevant information. In embodiments, the platform 1000 may include access to data about recipients maintained in a sales database, a marketing database, a service database, or a combination thereof, such that individuals preparing output text (which in turn is used to train the natural language generation system) have access to private information, such as about conversations between salespeople and individuals in the recipient list, past communications, and the like.

In embodiments, the CMS system 1400 may include automated follow-up detection, such that variants of language generated by the model may be evaluated based on outcomes, such as responses to emails, chats and other content, deals won, and the like. Thus, provided herein is a system wherein the outcome of a transaction is provided as an input to train the machine learning system to generate content targeted to a recipient who is a candidate to undertake a similar transaction. In embodiments, outcome tracking can facilitate improvement of various capabilities of the platform 1000, such as information extraction, cleansing of content, generation of recipient profiles, identification of recipients, and generation of text. In embodiments, text generation may be based on the nature of the targeted recipient, such as based on attributes of the recipient's organization (such as the size of the organization, the industry in which it participates, and the like). In embodiments, the AI/ML system 1300 may provide for controlled text generation, such as using a supervised approach (as described in the disclosure with summarization) and/or with an unsupervised or deep learning approach. In embodiments, the system may train a model to learn to generate, for example, blog post titles, email subject lines, or the like, conditioned on attributes like the industry of the recipient, the industry of a sales or marketing person, or other attributes. In embodiments, different language variants may be generated, such as text of different lengths, text of different complexity, text with different word usage (such as synonyms), and the like, and a model may be trained and improved on outcomes to learn to generate text that is most likely to achieve a favorable outcome, such as an email or blog post being read, a reply being received, content being clicked upon, a deal won, or the like. This may include A/B type testing, use of genetic algorithms, and other learning techniques that include content variation and outcome tracking.

In embodiments, content may be varied with respect to various factors such as verb tense, sentiment, and/or tone. For example, verb tense can be varied by using rule-based generation of different grammatical tenses from tokens (e.g., words and phrases) contained in content attached to a node in the knowledge structure 2900. In another example, sentiment can be varied by learning positive and negative sentiment on a training set of reviews or other content that has a known positive or negative sentiment, such as numerically numbered or "starred" reviews on e-commerce sites or review sites. In another example, tone can be varied by learning on text that has been identified by curators as angry, non-angry, happy, and the like. Thus, variations of text having different length, tense, sentiment, and tone can be provided and tracked to determine combinations that produce favorable outcomes, such that the content generation system 1408 progressively improves in its ability to produce affecting content for communications.

In various embodiments using no supervision (e.g., unsupervised learning), as soon as the AI/ML system 13000 has anything as an output, the AI/ML system 1300 can begin collecting labels, which in turn can be used for learning. In embodiments, the system can train an unsupervised model to create a heuristic, then apply supervision to the heuristic.

In embodiments, outcome tracking may include tracking content to determine what events extracted by the information extraction system, when used to generate natural language content for communications, tend to predict deal closure or other favorable outcomes. Metrics on deal closure may be obtained for machine learning from the platform, such as one with an integrated sales, marketing and service database as disclosed herein and in the documents incorporated by reference.

In an aspect, the platform 1000 may utilize variations on timing of events that may influence deal closure and allow the client 97 to make business decisions based on information provided by the platform 1000. For instance, the platform 1000 may explore how to partition up time periods with respect to particular types of events in order to determine when an event of a given type is likely to have what kind of influence on a particular type of outcome (e.g., a deal closure). This may include events extracted by the information extraction system 1404 from public sources and events from, for example, the CRM system 1100, an email interaction tracking system, a content management system, or the like. For example, the time period during which a CTO change has an influence on purchasing behavior can be evaluated by testing communications over different time intervals, such that the platform 1000 learns what events, over what time scales, are worth factoring in for purposes of collecting information, storing information in the knowledge structure 2900 (as "stale" events can be discarded), using information to generate content, targeting recipients, and forming and sending communications to the recipients. Outcome tracking can include tracking interaction information with email systems, as described in the documents incorporated herein by reference. As examples, the AI/ML system 1300 may learn what communications to send if a prospect has opened up collateral several times in a six-month space, how the cadence of opening emails or a white paper corresponds to purchasing decisions, and the like. In another example, if an event indicates a change in a CTO, the event may be tracked to discover a rule or heuristic, such as that a very recent (e.g., within two months) CTO change might indicate difficulty closing a deal that was in the pipeline, while a change that is not quite as recent (e.g., between five and eight months before) might indicate a very favorable time to communicate about the same offering. Thus, methods and systems are provided for learning time-based relevance of events for purposes of configuration of communications that include content about the events to recipients of offers. In embodiments, the platform 1000 may vary time windows, such as by sliding time windows of varying duration (e.g., numbers of weeks, months, or the like) across a starting and ending period (e.g., one-year, some number of months, multiple years, or the like), before or after a given date, such as a projected closing date for a deal, or the like. The platform 1000 can then see what happened at each point of time and adjust the sizes of time windows for information extraction, recipient targeting, message generation, and other items that are under control of the platform 1000, including under control of machine learning. Thus, the system can run varying time windows against a training set of outcomes (such as deal outcomes from the CRM system 1100 as disclosed herein) to tune the starting point and duration of a time windows around each type of event, in order to learn what events are useful over what time periods.

As noted above, win-loss data and other information from the CRM system 1100 may be used to help determine what data is useful, which in turn avoids unnecessary communication to recipients who are not likely to be interested. Thus, an event timing data set is provided, wherein varying time windows are learned for each event to determine the effect of the event on outcomes when the event is associated with communications about offerings. Outcomes can include wins and losses of deals (such as for many different elements of the systems), messages opened (such as for learning to generate subject lines of emails), messages replied to (such as for learning to generate suitable content), and the like. In embodiments, time windows around events may, like other elements, be learned by domain, such as where the industry involved plays a role. For example, the same type of event, like a CTO change, may be relevant for very different time periods in different industries, such as based on the duration of the typical sales cycle in the industry.

In embodiments, learning as described herein may include model-based learning based on one or more models or heuristics as to, for example: what types of events and other information are likely to be of interest or relevance for initiating or continuing conversations; what recipients should be targeted and when, based on industry domain, type of event, timing factors, and the like; what content should be included in messages; how content should be phrased; and the like. Learning may also include deep learning, where a wide range of input factors are considered simultaneously, with feedback from various outcomes described throughout this disclosure and in the documents incorporated by reference herein. In embodiments, learning may use neural networks, such as feed forward neural networks, classifiers, pattern recognizers, and others. For generative features, such as natural language generation, one or more recurrent neural networks may be used. The system may run on a distributed computing infrastructure, such as a cloud computing architecture.

In embodiments, content generated using the system, such as directed content enriched with information extracted by the information extraction system and stored in the knowledge structure 2900, may be used for a variety of purposes, such as for email marketing campaigns, for populating emails, chats and other communications of salespeople, for chats that relate to sales, marketing, service and the like, for dialog functions (such as by conversational agents), and the like. In embodiments, content is used in conjunction with a content management system, a customer relationship management system, or the like, as described throughout this disclosure and in the documents incorporated by reference herein.

Sales Coaching Feature

In embodiments, the platform 1000 is configured to allow for sales coaching. Conventionally a supervisor may review a sales call or message with a salesperson, such as by playing audio of a call or reviewing text of an email. In embodiments, audio may be transcribed and collected by the information extraction system disclosed herein, including to attach the transcript to the knowledge structure 2900. The transcript may be used as a source of content for communications, as well as to determine scripts for future conversations. As noted above with respect to variations in language, variations in the script for a sales call may be developed by the natural language generation system, such as involving different sequences of concepts, different timing (such as by providing guidance on how long to wait for a customer to speak), different language variations, and the like. Machine learning, such as trained on outcomes of sales conversations, may be used to develop models and heuristics for guiding conversations, as well as to develop content for scripts.

Content Assistance

In embodiments, the CMS system 1400 may be used to populate a reply to an email, such as by parsing the content of the email, preparing a reply and inserting relevant content from the knowledge structure 2900 in the reply, such as to customize a smart reply to the context, identity, organization, or domain of the sender. This may include allowing a recipient to select a short response from a menu, as well as enriching a short response with directed content generated by the content generation system 1408 using the knowledge structure 2900.

In embodiments, the CMS system 1400 may be used in situations where a user, such as a sales, marketing, or service person, has a message template, and the system is used to fill in an introductory sentence with data that comes from a node of the knowledge structure 2900 that matches one or more attributes of the targeted recipient. This may include taking structured data from the knowledge structure 2900 about organizations and populating a sentence with appropriate noun phrases and verb phrases (of appropriate tense).

In embodiments, the system 200 may provide an activity feed, such as a recommended list of recipients that match timely event information in the knowledge structure 2900 based on a pre-existing recipient profile or based on a recipient profile generated by the system as described in the disclosure. The system may recommend one or more templates for a given recipient and populate at least some of the content of an email to the recipient. In embodiments involving email, the platform 1000 may learn, based on outcomes, such as deals won, emails opened, replies, and the like, to configure email content, to undertake and/or optimize a number of relevant tasks that involve language generation, such as providing an optimal subject line as a person types an email, suggesting a preferred length of an email, and the like. The platform 1000 may look at various attributes of generated language in optimizing generation, including the number of words used, average word length, average phrase length, average sentence length, grammatical complexity, tense, voice, word entropy, tone, sentiment, and the like. In embodiments, the platform 1000 may track outcomes based on differences (such as a calculated edit distance based on the number and type of changes) between a generated email (or one prepared by a worker) and a template email, such as to determine the extent of positive or negative contribution of customizing an email from a template for a recipient.

Chatbots

In embodiments, the platform 1000 may be used to generate a smart reply, such as for an automated agent or bot that supports a chat function, such as a chat function that serves as an agent for sales, marketing or service. For example, if representatives typically send out a link or reference in response to a given type of question from a customer within a chat, the platform 1000 can learn to surface the link or reference to a service person during a chat, to facilitate more rapidly getting relevant information to the customer. Thus, the platform 1000 may learn to select from a corpus a relevant document, video, link or the like that has been used in the past to resolve a given question or issue.

In embodiments, the platform 1000 may automatically detect inappropriate conduct, such as where a customer is engaged in harassing behavior via a chat function, so that the system prompts (or generates) a response that is configured to draw the inappropriate conversation to a quick conclusion, protecting the representative from abuse and avoiding wasting time on conversations that are not likely to lead to productive results.

In embodiments, the platform 1000 may be used to support communications by service professionals. For example, chat functions of the platform 1000 are increasingly used to provide services, such as to help customers with standard activities, like resetting passwords, retrieving account information, and the like. In embodiments, the platform 1000 may serve a relevant resource, such as from a knowledge structure 2900, which may be customized for the recipient with content that is relevant to the customer's history (such as from a CRM system) or that relates to events of the customer's organization (such as extracted by the information extraction system).

In embodiments, the platform 1000 may provide powerful features for service professionals of the client 97 when interfacing with the client's customers 98. For example, when a customer 98 submits a support case, or has a question, the platform 1000 may use stored customer data around the customer and events about their account (e.g. what the customer has done before, product usage data, how much the customer is paying, and the like) in order to provide recommendations about how the service professional can formulate an effective response, whether it been in email, SMS, chatbot, messaging channel or phone. Over time, service outcomes, such as ratings, user feedback, measures of time to complete service, measures of whether a service ticket was opened, and others may be used to train the platform 1000 to select appropriate content, to generate appropriate language and the, in various ways described throughout this disclosure.

Outcomes may further include one or more indicators of solving a customer's problem, such as the number of responses required (usually seeking to keep them low); presence or absence of ticket deflection (i.e., avoiding unnecessary opening of service tickets by providing the right answer up front); the time elapsed before solution or resolution of a problem; user feedback and ratings; the customer's net promoter score for the vendor before and after service was provided; one or more indices of satisfaction or dissatisfaction; and the like.

FIG. 15 illustrates a method for generating personalized messages on behalf of a user. In embodiments, the method is executed by the CMS system 1400 of the platform 1000. At step 1510, the system obtains a recipient profile and message data. In embodiments, the message data may include a message template and/or an objective of the message. The message data may be received from a user of the system and/or derived by the system. For example, in some embodiments, the client 97 may provide a message objective and/or the message template. In some embodiments, the client 97 may provide a message object and the system may generate the message template. In embodiments, a recipient profile may indicate one or more attributes of an ideal recipient of a message that is to be sent on behalf of the user. In embodiments, the system may receive the recipient profile from the user. In some embodiments, the system may determine the recipient profile (e.g., the one or more attributes) based on the message objective and/or one or more attributes of the user.

At step 1512, the system 1400 determines a recipient list based on the recipient profile and the knowledge structure 2900. In embodiments, the system 1400 may identify individuals in the knowledge structure 2900 having the one or more attributes to obtain the recipient list. In embodiments, the system may generate a lead score for individuals having the one or more attributes and may select the recipient list based on the lead scores of the individuals. In embodiments, the lead score may be determined using a machine learned scoring model employed by the AI/ML system 1300. In embodiments, the system may include individuals having the one or attributes and that are associated with a particular type of event (e.g., a change in jobs, a change in management, works for a company that recently was acquired). In some of these embodiments, the time that has lapsed between the present time and the event is taken into consideration when determining the recipient list.

At step 1514, the system 1400 determines, for each individual indicated in the recipient list, entity data, event data, and/or relationship data relating to the individual or an organization of the individual. In embodiments, the system may retrieve the event data, entity data, and/or relationship data from the knowledge structure 2900. For example, the system may begin with an entity node of the individual and may traverse the knowledge structure 2900 from the entity node via the relationships of the individual. The system may traverse the knowledge structure 2900 to identify any other entities, relationships, or events that are somehow related to the individual and/or entities that are related to the individual. For example, the system may identify information about the individual such as the individual's organization, the individual's educational background, the individual's, the individual's recent publications, news about the individual's organization, news mentions of the individual, and the like.

At step 1516, the system generates, for each individual indicated in the recipient list, a personalized message that is personalized for the individual based on the entity data, event data, and/or relationship data relating to the individual or an organization of the individual. In embodiments, the system generates directed content for each individual in the recipient list. The directed content may be based on the entity data, event data, and/or relationship data relating to the individual and/or the organization of the individual. In embodiments, the system may employ natural language generators to generate the directed content using entity data, event data, and/or relationship data. In embodiments, the system may employ a generative model to generate the directed content based on the entity data, event data, and/or relationship data. In embodiments, the system may, for each individual, merge the directed content generated for the individual with the message template to obtain a personalized message.

At step 1518, the system provides the personalized messages to the recipient in accordance with an aspect of the present disclosure. In embodiments, the system 1400 may provide the personalized messages by transmitting each personalized message to an account of the individual for which the message was personalized. In response to transmitting a personalized message to an individual, the system may receive feedback data indicating an outcome of the personalized message (e.g., was the message opened and/or responded to, was a link in the message clicked, was an attachment in the message downloaded. The system may use the feedback data to reinforce the learning of one or more of the models described in the disclosure and/or as training data to train new machine learned models. In embodiments, the system may provide the personalized messages by transmitting each personalized message to a client device of the user, whereby the user may approve a personalized message for transmission and/or edit a personalized message before transmission to the individual.

Reporting System

Referring back to FIG. 1, the platform 1000 includes a reporting system 1900 that allows users to create different types of reports (e.g., custom reports) using various data sources associated with a client's business, including data sources corresponding to custom objects defined with respect to the client's business and/or any default objects that may be maintained with respect to the client's business.

One benefit of custom reporting may be that users are provided greater leeway in framing an inquiry of a report, which may allow for a much wider range of data to be used to generate reports. For instance, a client may wish to view a report that depicts how many customers that have made multiple purchases with the client have submitted customer service tickets. Furthermore, the user may break down the results of the report by the type of ticket (e.g., delayed shipping, malfunctioning product, missing parts, or the like). In example embodiments, the reporting system 1900 may leverage a schema layer that may operate on a client's respective ontology to determine data types of object(s) and event properties and associations between the client's objects and/or events to support the generation of custom reports in a flexible and schema-agnostic manner.

In example embodiments, the reporting system 1900 may provide a graphical user interface (GUI) to a user via a client device 97, where the user may select a reporting type from a set of different reporting types that may be supported by the reporting system 1900. Examples of reporting types may include, but may not be limited to, single object reporting, cross-object reporting, funnel reporting, attribution reporting, and/or custom reporting. In single object reporting, the user may select a single object/data source to generate a report on, such that the report may be generated only from properties and events that are associated with the selected object. In cross-object reporting, the user may select two data sources (e.g., objects) and the user may select a report based on the properties and/or events implicated by the intersection of the two data sources.

In funnel reporting, a user may select a specific funnel report from a curated set of funnel reports. As previously mentioned, a funnel report may be generated based on a predetermined set of sequential database queries (e.g., show contacts that may be engaged with the client via a website, then purchased a product/service, and then wrote a review). In attribution reporting, the client 97 may select an attribution report from a curated set of different types of attribution reports. As described in the disclosure, different types of attribution reports may visualize a correlation of revenue to different marketing efforts of the client. According to some example embodiments of custom reporting, the client 97 may select a set of data sources from a set of available data sources and the reporting system 1900 may generate a wide array of non-opinionated user configured reports based on the set of data sources and the intersections thereof. In example embodiments, the available data sources from which a user may select for a custom report may include data sources relating to default objects, custom objects, and/or events that may be tracked on behalf of the client.

As mentioned, a custom report may include a visualization (or "chart") that may be generated by the reporting system 1900 based on a set of data sources selected by the user, where the selected data sources may include object properties and/or event properties maintained by the platform 1000 on behalf of the client. Examples of the visualization may include, but may not be limited to, a graph, a histogram, a pie chart, and/or the like. In some example embodiments, when the user selects a custom reporting feature, the reporting system 1900 may determine and display a set of supported data sources, from which the user may select a primary data source and zero or more secondary data sources. In example embodiments, a primary data source may be an intended focus of the report and the secondary data sources may correspond to objects and/or events that may be directly related to the primary data source. In some example embodiments, the reporting system 1900 may allow a user to select up to a maximum number of secondary data sources (e.g., up to five secondary sources).

For example, a client may use the platform 1000 in connection with a car dealership and may have an ontology that may define a "vehicle" custom object that may be related to a "deals" object and a "contact" object, as well as one or more event records (e.g., a vehicle event object that may define a set of different events that may be recorded with respect to a vehicle instance and/or a contact event record that may include a "sale event" that is also associated with a vehicle that is purchased during the sale event). In this example, a user may wish to view a report that graphs how many vehicles were sold each month in the previous year and may wish to further view how many of each type of model were sold or the color breakdown for the vehicles sold each month. In this example, the user may select a "vehicle" data source corresponding to a "vehicle" custom object and may further select one or more sales-related secondary data sources. In this example, if the user wishes to view reports relating to sales of vehicles by color or by model, the user may select the vehicle data source as the primary data source and then may select deals as a secondary data source, which may allow the user to configure the desired report.

In example embodiments, the reporting system 1900 may present a data set selection GUI to a user that allows the user to select one or more data sources. In example embodiments, the reporting system 1900 may prune the available data sources from which the user may select the secondary data sources based on the selected primary data source. In example embodiments, the reporting system 1900 may determine which data sources may be selected as secondary data sources based on the objects and/or events that may be related to the primary data source. As the client 97 selects the primary data source (e.g., vehicles), the reporting system 1900 may constrain the available data sources that may be selected as a secondary data source based on the associations between the primary object corresponding to the primary data source and any other objects and/or events that may be related with the primary object. For example, when the user selects a "vehicle" data source, the reporting system 1900 may identify associated data sources vis-à-vis the objects and events that may be associated with the vehicle object, e.g., deals, ads, contacts, tickets, and the like. In this way, a user may request to create reports that may visualize properties and/or events that may relate to vehicles, deals (e.g., sales/leases of vehicles), and/or contacts. In response, the reporting system 1900 may then constrain the available data sources that the client may select for customization of the report such that the constrained set of data sources may be data sources that correspond to the objects and/or events that may be directly related to the primary data source (e.g., as defined in the client's ontology 2402). The user may then select a set of secondary data sources from the constrained set of data.

In response to the user selecting a primary data source and zero or more secondary data sources, the reporting system 1900 may then provide a mechanism (e.g., a report configuration GUI) that allows the user to configure a custom report. In configuring the custom report, the user may select a type of chart (or "visualization") that may depict the data in the report, assign properties from the selected data sources to different components of the selected chart, aggregate/group one or more of the properties, and/or apply filters to the assigned properties. In response, the reporting system 1900 may generate and execute a report plan based on configuration parameters provided by the user, where the report plan may include pre-query database operations (e.g., join operations on one or more columns of two data sources or the like), query database operations (e.g., select clauses, where clauses, and/or the like), and/or post query database operations (e.g., sum operations, average operations, count operations, and/or the like). In some example embodiments, a report plan may be a structured query language (SQL) query that may include pre-query database operations, query database operations, and/or post query database operations. In these example embodiments, the reporting system 1900 may generate an SQL query and may query the data warehouse or data lake using the SQL query, where the results of the SQL query may be used to generate visualized reports.

In example embodiments, the user may select a type of chart from a set of available charts. Examples of the types of charts that a user may select from include, but may not be limited to: histograms, bar charts, pie charts, doughnut charts, line graphs, sunburst diagrams, or the like. The reporting system 1900 may then determine the reportable properties that may be assigned to the different components of the selected chart. In example embodiments, the reporting system 1900 (or a supporting service) may leverage the data types of each type of property that may be referenced by the selected data sources to determine the properties that may be reported on and/or assigned to a respective component of a selected chart. In some example embodiments, the user may instruct the reporting system to group or aggregate certain properties, so that the results of grouping or aggregation may be assigned to certain components of the selected chart. For instance, if the user selects a bar graph, the reporting system 1900 may determine the types of data that may be assigned to the x-axis and the y-axis of the graph, such that a user may only assign certain types of properties to the x-axis or the y-axis. As may be appreciated, in a bar graph the y-axis may be typically a numerical value, while the x-axis may be typically a category (e.g., day, month, individual, grouping, or the like). Thus, any property that may be assigned to the y-axis may be a numerical value (e.g., an integer, a decimal, or the like), while the property that may be assigned to the x-axis may be categorical. It may be noted, however, that some properties that are not necessarily numerical may be aggregated to obtain a numerical value that may be assigned to the y-axis. For instance, even though aggregated sales volume data may not be explicitly maintained on behalf of the client, sale events from a particular period of time may be aggregated to determine a number of sales that occurred over the period of time.

Continuing the car dealership example above, the user may assign "count-vehicle sales" to the y-axis and "sale date-monthly" to the x-axis, such that the resultant chart may depict the number of vehicles that were sold each month that the sales data tracked. In some example embodiments, the reporting system 1900 may determine that sale events include a date property, which may be a "date" data type. In example embodiments, the reporting system 1900 may apply a rule that permits dates to be grouped by week, month, quarter, or year. In example embodiments, the reporting system 1900 may apply another rule that says events may be aggregated. Thus, in an example report, the reporting system 1900 may group sale events by the month in which the sale events took place and then, for each month, the sale events may be aggregated to determine the number of vehicle sales for the month. In example embodiments, the reporting system 1900 may constrain the available data types that may be assigned to a chart component based on the data type that was assigned to another component of the chart. For instance, in selecting "sale date-monthly", the reporting system 1900 may constrain the available data types to "number of vehicles sold", "number of vehicles leased", "number of vehicles test driven", and the like. Had the user selected "salesperson" for the x-axis, the reporting system 1900 may have constrained the available data types to a different but potentially overlapping set of data types (e.g., "number of vehicles sold", "number of customers engaged", "number of complaints", "emails sent", or the like).

In example embodiments, the user may select a property type to break down the depicted information in a chart. For example, if the user has assigned "vehicle sales-monthly" to the x-axis and "number of vehicles sold" to the y-axis, the user may select "model type" to break down the data, such that each bar in the depicted bar graph may be broken down by vehicle model to show how many of each vehicle model was sold during that month. In some of these example embodiments, the reporting system 1900 may determine the associations between different types of properties to determine whether a particular component may be broken down by a particular property type.

In example embodiments, the reporting system 1900 may allow users to apply filters to the properties applied to chart components. In example embodiments, the types of filters that may be applied to a particular property may be based on the data type of the property. For example, the user may filter the "sales dates-monthly" to sales before Jan. 1, 2020 or between the dates of Jan. 1, 2019 and Dec. 31, 2019. In another example, the user may filter a "number of sales" property by model type or by vehicle color.

In example embodiments, the reporting system 1900 may generate a report plan based on report configuration parameters 1920 (e.g., chart selection, property assignments, filters, aggregations, and/or groupings) provided by the client. The report plan may include a set of database operations that may be performed with respect to the selected data sources, including pre-query operations (e.g., join operations on one or more columns of two data sources or the like), query operations (e.g., select clauses, where clauses, and/or the like) and/or post query operations (e.g., sum operations, average operations, count operations, and/or the like).

The reporting system 1900 may then provide report data to the requesting client 97 based on the results of the report plan. In example embodiments, the report data may include a template for displaying the selected chart and data for parameterizing the selected chart based on the results database operations and any post-query processing. The platform 1000 may then display the selected chart to the client 97. Once the report is generated, the client 97 may continue to filter the report and/or change the properties that may be assigned to the chart components. In example embodiments, the reporting system 1900 may allow the client 97 to share and/or export the report to others using the platform and/or to third party integration tools 5000.

Figure 17:
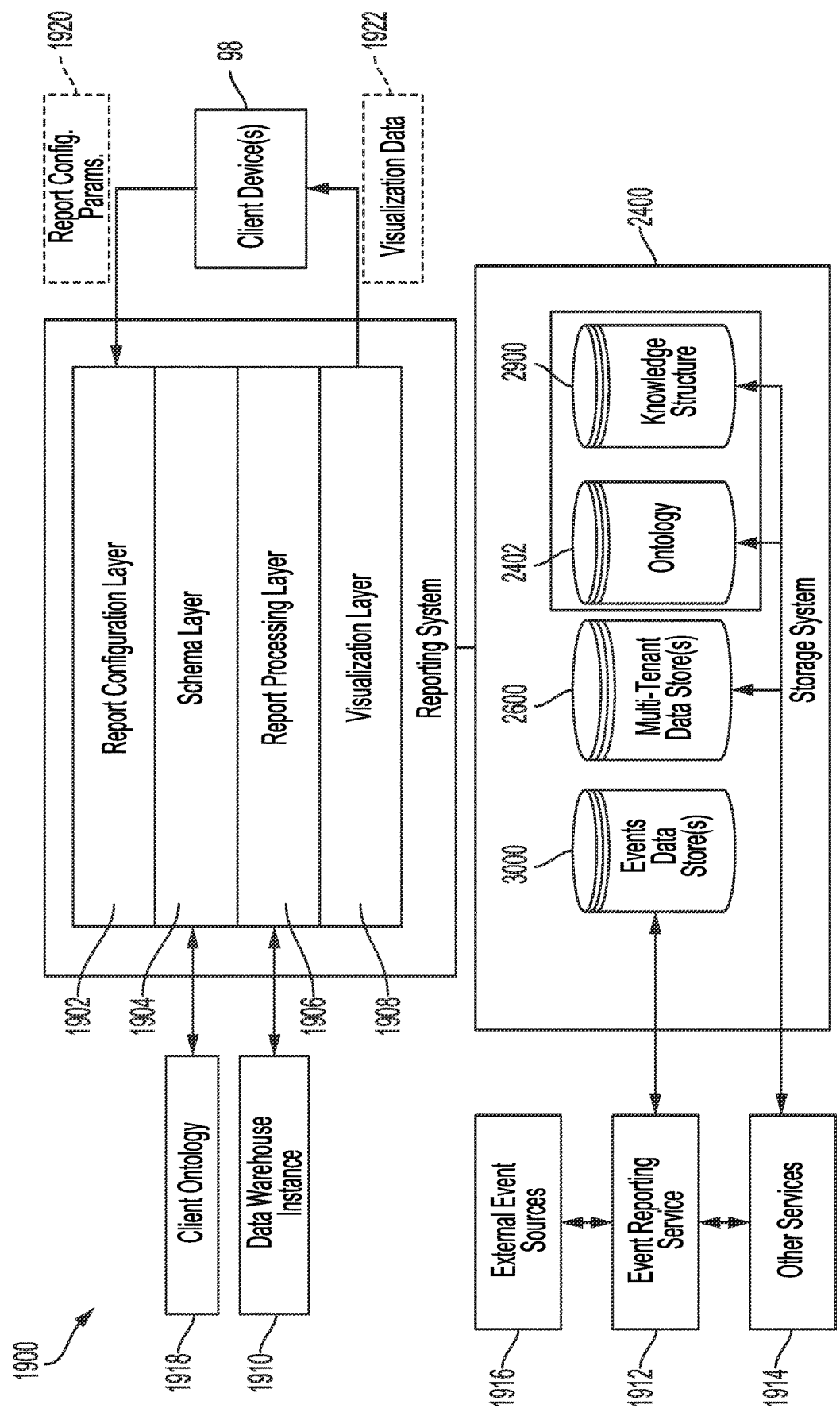
FIGS. 17-19 are block diagrams illustrating examples of computing environment wherein one or more of the provisions set forth herein may be implemented.

FIG. 17 illustrates a more detailed description of the reporting system 1900 in accordance with an aspect of the present disclosure. As shown in FIG. 17, the reporting system 1900 may include or leverage a report configuration layer 1902, a schema layer 1904, a report processing layer 1906, and a visualization layer 1908. It is noted that the various layers of the reporting system 1900 may be embodied as computer-readable instructions that may be executed by a set of one or more processors. In example embodiments, the reporting system 1900 may be configured as part of a microservice architecture, such that the reporting system may be accessible by other services of the platform 1000 and may access various services of the platform 1000.

In an aspect, the schema layer 1904 of the reporting system 1900 may include computer-executable instructions that may be configured to request schema services from an object schema service or schema service of the platform 1000 or another schema service external to the platform 1000 when facilitating the generation of reports by the reporting system 1900. In some example embodiments, the schema layer 1904 may be configured to perform the object schema services independently. For purposes of explanation, descriptions of operations and functions performed by the schema layer 1904 may include operations that may be performed by the object schema service and/or the schema layer.

In example embodiments, the reporting system 1900 may interface with a storage system 2400 of the platform 1000, which may be accessed to configure and serve data to reports generated by the reporting system 1900. In example embodiments, the storage system 2400 may store the event data store(s) 3000 that stores event instances and/or event records, an ontology data store 2402 that stores client ontologies 1918 of various clients of the platform 1000, the knowledge structure 2900 that may store instances of the client's objects and events, and a multi-tenant data store(s) 2600. As shown, in example embodiments, the ontology data store 2402 and the instances knowledge structure 2900 may be part of the knowledge data structure(s) 2900 of the storage system 2400. In example embodiments, the reporting system 1900 may be configured to access a data warehouse instance (e.g., a data warehouse instance), whereby the data warehouse instance may store a query-able knowledge structure 2900 which the report processing layer 1906 may access and query in response to determining a report plan. The data warehouse instance may be stored in the storage system 2400 of the platform 1000 or may be hosted by a third party and accessed via a network using an API or other suitable mechanism.

In some example embodiments, an event reporting service 1912 of the reporting tool 1900 may monitor for and record events in the event data store(s) 3000. In an aspect, the event reporting service 1912 may be configured to execute a set of listening threads on behalf of a client. In example embodiments, a listening thread may listen for one or more specific types of data that may be generated or otherwise provided by other services 1914 of the multi-business platform and/or external systems.

Returning to the yoga example, a listening thread that may be configured with respect to a yoga studio may listen for payments that are processed on behalf of the yoga studio. Each time a payment is processed on behalf of the yoga studio, a payment service 1800 of the platform may issue a payment notification of the payment to the event reporting service 1912. In this example, the payment notification may indicate the customer that made the payment, the offering (e.g., item(s) that was/were purchased and a price), and any other suitable data. In response, the event reporting service 1912 may generate a payment event based on the received notification. The payment event may indicate a payment ID that uniquely identifies the payment and a date and time at which the payment was processed (e.g., a time stamp). In example embodiments, the payment event may include additional data (e.g., a payment type, a sale location, or the like). In example embodiments, the event reporting service 1912 may store the event in the event data store(s) 3000 and may associate the payment event with one or more event records in the knowledge structure 2900. For example, the payment event may be associated with a contact event record corresponding to the customer who made the purchase, a product or service event record corresponding to the item that the payment was made for, and/or any other relevant event record. In this way, the event record may be associated with multiple objects within the client's data in a unified manner, thereby facilitating complex reporting features. In example embodiments, the event records that are stored in the event data store(s) 3000 and the associations thereto may be copied into the data warehouse instance 1910, such that the data warehouse instance 1910 may be queried by the reporting system 1900 when processing report requests. While the foregoing example of events centers around payments, the event reporting service 1912 may be configured to report other types of events as well.

As the various services 1914 of the platform 1000 write certain types of data to the knowledge structure 2900 or other databases, the event reporting service 1912 may generate event records corresponding to the data being written. Examples of events may include, but may not be limited to, an electronic message being sent to a contact, a contact opening an electronic message, a contact clicking on a link in an electronic message, a contact responding to an electronic message, a contact sharing a link contained in an electronic message, a contact visiting the client's website, the initiation of a new ticket by a customer, a customer service representative contacting a contact, an action being taken with respect to the ticket, the issue corresponding to the ticket being resolved, a ticket being closed, feedback being provided by a contact, a credit card payment being processed, an ACH payment being processed, a one-time payment being processed, a payment being made for a subscription, a deposit being processed, a refund being processed, a payment being declined, and the like. Furthermore, to the extent that a client has configured custom objects, the event reporting service 1912 may monitor for and record events relating to the custom objects.

In example embodiments, the report configuration layer 1902 may provide one or more GUIs that allow a user to request and configure different types of reports. In some of these example embodiments, the report configuration layer 1902 may instruct the schema layer 1904 to identify the data sources that may be selected to generate a report, and once the user has selected the data sources and the type of report that will be generated, the types of properties may be selected by a user to parameterize the report. In example embodiments, the report configuration layer 1902 may receive a set of report configuration parameters 1920 from the user via the one or more GUIs. In example embodiments, the report configuration parameters 1920 may include a chart type selection that indicates the type of chart the user may like to create, one or more property assignments that may indicate the types of properties (e.g., "reporting properties") that may be assigned to respective components of the chart, break down selections that may indicate one or more properties (e.g., "break down properties") with which a chart is further broken down by, aggregation definitions that may indicate the manner by which certain properties in the chart are aggregated and/or grouped (e.g., by day, week, month, or year, by individuals or teams, by name, by letter, or the like), and/or filter definitions that may define the manner by which certain properties are filtered (e.g., before, after, or between certain dates, accounts having no less than X in revenue, or the like). In response to receiving the report configuration parameters 1920 to the report configuration layer 1902 (e.g., via the report configuration GUIs discussed in this disclosure), the report processing layer 1906 may generate and execute a report plan based on the report configuration parameters 1920. In example embodiments, the report plan may include a set of database operations that may be performed with respect to the selected data sources, including pre-query operations (e.g., join operations on one or more columns of two data sources or the like), query operations (e.g., select clauses, where clauses, and/or the like), and/or post query operations (e.g., sum operations, average operations, count operations, and/or the like). The report processing layer 1906 may output the results of the report plan to the visualization layer 1908. The visualization layer 1908 may output visualization data 1922 to the user device (e.g., user device(s) 98) from which the request to generate the report was received. In example embodiments, the visualization data 1922 may include a chart template to render the selected chart and a set of visualization parameters corresponding to the results of the report plan, whereby the template may be parameterized with the visualization parameters to render the chart to reflect the results of the report plan.

In response to the user selecting the custom reporting feature, the report request GUI may present a set of available data sources from which the user may select one or more data sources from which the report may be generated. As discussed, the available data sources that a user may select from correspond to objects and/or events that correspond to the client (e.g., a company that employs the user). In example embodiments, the schema layer 1904 may determine the available data sources for a client associated with the user. In some of these example embodiments, the schema layer 1904 may access an ontology 2402 associated with the client to identify the objects and event records that may be maintained on behalf of the client and may determine the available data sources based on the identified objects and event records, including any custom objects or custom events defined or otherwise incorporated by the client. In the illustrated example, the user may select the data sources corresponding to CRM-related objects (e.g., "contacts", "companies", "deals", "tickets"), CRM-related events, marketing related objects (e.g., "landing pages", "marketing email", "website pages", "video", "blog", "ads", or the like), marketing-related events (e.g., "form submissions" or "web activities"), sales-related objects (e.g., "products"), sale-related events (e.g., "sales-activities"), service-related objects (e.g., "conversations" or "feedback"), service-related events, custom objects (e.g., "subscriptions", "services", "company locations", as shown in the illustrated example) and/or custom events (e.g., "referrals"). It may be appreciated that the events and/or objects that are shown in relation to the "custom objects" heading may vary depending on the client's configuration.

In some example embodiments, the user initially may select a primary data source and then zero or more secondary sources. In some example embodiments, the report configuration layer 1902 may receive the primary data source selection from the user via the report request GUI. In some example embodiments, the schema layer 1904 may determine a constrained set of available data sources based on the primary data source selection provided by the user. For example, in some example embodiments, the schema layer 1904 may identify the object or event corresponding to the primary data source in the client ontology 1918 and then may determine any objects or events that may be associated with the object that corresponds to the primary data source. In some example embodiments, the schema layer 1904 may include data sources corresponding to objects and/or events that may be directly associated with the object corresponding to the primary data source in the constrained set of data sources. An object may be directly associated with another object if the object is connected in the ontology to the other object via one or more associations. In example embodiments, the schema layer 1904 may determine objects that may be directly related to a selected object vis-à-vis event records that may be related to the selected object. In these example embodiments, the schema layer 1904 may identify event records that identify the selected object as a primary object and then may determine the objects that may also be associated with the event record via an event type association.

In response to the schema layer 1904 determining the constrained set of available data sources, the report configuration layer 1902 may constrain the set of available data sources, such that the user may only select data sources from the constrained set of available data sources. In the illustrated example, the user has selected the "Services" data source as the primary data source, and the report configuration layer 1902 has grayed out any data sources that may not be combined with the "Services" data source. The user may then select any number of secondary data sources from the constrained set of available data sources. In some example embodiments, however, the reporting system 1900 may limit the number of secondary data sources that may be selected to a maximum number of secondary data sources (e.g., up to five total data sources). In this example, the client may select the "Contacts" data source and the "Companies" data source as secondary data sources. Once the user has selected the secondary data sources, the user may configure one or more reports from the selected data sources.

In an aspect, the platform 1000 is configured to have a GUI that may be presented to the client 97 in response to the client selecting a set of available data sources. In example embodiments, the reporting system 1900 GUI provides an interface by which the user may provide a set of report configuration parameters that may be used to generate a custom report. In example embodiments, the client 97 may configure a report by selecting a type of chart to visualize the report and by assigning different properties to the various fields of the selected type of chart. For example, the client 97 may select from a bar graph (vertical or horizontal), a line graph, a pie chart, a donut chart, a sunburst diagram, or the like. In the illustrated example, the user has selected a vertical bar graph as a chart type from a set of available chart types.

In response to the client's selection of the chart type, the report configuration layer 1902 may display a set of parameterizable fields to the user that corresponds to different components of the chart. In an example, the client may have selected a vertical bar graph, which includes an x-axis and a y-axis, where the x-axis depicts groupings or individual items and the y-axis depicts a numerical value. The client may then assign certain properties to different fields of the chart, whereby the client's assignments to the chart components represent the inquiry being made by the client. Additionally, in some example embodiments, the report configuration layer 1902 may allow a user to group or aggregate certain types of properties and/or apply different filters to certain types of properties based on the data types thereof and/or the manner by which the properties are related to one another. For example, strings may be tallied into values and/or may represent different groupings. Similarly, dates may be grouped into days, weeks, months, years, days of the week, or the like. In another example, a one-to-many association between a first object to a second object may indicate that the second object may be grouped under the first object. For example, if a contact object is related to a salesperson object, contacts may be grouped under the salesperson that serviced the contacts.

In example embodiments, the schema layer 1904 may determine which properties of an object may be used to filter the object based on the data type of the properties. For example, objects having properties that may be represented in dates may be filtered based on the date of each instance of the object, such that object instances may be filtered to include only objects having a date that is before a certain date, after a certain date, after a first date and before a second date, or the like. Thus, a user may request to generate a report showing all instances of sales occurring after Jan. 1, 2020, and before Jan. 1, 2021.

In some example embodiments, the report configuration GUI may be configured to depict a reportable set of properties (e.g., the left-hand column of the report configuration GUI) given the selected data sources, whereby the user can browse for different property types to report on. In some example embodiments, the user may search by a name of the property or may select one of the various data sources selected by the user and browse through the property types corresponding to the data source. For instance, in this example, the user is browsing the property types of the "Services" data source and may select from property types such as address, consultant name, description, end date, name, object ID, service owner, service type, start date, and the like. In this example, the user has selected "Name" and "[Service] Start Date".

In some example embodiments, the user may drag-and-drop a property type to the "Available Fields" section of the fields of the report configuration GUI. When a user adds a property type to the available fields section, the schema layer 1904 may determine the different ways the selected property type may be reported on given the respective data type of the property and the type(s) of data that are assignable to each column component of the selected chart type. For example, the user here has selected "Start Date" and "Name", which are explicitly defined property types, where "Start Date" may be a date data type that indicates a date on which a service was started and "Name" may be a string data type that indicates the name of a service. In example embodiments, the schema layer 1904 may be configured to identify a set of implicit properties that may be assigned to the chart components based on the data types of the selected properties and/or the relationships between the selected properties and events and/or other objects that may be related to the selected property. For instance, because the user has selected the "Name" service, the services may be tallied based on the name of each service appearing in the client's data, and therefore a "Count of Services" property may be added to the available fields. Furthermore, as the "Name" property is a property of the "Service" object, and because the contact object and service object may, for example, be associated to the service object via a service event record (e.g., to indicate a service that may be purchased by a respective company on behalf of a company), the schema layer 1904 may determine that a user may also assign a "Count of Companies" and/or a "Count of Companies" to one or more of the chart fields. In this example, the user may assign the "Start Date" or "Name" to the X-axis and one of the "Count of Services", "Count of Companies", and/or "Count of Contacts" to the Y-axis, as the former properties may be categorical properties and the latter implicit properties may be numerical values. In the illustrated example, the user has assigned "Start Date" to the x-axis and has further grouped the dates by month and has selected "Count of Services" to the y-axis. In this way, the user has requested to see the number of services that were started each month.

Furthermore, in some example embodiments, the report configuration layer 1902 may allow a user to break down a selected chart based on an additional property type, thereby allowing the user to add dimensionality to a depicted chart. For example, a bar graph may be broken down according to a specified property type, such that each "bar" of a bar graph may be segmented on counts of different instances of the specified property type. As may be appreciated, a vertical bar graph may depict respective values (e.g., counts, scores, or the like) associated with respective "buckets" (e.g., date ranges, groups, persons, or the like). When a user selects to break down the chart by an additional field, each group may be broken down by tallies corresponding to the additional field. For example, the user may break down each bar in a graph by "Name", such that each bar may be further broken down into smaller components showing the number of each type of service started in a particular month by name. It may be appreciated that different types of charts may have different fields to which properties may be assigned. In example embodiments, the schema layer 1904 may determine which property types may be assigned to the "Breakdown by" component of the chart based on the property type(s) that may be assigned to the main component(s) of the chart and the relationships that may be shared between the assigned property types. For instance, the "Start Date" property may be a service event property and the "Count of Services" may be a tally that is indicative of the number of services that were started by the client's business for a given month. As both these property types may be related to a service object and "Name" is a property type of the service object that is represented by a string, the schema layer 1904 may determine that each column in the bar graph may be broken down by the "Name" property type. Conversely, because the "Count of Services" and "Count of Companies"

are numerical values, the schema layer 1904 may prevent the user from being able to break down the columns by those properties.

In example embodiments, the schema layer 1904 may determine which data types may be assigned to different fields based on the type of chart and the data types of the properties of the selected data sources. A data type may refer to the manner by which a particular property is depicted. For instance, a property may be represented by a string, an integer, a decimal, a date, a time, or the like. The schema layer 1904 may determine a property is a value if the data type of the property is an integer or a decimal. Additionally, the schema layer 1904 may determine that a particular property may be aggregated into a numerical value (e.g., a count) when the data type of the property is a string. For example, if the properties of a Service object include "Name", the schema layer 1904 may determine that "Name" can be aggregated by grouping the instances of the Service object by "[Service] Name" and tallying the number of instances in each group to obtain a count of services for each type of service offered by the client, and ultimately, a total number of services. In this way, the custom report may allow a user to assign "Count of Services" to the Y axis field, despite the count of services not being an explicit property type that is defined with respect to the services object. Similarly, the schema layer 1904 may determine that a particular property may be grouped into months, weeks, years, or the like if the data type of the property is a date.

In example embodiments, the report configuration GUI allows a user to select a filter to apply to one or more of the chart components and to define one or more filter parameters, such that a selected filter may cause the report processing layer 1906 to filter the query results based on the filter parameters. In example embodiments, the schema layer 1904 may determine the types of filters that may be applied to a property based on the data type of the property. For instance, dates may be filtered to include instances that may happen before a particular date, after a particular date, between two particular dates, excluding certain dates, or the like. In another example, values may be filtered to include values that are less than a certain threshold, greater than a certain threshold, that fall within a defined range, that are equal to a number, or the like. In example embodiments, each type of filter may include a database operation template that defines one or more database operations and a set of parameterizable fields, such that parameterizable fields may be parameterized with the filter parameters defined by the user.

Once a user has defined the report configuration parameters (e.g., chart type, field assignments, groupings, aggregations, and/or filters), the report processing layer 1906 may generate a report plan, including pre-query operations (e.g., join operations on one or more columns of two data sources or the like), query operations (e.g., select clauses, where clauses, and/or the like), and/or post query operations (e.g., sum operations, average operations, count operations, and/or the like). In example embodiments, the report processing layer 1906 may generate the report plan based on the configuration parameters, one or more database operation templates corresponding to the configuration parameters, and the relationships between the properties assigned to the chart parameters (e.g., as defined in the configuration parameters). For example, the report processing layer 1906 may determine pre-query operations, such as whether two or more tables need to be joined based on the property types that were assigned to the selected chart components, and if so, which tables are to be joined. In response to determining that two or more tables need to be joined, the report processing layer 1906 may parameterize a JOIN clause with the names of the tables (e.g., properties) that are to be joined. The report processing layer 1906 may further generate one or more queries that may be used to query a data set (which may be the result of a JOIN operation). For example, the report processing layer 1906 may parameterize a SELECT clause that retrieves a specific set of records (e.g., rows) from one or more tables. Furthermore, if there are filters that are to be applied to a chart component, the report processing layer 1906 may generate a WHERE clause that is parameterized with one or more filter parameters. For example, if the filter is a date-based filter that filters out dates that appear before a certain date, the corresponding template may be "WHERE [Property Name]>=[FILTER_DATE]", wherein [FILTER_DATE] is defined by the user in the filter parameters with respect to a property corresponding to [PROPERTY_NAME]. In another example, if the user has selected a property type that is grouped by a certain grouping parameter, the report processing system 1906 may parameterize a GROUP BY operation based on the user selection. In another example, the report processing layer 1906 may parameterize one or more post-query operations. For example, the report processing layer 1906 may parameterize COUNT clause templates to generate counts of a selected set of records, an AVG clause to determine an average value of a certain property in a selected set of records, a SUM clause to sum all the values of a certain property in a selected set of records, and the like.

In example embodiments, the report processing layer 1906 may generate the report plan based on the parameterized operation templates and may execute the query plan with respect to the identified data sources. In example embodiments, the report processing layer 1906 may query a copy of the client's databases in the data warehouse instance 1910 using the generated report plan. In response, the data warehouse instance 1910 may return the database query results to the report processing layer 1906. The report processing layer 1906 may output the results to the visualization layer 1908, which in turn may provide report visualization data to the user device (e.g., user device(s) 98) from which the request was received.

In example embodiments, the visualization layer 1908 may retrieve a chart template corresponding to the selected chart type and may determine report data that may be depicted in the chart template. In example embodiments, the chart template may have an associated function that receives the query results and outputs a set of visualization parameters with which the chart template is parameterized. For example, in a bar graph, the visualization parameters may include the number of bars, the heading for each column, the values along the x-axis, the height of each bar, the width of each bar, the color of each bar, and the like. In another example, for a pie chart, an associated function may determine the label for each respective "slice" of the chart, an angle for each slice of the chart, and/or a color assignment for each slice of the chart. In example embodiments, the visualization layer 1908 may generate a file (e.g., a JSON file) that contains the chart template and the visualization parameters and may transmit the file to the user device of the user. In response, the user device may display the depicted report in the report configuration GUI of the platform 1000.

In example embodiments, the data warehouse instance 1910 may maintain the joined data sets in memory after a requested report has been generated, such that the user may adjust one or more of the report configuration parameters during the same reporting session without having to replicate a computationally expensive table join operation. In these example embodiments, certain adjustments to the report configuration parameters may be processed much more quickly as the relevant tables have already been joined in the data warehouse instance 1910. In adjusting one or more of the report configuration parameters, the user may select a new chart type, assign new properties to chart components (of the new chart type or the original chart type), define new filter parameters, define new aggregation parameters, and/or the like. For example, the client may select a pie chart from the available chart types and assigned "Count of Companies" to the values field and "Start Date-Monthly" to the breakdown field in the report configuration. In this example, the user may wish to see the number of companies that started a service in each month. Furthermore, in this example, the user is adjusting the aggregation parameters relating to the "Start Date" property. As shown, the user may adjust the aggregation to daily, weekly, monthly, quarterly, yearly, or the like. Assuming the user does change the aggregation parameter to "Weekly" or "Daily", the report processing layer 1906 may adjust the report plan based on the adjusted aggregation parameter and execute the adjusted report plan. The report processing layer 1906 may receive the results of the report plan from the data warehouse instance 1910 and may output the results to the visualization layer 1908. The report visualization layer 1908 may then update the visualization of the selected chart based on the updated result.

Referring back to FIG. 1, the platform 1000 includes a conversational intelligence system 2000 that may provide services related to recording and transcribing conversations and messages, such as video calls, audio calls, chat transcripts, SMS texts and/or messages, and adding these transcribed events into the platform 1000.

Figure 18:
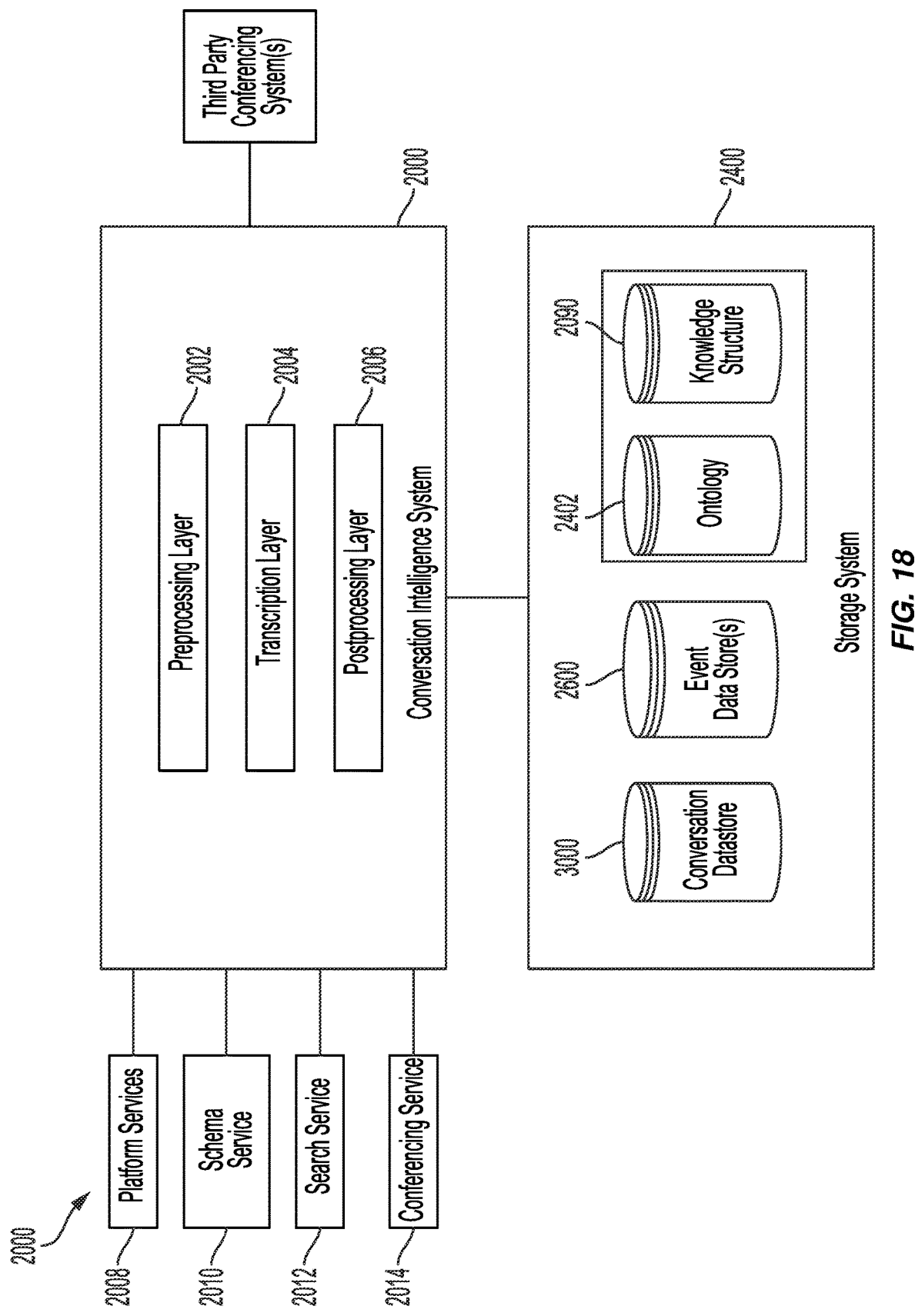

Referring now to an example implementation of FIG. 18, the platform 1000 with specific emphasis on details of the conversation intelligence (CI) system 2000. The CI system 2000 may include a preprocessing layer 2002 that may generally provide preprocessing types of functionality which may include but may not be limited to: identifying identities of speakers (e.g., using a diarization service), identifying/distinguishing speaker tracks (e.g., using a speaker track service), conversation record generation, and the like as described in the disclosure. The CI system 2000 may include a transcription layer 2004 that may include a transcription service for providing transcription of media recordings (e.g., audio recordings, video recordings, and the like) into a transcript as described in the disclosure. In other examples, the transcription layer 2004 may communicate with an external third-party transcription service 6000 that may provide a transcription of media recordings.

The CI system 2000 may include a post processing layer 2006 that may provide general post-processing types of functionality (e.g., with respect to the transcript) that may include but may not be limited to including: providing transcription hints (e.g., use a keyword service), keyword extraction, topic extraction (e.g., call topic tagging), search indexing, event generation, trigger actions (e.g., trigger actions may be initiated from a unified event), feature extraction, other metadata extraction (e.g., metadata tagging, a presentation service for displaying various information related to conversations, a calls preview/review service with regard to the transcript, a global unified search service for searching the transcript, a commenting service that allows the user to comment on the transcript, etc. as described in the disclosure.

In example embodiments, the CI system 2000 may communicate and/or utilize platform services 2008), a schema service 2010, a search service 2012, and/or a conferencing service 2014 as shown in FIG. 18. Also, in example embodiments, the CI system 2000 may use various data in the storage system 2400 to provide functionality as described in the disclosure. In particular, the CI system 2000 may utilize conversation data in a conversation datastore 6720, event data in the event data store(s) 3000, and knowledge data structure 2900. Most relevant, the CI system 2000 may use the ontology 2402 and knowledge data structure 2900.

Conversation Object

Figure 19:
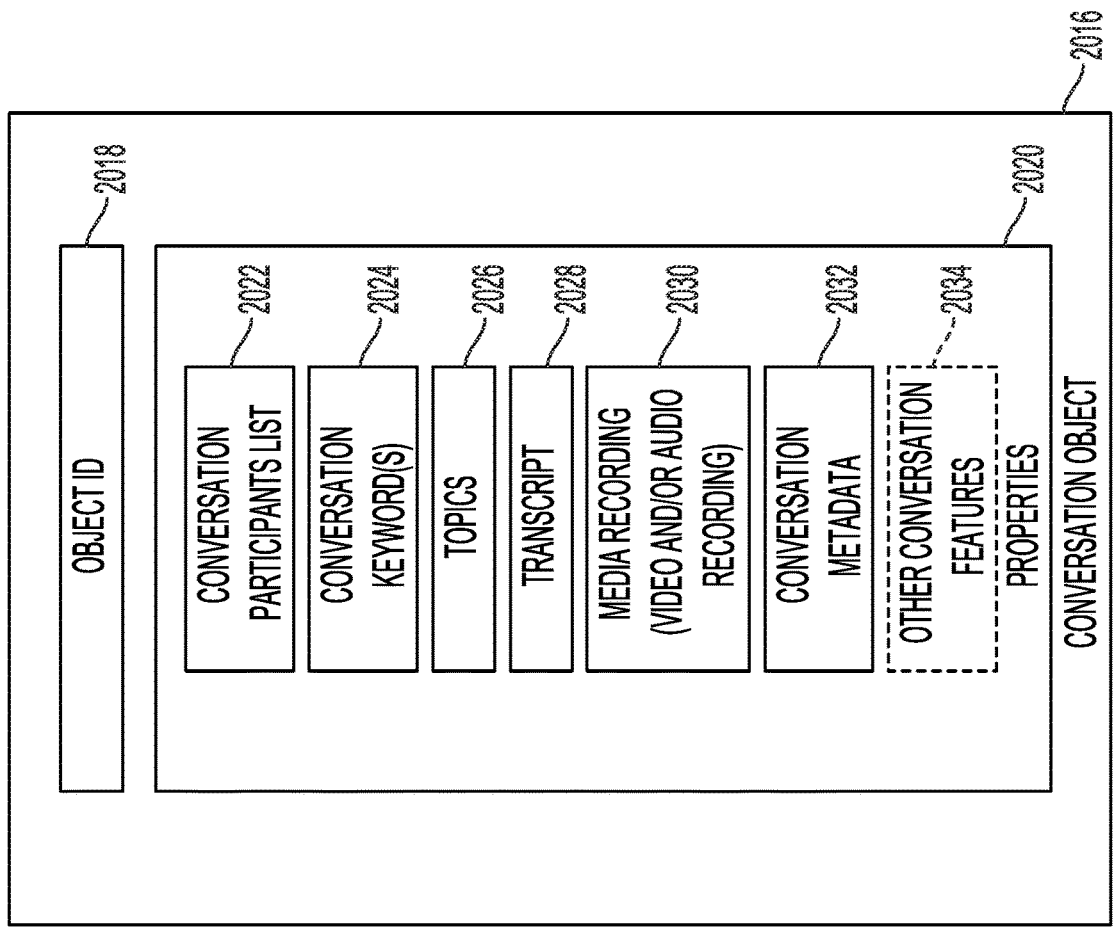

FIG. 19 illustrates an example of a conversation object 2016 (e.g., may also be referred to as a call object, a conversation record, or a call record) according to example embodiments of the disclosure. In example embodiments, the conversation object 2016 defines a set of properties of a recorded conversation (e.g., a video call, an audio call, a chat transcript, or the like). In this way, any conversations that are processed by the CI system 2000 may be represented in a client's datastores (e.g., knowledge structure 2900 and/or events data store(s) 2600) as conversation object instances (or "conversation records").

In example embodiments, the conversation object 2016 may include an object identifier 2018 (object ID) that uniquely identifies a specific conversation from other conversations and a set of conversation properties 2020. Examples of conversation properties 2020 may include, but may not be limited to, a list of conversation participants 2022, a set of conversation keyword(s) 2024, a set of detected topics 2026, a transcript of the conversation 2028 (e.g., link to a transcript), a media recording of the transcript 2030 (e.g., link to a video and/or audio call recording), conversation metadata 2032, and/or other features of the conversation 2034. In some examples, the conversation object 2016 may be tied into the platform 1000 to be used with other types of objects (e.g., core objects and/or custom objects).

In example embodiments, the conversation participants list 2022 may indicate a list of participants in a respective conversation in which the conversation participants may be listed in a conversation record by their name (e.g., a string indicating the name of the conversation participant) and/or via a reference to another record that corresponds to the respective participants. In the latter scenario, the other referenced records may be contact records, employee/salesperson records, or the like. In some example embodiments, additional information of the conversation participants may be stored in the conversation record, such as a position of each participant (or the role of the participant, such as a buyer, customer, seller, or the like). In example embodiments, the conversation participants list property 2022 may allow conversations to be searchable by one or more participants in the call (e.g., searchable transcripts of calls). The conversation list of participants 2022 may be part of the conversation object 2106 and/or may be found in the transcript. This may allow for the ability to search conversations for one or more participants.

In example embodiments, the conversation keywords property 2024 may include a list of keywords that may be extracted from the respective conversation. It is noted that keywords may be one word or multiple word phrases. In example embodiments, the keywords may be keywords that are automatically extracted from any conversation (e.g., prices, "next steps", deal-specific language, or the like) and/or keywords that may be relevant to the conversation and/or the client (e.g., competitor names, product names, person names, industry specific words or phrases, words having a term frequency-inverse document frequency (TF-IDF) score above a threshold, or the like. In example embodiments, the conversation record (or an associated record, such as an event record) may store, for each extracted keyword, metadata relating to the keyword, such as how many times the keyword was mentioned, timestamps/locations in the transcript when the keyword was mentioned, who mentioned the keyword, and/or the like.

In example embodiments, the conversation topics property 2026 may indicate the various topics that were discussed during the respective conversation. In example embodiments, topics may be general topics (e.g., small talk, sales discussion, customer service discussion, or the like) or client and/or industry-specific topics (e.g., discussions relating to products, product launches, competitors, partners, and/or the like). In example embodiments, the conversation record (or an associated record, such as an event record) may store, for each detected conversation topic, metadata relating to the topic, such as timestamps/locations in the transcript when the topic was discussed, a duration of the discussion of the topic, who participated in the discussion of the topic, and/or the like.

In example embodiments, the transcript property 2028 may include a reference to where the transcripts may be obtained. In example embodiments, the transcript property 2028 may contain a link, a memory address, or any other suitable reference that allows the CI system 2000 to retrieve a transcript of the conversation.

In example embodiments, the media recording property 2030 may include a reference to where the media conversation (e.g., audio and/or video of the conversation) may be obtained. In example embodiments, the media recording property may include one or more links, memory addresses, or any other suitable references that allow the CI system 2000 to retrieve the file(s) that contain a recording of the conversation. In some examples, the media recording property may include links to third party services 6000 and/or platforms that have the media conversation (e.g., video and/or audio recording). As discussed, in some examples embodiments, audio and/or video may be stored as multiple files. In this way, the media recording property may include multiple references, such that video files and/or audio files are retrievable.

In example embodiments, the conversation metadata property 2032 may define metadata relating to the conversation. Examples of conversation metadata 2032 may include, but may not be limited to, a date and time of the conversation, a length of the conversation, a conversation medium on which the conversation took place, and/or other suitable types of metadata. This type of information and/or data may also be referred to as or related to conversation features 2034. In some examples, the conversation metadata property 2032 may include conversation metadata such as sentiment of speakers, how fast speakers are speaking, identified good call/bad call with respect to business, and/or other coaching metrics.

In example embodiments, the conversation object 2016 may include additional or alternative conversation properties (e.g., other conversation features 2034) without departing from the scope of the disclosure.

Conversation Intelligence Process

Figure 20:
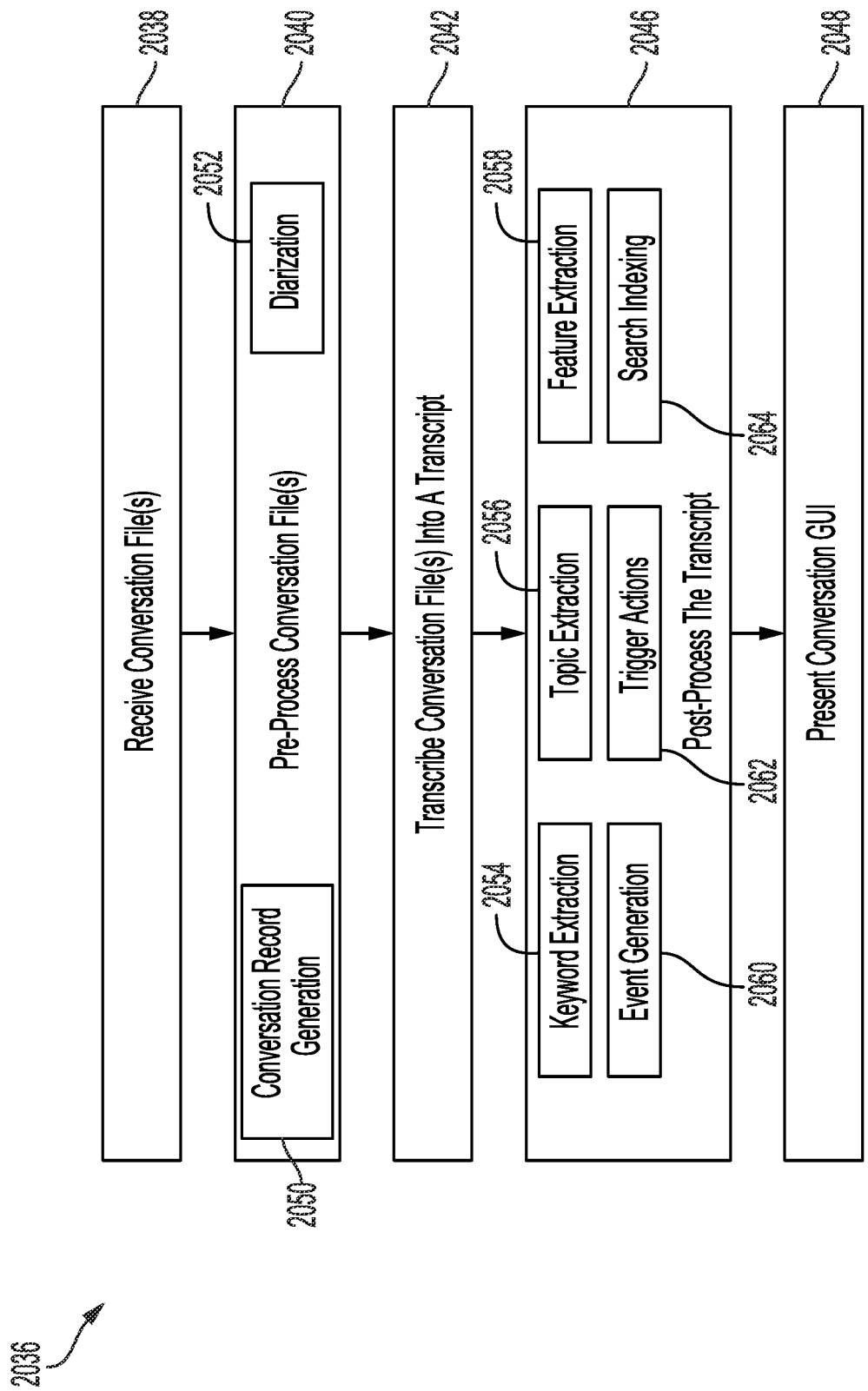
FIG. 20 is a flow chart illustrating an example of a set of operations for performing one or more of the provisions set forth herein.

FIG. 20 illustrates a method of operations for processing a conversation of the CI System in accordance with an aspect of the present disclosure. In FIG. 20, the method 2036 is described with respect to processing a video call conversation, but it is appreciated that the conversation may be an audio-only recording of a call. In some example implementations, the conversation may be a text-based chat. In these example implementations, some operations may be skipped (e.g., transcription).

At step 2038, the CI system 2000 may receive a set of one or more conversation recordings in one or more conversation files. In example embodiments, the conversation files may include one or more media files (e.g., video or audio). In some example embodiments, each media file may correspond to a different speaker in the conversation. In example embodiments, the CI system 2000 may receive the conversation files from a third-party call service, video conference service, conferencing service 2014, and/or call provider services. These third-party conferencing services may be third party conferencing system(s) 6000. Alternatively, the media file may be received from a video conferencing service 2014 of the platform 1000. In an aspect, the platform 1000 may provide automatic call recording using conferencing service 2014 to automatically record or capture calls and video conferencing. In some examples, an API may be used to ingest and transcribe third party calls/video.

At step 2040 in FIG. 20, the CI system 2000 may pre-process the conversation files to improve the transcription of the file. In example embodiments, pre-processing may include identifying identities of the speakers in the stream. In an aspect, the CI system 2000 may further obtain information relating to one or more of the speakers, such as a name of the speaker, a title of the speaker, a company of the speaker, and/or the like. As described, this may occur in the preprocessing layer 2002 at step 2040. In other example embodiments, this may occur in the postprocessing layer 2006 later at step 2064 depending on where this data may be pulled from. For example, the CI system 2000 may identify speakers and pull contact information but may need to use the transcript to complete this process. In other examples, the CI system 2000 may pull data that exists from the CRM to improve the quality of the transcripts.

In example embodiments, the CI system 2000 may further include additional information, such as "transcription hints". In example embodiments, transcription hints may be a list of words that may likely appear in the transcript, such as competitor names, a company name, names of individuals on the call or that work in the company, keywords that come up during the conversation, or the like. In some examples, there may be pre-processing of transcripts. In some example embodiments, pre-processing conversation file(s) may include performing speaker diarization 6922. In these example implementations, the CI system 2000 may operate on the received audio files to assign respective audio feeds to respective speakers in the conversation, such that the audio segments may be transcribed into transcripts that assign segments of transcribed text to the correct speaker. In this way, the transcript may be processed into a readable format. In example embodiments, the CI system 2000 may perform other pre-processing operations on the received files to improve the quality of the transcription and other actions may be performed on the received files (e.g., audio and/or video files) and the transcript. In some example embodiments, the CI system 2000 may perform conversation record generation 6920 when pre-processing the conversation file(s).

In example embodiments, the CI system 2000 may create a call engagement or a user may use an API to create a calling engagement, and then a recording URL may be transferred (e.g., including app ID, speakers, etc.). Then, the CI system 2000 may pull that calling engagement to the conversation object 2016 in the CRM 1100. The CI system

2000 may identify associations from the call or calling engagement which may be created and/or added to the conversation object 2016 by the CI system 2000. In example embodiments, the CI System 2000 may use an API (e.g., partner API) that may push call recordings (and future state transcripts) to the multi-service business platform 1000. In example embodiments, the call engagement API may be extended to accept call recording links and all calls may be added as objects, transcribed, and usable in the platform 1000.

At step 2042 in FIG. 20, the CI system 2000 may transcribe the conversation file(s) into a transcript. In example embodiments, the CI system 2000 may use a transcription service to transcribe the conversation files. In some example embodiments, the CI system 2000 may leverage a third-party transcription service, such as the speech-to-text service. In other example embodiments, the CI system 2000 may leverage a proprietary transcription service that may perform speech-to-text transcription. In example embodiments, the CI system 2000 may provide each audio file individually to the transcription service.

In some example embodiments, the CI system 2000 may further provide information determined in the pre-processing step 2040, such as identifies of the participants, information relating to the participants, transcription hints, and/or the like. In example embodiments, the transcription service may use this information to improve the quality of the transcription. In example embodiments, a natural language processing (NLP) model may be used to assist with producing a transcript. In some examples, third party services may be used for transcribing the conversations or calls. In other example embodiments, a multi-language transcript process may be used for transcribing conversations in various different languages.

In example embodiments, the call engagement may be created, at which point information related to the call engagement may be directed to a transcription process or service. Then, the transcription service may pull down a uniform resource locator (URL), and the CI system 2000 may use this data to generate the transcript.

At step 2046 in FIG. 20, the CI system 2000 may post-processes the transcript. In example embodiments, post-processing may include performing various feature extraction techniques (e.g., feature extraction actions), various recordation-related actions (e.g., conversation object or record generation), transcript processing, and/or other suitable processes. Post-processing the transcript 2046 may include performing keyword extraction (step 2054). In example embodiments, the CI system 2000 may perform various techniques to extract one or more keyword(s). In some example embodiments, the CI system 2000 may have a predetermined list of keywords that may be identified. These terms may be terms that appear in the ordinary course of business, terms that are specific to the user/client (e.g., employees, customers, competitors, partners, products, services, and/or the like), or words that may be specific to certain topics (e.g., sales-related terms, customer service-related terms, or the like). In some example embodiments, the CI system 2000 may use an analytics-based approach to extract keywords. In these example embodiments, the CI system 2000 may use various approaches to extract keywords based on the contents of the transcript or use other suitable techniques to identify keywords.

In some example embodiments, post-processing the transcript (step 2046) may include performing topic extraction (step 2056). In example embodiments, the CI system 2000 may process the transcript, and portions thereof, to classify topics that were discussed during the conversation. These may include topics that took place only during certain portions of a call or conversation. For instance, the CI system 2000 may classify a "small-talk" section of a conversation or a "negotiation" section of the call. In example embodiments, the CI system 2000 may leverage one or more topic extraction models that may be trained to classify topics in a conversation based on one or more features of the conversation. The CI system 2000 may use additional or alternative methods to extract tone.

In some example embodiments, post-processing the transcript (step 2046) may include performing additional feature extraction (step 2058). For example, the CI system 2000 may extract features such as a tone of the conversation (or a portion thereof), a pace of the conversation, and/or any other suitable features. In an aspect, post-processing the transcript may include generating one or more event notifications (step 2060). In example embodiments, the CI system 2000 may generate event notifications when certain keywords, topics, and/or other certain features are detected. In example embodiments, the CI system 2000 may generate an event notification that indicates the type of event (e.g., the keyword or topic discussed), the speaker or speakers involved in the event, and/or metadata surrounding the event (e.g., a timestamp indicating when the event was recorded in relation to the audio/transcript). In this way, events may be used to trigger workflows or prompts, to update event records, and/or the like.

In some example embodiments, post-processing the transcript (step 2046) may include triggering one or more Trigger actions (step 2062), where the actions may be an initial action in a workflow (which may be a custom workflow defined by or on behalf of the client). In these example embodiments, the CI system 2000 may be configured to trigger certain actions, tasks, and/or workflows when certain topics and/or keywords are detected. For instance, when a sale price is discussed and agreed to, the CI system 2000 may trigger a workflow that automatically generates a price quote that may be sent to a customer. Other examples of workflows and/or actions that may be triggered are discussed throughout the disclosure.

In some example embodiments, post-processing the transcript (step 2046) may include indexing (step 2064) the transcript such that the transcript may be searchable via a search service of the platform 1000. In example embodiments, the CI system 2000 may provide the transcript to a search service (e.g., search service 2012) of the platform 1000, which may index the conversation, whereby users may subsequently search across many transcripts to find conversations that discussed certain keywords and/or topics. In example embodiments, the search indexing may provide call indexing such as indexing of all calls or conversations for a user in one place (e.g., index of all team's calls viewable in the same place). As shown in FIG. 20, the CI system 2000 may present or display a conversation graphical user interface (GUI) based on the post-processing, the transcript, and/or the conversation files (step 2048).

Example Conversation Intelligence Process

In example embodiments, the generated transcript may be provided to a transcription database and the CI system 2000 may tag each conversation object with a link to the transcript database. In between, the CI system 2000 may perform various actions (e.g., identifying speakers via diarization). In some examples, the conversation (e.g., call) may be sent out as separate speaker media files for each speaker to the transcription service. As in the disclosure, the CI system 2000 may provide voice tagging such that the CI system

2000 may split up conversations. Then the CI system 2000 may match conversations to the speaker tracks based on the information the CI system 2000 has access to in relation to associated contacts and callers. When the conversation object is created, the CI system 2000 may give application programming interfaces (APIs) the ability to give hints as to who is speaking and when they are speaking. Then, the CI system 2000 may use this information when performing speaker diarization. For example, with Zoom® integration, the call may be used and provided to an API to add calling engagement with the associated contacts. Then, the CI system 2000 may pass hints as to who is talking, and the CI system 2000 may then split up these speakers to be provided to the transcription service (internal, external, or third-party service). The CI system 2000 may store the call and may send the call to the transcription service (e.g., when split up) to be transcribed.

In example embodiments, once the CI system 2000 has a transcript in the database, the transcript may be processed for keywords and may also be processed for a global search. The CI system 2000 may send the processed transcript to a search worker that may be listening for transcripts and may monitor to make the transcripts searchable on the back end. There may be several workers or services such as keyword workers or services. In some examples, there may be automatic data entry as a service as well. Each conversation may be broken into utterances. There may be different worker threads or services that may provide keywords next extraction, keyword tagging, diarization, etc. For example, there may be a portion of media (e.g., audio) that may be split up into separate speakers. Then, this media data may be sent to the transcription service (e.g., third party transcription service) such that the data may be transcribed for each speaker track separately. The transcription service may support several languages out of the box which may utilize auto-detection. For example, the CI system 2000 may auto-detect what language is being spoken using the transcription service.

In example embodiments, the CI system 2000 may use a model in providing transcription improvements to transcripts (e.g., model may be used to improve transcripts received internally or received from a third party service). This may be accomplished by providing a number of manually transcribed calls to use as data to improve transcript-related models. This may be completed for any language such as English. In some examples, several hours of audio may be used to measure transcript accuracy, and then the CI system 2000 may use the feedback to improve the quality of the transcripts.

In example embodiments, after processing, a call or conversation object instance may be created. Speakers may be identified which may be tagged and keywords may be tagged. These tags may be by utterance such that every one of these utterances may be labeled (e.g., one utterance belongs to one topic). In some examples, the CI system 2000 may use the label data sent to automate this process. Then, the CI system 2000 may aggregate from the utterance. For example, when referring to core object-type keywords (e.g., pricing), these keywords may be linked to the utterance which may be used to identify topics or other items downstream. For example, the keywords may be associated with the call in general. For example, this may be an aggregate of the types of the utterances. For example, the CI system 2000 may tag the utterances and then the CI system 2000 may take all the utterances and create a tag.

In general, there are call speakers and there are utterances. Before the transcription service (e.g., internal or third-party transcription service) is utilized, there may be speakers such that each speaker thread (e.g., speaker-related audio) may be sent to the transcription service. Then afterward, the CI system 2000 may analyze the transcript and break it down into utterances. After sending each speaker's audio, the CI system 2000 may piece these speaker transcriptions together into one transcript of utterances. For example, the speaker transcriptions may be stored separately. For example, on the back end, there may be a separate transcript file for each speaker that may be stitched together to form the transcript with the logical flow of the conversation. As is typical, the transcript may include these segments based on timestamps. The speaker utterances may be stitched together to form the transcript. These utterances with the different time stamps may be converted into one or more conversation elements or utterance elements that may be depicted. Each of these utterance elements may be clicked on to provide further information or position play recording at clicked utterance, comments may be added to these utterances, the utterances may be shared, etc.

In an aspect, the CI system 2000 may allow a client to log in and view the conversation objects 2016. The user may view information about the call such as targeted managers, who on the team is talking, and when a person speaks during a conversation. Other information that may be viewable may include call outcome and duration. In an aspect, the CI system 2000 may be used to label calls with a call title so that users may monitor what is happening in the conversation. These calls may be internal or through third party calling/messaging services 6000. The users may easily preview what is going on in the call or conversation to identify speakers. The CI system 2000 may allow the user to scan and/or read through the transcript and/or edit/modify the transcript without having to leave the context of the call. The CI system 2000 may allow the user to click into the page either from clicking view full screen in a "Call Review" window (or may be referred to as a "call preview" window) or clicking in a calls table. In example embodiments, the CI system 2000 may access this call review or preview anywhere in the CRM such that a user may view the call from other records (e.g., from a contact) without having to leave the context GUI or other display or other section of the platform 1000.

In an aspect, the CI system 2000 has a GUI for displaying a conversation view (or call view) of a transcript. The CI system 2000 may allow a user to view which speaker is talking, view the call speaker tracks, and add notes throughout a transcript in line with the media recording (e.g., video and/or audio recording). In an aspect, the CI system 2000 may provide call topic tagging (e.g., part of the call may be small talk, questions, pricing, etc.). The CI system 2000 may use one or more models utilized with the AI/ML System 1300 for providing some of these features. The "conversation view" may also show keyword tagging (e.g., indicating that "sales" was mentioned five times in the call). The GUI may include commenting on the transcript at specific points. The GUI also shows the ability to scroll through comments, click on comments, and add comments at particular points in the call. The comments may scroll with the user's view as they shift through a call (e.g., shifting with mouse or pointer in conversation display). The GUI may also show call participants and ability to search through the transcript.

In an aspect, the CI system 2000 may allow for searching across every conversation as shown in GUIs. The CI system 2000 may also provide for searching across every call and other objects. For example, searching companies, contacts, and pulling up all the conversations (e.g., calls). For example, as shown in GUI, a search of company "HubSpot" in various types of conversations (e.g., calls and/or emails). In example embodiments, this searching may be a unified search that may combine keywords with the search feature (e.g., unified search) providing interesting and related features.

In an aspect, the CI system 2000 operates with the other components of the platform 1000, which allows for connecting of conversations with reporting functionality (e.g., reporting on deals, reporting of a service organization related to conversations, etc.). In other examples, the CI system 2000 may involve triggering of keywords when the CI system 2000 may detect that specific topics, phrases, and/or words have been mentioned in conversations (e.g., "should I generate a quote for this?"). The CI system 2000 may generate a check out page based on a conversation (e.g., from a call to a closed deal with minimal effort). The CI system 2000 may be able to provide this link between the transcript and actions due to the integration and set up of the CI system 2000 with the platform 1000 having joined services.

In an aspect, the CI system 2000 may be used to generate events based on the conversation or the call. For example, this may be a generation of a keyword event such that whenever a keyword is mentioned in a transcript, a keyword event may be generated and associated with one or more event records. In some example embodiments, certain keyword events may correspond to a category of keywords (e.g., keywords grouped in a category which may relate to and/or be associated with one or more topics such as "pricing" may be a keyword category that may include groups of keywords such as "sell" or another keyword category may be "products") that may be unified in the event framework. Keywords may be definable with respect to these categories of keywords. In some examples, there may be models that may assist users in selecting keywords as the models may provide suggested keywords or transcription hints to words of interest. Categories may be created manually or by a model that may analyze conversations (e.g., conversations between a user and customers), or may use natural language understanding. Examples of categories may include, but may not be limited to, call topics, action items (e.g., next steps), competitors, products, company initiatives, etc.

In an aspect, the CI system 2000 may allow for a keyword to be defined by a user such that every time the keyword shows up in a conversation (e.g., keyword detected), the keyword may be reported. For example, calls may be used to predict categories of keywords. The CI system 2000 may use models to predict keywords, and these predicted keywords may then be used across the framework, either in reporting, workflows (e.g., email sends), etc. These keywords may be used with any combination of workflows such that phrases and/or quotes may be provided to/used to power the CI system 2000 (e.g., when a person mentions "sales", send automated emails). In some examples, statements may be made during a call that may be detected and may trigger actions (e.g., "add note or comment here"). In some examples, the CI system 2000 may use a model that may detect pricing, next steps, packaging, etc. The architecture for this model may be different from all the other call topic tagging models (e.g., architecture of the model may be different from tagging architecture).

In example embodiments, once keywords are entered, the keywords may be used in a number of ways. For example, the entered keywords may be used to improve the quality of the transcripts (e.g., improve transcription process or post-quality transcription process). These keywords and related data may be fed to the transcription service (e.g., third party transcription service API) to improve the quality of the transcripts. In another example, after processing the transcripts, the CI system 2000 may monitor for words, phrases, and/or terms that probably should be keywords and fix or adjust the transcript accordingly. These identified keywords may be used to define categories which may then be used in reporting, to run workflows on keywords, etc. The CI system 2000 may be built for utilization with specific use cases on top of the workflows such as a competitor name being mentioned on a call or the like may trigger a workflow (e.g., an email being sent). For example, the CI system 2000 may allow for setting up a follow-up quote or trigger based on a message notification (e.g., for any competitor being mentioned in a conversation, trigger message notifications). In another example, the CI system 2000 may show these mentions on the reviewed call (e.g., "you mentioned workflow six times") such that the CI system 2000 may allow users to click on the transcript and find all comments mentioning workflows in the transcript.

In example embodiments, keywords may be extracted using keyword extraction models (e.g., may use heuristics and/or other types of models for keyword extraction). There may be transcription hints to words of interest and keywords. Keywords may refer to, for example, pricing in the call, closing the deal, etc. Whereas hinting to keywords may refer to finding a keyword (e.g., company X's name) that may sound similar to another word such that this keyword may not be known in a transcript. When trained, the models may be improved accordingly with new keyword data and/or hint-related data. For example, there may be a need by a user to make sure that the word for a competitor and/or the word referring to the user's own company may be used correctly.

The CI system 2000 may provide the user with an ability to comment in the transcript. For example, the user may comment about utterances in the transcript. This layout and design of commenting may provide similar functionality to a word processing document (e.g., comments located in line with the text of transcript). The comments may be shared, and events may be triggered from comments. Comments may be added for each utterance (e.g., conversation snippet). In some examples, a comment may be added for a group of utterances. In other examples, the CI system 2000 allows for snippet or utterance sharing.

In an aspect, the CI system 2000 may generate call speaker tracks without a transcript. This may remove the costs of generating transcripts while still providing benefits of providing conversation intelligence (e.g., information from conversation) without needing transcripts to be generated. The process for generating this type of timeline and/or call speaker tracks without transcripts may be based on the CI system 2000 analysis of conversation files (e.g., media files such as audio files and/or video files). Instead of relying on the transcripts to build these timelines, the CI system 2000 may process the audio directly to build these call out speaker tracks. The CI system 2000 may show the screen with keyword information without ever needing to display a transcript.

In an aspect, the CI system 2000 is configured to allow searching in transcripts with respect to a global search service 2012. The CI system 2000 may connect the transcript to searching and indexing capabilities. The entire transcript may be indexed such that the CI system 2000 may be used to search for anything within the transcript. In terms of searching, the CI system 2000 may utilize a lexical search that may include performing exact matches of strings within queries, to documents, to search credit strips, to a truly semantic search such that when searching for "set up", the user may also find "onboarding" and other related terms. The CI system 2000 may also use machine learning and natural language processing to help sort fuzzier matches.

The CI system 2000 may use transcript searching to help implement the technology platform 1000 to do a variety of searches. In an aspect, the CI system 2000 may utilize elastic search. In other examples, the CI system 2000 may provide lexical searches. In another example, machine learning techniques may be used by the CI system 2000 allowing for dynamic and relevant search results that may use transcript searches. When searching across multiple objects, there may be a model that may provide ranking specifically for each user. This may cause some of the objects to change based on relevance (e.g., a relevance score calculated for each user). For example, a sales user may have customized unique search settings such that the sales user may prioritize searching for "tickets" over other terms whereas a CEO user may prioritize "revenue" over other terms based on these settings (e.g., search setting may be based on user's preferences, user's position, user's role in an organization, user's department in an organization, etc.). In summary, there may be query processing on the front end and/or there may be machine learning models on the back end that may help score relevance to the particular user or the context of the search and the search terms that users enter. In some examples, the CI system 2000 may allow for users to enter data for creating a model. This may be provided with conversations from media files (e.g., audio and/or video files) along with emails. From these conversations, the CI system 2000 may determine user role (e.g., product manager in the signature) such that the CI system 2000 may enter this data into the platform for each user.

In example embodiments, there may be a search infrastructure that provides indexing and latent searching. For example, the search infrastructure may provide lexical (e.g., letter by letter kind of searching) and also semantical search. In some examples, the CI system 2000 may provide fuzzy matching from conversations (e.g., based on a most recent call), then the CI system 2000 may also determine relevant scores and provide the relevant scores so that more important parts of the conversation may be pulled (e.g., the CI system 2000 may use the search service 2012 to provide searching of conversation intelligence data). For example, more important portions of the conversation for a user's particular role may be higher ranked than other portions based on various factors (e.g., based on calls that the user was on, calls that fall into the user's business unit, calls that align with user's role, more recent calls, etc.). This technique may be referred to as scoring or sort scoring.

In example embodiments, the CI system 2000 may receive a media recording such as an audio recording, a video recording, and/or combination audio recording/video recording from a third-party service such as the third-party conferencing system(s) 6000 (e.g. any third-party calling service) or an internal call or any other calling/conference service. The CI system 2000 may receive a series of video feeds that have audio associated with them. Each feed may be associated with a different speaker. These feeds may be sent to the transcription service which may be an internal service or an external service.

There may be a preprocessing stage (e.g., run via preprocessing layer 2002) which may be provided to the transcription layer 2004 (e.g., transcription service). The CI system 2000 may receive from the transcription service a transcript that may have time stamps on when specific utterances were made. Then, there may be a post processing stage (e.g., run via post processing layer 2006) where the utterances may be combined to form a transcript. The conversation object instance (or call object instance or transcript object instance) may record the properties of the conversation (e.g., the transcript may be attached to this call object or conversation object or the call/conversation object may have transcript capabilities). The conversation object or call object may either use the transcription service to create transcripts or a third-party service may send the system transcripts.

In an aspect, the platform 1000 utilizes post processing (e.g., via the postprocessing layer 2006) where the CI system 2000 may apply a set of models in conjunction with the AI/ML System 1300. Those models may be used to obtain sentiment, topic extraction, and keyword extraction aspects. Then, there may be indexing of the transcript so that the transcript becomes searchable. The transcript may be searchable and the transcript may be input to the multi-business platform 1000 (e.g., framework). The transcript (e.g., as part of the conversation object) may be reportable. There may be an option to provide coaching after the transcript has been processed which may be a downstream feature. The CI system 2000 may have the transcript and may direct the conversation or call back into the GUI. The utterances may match up which may be placed in UI elements. The utterances may be connected to the transcript such that the timestamp may associate back to the conversation or call allowing the user to move in the interface back and forth from the transcript to the call recording.

In an aspect, the CI System 2000 is configured to provide conversation intelligence from applying metadata to conversation text. This may include transcripts, emails, and/or chats. The CI system 2000 may take this text and feed it through a set of models processes by the AI/ML System 1300 to get metadata such as sentiment, topics, keywords (e.g., keyword prediction), and determination/prediction of other information. This may allow for the CI system 2000 to provide suggestions to users regarding the most accurate keywords based on the model prediction. This metadata may then be used by the Reporting System 1900 to generate reports (e.g., cross-object custom reports), by an automation service to trigger workflows that may set off a number of actions (e.g., trigger emails to customers, send out event hooks so a team may be notified of an event, etc.), or other suitable CRM-based services.

In an aspect, the CI system 2000 may provide a coaching view that may show questions asked, keywords mentioned, topics, etc. This coaching view may allow for the user to quickly locate a correct point in a call. This may relate to searchable features as well as metadata that may be used to find calls more promptly. An example of where this becomes relevant with extracting metadata may be an email parser. The email parser may read through emails in a connected inbox or logged engagements and may extract specific properties (e.g., job title, phone number, address, etc.) which may then be entered into the contact record. This may be done for any conversation (e.g., calls along with chats) but may also provide extraction of other properties. For example, the CI system 2000 may extract sentiment across emails, calls, and chats. Then, that metadata may be reported on and searched on. This metadata may also be added to the CRM objects. In some examples, the users may be coached on emails that may be around the metadata extracted. In example embodiments, the coaching tool (e.g., call coaching) may provide various features and advantages that include but may not be limited to: listening for important aspects or parts of a call using speaker tracks or the transcript, speeding up a call, sharing and searching the call, and leaving comments/notes to give feedback. In some examples, calls on mobile may be determined for providing coaching of a list of calls on mobile.

In some examples, the CI system 2000 may determine a contact based on data of speakers in conversations (e.g., conference calls). This contact may not already exist in the database but may be created as new for the speaker and associated with the speaker from the call. This extraction may be rule-based (e.g., using a large set of rules) or use a developed model. The model-based approach or rule-based approach may be built in a way such that it may be trained. For example, the rule-based approach may be built such that the rules may be trained/adjusted over time (e.g., adjusted based on trained data over time). The model may also be updated based on the changing data across the Internet as well as changing data specific to the user over time. In some examples, the model and/or rule-based approaches may utilize manual oversight or semi-supervised overview (e.g., partially automated) and in other examples, the model and/or rule-based approaches may be executed automatically (e.g., fully automated).

In example embodiments, there may be a variety of types of metadata that may be extracted. For example, metadata that may be extracted from conversations (e.g., calls) may include questions asked, numbers, call topics (broad and narrow), and the like. Call topics may refer to small talk, pricing, discovery, talking about products, etc. In other examples, call topics may refer to a discovery call, an intro call, a next steps call, and the like. Another type of metadata that may be extracted may be sentiment which may be whether the customer is happy, sad, mad, etc.

In some examples, topic metadata may be pulled and the CI system 2000 may determine correlations between specific topics (e.g., including specific words and/or phrases) with results of the customer (e.g., customer purchases a product or service). For example, a type of topic pulled may be finding the most commonly used phrases and correlating these phrases to a deal (e.g., one set of types of phrases may lead to higher revenue based on correlations). For example, a customer has a homegrown business where anytime that a sales representative said, "customers like you", it would increase the chance that a deal may close by a specific percentage (e.g., 25%). Then, the user may use this data to implement a company policy for every sales representative to start saying the phrase "customers like you". In some examples, there may be feedback from previous calls that may go through analytics of the CI system 2000 that may combine calls that resulted in sales versus calls that did not result in sales. Then the CI system 2000 may provide feature extraction from the keyword extraction to find when phrases are used (e.g., identify phrases in an analytic manner). This correlation type of analysis may utilize one model or multiple models.

In examples, any property and/or object (e.g., core object and/or custom object) in the platform 1000 (e.g., in CRM) may be extracted as metadata from conversations. For example, objects such as deals may have a decision maker where a contact is usually added. The CI system 2000 may extract this object from conversations such as phone calls and/or emails (e.g., email extraction may be a precursor to all the objects and/or properties that may be extracted) such that the decision maker may be extracted from the conversations (e.g., calls and/or emails). This may be in the form of metadata and may be based on how questions are answered. In some examples, deference may be given to certain people in the conversations and/or if a speaker/communicator recommends speaking to a particular person.

Other types of metadata that may be extracted may include money phrases, decision makers, recommended actions, and any other relevant properties and/or objects in the CRM that may be potentially extracted as call metadata. This data may be related to information in transcripts, information in emails, or other information accessible from the CRM.

In example embodiments, the CI system 2000 may also pull and provide recommended actions (e.g., as metadata) that may be mentioned in the conversation. For example, the CI system 2000 may identify the phrase "I'm going to call you tomorrow" in a call then engage the multi-service business platform 1000 to implement an action providing an invite for tomorrow. In examples, the CI system 2000 may use a tasks type of tool to provide this functionality.

In example embodiments, as part of these metadata processes, the CI system 2000 may utilize natural language processing (NLP) and natural language understanding (NLU) with models in order to understand language by leveraging the AI/ML System 1300. Feature extraction may be fed into the models which may output metadata (e.g., sentiment, decision maker is X, call topic is Y, the call topic for this particular text is Z, etc.). The NLP model may be pre trained in a variety of ways. For example, the NLP may be pre-trained by Internet data. The model may also be post-trained with framework-specific data (e.g., data in the multi-services business platform 1000 such as data in the storage system 2400). In some examples, information from a user of the platform may be used in training the model in real time. In summary, there may be three phases of pretraining the NLP which may include training from the Internet, training from the data of the multi-services business platform 1000 (e.g., framework data) and the user data, and/or customer data training (e.g., based on information from the user and/or customer and context about a particular call used to differentiate the particular user from other users).

In example embodiments related to the CI System 2000, the platform 1000 utilizes implicit ontology and the neural networks to learn the ontology 2402 automatically. This means that there may be implicit ontology in the neural network model even if it cannot be directly viewed. In some examples, users may be able to adjust and/or give hints to the models. This may be an example of how keywords may be created in the multi-services business platform 1000 such that by adding a keyword, there may be a hint to the model to bias towards one or more specific keywords.

In some examples, when there are words that sound the same (phonetically), the CI system 2000 may bias towards the word that the CI system 2000 knows is likely an intended topic. In some examples, phonetic similarity may be used to improve the quality of transcription during post processing (e.g., fix errors in the transcript). For example, the NLP may look to synonyms of words/phrases related to a specific topic (e.g., use synonym and lexical understanding to help with topics). When the CI system 2000 is processing the transcript, the CI system 2000 may know that specific words are related (e.g., king and prince may be related as words) even though these words may be lexically different which may be based on training from the Internet. This encapsulates that semantic information may be used by the NLP in identifying similarities among words, similarity of sentences to other sentences, and the like.

In example embodiments, with call topic tagging, there may be a model utilized by the AI/ML System 1300 and the CI system 2000 to provide unsupervised learning to generate clusters of topics that may then be used to train a separate model (e.g., generate the labels for topics). The CI system 2000 may then automatically add relevant labels and/or provide a capability for developers to manually review and add relevant labels. This call topic tagging of relevancy may be further verified by users.

In example embodiments, transcript quality models may be used with transcripts at preprocessing and postprocessing stages. For example, the CI system 2000 may relate to preprocessing of transcripts once the transcripts have been added to the multi-service business platform 1000. There may be several ways to improve the quality of the transcripts. For example, hints may relate to preprocessing where the hints may be sent with the audio to the transcription service. There may be some post processing as well at some point to improve transcription results from the transcription service.

In example embodiments, there may be keywords that may be interconnected with workflow, workflow triggering, and/or action triggering. This may be set up by users or may be predetermined in setup of the CI system 2000 and the platform 1000. For example, there may be alerts setup or workflow actions setup based on the automation platform of the framework (e.g., as described in the disclosure). In an aspect, keywords may be added and then the CI system 2000 communicates with portions of the platform 1000 to set up a workflow action (e.g., may send an email).

For example, a competitor may be referred to in a deal that may have a workflow action that sends an email out to customers (e.g., saying "we've noticed you spoke about the competitor, here's a discount"). In another example, the workflow action may be a notification sent to an internal team that a particular speaker on the transcript is discussing a competitive deal such that the platform 1000 may recommend extra attention on this contact speaker from the conversation. This may also be used to change the score of a deal such that the deal may need more attention, the deal may need less attention, or the deal is more or less likely to close with manual scoring. In terms of the automated approach, the user may enter keywords then the platform 1000 may send out an email digest of the relevant calls that have that keyword in them. In examples, the CI system 2000 may allow for selection of a keyword by the user to trigger an action. The automation of the platform 1000 may allow for filtering by any of the properties of the objects in the framework.

The platform 1000 may be connected to the CI system 2000 such that keywords may be created as unified events in the framework and unified events may flow the platform 1000. The unified events may be used to trigger workflow actions. As a unified event, connecting to the platform 1000 may be easily completed such that conversation objects may interact with current and future aspects of the framework.

In an aspect, when a particular keyword is mentioned, it may trigger a unified event. These unified events may refer to relatively large event records that apply to a particular type of object (e.g., user may have an event log for the user that may log several different types of events). In examples, keywords may be triggered by keyword events which may be predefined by the platform 1000 and/or some keywords may be customizable as being created by each client. The keyword events may be integrated into the broader platform which may then be aggregated in reports, in workflows, list segmentation, and other functionalities/features of the system framework or platform. In some examples, each keyword may relate to a separate unique event where each event may have different attributes that have different values. In other examples, multiple keywords may relate to the same event. A category may be supported on top of these events. In some examples, this may be used with a JavaScript Object Notation (JSON) schema where a keyword may be detected and then the property may be the word (e.g., "sell" and the category may be "pricing").

In an aspect, it may be preferred that each keyword has its own event record which may be only one type of event. For example, every time the word occurs in conversation, this may refer to one type of event with a different attribute of what the word refers to in the event. For example, out of the keyword mention event type, there may be two events for two different words (e.g., "buy" and "sell") such that these words refer to individual events that may trigger any individual automation. Keywords may be grouped with a particular event type (e.g., keyword detected) as one event type or multiple event types. For example, there may be event types such as pay queue where a page view form submission or integration event may be triggered. This event may be triggered by a next event keyword mention that may be defined with one or multiple keywords (e.g., based on developer and/or user preferences) with each word providing a trigger independently and flowing independently. In some examples, properties of keywords and/or properties of events may trigger workflows. For example, if a competitor's name is mentioned in the conversation and this attribute may be in an event, it may trigger an action such as sending an email.

In example embodiments, keywords may be grouped together such that multiple keyword events may be searched together per call (e.g., a list of keywords being tracked as mentions). This may refer to a list of all competitors which may be grouped under one category of keywords (e.g., category keyword event may include multiple keywords as being under the same category of event for keyword searches or mentions). In some examples, each user may create their own keyword events. In other examples, keywords may already be created as default keyword events or as generally recommended keywords for most users (e.g., use a model that recommends keywords for users to add). For example, there may be categories of keywords that may be suggested to users such as competitors, products, services which may vary based on the user. In this example, the model may be used to recommend categories of keywords and/or keywords themselves based on the transcript (e.g., the CI system 2000 may communicate that it detects that Company X is a competitor to user's company and asks the client whether they would like to add "Company X" in the form of a keyword suggestion). In other examples, the CI system 2000 may recommend keywords based on data in other parts of the platform (e.g., the CMS and support articles). For example, if a user has a blog discussing their products, the platform may recommend the products discussed on the user's blogs. With these examples, the CI system 2000 may include a suggestion phase where the CI system 2000 suggests keywords or keywords events (e.g., based on category of keywords and/or keywords themselves) to users to be considered for creation. The CI system 2000 may mine the transcript, email, and/or other conversation communications to identify these suggested keyword events.

For example, the word "next steps" may be set up by the CI system 2000 using keyword technology or may be created through a call topic tagging model or a next steps model (e.g., analysis and creation of keywords based on models). The call topic tagging may involve monitoring of generic topics which may be set by the user. This may be tuned over time using the AI/ML system 1300 such that some of these topics may be defaults within the CI system 2000. In general, keywords may be either defined by the user or extracted through the conversation. In some specific examples, tf-idf scores may be used to identify keywords from the transcript (e.g., a word is mentioned 10-12 times in a call but is usually mentioned a couple times or less in most conversations such that this word may be suggested as a keyword).

In example embodiments, during post processing, the call topic tagging (e.g., tagging conversation as a pricing call) may be a unified event such that the CI system 2000 may trigger a workflow. The automatic models may also be used with these events. For example, topics may be unified events that may trigger one or more workflows. The keyword events may trigger these post-conversation workflows. Unified events may provide interesting information with respect to a user's journey analytics. For example, when considering a lifecycle of a customer from a user's website to pricing call to buying a product, use of unified events may be particularly important and useful with respect to this lifecycle.

In an aspect, the CI system 2000 may pull all relevant information to be added as events which may be reportable via the reporting system 1900. The CI system 2000 may allow for cross object reports with any other object (e.g., core object and/or custom object) in the platform 1000 which may be reported as preferred by the user. These events may be aggregated in the coaching view of the platform GUI. This means that these events may be placed in the coaching GUI so that a user (e.g., manager) may select a preferred position in the call without having to listen to the entire call or search around. Related metadata may also be used by the CI system 2000 such that the user may find desired information.

In some examples, the CI system 2000 may process transcripts in bulk to find item suggestions that may be unaware to the user (e.g., a user may not necessarily know to make these suggested events, but the CI system 2000 may monitor/analyze across calls and correlate to build suggestions).

For example, this may involve an insights dashboard such as a sales AI dashboard that may provide common topics mentioned that the CI system 2000 may determine are relevant to each user. The CI system 2000 may drill down to the list of conversations (e.g., calls) to observe and analyze patterns and/or identify lists of relevant emails and/or messages. For example, the CI system 2000 may identify some deals that may be in danger of churn because conversations may include mentions (e.g., a few words) that may be detected as being relevant to the user with respect to deal concerns. The CI system 2000 may monitor across all conversations and provide analysis outside of the event frameworks. In some examples, attribution reporting may be used with the CI system 2000. For example, the events may be used when keywords are mentioned that may have a monetary value correlated to the revenue that a user's company/business earned. In general, the CI system 2000 may utilize searching, keyword integration, trigger actions, models, transcript analytics, etc. to provide these capabilities. In example embodiments, the CI system 2000 may provide general call analysis & reporting that may include searching for keywords and phrases across a user or a team's entire history of calls and may build detailed reports tracking call metrics and keyword mentions. In some examples, there may be keyword reporting where reporting on keyword mentions in transcripts may be provided in the custom report builder as described in the disclosure. For example, the "custom report builder" may be selected, then calls, keywords, and categories may be selected from data sources. The keywords may be adjusted by the user such that there may be different categories of keywords (e.g., "competitors" may be one category and a "finance" may be a second category where "finance" includes keywords such as "budget" and "funds").

In example embodiments, the platform 1000 may provide and utilize a host of models to make forecasts and predictions (e.g., predict deal scores) as well as improving accuracy of these forecasts and predictions via the AI/ML System 1300. For example, keywords may trigger a deal score to change which may be used for forecasting. The CI system 2000 may determine from one or more conversations whether a deal appears it will close or whether the deal may not close (e.g., based on a number of different factors such as tone, words that were used, and/or a combination of these factors). The CI system 2000 may also monitor frequency of touch points in making these determinations (e.g., how many emails are being sent by customer, how many phone calls from customer, and/or a combination of these actions may lead to a relatively accurate prediction). In some examples, there may be a correlation functionality engine as may be used with correlating/correlations described in the disclosure. This correlation function/engine may monitor conversation data (e.g., in the conversation datastore 3000) to find correlations between touch points in one or more conversations (e.g., frequency of words, tones, frequency of contacting, etc.) for indicating one or more predictions based on models. In examples, the models may be setup to monitor preselected correlations and/or these models may be used to identify new correlations specific to each user's conversations (e.g., properties of conversation objects). These models may be trained generally on the entire Internet but may learn to identify nuances of each particular user-based training with the user data over time.

Referring back to FIG. 1, the platform 1000 may include a workflow system 2100 in accordance with an aspect of the present disclosure. In example embodiments, the workflow system 2100 may relate to controlling, configuring, and/or executing of workflows in the platform 1000. In example embodiments, the workflow system 2100 may utilize an automation application programming interface (API) which may provide "Get" functionality (e.g., get all workflows, get a specific workflow, get current enrollments, get performance stats for a workflow, and the like), "Post" functionality (e.g., enroll an object such as a contact into a workflow, create a workflow, using webhooks in workflows, and the like), "Put" functionality (e.g., log events), and "Delete" functionality (e.g., delete a workflow, unenroll or remove an object such as a contact object from a workflow).

The workflow system 2100 may include a custom workflow actions system 2102 that may communicate with various systems, devices, and data sources according to one or more example embodiments of the disclosure. The custom workflow actions system 2102 may provide users with the ability to create custom workflow actions (e.g., custom code actions). In general, the custom workflow actions system 2102 may relate to a custom workflow action process for setting up a custom workflow action. Creating a custom workflow action may make it easier for users to integrate their services with other workflows on the multi-service business platform 1000. In example embodiments, this process may include an initial definition of a custom action that may include expected inputs and a web address (e.g., uniform resource locator (URL)) that may be requested when the custom action is executed. Users may then install an application and add the custom action to their workflows. When the workflows execute, requests (e.g., hypertext transfer protocol secure (HTTPS) requests) may be sent to the configured URL with a payload that may be configured.

In an aspect, the custom workflow actions system 2102 may allow users to define custom actions. For example, a custom action definition may include all information needed for workflows (e.g., needed for workflow system 2100) to display the custom action in a workflows application. This same definition may also specify the request format for requests coming from other services, systems, data sources, etc. in the platform 1000 as well as the handling of responses from these other services, systems, data sources, and the like. In example embodiments, the custom action definition may include: an action name (e.g., label given to the action in the workflows application) and action inputs (e.g., fields that may be filled out by a user to control the action's behavior and/or the selected values that may be included in the request that may be sent to the action web address such as "actionUrl"). The custom action definition may also include input options (e.g., define a set of valid values for the action inputs). In some examples, the input options may be optional for each field. In other examples, the input options may be either a static list or a webhook URL that may be provided. If the webhook URL is provided, the options may be fetched from that URL whenever the action may be edited by a user in the workflow actions system (e.g., workflows tool). In example embodiments, the custom action definition may also include an action web address (e.g., action URL "actionUrl") and labels. An HTTPS request may be sent to the action URL whenever the action may be executed by the workflow system 2100 (e.g., workflows tool). The request body may include information about which user the action is executing on behalf of, and what values may be entered for the input fields. The labels may be a user-facing copy that describes to the user what the action's fields may represent and what the action does. Labels may be specified in any number of languages (e.g., English, French, German, Spanish, etc.).

In example embodiments, the custom workflow actions system 2102 may provide for a variety of other processes with respect to the defined custom actions. Validating requests may be made for the custom actions. In some examples, there may be default payloads (e.g., field option fetch) such that requests to fetch options may be made when a user may be configuring a custom action in a workflow. In some examples, if there is a desire to limit the number of options that may be returned by an option fetch, a pagination cursor may be set which may instruct the workflow system 2100 (e.g., workflows tool) that more options may be loaded. The list of options may be made searchable allowing for results to be filtered by a search query (e.g., return "searchable": true). In an example embodiment, execution requests may be made when a workflow may be executing a custom action against an enrolled object. For example, there may be input fields for workflows (e.g., contact and deal workflows) such that there may be a static input field (e.g., dropdown field with options) where one field may have a value for a platform user and another field may have a value pull from a property (e.g., as selected by a user for workflows) on the enrolled object.

In example embodiments, requests made for custom actions may be customized by configuring serverless functions for the custom actions. For example, field option fetches may be customized such that there may be two hooks to customize a field option fetch lifecycle (e.g., using pre-fetch and post-fetch options functions). The pre-fetch options function (e.g., "PRE_FETCH_OPTIONS") may allow the user to configure a request that may be sent from the platform 1000 and the post-fetch options function (e.g., "POST_FETCH_OPTIONS") may allow for the user to transform responses from the user's service into formats that may be understood by the workflow system 2100 (e.g., workflows tool). In example embodiments, there may be a hook into an action execution lifecycle including a pre-action execution function (e.g., "PRE_ACTION_EXECUTION"). This function may allow users to configure requests that may be sent from the platform 1000. In example embodiments, a custom action may use a serverless function to transform a payload that may be sent to a configured action URL (e.g., "actionUrl"). When no object types (e.g., "objectTypes) may be specified, this may be available for all types of workflows.

In an example embodiment, a custom action with field dependencies and options may be fetched using an API. For example, where a widget size may depend on widget color, a user may not be able to input a value for the widget size until a widget color is selected. A widget cost may also be dependent on the widget color but may be conditional on a value that the user selects for the widget color (e.g., a user may not input a value for widget cost unless "Red" is selected as the widget color). In a blocking custom action example, a callbacks API may be used to instruct workflows to complete an action and have an enrolled object continue to next action in a workflow. In some examples, action blocks may not be specified when an action is created but may be determined by a response from a configured action URL (e.g., "actionUrl").

In example embodiments, a custom action may be published. By default, the custom actions may be created in an unpublishable state and may only be visible in a developer portal associated with the platform 1000 (e.g., platform application). To make the custom action visible, a published flag on the action definition may be initiated (e.g., made "true"). In example embodiments, the custom action may be tested such as by creating a workflow in the workflow system 2100 (e.g., workflows app or tool) and adding the custom action. In example embodiments, the custom action may be executed such that a success of the custom action may be determined by examining a status code returned. For example, the status code returned may indicate that: the action completed successfully as indicated by the status code (e.g., 2xx status codes), the action failed (e.g., there may be some example exceptions where this may be indicating retries such as 429 Rate Limited status codes that may be retreated as retries and the Retry-After header may be respected) as indicated by the status code (e.g., 4xx status codes), or a temporary problem with service (e.g., action may be retried at a later time) as indicated by the status code (e.g., 5xx status codes). In some example embodiments, retries may occur through fetching of object properties using a platform API or by calling other platform API endpoints. In example embodiments, custom actions may block workflow execution. This means that instead of executing the next action (after the custom action) in the workflow after receiving a "completed" response (e.g., 2xx or 4xx status code), the workflow may stop executing ("block") until the workflow may be instructed to continue. In example embodiments, a blocking execution may be kicked off or a blocked execution may be completed. In example embodiments where a blocking execution may be kicked off, a custom action may be blocked asynchronously. There may be an expiration that may be a default duration after which the custom action may be considered "expired". At this stage, execution of the workflow may resume and an action following the custom action may be executed even though there may not be an instruction for the workflow to continue.

In example embodiments, the workflow actions system 2102 may allow for developers to print or export outputs from their code as part of logging. It may help debug issues and may provide support for end users. In example embodiments, a function may define output fields that may be used later in the workflow. Then, the data output type (e.g., number, string, boolean, datetime, enum, date, phone number) may be selected in a user interface (UI) such as by inputting a field preferred for output. The output fields may be part of a JSON object in some examples. In example embodiments, to define data outputs that may be used as inputs in a workflow, "Data type" may be clicked from a "Data outputs" dropdown menu and type of data may be selected (e.g., name for data output may be provided in "Name" field and multiple outputs may be added by clicking "Add output"). The output from the code action may be used as input to a "copy property" action as a "copy property value" in FIG. 83. This may remove a need to make another API call to store a value as a property on an object.

In example embodiments, there may be a variety of use cases for the workflow actions system 2102. Some example use cases may include: transforming data (e.g., turning a string into a date/time object such as "date_time" or changing a formatting of a phone number), data hygiene (e.g., name capitalization, name concatenation, etc.), lead assignment, territory management, service-level agreement (SLA) management for service issues, customizing webhook payloads (e.g., change format of a request that may get made for a webhook action, and with the custom code action (and the requests library)), and/or the like. In some example embodiments, random number generator functions may be used (e.g., cryptographically secure pseudo-random number generation) such as with respect to enrolling objects into a workflow.

Figure 21:
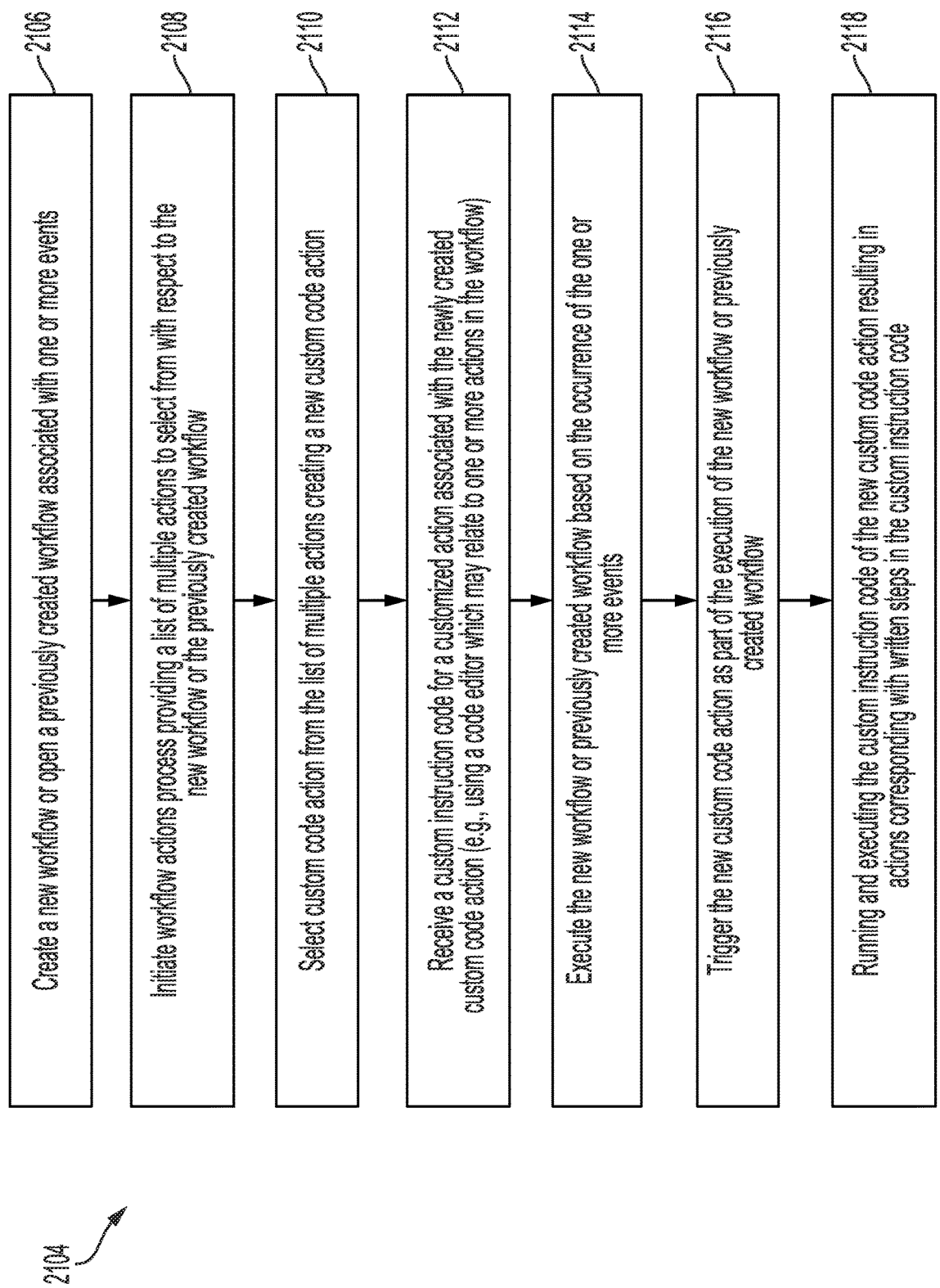
FIG. 21 is a flow chart illustrating an example of a set of operations for performing one or more of the provisions set forth herein.

Referring now to FIG. 21, there is shown a flowchart 2104 having an example set of operations for creating and using a custom workflow (specifically creating and using a custom action process such as a custom code action process). The process includes creation of a new workflow or opening a previously created workflow associated with one or more events at step 2106. A workflow actions process may be initiated providing a list of multiple actions (e.g., action types) to select from with respect to the new workflow or the previously created workflow at step 2108. A custom code action may be selected from the list of multiple actions creating a new custom code action at step 2110. Next, a custom instruction code for a customized action associated with the newly created custom code action may be received from a user (e.g., a user may use a code editor which may relate to one or more actions in the workflow) at step 2114. The new workflow or previously created workflow may be executed based on the occurrence of the one or more events at 2104. Then, the new custom code action may be triggered as part of the execution of the new workflow or previously created workflow at step 2116. Running and executing the custom instruction code of the new custom code action may result in actions corresponding with written instructions (e.g., steps) in the custom instruction code at step 2118.

In general, the custom workflow actions system 2102 (e.g., custom code workflow actions tool) may allow users to create workflows that respond to events so that the users may customize any action that they want after an event has taken place. The custom workflow actions system 2102 may function within a custom workflow actions process. Other related actions and/or functions may also be included in the custom workflow actions process. In example embodiments, events may be defined generally as some change in the platform 1000. For example, this change may be a property change on a contact or anything that may drive a list change. Then, platform 1000 may take an action on any number of user-configured actions. For example, the platform 1000 may be used to configure or set properties, send emails, send notifications, call other URLs in other companies, and the like. In example embodiments, other actions may be taken within the scope of this disclosure providing a relatively broad list of actions that may be taken. Some examples of events of extensions may include create a ticket (e.g., an issue tracking ticket such as an internal ticket or call out a webhook to a third-party company. In other examples, messages may be sent through various channels (e.g., send internal messages).

In example embodiments, the custom workflow actions system 2102 uses a custom code action. Specifically, in example embodiments, the custom workflow actions system 2102 may provide the ability for users to write their own code and may execute arbitrary logic in response to the code. This may be a graphical programming language where there may be a condition (e.g., if/then statement). The custom code action allows users to author arbitrary logic to do whatever the user wants when an action shows up (e.g., using JavaScript). There may also be data passing between actions such that one action occurs and then there may be a result from that action. This result may be passed to another second action such that the second action may act on the result that may be used as part of the input of what it may be doing. In another example embodiment, the custom workflow actions system 2102 may use formula actions which may be relatively simple custom code actions (e.g., performing or providing data hygiene processes such as capitalization of names, spell checking, etc.). These actions (and related processes) may stem from the ability to execute an arbitrary process when an action takes place.

In an aspect, the workflow system 2100 may operate with the GUI of the platform 1000 for displaying an example workflow tool which may be found under a workflows section in a top navigation tool set. This may provide a home where a visual automation builder may be used. This may allow for processes such as triggers and actions to be executed. In an aspect, the GUI of the platform 1000 displays a custom code action using custom workflow actions system 2102. In an aspect, the custom code action may provide a way for users to write and execute programming language (e.g., JavaScript) in an action.

In example embodiments, the custom workflow actions system 2102 may provide an interface (e.g., in the form of a relatively small instant virtual extranet (IVE)) that a user may use to create code (e.g., JavaScript) related to adding a function, such as a GUI for displaying an example custom code action development interface. Custom code actions may extend workflow functionality within and external to the platform 1000. In example embodiments, custom code actions may support JavaScript using a runtime framework such that when actions execute, a runtime compute may be managed through a serverless function 1000. In some examples, this may allow for the platform 1000 to operate on all of the data that currently exists in the workflow. The data that currently exists in the workflow may enroll one or more objects when the workflow may be triggered. For example, the custom workflow actions process may either enroll a contact or a deal such that all of the data about that object (e.g., contact or deal) may be made available to be able to operate on. This may occur with any action in the workflow.

In example embodiments, the GUI may have a "choose an action" interface using custom workflow actions system 2102.

In another example, the GUI may display a selection of a custom code action from the "choose an action" interface (e.g., using custom workflow actions system 2102). For example, a client user can navigate to a "workflows" feature via "automation", select a "name" of a workflow or create a new workflow, select the "plus icon+" to add a workflow action, and then select "custom code". In example embodiments, the custom workflow actions process (including custom workflow actions system 2102) may be combined with supporting features in workflows. For example, when a workflow may be triggered, the workflow may enroll an object. Typically, all of the data made available to a workflow may be the data about that object.

In an aspect, the custom workflow actions system 2102 allows for the creation of custom code actions for a workflow. For example, users may write and execute programming language (e.g., JavaScript) within a custom action in workflows. In the workflow system 2100 a feature is contemplated referred to as "custom code action", whereby upon selecting the "custom code action" link, a code editor may be opened for the user to input software code instructions for a workflow. This new custom code action may be triggered when an object reaches this stage of a workflow where the custom code action is initiated.

In example embodiments, the custom code actions may utilize an "exports" main function (e.g., "exports.main( )") that may be called when a code snippet action may be executed. In example embodiments, the custom code actions may each have an event argument that may be an object that may have details for the workflow execution. Also, the custom code actions may each have a callback function (e.g., "callback( )") that may be used to pass data back to the workflow (e.g., the callback function may be called in the "exports" main function). In some example embodiments, there may be an event object in JSON such as an example payload that includes reference to a portal ID, custom action definition ID, type of CRM object that may be enrolled in workflow, and a unique ID for execution. In example embodiments, there may be several libraries available for use within code actions. The libraries may be loaded using a normal require function of the code.

Using the custom code action may allow for various other use case examples (and related processes) that may be performed with objects. For example, the system may run different processes on objects, calculate different fields within that data, etc. Further, the custom workflow actions process (e.g., using the custom workflow actions system 2102) may execute API calls out to other systems or into the internal API to get other data.

There may be example instances where the code may refer to something that may not be widely shared. For example, this may be a means of authentication (e.g., an API key). The custom workflow actions system 2102 may allow for the management of secrets that a function may have access to directly in the workflow action definition. In example embodiments, the GUI of the platform displays an "add a secret" interface on a management interface requesting credentials information. (e.g., secret name: "hapikey" and secret value: "my-api-key"). Once added, the secrets may be available as environment variables used by the platform 1000.

In an aspect, the custom workflow actions system 2102 may provide the ability for users to add API secrets that users may authenticate into various different services that they want to call out. Within the code itself, the user may make API calls (e.g., call the platform contact API and/or call the contact API in order to obtain information such as zip codes of contacts or other data). This data may be obtained to be acted on by the user within the platform. In other example embodiments, this may be accomplished with external services and external APIs. In general, the custom code action may open up a variety of possibilities and example use cases that the user may write and execute (e.g., using JavaScript). In example embodiments, to use a secret in with a custom code action, a "Secrets" dropdown menu may be clicked and then an "existing secret" may be selected or a "new secret" may be added. The "new secret" may be added by clicking on "add secret", enter "Secret name" and "Secret value", and then save such that this "new secret" may be selected in future custom code actions. Existing secrets may be edited or deleted via a "Manage secrets" interface.

Example available data to workflows may be expanded. In one example, it may be expanded to include data passing. This may mean that any action that happens may also take the custom code action. In this example, the custom code action may view a contact, may pull in the zip code of the contact, and then may call out to the zip code API. The zip code API may allow for extraction of zip code data, calling up the API, and then may associate that data to different states and regions. With this information, the user may configure the workflow such that if a customer fills out that they are from a particular zip code, then that customer may be associated with a particular region which then may be passed off to a user (e.g., user's company's sales team). Other similar configurations may be performed using the custom code action. This may allow for extraction of the result of that data and then passing it through to the rest of the workflow. This may eliminate a need to make an API call back to the internal platform (e.g., multi-service business platform 1000) to write it onto a CRM property. This process of data passing may provide an expansion of the amount of data that may be accessible to the workflow itself. When the workflow may be executing, the workflow may become more successful (e.g., improved quality) and more capable with every action that may happen and may expand the amount of data that may be available.

In other examples, the user may prefer to use the custom workflow actions system 2102 to develop code to capitalize contact names (e.g., capitalize last names). In example embodiments, the platform 1000 displaying an example "format data" interface which allows the client user to provide custom code action used in to automatically capitalize names. Specifically, as described in the disclosure, the custom workflow actions system 2102 may be used to create a code action for capitalizing contact names (e.g., capitalize last names). The custom workflow actions system 2102 may provide flexibility to users based on their general business needs and purposes.

In example embodiments, there may be a passing in of what objects are enrolled and/or what objects (e.g., contact objects) may be started in workflows which may be directed to the code of the custom workflow actions system 2102 that the platform 1000 may need for some next actions. From there, the platform 1000 may search/query. Then at the end, the code may pass in the ability to pass out data. This may be called a callback where information or data may be passed.

In some examples, this code may execute an API from another service and may look up information and retrieve a phone number that may need to be found and pulled externally. This may enrich the contact data which may be passed out of the workflow by transferring the data to predefined fields (e.g., email and phone which may be defined). In example embodiments, the platform 1000 displays an example custom code action (e.g., using custom workflow actions system 2102) related to formatting a phone number. Then, the code may specify what kind of data may be expected to output this custom code action. The reason for specifying this output may be so that the downstream actions may know and anticipate what to expect (e.g., copy property action which may be copying the value of the phone number from the custom code action to a custom property boom. In example embodiments, the platform 1000 is configured to display an example copy property value interface utilizing the custom workflow actions system 2102. In example embodiments, this may allow for outputs (e.g., outputs passed from the workflow) to be used in subsequent actions in the workflow such that the output data may be passed to subsequent actions within the workflow and/or other workflows.

In example embodiments, workflows may be displayed as a flow diagram that relate to some change that occurred within the platform 1000 providing a series of steps that may occur as a result of that change. The workflow may span seconds or days or longer, in terms of how long it may take to execute. Accordingly, in some examples, starting the workflow may occur from a form submission from a contact, and then multiple days later the user may be working on a drip email campaign for customers. This may be all based around conditional actions that may occur where if a customer of the user filled out the form and then viewed the landing page after the email was sent, it may trigger some action. The custom workflow actions system 2102 may allow for users to customize what they may want to act on based on an event occurring. This may allow users or developers to take control over the value they may get out of the use of the platform 1000 by providing their own custom code. The custom workflow actions system 2102 may give users autonomy and control to build particular workflows for their business use cases and needs. The user may add any number of desired actions with custom code at any number of steps in a workflow that may be dependent upon particular challenges the user may be trying to solve by using the workflows tool 2102. For example, there may be a workflow that has four actions that may have a custom code for one of the four actions or there may be a workflow that may have one action that may be a custom code action. The custom workflow actions system 2102 and custom workflow actions processes may allow for running this code internally with respect to the platform 1000. This may allow any user from any company size to write this type of code which may be immediately run by the integrated platform.

In general, each custom code action may be an action within a larger workflow. The custom code action may fit into a broader category of actions. There may be pre-built actions that may have already been created, such as a "send email" interface which may be automatically built into workflows. This "send email" action may allow for a selection of emails to be sent such that when this action executes, contacts may be sent a particularly selected email. There may be other prepackaged actions that provide external communication by sending an email or sending a notification via a third party messaging service, provide assignment (e.g., rotate a record to the owner), provide creation (e.g., create a record or create a task), provide list management (e.g., add to a static list or remove from a static list), provide ads/advertisement management (e.g., add to an ads audience, remove from an ads audience, or the like), provide delay (e.g., delay for a set amount of time, delay until a day or a selected time, delay until an event happens, or the like), provide internal communication (e.g., send internal email notification, send internal marketing email, send internal short message service (SMS), send in-app notification, or the like), etc.

In some examples, an action may be a "delay" action. The delay action may wait or delay for a specified period of time (e.g., one day). In some examples, a custom code action may be written to do a similar delay along with other steps to form a new custom code action that may include delay as one step in the custom code action. In another example, there may be a "Set Properties" action where the workflow system 2100 may output the property that was enrolled and then request setting the specific property to a specific value which may then be set. This may be hard coded into the automation tool which may have been created with the user interface (UI) for this platform. In example embodiments, this action may be created with a custom code action by looking up or identifying the contact that was passed to the user and then the system may use APIs to set a property to a desired value by the user.

In example embodiments, the custom code action may be a type of extension which may be any action that is not hard coded into the platform. These custom actions may be written using an extension interface (e.g., of the custom workflow actions system 2102) as described in the disclosure. The custom code actions may be specific to each portal and each workflow for the user. The code that the user writes for the custom code action may be unique or specific to that workflow. Specific tasks or steps in the custom code (e.g., defined within the custom code action) may be used elsewhere but the combination of the custom code action in one workflow (with other actions in the workflow or by itself as a sole action in the workflow) may be unique to only that workflow.

In some examples, the users may use the platform marketplace to install an integration that may provide additional functionality inside of the automation tool. Converting some custom code actions to hard coded actions may occur where it may become apparent that the process (e.g., instruction steps of the process) of the custom code action may provide solutions to some problems for the majority of users. There may be a balance between use of custom code action (e.g., purpose built through code) versus default code within the platform.

In the example custom code action, the platform 1000 may be initially defined such that a library may be imported (e.g., importing a platform API client) so that API calls may be made from the platform. Next, the custom code action may open a scope such that code in two curly brackets may be inside a main function. The event and callback may be passed into this scope for use. For example, this event may be available, which may be the information that may be shown in the comment (e.g., towards the bottom of code) that this event may occur. Then, the callback may be a type of handle that may allow for passing of data. In this example, there may be a few comments that discuss secrets. Then, the custom code action request may ask to obtain an object from an API. The API request may be signed with an API key or other authentication mechanism to identify the user. Then, the code may extract an identification (ID) from the object data returned by the API and use it in subsequent actions or requests. In some examples, the custom code action may include requests for lookup of contacts at the CRM and then may use an API to obtain by ID. This may include a request to take some action. Then, the action that is being initiated or executed may be using the information that was passed on by the event to get the ID of the contact that has been enrolled in this workflow. For example, the platform 1000 may be used to obtain a contact by this event along with the related email and phone. In some examples, this custom code may limit the information request of contacts to emails and phone numbers only.

Other Custom Code Action Examples

In example embodiments, the platform 1000 may be configured to receive and utilizing custom code action like simply looking up emails and phone numbers from the CRM and then passing them back out because this information was not available. In other examples, the custom code may allow the user to define the output of the custom code action as being a specific number of strings (e.g., two strings) where a string may be a series of characters, an email address, a phone number, and/or the like. This data may be used in later parts of the workflow such that the overall action may be a straight look up action. Then, there may be some error handling at the end of the code.

As described in the disclosure, there may be associations defined between objects in the platform 1000. For example, a contact object may be associated with deal objects such that the same contact objects may be associated with company objects. When a contact gets enrolled in the workflow, the user may look up anything that may be available through this API. In some examples, the platform 1000 may be used using a platform client object in the JavaScript of the platform 1000 to look up any associated objects. For example, users may want to add a dash to the beginning of the name of every deal that may be associated with a particular contact. In example embodiments, this may be coded into the custom code action such that the contact may be enrolled, the API may be used to look up all of the associated deals, the deal objects may be obtained, the name of these objects may be obtained, dashes may be added next to the names, all names may be set, and then the process may end.

In other examples, a "Get by ID" function may be searched and pulled by the custom workflow actions system 2102. The custom workflow actions system 2102 may not have to use the event object ID. For example, if preferred, a contact may be associated with an ID number. This number may be used to search or look up arbitrary information from the platform 1000 (e.g., obtaining object information associated with that ID).

In example embodiments, in relation to data passing, there may be an application that may define the output of the action. The other part may be data passing such that this may be the data that may be defined by this action such that another action may pull it. Working on the inputs may be accomplished such that the inverse of this for a custom code action may pass data into the action. For example, one custom code action or another action may define that output and pass it into the action.

In other example embodiments, there may be data fetching. For example, this data may be available in the workflow such that the custom workflow actions system 2102 may consider contact objects as enrolled such that associated data, or the data of other objects created, may be accessed. In another example, if the user prefers to obtain data that may not be related to the enrolled object or the other data that is created, there may be some ability to fetch data from either elsewhere on the platform 1000, from an extension, from a connection to another system, etc. Being able to fetch data from the platform 1000 (e.g., at least data associated with the platform 1000) may be another example embodiment which may avoid the need to make API calls. This becomes valuable for two main reasons. One reason may be that a function may be limited in its size such that more API calls made may be taking away from what may be written. Second, every API call may count against the user's API call limits such that the fewer API calls required to be transmitted to the platform because of exposing the data in different ways, the more the user may actually utilize the data. This may allow the user to develop or write all of these API calls in the code. In some examples, all of the data within the platform 1000 may be made available as a point-and-click type of relationship such that the user may not have to make these API calls.

Other custom code action examples may include: data cleanup/formatting (e.g., reformatting phone numbers, dates, text/names, etc.), advanced lead rotation (e.g., doing a weighted rotation based on seniority and also splitting them up based on geographies), service level agreement (SLA) management such that issues and deals may be easily kept on track, using data from an external service to verify customer inputs (e.g., real estate example), advanced customer onboarding automation, and the like.

In general, there may be two main buckets (e.g., buckets of information) for the custom code action. One bucket may be to keep user data clean. This bucket example may refer to reformatting phone numbers, reformatting dates, or reformatting other data in the CRM or anywhere else to be used in an improved way. The other type of bucket may be to drive processes (e.g., bespoke processes). For example, there may be a sales process where leads may be rotated through teams different than the way that other teams do it because it may be based on seniority of representatives (reps), region of reps, and other factors. These factors may be used to drive different processes. Some of these processes may be advanced leave rotation, SLA management (e.g., related to items such as tickets and deals), and the like.

In example embodiments, the custom workflow actions system 2102 may be useful to users in various markets (e.g., real estate services). In real estate, the custom workflow actions system 2102 may be used by the user to create a custom code action to call a third-party real estate service API (e.g., real estate platform API) which may be used to pull in listing data. This may be used either to pull in data to the platform for analysis and/or to provide verification that inputted data is accurate. In general, the custom workflow actions system 2102 may be used with these two buckets of either keeping data clean in the CRM and/or running bespoke business processes to help customize how automation may help a business.

In example embodiments, as described in the disclosure, custom code actions may be used with weighted lead rotations. This may allow users to evenly distribute new contacts to a rep center team or decide a weighted percentage of distribution of contacts amongst a team (e.g., based on preferred weighting). The team may be viewed as owners (e.g., each owner may have a different ID) to these contacts within the workflow system 2100. In an example workflow, there may be an initial action where if a contact owner is known, the contact may be enrolled in the workflow. Within an example custom code action (e.g., using the custom workflow actions system 2102), the owner IDs may be assigned as part of a function. Each owner ID may be associated with different weighting (e.g., percentage weighting) which may be revised or changed based on a user's preference. There may be no limit to the number of owners (e.g., owner IDs) included in this process. When the custom code action executes, the contacts may be evenly distributed based on the selected weighting of each owner. In this example workflow, there may be a "simple branch" action that may occur after the custom code action. The "simple branch" action may branch out an output of the custom code action to the different owners (e.g., different owner IDs). The properties may be set for each owner (e.g., each owner ID). This may provide flexibility for users in setting up their weighted lead rotation process.

In example embodiments, there may be a bidirectional data sync custom workflows that may be built the client user 98 and executed by the synchronization system 1200 (FIG. 1). For example, it may be possible to trigger workflows as a result of a sync update. Syncing may allow for accessing a set of applications that users may get value out of by pulling data into the platform 1000 because of custom objects, custom events, etc. This may add additional power and automation into all these custom data sets and also the platform 1000 to find data sets. This may provide true automation of business processes on top of the platform 1000 in a unified way. With the custom workflow actions system 2102, users may solve business process problems and automation problems using this tool that stores business data sets. The custom workflow actions system 2102 may be built into and integrated with the platform 1000. There are many benefits to having all this functionality in one place versus needing to jump or switch between different applications and go through the administrative overhead or operational overhead of working with third party tools.

In example embodiments, the platform 1000 may utilize the event system 1700 (FIG. 1) such that users may be able to define their own events and facilitate triggering specific actions such as behavioral events for marketing events. The platform 1000 may determine how a user may be interacting with a customer indicating who may be interacting with the user's business such that some events may be triggering as a result of that interaction. There may be some interesting values to having this interaction directly connected to the CRM. It may provide added power to the entire platform 1000 to allow for this behavioral interaction to be integrated with unified events by having all these data sets interacting with each other.

In example embodiments, the custom workflow actions system 2102 and related processes may be used with the conversation intelligence system 2000. For example, the call recording feature (e.g., of the conversation intelligence system 2000) may provide speech analysis of recordings and may mark elements in these recordings based on keywords. These keywords may be events that may then trigger workflows. For example, if a speaker says a keyword such as "deals" on the call, it may trigger a workflow that then may perform an action (e.g., arbitrary action such as send a specific email to the customer). This workflow may be defined with one or more custom code actions by using the custom workflow actions system 2102. In another example, the customer on a call may mention a competitor company during the call such that an email may be triggered as part of a workflow to follow up with competitive analysis to the customer. This may relate to unified events such that every event created within the platform may be plugged into custom workflow actions (e.g., custom code actions) that may be tied into data, systems, services, etc. in the platform 1000. Then, the custom code action may be run with respect to this integration and/or actions (e.g., custom code actions) that may be discovered in the platform 1000.

In an aspect, the platform 1000 is configured to display an enrollment trigger interface, whereby the platform 1000 may allow integration of workflows through enrollment of workflows. For example, enrollment may be how an object (e.g., contact or dealer company) may be enrolled in a workflow. If objects match a set of filters similar to how lists may be created on the platform 1000 (e.g., creating a list of all customers whose annual revenue is over an amount such as $100,000), this may be used to enroll objects in workflows. For example, with events that may be currently in function, if an element (e.g., object) may match this list and an event occurs (e.g., if an event occurs to a particular contact), then the platform 1000 may enroll the element (e.g., contact) in the workflow. This may relate to how workflows may be initiated. Then, there may be interactions with objects (e.g., contact objects) in the workflows that may be based on the custom code actions in the workflow. The enrollment criteria may define why an object may enter a workflow (e.g., a member of another list). This may be used in filtering such as based on contact properties (e.g., annual revenue of contact). Accordingly, the filtering may be used as events that may be added and as conditions that may be added.

Payment

Referring to back to FIG. 1, the platform 1000 may include a payment system 1800 that processes payments on behalf of clients of the multi-service business platform 1000. The payment system 1800 may be configured to facilitate one-time payments, recurrent payments (e.g., subscription payments), installment payments, and/or the like on behalf of clients. Referring back to the yoga studio example, the yoga studio may offer items (e.g., yoga mats, yoga accessories) and/or individual packages for sale. Such offerings are likely to be processed as one-time payments. In this example, the yoga studio may also offer subscription plans (e.g., unlimited yoga classes for $100 a month), which may be processed as subscription payments, according to some example embodiments of the disclosure. In this example, the yoga studio may also offer personal training packages that automatically renew once a customer has finished their last personal training session. In this example, the personal training offering may be processed as a recurring payment that may be triggered based on the occurrence of a condition (e.g., the last session being used). The payment system 1800 may be configured to facilitate these different types of payments on behalf of the clients and to integrate any payment-related data and event data into the client's data stores. The platform 1000 is configured to allow rich payment data and payment event data to be integrated with the client's CRM system 1100, CMS services 1400, ticketing services 2200 and the like. Additionally, the payment data and payment event data may be reported on via the reporting system 1600.

In example embodiments, the payment system 1800 may be configured to generate "checkout links" corresponding to respective checkout pages for respective offerings provided by a client. In example embodiments, a checkout page may be a digital medium that is configured using a set of checkout parameters provided by the client and allows a user to initiate a payment for the respective offering that may be defined in the checkout parameters corresponding to the checkout link. In example embodiments, a checkout link may refer to a resource identifier (e.g., a uniform resource locator (URL) that links to a webpage, a deep link to a native application, and/or the like) that causes the multi-service business platform 1000 to serve a checkout page to a user device when the checkout link is selected (e.g., clicked, pressed, or otherwise activated) from the user device. An offering may refer to one or more items (e.g., services, products, warranties, leases, or any combination thereof) that may be offered by the client in exchange for a set payment price.

Referring back to the yoga studio example, the platform 1000 is configured to allow the studio t offer different types of classes for students, which may be priced differently. Additionally, the yoga studio may offer discounts to students that purchase different packages of classes (e.g., three different classes for a combined price of $75), purchase multiple classes (e.g., 20% discount if a student purchases three of the same classes together), or purchase a monthly subscription (e.g., $100 a month for unlimited classes). Thus, in this example, different offerings may include individual classes at their respective standard price, different class packages each offered at a respective price, same class bundles at a respective discounted price, and a monthly subscription at a fixed price. In this example, a client user 98 may define via a graphical user interface) a set of checkout parameters for each offering, including item(s) (e.g., product, service, warranty, property, lease, and/or combination thereof) being offered, a price of the offering, and any other additional requirements for checkout (e.g., number of payments such as one time, set number, or continuing subscription, schedule of recurrent payments (if applicable), contract signature requirements, and the like). In response to the checkout parameters, the payment system 1800 may generate a checkout link that corresponds to a checkout page, whereby the yoga studio may provide the checkout link to contacts or potential contacts (e.g., in emails, ads, text messages, or any other suitable medium).

In example embodiments, a user affiliated with a client may request that a checkout link be generated for an offering via a graphical user interface (GUI) (referred to as a "checkout configuration GUI"). In doing so, the user may provide a set of checkout parameters via the checkout configuration GUI, including defining the offering. In providing the offering, the user may select one or more items (e.g., products, services, warranties, subscriptions, or the like) and may define a price for the offering. In some example embodiments, the types of items that a client offers (e.g., sells, leases, or the like) may be represented as custom objects in the client's ontology. Thus, in some example embodiments, the payment system 1800 may identify the types of items a client may offer based on the types of objects that are in the client's ontology.

Additionally or alternatively, the checkout configuration GUI may allow the user to provide product offering information, such as an item name, an item description, and/or media content depicting the item. In example embodiments, the user may define the price of the offering. For example, the user may define the price if it is a special offer and/or the price is not listed in the client-specific data stored by the multi-service business platform 1000. In example embodiments, the user may also define whether the payment price is a one-time price, a set of installment payments, or a subscription-based payment. In the case that the payment is an installment payment, the user may define how many payments are to be made, an amount per payment, and a schedule for the recurring payments (e.g., weekly, monthly, yearly, quarterly, beginning of the month, monthly from the date of purchase, or the like). In the case that the payment is a subscription payment, the user may define a payment schedule (weekly, monthly, yearly, quarterly, draw payments at the beginning of the month, draw payments every month on the corresponding date of purchase, or the like) and a payment amount for each scheduled payment (e.g., $12.99 a month, $99.99 a year, or the like). In some example embodiments, the checkout parameters may include one or more checkout requirements. Examples of checkout requirements may include a contact signing a contract before a payment may be processed or the contact agreeing to a set of terms and conditions before a payment may be processed. In these example embodiments, a user may define the checkout requirements, such as requiring a purchase contract be electronically signed by a customer prior to purchase.

In response to the user providing the configuration parameters and requesting the checkout link, the payment system 1800 may generate a checkout link for the offering and may store the checkout parameters in a checkout database. In some of these example embodiments, the checkout parameters may be indexed based on the checkout link. In this way, the checkout link may reference the checkout parameters, such that when the checkout link is selected by a user, the payment system 1800 may parameterize a checkout page template with client-specific data, including the checkout parameters and any client-provided content (e.g., logos, fonts, styles, layouts, salesperson information, business contact information, and/or the like).

Once a checkout link is generated, the checkout link may be embedded in any suitable medium and/or stored with the client's data. For example, a checkout link may be embedded in electronic messages (e.g., email, SMS, direct messages, and/or the like), on the client's website, in digital advertisements, in live chats, in promotional materials, in quick response (QR)-codes, or the like. In some example embodiments, the checkout link may be provided to the CMS system and/or the CRM system, such that the checkout link may be integrated into messaging workflows and event data relating to the checkout link that may be tracked (e.g., each time the checkout link is activated, each time the checkout link is sent in a message, each time the checkout link is provided in an advertisement, and/or the like). In some examples, an effectiveness of different checkout link mediums may be reported on by the reporting system (e.g., in a multi-object custom report). It is appreciated that other payment-related reports may also be generated. For example, how many times a customer opens a checkout link before initiating a purchase, how many times a checkout page is accessed, how many times a checkout page is shared, and/or the like.

In example embodiments, the payment system 1800 may store the checkout parameters (e.g., in a checkout database 1810) and may generate a checkout link that may be associated with the checkout parameters. Thus, in some example embodiments, the payment system 1800 may generate a checkout link for each respective offering, whereby a checkout link may be clicked (or otherwise selected) by a potential purchaser (e.g., from the client's website, an email, a text message, a chat, scanning a QR code, or the like) to initiate a purchase for the offering. In response to a checkout link being clicked or otherwise selected, the payment system 1800 may generate and serve a checkout page (or "checkout UI") corresponding to the offering indicated by the checkout link. In example embodiments, the payment system 1800 may retrieve the set of checkout parameters corresponding to the offering indicated by the checkout link and, in some example embodiments, any client-specific content (e.g., branding, fonts, layouts, or the like) corresponding to the client selling the offering, and then may serve the checkout page based on the checkout parameters and the client-specific content. Put another way, the payment system 1800 may serve a checkout page that may be configured in accordance with the checkout parameters and client-specific content corresponding to the offering indicated by the checkout link. In example embodiments, checkout parameters may include, but may not be limited to, the offering (including the price), a description of the offering, a contact for the offering (e.g., a salesperson), whether the payment is a one-time payment or a recurring payment (e.g., a multi-installment payment or subscription payment), a payment schedule (if a recurrent payment) and/or the like. In example embodiments, client-specific content may include a logo of the client, the client's branding, fonts and/or style sheets provided by the client, a photograph or other media corresponding to the offering, and/or other types of content that may be presented in a checkout page. In example embodiments, the payment system 1800 may be configured to facilitate credit card payments, ACH payments, cryptocurrency payments, or other suitable payment methods. In these example embodiments, the customer may provide payment information, such as credit card information or bank account and routing information, etc. In example embodiments, the payment system 1800 may initiate a payment session with a payment processor on behalf of a customer and may provide the payment session information (e.g., session ID and/or session key) to the customer's user device. Once presented with the checkout GUI, a customer may provide payment information via the checkout UI, whereby the checkout page (as executed at the customer user device) may route the payment information directly to the third party payment processor 1820 using the payment session information. In response to the payment information, the third party payment processor 1820 may transfer funds from the customer's account (e.g., credit card account if by credit card or bank account if by ACH) to an account affiliated with the client and may provide a confirmation of a successful transaction to the payment system 1800 (e.g., via an exposed webhook).

In response to confirming a successful transaction, the payment system 1800 may initiate one or more bookkeeping actions. Examples of bookkeeping actions may include, but may not be limited to, generating a payment event indicating a successful purchase, notifying the CRM system 1100 of the sale, updating one or more properties of an object instance (e.g., deal object instance, a product object instance, a custom object instance, or the like), triggering a custom workflow, or other suitable actions. In example embodiments, the custom workflow may include scheduling a follow up communication with the customer (e.g., for shipping information, for customer service information, for training, for feedback, or the like), scheduling recurrent payments, notifying an external system of the payment (e.g., to schedule a service, such as a training, a class, a construction project, professional services, or the suitable services), and/or the like. Similarly, if a payment is unsuccessful, the payment system 1800 may initiate one or more bookkeeping actions corresponding to an unsuccessful payment.

In example embodiments, the payment system 1800 may be implemented as an internal microservice. In this way, payments may be initiated from various services of the multi-service business platform 1000 and at various points in a customer lifecycle. For example, payments may be initiated from the CRM system 1100, the CMS system 1400, the service system 1600, and/or from other services of the multi-service business platform 1000. Checkout links to specific offerings may be embedded in websites, native applications, electronic messages (e.g., email, text message, direct messages), chats, QR codes, social media pages, and the like. Additionally, payment-related functions (e.g., subscriptions, invoicing, refunds, and the like) may be integrated into various workflows that are supported by the multi-service business platform 1000. For example, a user may configure a workflow to send automated follow-up emails to buyers of a certain offering (e.g., a product or service) that has a checkout link to purchase additional offerings (e.g., product, service, warranty, or the like) after a certain amount of time after the initial purchase.

In example embodiments, the payment system 1800 may generate checkout links that may be accessible to a quoting service of the multi-service business platform 1000. In these example embodiments, a user affiliated with a client may configure a quote/invoice and request that may be sent to a contact via the quoting service. In response, the quoting service may generate the quote (which may or may not include an invoice) and may request a checkout link from the payment system 1800. The request may include a set of checkout parameters that may be obtained from the quote. In response to the request, the payment system 1800 may generate the checkout link and may provide the checkout link to the quoting service. In response to the checkout link, the quoting service may embed the checkout link in the quote/invoice and may provide the quote/invoice to the customer, where the customer may use the link to access a checkout page and initiate a payment to the client. In some example embodiments, the client may require an electronic signature from the customer before the payment may be processed. In these example embodiments, the quoting service may further send an electronically signable contract with the quote/invoice or the electronically signable contract may be accessed via the checkout page. In this way, a client may initiate an entire sale closing workflow that may include providing a quote, executing a contract, and executing a payment from a single quote via the quote and the checkout link. It may be appreciated that the payment system 1800 may interface with other services of the multi-service business platform 1000 without departing from the scope of the disclosure.

Figure 22:
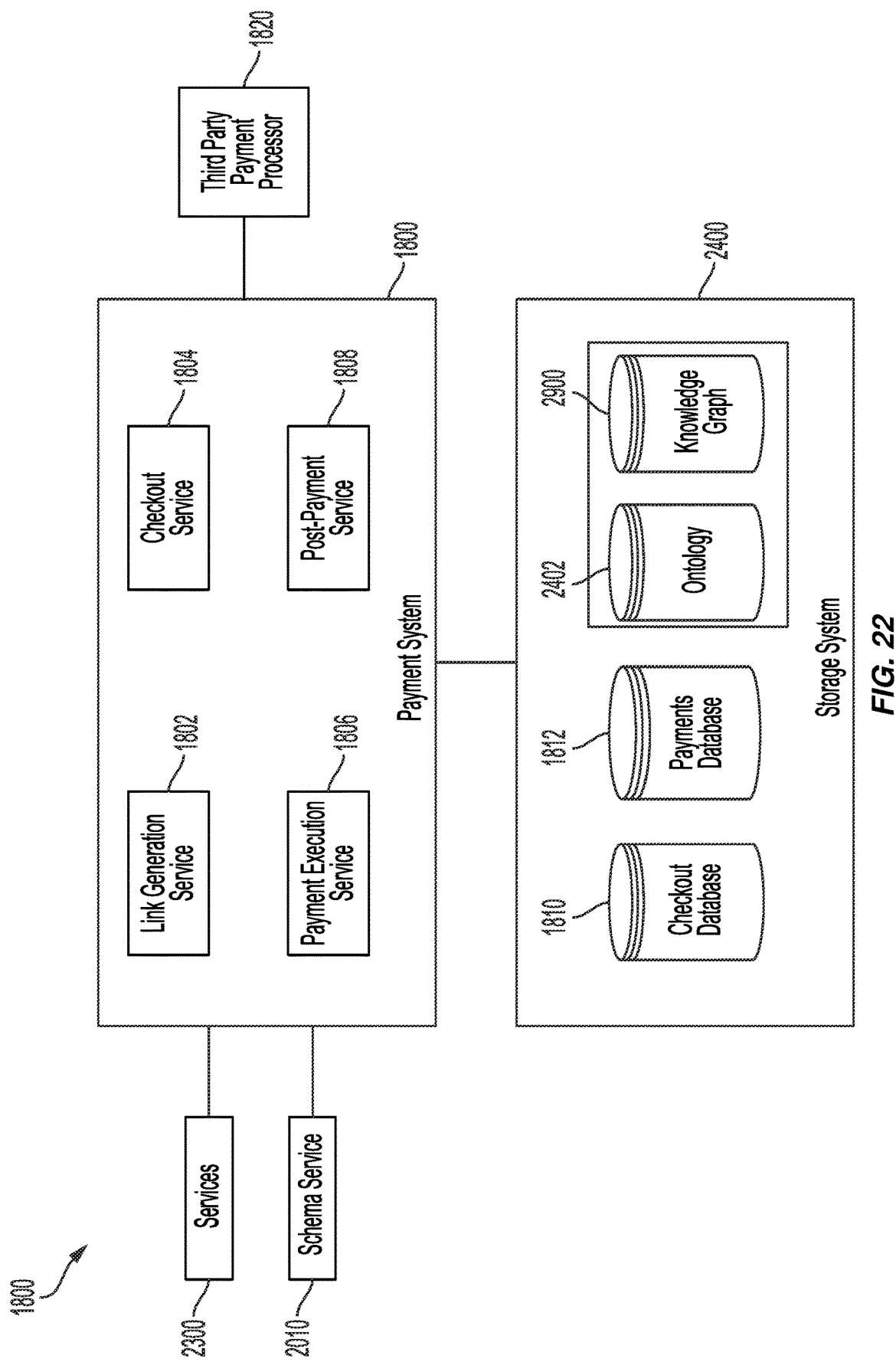
FIG. 22 is a block diagram illustrating an example of a computing environment wherein one or more of the provisions set forth herein may be implemented.

FIG. 22 illustrates an example configuration of a payment system 1800 according to some example implementations of the disclosure. In example embodiments, the payment system 1800 may be executed by a set of processors. In example embodiments, the payment system 1800 may include and/or access a link generation service 1802, a checkout service 1804, a payment execution service 1806, and a post-payment service 1808. In example embodiments, the payment system 1800 may read data from and write data to a checkout database 1810, a payments database 1812, an ontology 2402, and/or a knowledge structure 2900. As shown, in example embodiments, the ontology data store 2402 and the instances knowledge structure 2900. In example embodiments, the payment system 1800 may communicate with a set of internal services 2300, such as messaging services, customer relationship management services, quoting services, invoicing services, and/or the like.

In example embodiments, the payment system 1800 may communicate with a third party payment processor 1820 via an API of the third party payment processor 1820. In this way, clients of the multi-service business platform 1000 may not have to integrate their own respective payment processors with the multi-service business platform 1000. Rather, the payment system 1800 may manage the back-end API integration with the third party payment processor 1820 on behalf of the clients of the platform 1000. Furthermore, in some example embodiments, the payment system 1800 may initiate payment sessions on behalf of customers, but may provide the payment session information (e.g., session ID and session key) to the customer device, such that the payment system 1800 does not receive any payment information from customers. Rather, payment information may be provided directly to the payment processors from the customer device.

In example embodiments, the link generation service 1802 may generate checkout links corresponding to user-defined offerings. In some of these example embodiments, a user may access the link generation service 1802 via a user interface presented by the payment system 1800 or another suitable system (e.g., the CRM, the CMS, the service system, or the like) and may provide a set of checkout parameters. In response, the link generation service 1802 may generate a checkout link (e.g., a URI) corresponding to the checkout parameters and may store the checkout parameters in the checkout database 1810, where the checkout parameters may be associated with the checkout link in the checkout database 1810. In example embodiments, the user may identify the checkout parameters, including the offering, via a checkout configuration GUI. For instance, the user may select one or more items (e.g., products, services, warranties, or the like) to include in an offering and may provide a price for the offering. In some example embodiments, the types of items that a client may offer (e.g., sells, leases, or the like) may be represented as custom objects in the client's ontology. Thus, in some example embodiments, the payment system 1800 and/or the schema service 2010 may identify the types of items a client may offer based on the types of objects that may be in the client ontology 2402. In this way, the user may select the items that may be included in an offering from a menu (e.g., a drop down menu). In these example embodiments, an item may include one or more properties (price, suggested price, item descriptions, or the like), such that the link generation service 1802 may obtain some of the item's properties to include in the checkout parameters.

In example embodiments, the user may provide additional checkout parameters and/or client-specific content. For example, the user may define whether the payments are recurring payments, one-time payments, or paid in accordance with another payment plan. Additionally or alternatively, the user may provide the checkout parameters manually and/or may provide media contents corresponding to the offering, such as images or videos of the offering, which may be stored as client-specific content. In example embodiments, client-specific content that may be used for all checkout pages that may be served on behalf of the client (e.g., fonts, logos, style sheets, trademarks, stock images, or the like) may be uploaded by a user associated with the client during on-boarding or a similar configuration phase. In this way, when checkout pages are generated on behalf of a client, the checkout pages may all have the same look-and-feel. In some example embodiments, the link generation service 1802 may receive additional configuration requirements from the user. For example, the user may add a location verification requirement, an age requirement verification, a contract that must be e-signed, terms and conditions that must be agreed to, and/or the like. In some of these example embodiments, the user may upload or otherwise link a contract or a terms and conditions (e.g., terms and conditions document) to the checkout parameters, such that the contract or terms and conditions may be provided to the customer prior to checking out.

In response to the user providing the checkout parameters, the link generation service 1802 may generate a uniform resource identifier (URI) (e.g., a uniform resource locator (URL), a deep link, or the like). In example embodiments, the URI may include a domain (e.g., second-level domain, subdomain, and/or top-level domain), a path (e.g., subdirectory portion), and a tail portion (e.g., remaining portion of the URI after the path). In example embodiments, the domain of the URI may indicate the multi-service business platform 1000; the path of the URI may indicate a subdirectory that references the client checkout directory; and the tail of the URI may be a unique identifier corresponding to the checkout parameters of the offering. The link generation system 1802 may store the additional checkout parameters and/or the client-specific content in the checkout database 1810. In some example embodiments, a client may generate multiple checkout links for the same item, such that different checkout links may correspond to different prices for the item. For instance, if a salesperson wants to offer a special discount or otherwise differing price to a customer or class of customers, the salesperson may configure the offering with the item and the alternate price, such that the resultant checkout link may reference the item at the alternate price. In this way, when the resultant checkout link may be accessed, the payment system 1800 may verify that the customer attempting to purchase the item at the alternate price has permission to purchase at the price, and if so, to serve a checkout page that depicts the alternate pricing.

The link generation system 1800 may output the checkout link to the service that requested the checkout link. As discussed, the checkout link may be embedded into a medium (e.g., email, text message, website, direct message, a quote, an invoice, or the like) directly by the user from the link generation GUI by the CRM system 1100, CMS 1400, the ticket system 1600, a quoting service, or the like.

In example embodiments, the checkout service 1804 may serve checkout pages to user devices such that the checkout service 1804 may be called when a customer selects a checkout link via a user device. The checkout service 1804 may receive the tail of the checkout link and may retrieve the checkout parameters from the checkout database 1810 based on the tail of the checkout link. Additionally, the checkout service 1804 may retrieve any client-specific content based on the tail of the checkout link. The checkout service 1804 may generate the checkout page based on the checkout parameters and any client-specific content retrieved from the checkout database 1810. The checkout service 1810 may output the checkout page, which may be transmitted to the user device of the customer. In example embodiments, the checkout page may provide a GUI by which the customer may provide payment information, such as a name, an address, credit card information or ACH information, and other suitable payment information.

In example embodiments, the payment execution service 1806 may initiate payment sessions with a third-party payment processor 1820 on behalf of the client's customers. In example embodiments, the payment execution service 1806 may request a payment session from the third party payment processor 1820. The payment execution service 1806 may request the payment session in response to the selection of the checkout link (e.g., in response to the request provided by the customer device). In response to a payment session being initiated, the payment execution service 1806 may receive payment session information from the third party payment processor 1820 (e.g., a session ID and/or session key) from the third party payment processor 1820 and may transmit the payment session information to the requesting customer device. In response, the customer device may provide the payment information entered by the customer via the GUI to the third party payment processor 1820 using the payment session information.

In example embodiments, the payment execution service 1806 may expose a webhook to the third party payment processor 1820 and may add the pending transaction to a listening thread that may listen for confirmation of the transaction via a webhook that may be exposed by the payment execution system 1806. In these example embodiments, the third party payment processor 1820 may provide a confirmation of the transaction to the payment execution service 1806 via the exposed webhook.

In response to receiving the confirmation for a transaction, the payment execution system 1806 may update the payments database 1812 to indicate the successful transaction. In some example embodiments, the payments database 1812 may store a unique identifier that may identify the transaction (e.g., a unique string), an identifier of the customer that participated in the transaction, a date of the transaction the item(s) that was/were purchased by the customer, the price of the item(s), and/or any other relevant data. In some example embodiments, the payment execution service 1806 may redirect the customer to a merchant page of the client upon completion of the transaction. In some example embodiments, the payment execution system 1806 may generate a payment event, which may be logged in one or more event records. For example, the payment event may be logged in a company or contact event record corresponding to the entity that provided the payment, a deal event record corresponding to the deal from which the payment event was initiated, and/or a custom event record corresponding to the item that was purchased.

In example embodiments, the post-payment service 1808 may execute or initiate post-payment workflows. The post-payment workflows may include default workflows and/or customer-defined workflows. In example embodiments, post-payment workflows may include issuing notifications to the client and updating the knowledge structure 2400 based on the transaction (e.g., updating the knowledge structure 2400 to indicate that the customer purchased the item at a certain price on a particular date). Additionally, the client may define post-payment workflows that are specific to its business. For instance, the client may define a workflow where a follow up email may be automatically sent to the customer requesting feedback after a prescribed time period or to remind a salesperson to contact the customer after a prescribed time period. The client may define additional or alternative post-payment workflows without departing from the scope of the disclosure.

In example embodiments, the payment system 1800 may be configured to process refunds on behalf of clients. In these example embodiments, the payment system 1800 may receive a request for a refund from a customer user device. In some example embodiments, the checkout service 1804 may provide a refund page to the customer, whereby the customer may provide transaction information, such as the unique transaction identifier of the transaction at issue. The checkout system 1804 may verify that the transaction may be a valid transaction based on the unique transaction identifier and that the customer is the customer associated with the transaction identifier. Upon verifying that transaction information, the payment execution service 1806 may initiate a refund session with the third party payment processor 1820. In example embodiments, a refund session may be a payment session, where the third party payment processor transfers funds from the client back to the customer. In response, the third party payment processor 1820 may initiate the refund session and may return a session ID. The payment execution service 1806 may then transmit refund information (e.g., an amount and account information of the customer) to the payment processor 1820. The third party payment processor 1820 may then issue the refund to the customer's account and may communicate a confirmation of the refund to the payment execution service 1806. In response, the payment execution service 1806 may update the payment database 1812 to indicate that the refund was issued to the customer. In example embodiments, the post-payment service 1808 may execute or initiate refund workflows. For example, the post-payment service 1808 may issue a notification that the refund was issued, may update the knowledge structure 2400 to indicate that the customer was issued a refund, send an email to the customer indicating that the refund was issued, or the like. Additionally, the client may define custom refund workflows that may be executed in response to a successful refund being issued.

Figure 23B:
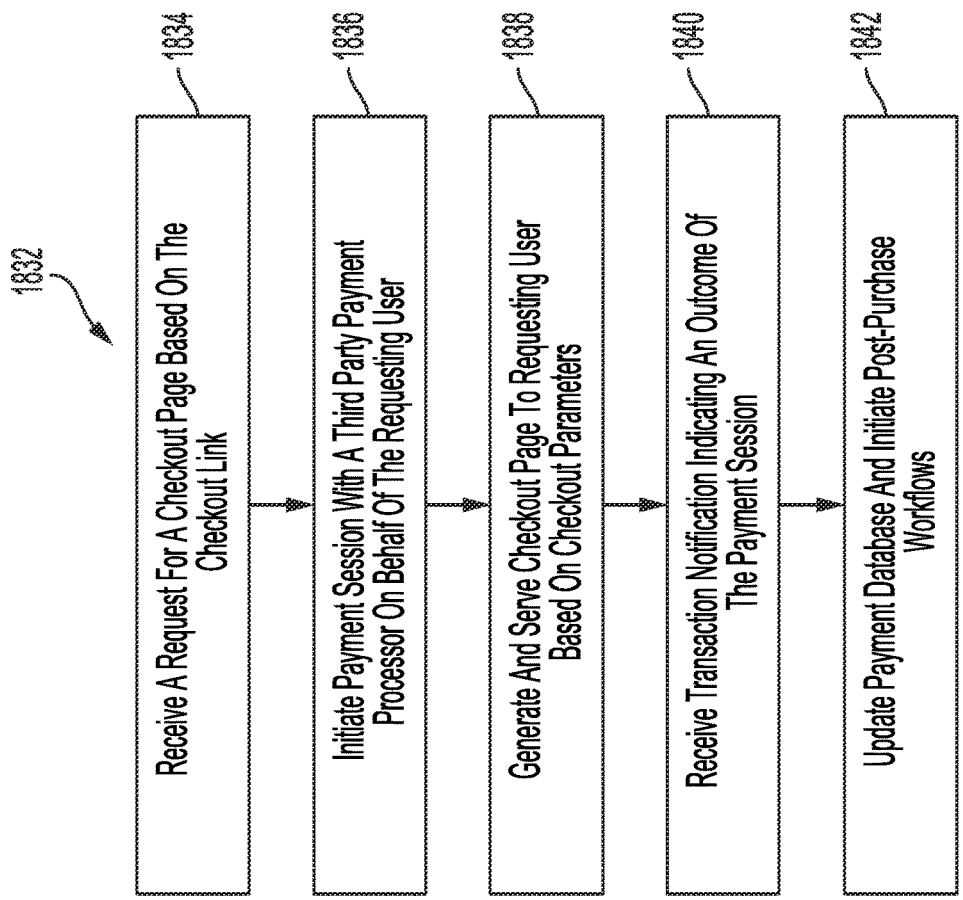
FIGS. 23A and 23B are flow charts illustrating example of sets of operations for performing one or more of the provisions set forth herein.
Figure 23A:
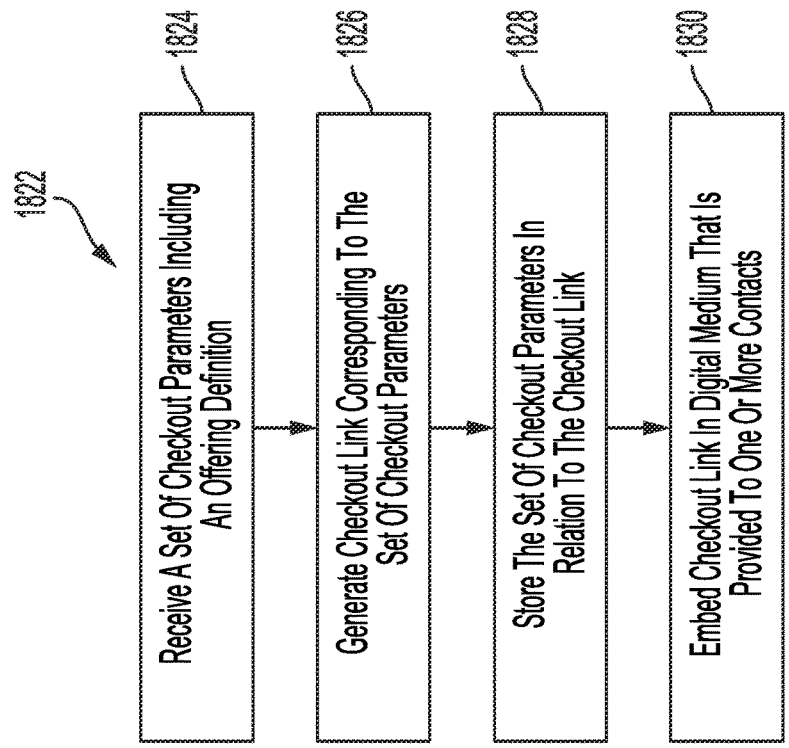

FIG. 23A illustrates an example set of operations of a method 1822 for generating a checkout link on behalf of a client. The method 1822 is described as being performed by the payment system 1800 of the multi-service business platform 1000.

At 1824, the payment system 1800 may receive a set of checkout parameters corresponding to an offering (e.g., offering definition) from a user device. In example embodiments, the link generation service 1802 may provide a checkout configuration GUI to a user device, which may be presented to a user. The user may define an offering and a set of checkout parameters corresponding to the offering via the checkout configuration GUI. As discussed, the offering may include one or more items offered by a client. In some example embodiments, the payment system 1800 may allow a user to import items that may be represented in the client's ontology 2402/knowledge structure 2400. For example, the user may define custom objects that may represent items that may be offered by the client and instances of these objects may include properties of the item defined therein. In some of these example embodiments, the schema service 2010 may be configured to identify custom objects that may represent items that the client transacts (e.g., sells, leases, or the like) based on the properties of the custom object.

In some of these example embodiments, the schema service 2010 may identify these items and may display the items in a menu (e.g., a drop-down menu) or other GUI elements. In some example embodiments, the user may search for items listed in the client's knowledge structure 2400 and the schema service 2010 (or another suitable search-related service) may return items that match the search query. In the foregoing example embodiments, the link generation service 1802 may receive a user selection of a menu item or a search result and may import a set of properties of the item from a respective object instance (e.g., from the knowledge data structure 640). In some example embodiments, the user may manually enter items and their descriptions. In example embodiments, the user may further provide checkout parameters via the checkout configuration GUI, such as a payment amount, a payment type (e.g., one-time, recurring, or the like), any checkout requirements and supporting documents or links, and/or other suitable checkout related data.

At step 1824, the payment system 1800 may generate a checkout link corresponding to an offering based on a set of checkout parameters that may include the offering. In example embodiments, the link generation service 1802 may generate (or otherwise obtain) one or more URIs corresponding to the checkout parameters.

At step 1826, the payment system 1800 may store the set of checkout parameters in relation to the checkout link. In some of these example embodiments, the link generation service 1802 may store the checkout parameters and any other user-provided content in a checkout database 1810 and may index the checkout parameters with the one or more URIs. In some of these example embodiments, the link generation service 1802 may store the checkout parameters in a checkout record that may include or otherwise reference the checkout parameters and any additional user-provided content that may index the checkout parameters with the tail portion of the one or more URIs.

At step 1828, the checkout link may be embedded in a digital medium (or multiple digital media) that may be provided to one or more contacts. Once a checkout link is generated and the checkout parameters are indexed, a client (e.g., a user associated therewith) may embed the checkout link in any suitable digital medium. For example, a client may embed the checkout link on websites, native applications, electronic messages (e.g., email, text message, direct messages), chats, QR codes, social media pages, digital advertisements, or the like. In some example embodiments, the checkout links may be output to a user via a graphical user interface, whereby the user may copy the link and/or select a specific digital medium in which the checkout link may be embedded. In some examples, a user may embed the checkout link in a chat conversation with a contact or in an email. In this way, the user (or another user) may generate a special offer for one or more contacts and may provide a direct link to checkout at the special price. In another example, a user may embed the checkout link on a social media page and/or in social media advertisements, whereby interested contacts may select the checkout link and may be directed to a checkout page that may be generated using the checkout parameters.

Additionally or alternatively, the checkout link may be imported to the CRM system 1100 and/or a CMS 1400. In these example embodiments, the checkout link may be incorporated into the client's marketing efforts and/or workflows. For example, a user of the CRM system 1100 may initiate a targeted digital media (e.g., email or SMS message) campaign that may include the checkout link (e.g., a special offer to certain contacts of the client). In this example, events relating to the email and/or the checkout link may be monitored and recorded, such as how many contacts opened the email, clicked on the checkout link, purchased the item(s) indicated (e.g., by initiating a payment), and/or other suitable events. In this way, the multi-service business platform 1000 may leverage the tracked events to generate reports relating to payments and/or the checkout link.

In example embodiments, the method 1822 may be executed so that a user may generate checkout links corresponding to the same combination of one or more items, such that the client may provide different offerings (e.g., pricing, contracts, terms, or the like) for the same combination of items to different contacts in a trackable and/or reportable manner. Moreover, in some example embodiments, a client may associate checkout links with specific contacts (e.g., with user accounts thereof), such that only the specified contacts may initiate a payment with the checkout link.

For instance, the yoga studio may elect to reward valued customers with a special discount price on certain packages of classes. In this example, the yoga studio may provide respective sets of checkout parameters to the multi-service business platform 1000 (e.g., while accessing the payment system 1800, the CRM system 1100, the CMS system 1400, and/or the service system 1600), whereby the payment system 1800 may generate a first checkout link that may correspond to an offering of a set of three different classes to customers at a first price and may also generate a second checkout link corresponding to a second offering of the same set of three classes at the discounted price. In this example, the payment system 1800 may not restrict the use of the first checkout link, but may associate an account restriction with the second link, such that only customers having designated accounts (e.g., valued customers) may be allowed to access the offering associated with the second link. Furthermore, in this example, the reporting system may allow a user to define custom reports that may be configured to depict various analytics relating to checkout links and/or payments.

FIG. 23B illustrates an example set of operations of a method 1832 for processing a payment on behalf of a client. The method 1832 is described as being performed by the payment system 1800 of a multi-service business platform 1000. In example embodiments, the method is executed by a set of processors of the multi-service business platform 1000. In example embodiments, the operations of the method 1832 may be performed by a set of services (e.g., microservices) of the multi-service business platform 1000.

At step 1834, the payment system 1800 may receive a request for a checkout page corresponding to or based on the checkout link. In example embodiments, the checkout service 1804 may receive a request for a checkout page from a user device (e.g., of a potential customer) in response to a user selection of the checkout link. In example embodiments, the request may include a portion of the URI (e.g., the tail portion of the URI).

At step 1836, the payment system 1800 may initiate a payment session with a third party payment processor on behalf of a requesting user (e.g., a customer) from which the request was received. In example embodiments, the payment execution service 1806 may request a payment session from the third party payment processor. In response, the third party payment processor may initiate a payment session and may provide payment session information to the payment execution service 1806. In example embodiments, the payment execution service 1806 may provide the session information to the customer user device, such that the payment information may be provided directly from the customer user device to the third party payment processor 1820. In some of these example embodiments, the payment execution service 1806 may provide the payment session information to the customer user device with the checkout page (e.g., as discussed at step 1838). In some example embodiments, the payment system 1800 may provide the payment session information after serving the checkout page to the customer user device. In some of these example embodiments, the payment system 1800 may provide the payment session information to the customer user device after confirming that the customer has fulfilled other requirements associated with the transaction. For instance, the payment execution service 1806 may verify that the customer has applied an electronic signature to (e.g., eSigned) any required contracts (or any analogous electronic documents) prior to transmitting the payment session information to the customer device.

At step 1838, the payment system 1800 may generate and serve a checkout page to the requesting user based on the checkout parameters corresponding to the checkout link. In example embodiments, the checkout service 1804 may retrieve the checkout parameters from the checkout database 1810 based on the selected URI (e.g., using the tail portion of the URI). In some of these example embodiments, the checkout database 1810 may return the checkout parameters corresponding to the selected URI as well as any additional user-provided content (e.g., styles, fonts, templates, images, branding, and/or the like). In example embodiments, the checkout service 1804 may serve the checkout page to the user device. In some of these example embodiments, the checkout service 1804 may generate the checkout page (e.g., a parameterized JSON or XML file) based on the checkout parameters and any additional user-provided content and may send the checkout page to the requesting user device.

In response to receiving the checkout page from the checkout service 1804, the user device may display the checkout page, such that the user may initiate a payment via the checkout page. The user may then input payment information (e.g., credit card number, expiration date, card verification value (CVV), ACH routing and account number, pin number, zip code, address, and/or the like) via a GUI of the checkout page. In these example embodiments, the user checkout device may provide the payment information directly to the third party payment processor 1820 using the payment session information (e.g., session ID and/or session key) provided by the payment execution service 1806.

At 6616, the payment system 1800 may receive a transaction notification indicating an outcome of the payment session. In example embodiments, the payment execution service 1806 may expose a webhook to the third payment processor 1820 and may add the pending transaction to a listening thread that may listen for confirmation of the transaction via the exposed webhook. In these example embodiments, the third party payment processor 1820 may provide a notification indicating an outcome of the transaction to the confirmation of the transaction to the payment execution service 1806 via the exposed webhook. The notification may indicate whether the payment was successfully processed or unsuccessfully processed.

At step 1842, the payment system 1800 may update the payments database 1812 and initiate any post-purchase workflows based on the transaction notification. In some example embodiments, the payment execution system 1806 may update the payments database 1812 to indicate the successful transaction in response to receiving the confirmation for a transaction. In some example embodiments, the payment execution system 1806 may store transaction information (e.g., a unique identifier that may identify the transaction, an identifier of the customer that participated in the transaction, a date of the transaction, the item(s) that was/were purchased by the customer, the price of the item(s), and/or any other relevant data) in the payments database 1812. In some example embodiments, the payment execution system 1806 may generate a payment event, which may be logged in one or more event records. For example, the payment event may be logged in a company or contact event record corresponding to the entity that provided the payment, a deal event record corresponding to the deal from which the payment event was initiated, and/or a custom event record corresponding to the item that was purchased. In some example embodiments, the payment execution system 1806 may store transaction information indicating that the payment was unsuccessful if the third party payment processor 1820 is unable to process the payment.

In some example embodiments, the payment execution service 1806 may redirect the customer to a merchant page of the client upon successful completion of the transaction. Similarly, the payment execution service 1806 may redirect the customer to an error page and/or may provide an error message indicating that the payment was not processed.

In example embodiments, the post-payment service 1808 may execute or initiate post-payment workflows. The post-payment workflows may include default workflows and/or customer-defined workflows. In example embodiments, a default post-payment workflow may include issuing notifications to the client and updating the knowledge structure 2400 based on the transaction (e.g., updating the knowledge structure 2400 to indicate that the customer purchased the item at a certain price on a particular date). In these scenarios, the client may receive the notification of a successful transaction and may initiate the transfer of the item(s) indicated by the offering to the customer (e.g., either electronically or physically (e.g., by shipping)). Additionally or alternatively, the client may define custom post-payment workflows that may be specific to its business. For instance, the client may define a workflow where a follow up email may be automatically sent to the customer requesting feedback after a prescribed time period or to remind a salesperson to contact the customer after a prescribed time period. In other non-limiting examples, a custom post-payment workflow may include reinforcing a machine-learned model associated with the client, updating client-specific analytics, and/or sending automated messages (e.g., to the client's sales team, the customer, or the like). The client may define additional or alternative post-payment workflows without departing from the scope of the disclosure.

Referring back to FIG. 1, an example environment in provided to include a multi-client or tenant service business platform 1000 or generally "platform" in accordance with the present disclosure. As shown, the environment includes a platform which may be also referred to as a multi-tenant distributed system, framework system or a multifunction business platform that may serve the needs of multiple users who in turn use the system to provide services, support, and the like for their customers. The platform communicates with various systems, devices, and data sources according to example embodiments of the disclosure.

The platform communicates and sends/receives data over a communication network (e.g., Internet, public network, private network, etc.). In particular, the platform leverages network to send and receive data with one or more user devices, one or more client devices, one or more third party services, one or more integrator devices, and external information sources and databases.

The platform includes a Customer Relationship Management (CRM) System, a Directed Content System, an Artificial Intelligence/Machine Learning (AI/ML) System, a Content Management System (CMS), a Multi-Client Ticketing System, a Customization System, a customizable Events System, a Payments System, a Reporting System, a Conversational Intelligence System, a Custom Workflow System, an Entity (or Object) Resolution System, an Infrastructure and Services System, and a Storage System in accordance with an aspect of the present disclosure. Additionally, the platform includes an AI/ML concierge system (e.g., AI/ML concierge system 24099 of FIGS. 24A-24C) and a chat interface (e.g., an AI/ML content assistance System) which operates seamlessly with the platform. The AI/ML concierge system is configured to send and receive data to any or all of the individual components shown in FIG. 1 to enable the use cases discussed herein.

The AI/ML Concierge System is shown in FIG. 1 as separate from the AI/ML System. However, in an embodiment, the AI/ML concierge is combined with the AI/ML System. In another embodiment, the AI/ML concierge leverages some or all of the AI/ML System and sends/receives data therewith to allow the platform to perform the functions described herein.

These systems may function and/or be used similarly to the same or similar systems described in the disclosure. For example, the AI/ML system is used with core objects and are also applied similarly to the custom objects. The platform may synchronize some arbitrary custom objects outside the platform to objects in the platform. In summary, in examples, the platform may act as an arbitrary platform that may act on arbitrary custom objects using various systems and the services (e.g., used with arbitrary actions and synced to arbitrary systems of the platform) thereby benefiting from these various capabilities. The external information sources may include company information or data on customers, products, sales, third party data, resource description framework (RDF) site summary (RSS) feeds or really simple syndication (RSS) feeds, telemetrics (e.g., from email, websites, app usage), and the like with respect to custom objects. The platform may also communicate with third party service(s) (e.g., third party applications, websites, databases, etc.) via network. The platform may also communicate with one or more integrator device(s) or apps, also referred to as developer apps. Developer apps may refer to user devices used by third-party integrators or developers who may create, define and deploy a series of custom objects, events, workflows, website themes and other services that may be integrated with other objects in the platform. The platform is configured to seamlessly connect and integrate objects and services that are deployed through an integrator or developer which then may be offered to users (e.g., clients) via the platform. For example, the platform may include internal and external APIs (as described in the disclosure) that a developer or integrator may use to define custom objects and integrate those custom objects into the CRM system. The integrator users may define a series of custom objects and then define object definitions. When a client device installs that integration, the platform may enable the user to then start creating and using instances of custom objects defined by the integrator users.

The AI/ML concierge includes a chat interface which allows users to input natural language commands that are processed using the power of AI/ML concierge. The AI/ML concierge can generate a wide variety of outputs based upon the natural language commands, such as programmatically generating reports, a blog on a particular topic, a presentation slide, a spreadsheet, images, software code, emails, contacts, etc. With AI/ML concierge, a user can complete a task using a declarative approach where the user inputs a natural language statement as a command/query that describes an outcome (e.g., "generate a report on a company ABC"), but does not include the actual functional steps or code to achieve the outcome. Instead, the AI/ML concierge takes the natural language statement as input, and generates and performs the functional steps or code that produces the outcome described by the natural language statement.

In some embodiments, the AI/ML concierge is linked to other various modules the multi-client service system platform, data sources (e.g., a website, a customer relations management database, an image repository, etc.) from sources and/or the Storage System, applications (e.g., a spreadsheet application, a presentation application, a word processing document, a social network application, an email or messaging application, etc.), and services (e.g., an email service) in order to enhance the capabilities of the chat interface. In some embodiments, the AI/ML concierge links to the CRM System in order to leverage information within the CRM System and populate new information within the CRM System (e.g., create tasks, create contacts, view marketing information, perform various analysis on sales data, create reports, etc.) based upon natural language commands input through the chat interface. In some embodiments, the AI/ML concierge and/or the chat interface may be integrated into and/or is a part of the multi-client service system platform.

The AI/ML concierge may implement various application programming interfaces (APIs) in order to interface with the modules (e.g., an API used to access the CRM System, a REST API to access a service accessible over a network, etc.). The AI/ML concierge may link to various applications, services, and content such as a spreadsheet application, a word processing application, a presentation application, a blogging service, a social network service, websites, databases, an image repository, social network profiles and posts, and/or other content in order to process natural language commands input through the chat interface, which is described in different use cases in FIGS. 24A-24C.

In an embodiment, the AI/ML concierge links to an artificial intelligence system of an integrator app that can create images and art from descriptions submitted through the chat interface in natural language. In another embodiment, the AI/ML concierge links to another integrator app keyword research service or tool that provides topics and content (e.g., ideas, concepts, topics, paragraphs of text, sentences of text, etc.) related to natural language commands input through a chat interface of the AI/ML concierge.

When a user inputs a natural language command through the chat interface (e.g., "generate a report on a company ABC"), the AI/ML concierge automatically selects certain modules, corresponding to the platforms, data sources, applications, and/or services, to utilize for processing the natural language command. The natural language command may describe a desired outcome such as the report about the company ABC, which may be used by the AI/ML concierge to select one or more of the modules to utilize for generating the desired outcome. The desired outcome, derived from the natural language command, may be used to select an order with which to access/invoke the modules, what inputs to input into each module (e.g., an output from one module may be used as an input to another module), and what outputs are expected from each module. For example, the CRM System and Storage System, a website of the company ABC, a business information repository, a social network service hosting a social network profile of the company ABC, and/or other modules or content may be selected in order to obtain information that the AI/ML concierge will use to generate the report. In this way, natural language commands input through the chat interface are used by the AI/ML concierge to select, order, and/or invoke certain modules in order to generate content using artificial intelligence, machine learning, and/or various types of models, which can be used by business growth professionals such as customer service agents, executives, a marketing team, a sales team, and/or a wide variety of other types of users.

FIG. 24A illustrates an embodiment of the chat interface 24000 powered by the AI/ML concierge of the platform 1000. The chat interface 24000 may be populated with a natural language input interface 24004 through which a user can input natural language commands to the AI/ML concierge 24099. The chat interface 24000 may include a suggestions interface 24002. The AI/ML concierge 24099 may generate suggested natural language commands to populate within the suggestions interface 24002 based upon a role of the user (e.g., the user may be part of a marketing, sales, IT, or management team of a company), a location of the user, prior natural language commands submitted by the user (e.g., the user may have recently submitted natural language commands to add new contacts from a contact spreadsheet into a Storage System 550), an employer of the user, information within emails of the user (e.g., a work email may indicate that the user is to add certain people as new contacts into the Storage System 550), information within a social network profile of the user, a web browser search history of the user, a purchase history of the user, information accessible through a module (e.g., information accessible through a CRM System 502, information within the spreadsheet accessible through a spreadsheet application or online spreadsheet hosting service, etc.), etc. . . .

The suggestions interface 24002 may be populated with the suggested natural language commands that a user can select for inserting into the natural language input interface 24004, such as "how many total contacts are there?", "show monthly summary of web visits last year", "add contact . . . ", "send that to me as a daily email update", "where do I find a report on my social media performance", "report of companies summarized by industry", etc. In response to the user selecting a suggested natural language command through the suggestions interface 24002, the suggested natural language command may be auto populated within the natural language input interface 24004. In some embodiments, the suggested natural language command may be auto submitted through the natural language input interface 24004 or merely populated within the natural language input interface 24004 for further user editing.

In some embodiments, the user may input a first natural language command "add contact john doe, john.doc@mail.com, 24011 science way, cleveland ohio, follow-up in 3 days" into the natural language input interface 24004. In response to the user submitting the first natural language command through the natural language input interface 24004, the AI/ML concierge 24099 may parse the first natural language command using various parsing functionality (e.g., a declarative programming model or other functionality used to identify desired outcomes described in natural language, entity recognition functionality, semantic parsing, topic identification functionality, text classification functionality, deep learning-based text understanding, natural language processing functionality, machine learning, etc.). The AI/ML concierge 24099 evaluates the first natural language command using artificial intelligence, declarative programming models, and/or other machine learning in order to determine what functions and/or programming code to perform and what modules to use in order to achieve/generate the desired outcome. In some embodiments, the AI/ML concierge 24099 may identify a desired outcome of creating a contact for John Doe, along with a task of following up in 3 days with John Doe.

The AI/ML concierge 24099 may identify a module corresponding to the CRM system 502 that could be used as part of completing the desired outcome. The AI/ML concierge 24099 may generate an output 24006 by creating a contact in a particular format that could be used to create a contact within the CRM System 502. The AI/ML concierge 24099 may capitalize certain words, fill in missing information (e.g., add a zip code), query external data sources or modules in order to identify additional/supplementary information to include within the contact (e.g., retrieve a photo of John Doe from a social network profile), and/or perform other processing upon the first natural language command in order to create the contact. The AI/ML concierge 24099 may display the output 24006 of the contact through the chat interface 24000. The AI/ML concierge 24099 may populate the output 24006 with a View in CRM interface element and an Add Note to Contact interface element. The user may utilize the Add Note to Contact interface element in order to add notes and/or edit the contact generated by the AI/ML concierge 24099. The user may utilize the View in CRM interface element in order to invoke the AI/ML concierge 24099 to utilize various APIs in order to add the contact into the CRM System 502. Additionally, the user may be transitioned to a CRM application 24010 that displays the contact added to the CRM System 502. The CRM application 24010 may allow the user to view the contact, emails received by the contact, calls made to the contact, tasks related to the contact, meetings scheduled with the contact, activities related to the contact such as the task created by the AI/ML concierge 24099 for a later date or time period to follow-up with the contact, etc.

FIG. 24A also illustrates a chat interface 24020 powered by AI/ML concierge 24099. The chat interface 24020 may be populated with a natural language input interface 24024 and a suggestions interface 24022. The user may input a second natural language query "lookup company ABC" into the natural language input interface 24024. The AI/ML concierge 24099 may parse the second natural language query using various parsing functionality in order to identify a desired outcome of creating a company overview for Company ABC. The AI/ML concierge 24099 may utilize the desired outcome and/or information parsed from the second natural language query in order to determine what functions and/or programming code to implement, which modules to utilizes, what inputs to input into the modules, an order with which to utilize the modules, whether outputs from certain modules should be used as inputs for other modules, and/or how to format and/or combine the outputs for generating the desired outcome. In this way, the AI/ML concierge 24099 creates an output 24026 of the company overview for Company ABC for display through the chat interface 24020. The output 24026 may be populated with information retrieved from various modules (e.g., a website of Company ABC, a social network service hosting a social network profile of Company ABC, information about Company ABC within the Storage System 550, SEC filing data for Company ABC, news articles related to Company ABC, etc.). The output 24026 may be populated with a number of employees, a company description, a founding year, a location, a link to a social network profile of Company ABC, and/or other information related to Company ABC.

Figure 24B:
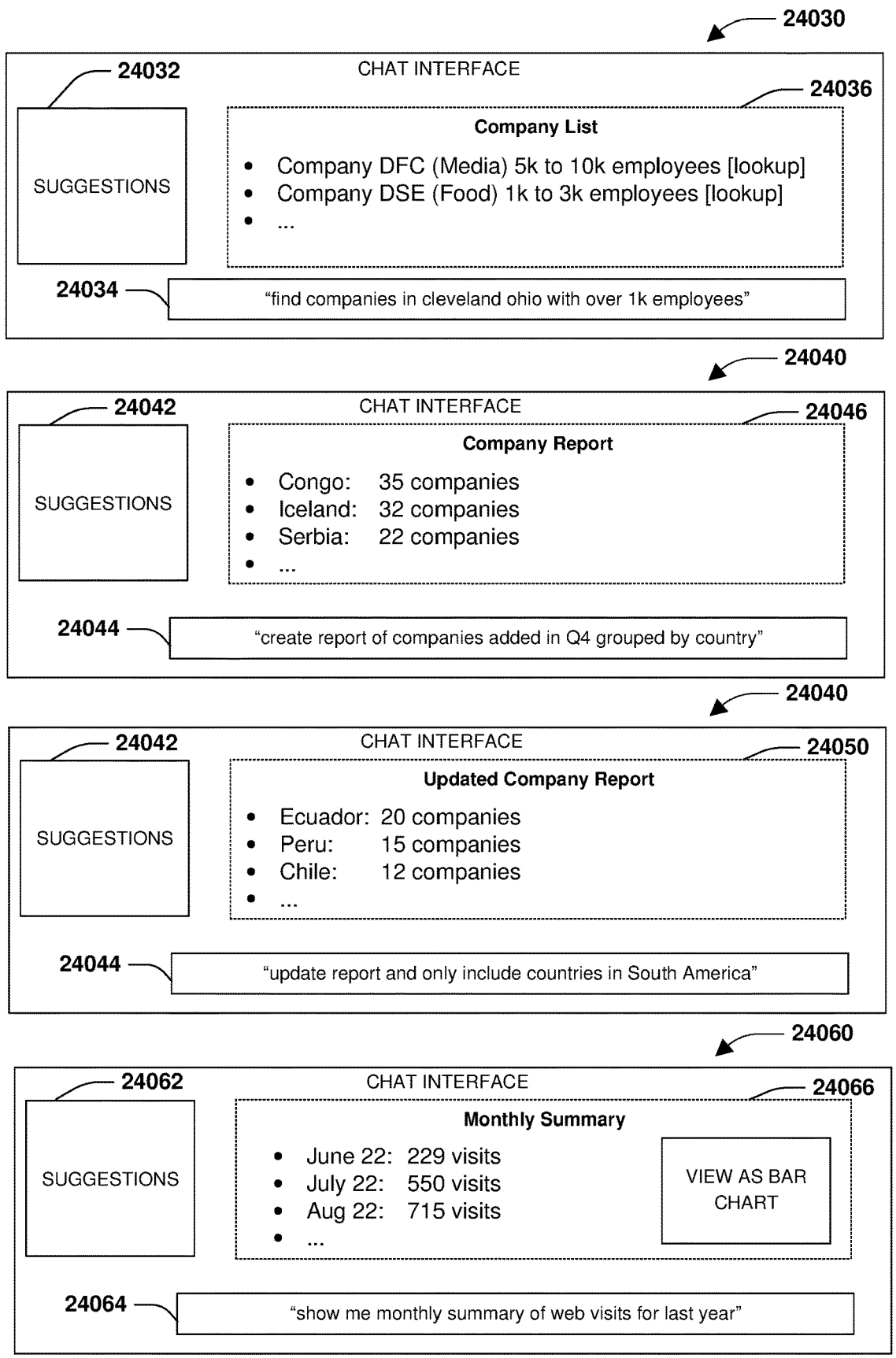
FIGS. 24A-26 are block diagrams illustrating examples of computing environment wherein one or more of the provisions set forth herein may be implemented.

FIG. 24B illustrates a chat interface 24030 powered by AI/ML concierge 24099. The chat interface 24030 may be populated with a natural language input interface 24034 and a suggestions interface 24032. The user may input a third natural language query "find companies in cleveland ohio with over 240 k employees" into the natural language input interface 24034. The AI/ML concierge 24099 may parse the third natural language query using various parsing functionality in order to identify a desired outcome of generating a list of companies located in Cleveland, Ohio that have over 240,000 employees. The AI/ML concierge 24099 may utilize the desired outcome and/or information parsed from the third natural language query in order to determine what functions and/or programming code to implement, which modules to utilizes, what inputs to input into the modules, an order with which to utilize the modules, whether outputs from certain modules should be used as inputs for other modules, and/or how to format and/or combine the outputs for generating the desired outcome. In this way, the AI/ML concierge 24099 creates an output 24036 of the list of companies for display through the chat interface 24030. The output 24036 may be populated with information retrieved from various modules, such as information from a Storage System 550 relating to companies located in Cleveland, Ohio with over 240,000 employees. The output 24036 may also be populated with lookup links to perform web searches for additional information associated with each company (e.g., a hyperlink to search results for a company's name).

FIG. 24B also illustrates a chat interface 24040 powered by AI/ML concierge 24099. The chat interface 24040 may be populated with a natural language input interface 24044 and a suggestions interface 24042. The user may input a fourth natural language query "create report of companies added in Q4 grouped by country" into the natural language input interface 24044. The AI/ML concierge 24099 may parse the fourth natural language query using various parsing functionality in order to identify a desired outcome of generating a company report that lists the number of companies added as clients in the 4th quarter of a current year where the list is grouped by different countries. The AI/ML concierge 24099 may utilize the desired outcome and/or information parsed from the fourth natural language query in order to determine what functions and/or programming code to implement, which modules to utilizes, what inputs to input into the modules, an order with which to utilize the modules, whether outputs from certain modules should be used as inputs for other modules, and/or how to format and/or combine the outputs for generating the desired outcome. In this way, the AI/ML concierge 24099 creates an output 24046 of the company report for display through the chat interface 24040. The output 24046 may be populated with information retrieved from various modules, such as information from the Storage System relating to companies that were added as clients in the 4th quarter of a current year. The AI/ML concierge 24099 may reformat and/or group the information from the Storage System 550 based upon countries for inclusion within the company report.

The user may subsequently submit a fifth natural language query of "update report and only include countries in South America" through the natural language input interface 24044 while the company report is displayed as the output 24046 through the chat interface 24040. Accordingly, the AI/ML concierge 24099 may parse the fifth natural language query using various parsing functionality in order to identify a desired outcome of updating the company report by filtering out countries that are not included within South America. The AI/ML concierge 24099 may utilize the desired outcome and/or information parsed from the fifth natural language query in order to determine what functions/codes to implement, which modules to utilizes, what inputs to input into the modules, an order to which to utilizes the modules, whether outputs from certain modules should be used as inputs for other modules, and/or how to format and/or combine the outputs for generating the desired outcome. In this way, the AI/ML concierge 24099 creates an updated output 24050 of an updated company report for display through the chat interface 24040.

FIG. 24B also illustrates a chat interface 24060 powered by the AI/ML concierge 24099. The chat interface 24060 may be populated with a natural language input interface 24064 and a suggestions interface 24062. The user may input a sixth natural language query "show me monthly summary of web visits for last year" into the natural language input interface 24064. The AI/ML concierge 24099 may parse the sixth natural language query using various parsing functionality in order to identify a desired outcome of generating a monthly summary of users visiting a website of the user during the prior year (2022). The AI/ML concierge 24099 may utilize the desired outcome and/or information parsed from the sixth natural language query in order to determine what functions and/or programming code to implement, which modules to utilizes, what inputs to input into the modules, an order with which to utilize the modules, whether outputs from certain modules should be used as inputs for other modules, and/or how to format and/or combine the outputs for generating the desired outcome. In this way, the AI/ML concierge 24099 creates an output 24066 of the monthly summary for display through the chat interface 24060. The output 24066 may be populated with information retrieved from various modules, such as information from a Storage System 550 relating to users visiting the user's website.

Figure 24C:
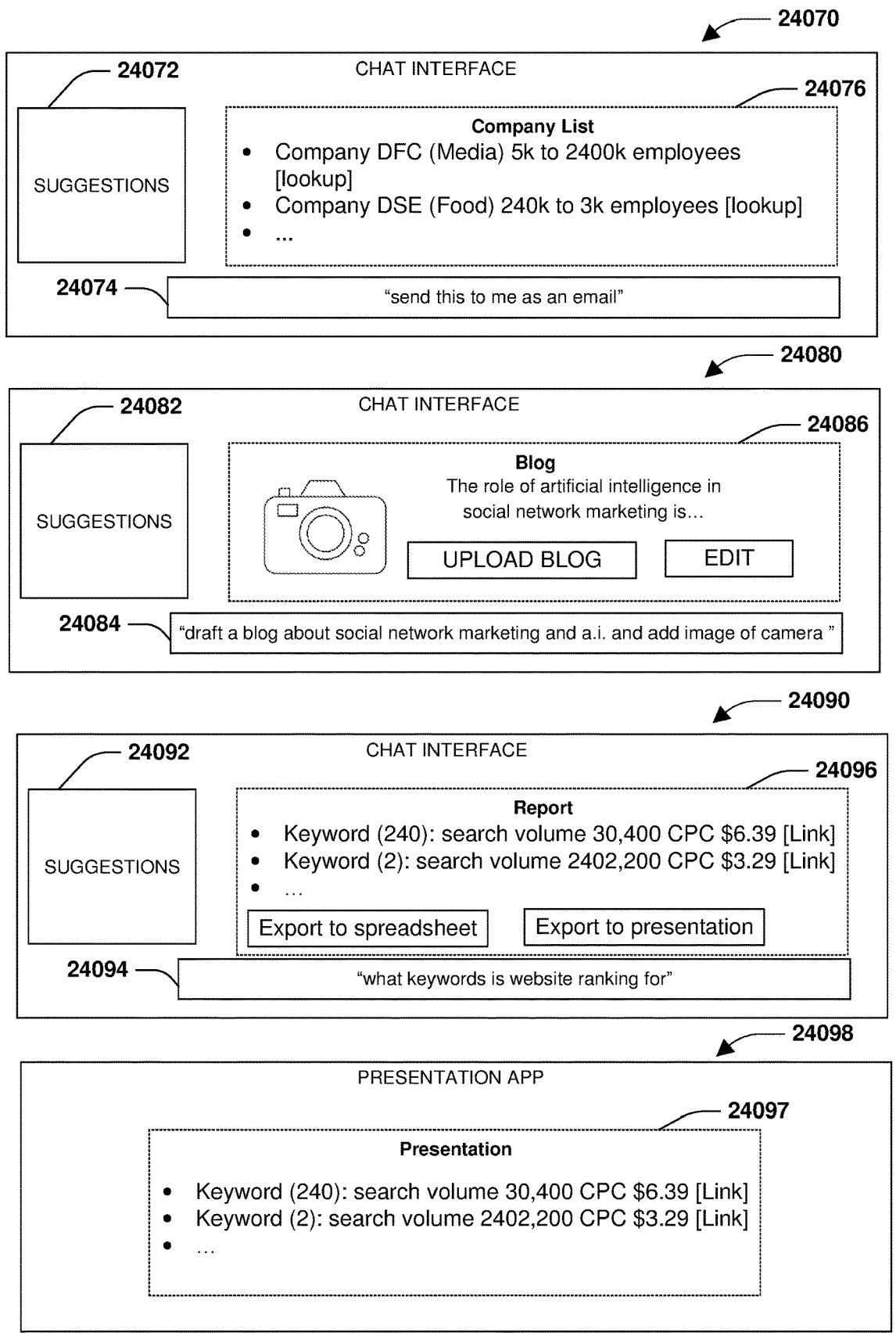

FIG. 24C illustrates a chat interface 24070 powered by AI/ML concierge 24099. The chat interface 24070 may be populated with a natural language input interface 24074 and a suggestions interface 24072. The user may input a seventh natural language query "send this to me as an email" into the natural language input interface 24074 while an output 24076 of a company list is displayed through the chat interface 24070. The AI/ML concierge 24099 may parse the seventh natural language query using various parsing functionality in order to identify a desired outcome of the chat interface 24070 constructing and sending an email to an email address of the user where the email includes the company list as either an attachment or within a body of the email. The AI/ML concierge 24099 may utilize the desired outcome and/or information parsed from the seventh natural language query in order to determine what functions and/or programming code to implement, which modules to utilizes (e.g., an email service), what inputs to input into the modules, an order with which to utilize the modules, whether outputs from certain modules should be used as inputs for other modules, and/or how to format and/or combine the outputs for generating the desired outcome. In this way, the AI/ML concierge 24099 generates the email and transmits the email through an email service to a recipient.

FIG. 24C also illustrates a chat interface 24080 powered by AI/ML concierge 24099. The chat interface 24080 may be populated with a natural language input interface 24084 and a suggestions interface 24082. The user may input an eighth natural language query "draft a blog about social network marketing and a.i. and add image of camera" into the natural language input interface 24084. The AI/ML concierge 24099 may parse the eighth natural language query using various parsing functionality in order to identify a desired outcome of creating a blog describing how artificial intelligence is used in social network marketing, which includes an image of a camera.

The AI/ML concierge 24099 may utilize the desired outcome and/or information parsed from the eighth natural language query in order to determine what functions and/or programming code to implement, which modules to utilizes (e.g., a keyword research service, a text generation service, an image generation service, etc.), what inputs to input into the modules, an order with which to utilize the modules, whether outputs from certain modules should be used as inputs for other modules, and/or how to format and/or combine the outputs for generating the desired outcome. In this way, the AI/ML concierge 24099 creates an output 24086 of the blog with text describing how artificial intelligence is used in social network marketing and with the image of a camera. The blog may have a certain length, reading level, and/or format (e.g., bullet points, outline, etc.) derived from the desired outcome. The output 24086 may be populated with an Upload Blog interface element that the user can click in order to upload/post the blog to a website, blogging service, etc. The output 24086 may be populated with an Edit interface element that the user can click in order to transition into a blog editor interface for modifying the text and/or the image of the camera.

FIG. 24C also illustrates a chat interface 24090 powered by AI/ML concierge 24099. The chat interface 24090 may be populated with a natural language input interface 24094 and a suggestions interface 24092. The user may input a ninth natural language query "what keywords is website ranking for" into the natural language input interface 24094. The AI/ML concierge 24099 may parse the ninth natural language query using various parsing functionality in order to identify a desired outcome of creating a report that lists information about keywords associated with a website of the user. The AI/ML concierge 24099 may utilize the desired outcome and/or information parsed from the ninth natural language query in order to determine what functions and/or programming code to implement, which modules to utilizes, what inputs to input into the modules, an order with which to utilize the modules, whether outputs from certain modules should be used as inputs for other modules, and/or how to format and/or combine the outputs for generating the desired outcome. In this way, the AI/ML concierge 24099 creates an output 24096 of a report about the keywords associated with the website, which may include the keywords, a search volume for the keywords, a cost per click for the keywords, and/or links to landing pages for the keywords. The output 24096 may be populated with an Export to Spreadsheet interface element that the user can click in order to export the report into a spreadsheet hosted by a spreadsheet service. The output 24096 may be populated with an Export to Presentation interface element that the user can click in order to export the report into a presentation 24097 hosted by a presentation application 24098.

Intro/Overview of Tracking Model

Systems and processes are provided herein for translating between urchin tracking module (UTM) content (e.g., content used in a uniform resource locator (URL) of a campaign) and a globally unique identifier (GUID) that may be used to uniquely identify a database object, such as a database object for the campaign.

Background of UTM and GUID

In some embodiments, an urchin tracking module (UTM) to globally unique identifier (GUID) and validation system may embody systems and/or processes that may tie to a multi-service business platform framework, thereby allowing services of the campaign UTM to GUID and validation system to access campaign data that may be integrated into the platform framework (e.g., centralized data framework, distributed data framework, etc.).

In some embodiments, a central facet for an exemplary marketing hub product may include being able to report on effectiveness of a campaign (e.g., a marketing campaign). In some embodiments, assigning a universal ID to each campaign may facilitate integral workings of such a product. This may allow for reporting on any or all aspects of the campaign and tying customer business activity back to that campaign (e.g., tying a customer's journey through various business activities back to a campaign may provide a holistic overview of how a business cycle is actually functioning).

Further, aspects of a campaign UTM to GUID and validation system may be different and unique by having access to an entire office suite of activities and then being able to map that out from a marketing campaign.

Compared to existing UTM solutions, these systems and/or processes may be based on a combination of converting a UTM to a GUID and then using the GUID to connect to the multi-service business platform in a universal object access framework.

Business enterprises, individuals, etc. may employ digital marketing campaigns for, among other things, promotional purposes, such as to achieve awareness of a new product or service. Tracking activity and results of these digital marketing campaigns may rely on a mechanism of passing information among computing instances/systems via an Internet Protocol, such as a universal record locator (e.g., URL). In particular, a mechanism referred to as UTM, which is known to stand for Tracking Module may provide valuable information to digital marketing campaigns. A UTM, which may be passed as a set of parameterized fields in a URL, may include an identifier for a corresponding digital marketing campaign. In some embodiments, an identifier for a digital marketing campaign may be represented in a UTM as a value of a "CTM_campaign" field. When the "CTM_campaign" field, herein referred to as the campaign name may be unique for a given digital campaign tracking framework, all activity associated with URLs containing a corresponding UTM may be tracked and attributed to the corresponding digital marketing campaign.

Digital marketing campaigns may include a range of digital assets, such as advertisements, posts (e.g., blog posts, social media posts), emails, webpages, workflows, etc. A digital marketing framework may handle these assets through a structured database, such as a customer relationship management (CRM) database that may be configured to relate this range of assets to a campaign based on, for example, the unique campaign name. When the amount of data handled by such a framework is small, a unified database may suffice for economical operation. However, the amount of data (e.g., the number of campaigns, number of assets, number of distinct clients with campaigns, etc.) may far exceed capabilities for even a database distributed over a few data servers. Therefore, campaign databases, and without limitation CRM databases used for handling such campaigns may be distributed over dozens if not hundreds or more of servers across the Internet. Further, as the number of campaigns and the number of clients executing campaigns handled by a distributed CRM database increase, it may become likely that two or more campaigns may be assigned the same human readable name. Resolving a UTM with a campaign name that is not uniquely distinguishable for a given distributed CRM database (or the like) may require significant computing resources (and more importantly excessive time) that may compromise the campaign and/or result in failure.

In some examples, even without a campaign name collision, determining a location of content (e.g., a database object instance of a campaign) for a particular UTM in a large distributed database may involve undue overhead in terms of computing resources (e.g., maintaining and accessing cross references of campaign-location with a human assigned campaign name across many servers for each occurrence of a UTM in an advertising campaign), excessive time (delays due to processing a URL may result in user dissatisfaction), as well as impacting handling common occurrences, such as a change to a human-assigned campaign name (e.g., updating such cross reference resources throughout the distributed database and maintaining a history of object instances of prior campaign names and related data).

In some embodiments, large distributed databases, among other types of record keeping systems, may benefit from efficient assignment of a unique identifier to each item in such a database. In some embodiments, a unique identifier may be assigned to a set of records (e.g., a database object instance) for each campaign in the database. Various approaches for generating a statistically unique identifier are provided. In an example, one such approach may involve producing a long random number so that even if more than one billion such numbers are generated, a probability of a collision may be well below a collision threshold for use of the identifiers generated. An example of a statistically unique identifier may be referred to herein as, among other things a GUID, which may be an acronym for "Globally Unique Identification Data", "Globally Unique Identifier", unique object identifier, unique object ID, ID, etc. Further, a human assigned/generated campaign name may be abbreviated herein as HGCN.

Therefore, there may be a need for efficient methods and systems to ensure that each campaign name (e.g., a campaign name for a digital advertising framework; a campaign name used in a UTM) may be unique. Further there may be a need for unique campaign naming methods and systems that may enable users to define (and redefine) a human-readable name for each campaign without being artificially restricted to a subset of all possible names, such as only using names that may not already be in use by another customer in a multi-service business platform database. Also, there may be a need for efficient access to a corresponding portion of a distributed CRM database (e.g., a database object instance) when presented with a unique campaign name.

Defining UTMs, GUIDs, and Processes

In some embodiments, an Urchin tracking module (UTM) may be a global standard used by marketers to track effectiveness of marketing campaigns across different sources and media (e.g., identifying marketing campaign clicks and internet activity). A campaign UTM may be a standard way of linking a marketing campaign to a location of clicks (e.g., clicks came from a social network website or app).

A campaign UTM may be defined to facilitate linking user activity to the campaign. In some embodiments, clicking on content within a social network website may take a user to a company webpage. The corresponding URL on a browser's address bar may have a relatively long string of words, characters, numbers, symbols, etc. that may be tagged onto a link, so that when a browser arrives at the target website, it may obtain insights and/or analysis such as a click coming from the social network website or a click coming from promotional content, and these actions may be associated with a marketing campaign. A campaign UTM may be a standard way of expressing the notion that clicks came from the marketing campaign.

In some embodiments, a globally unique identifier (GUID) may be a randomly generated identifier with a relatively low probability of collision which may be commonly used as an identifier in distributed systems.

In some embodiments, described herein are systems and processes of a way to directly translate a campaign UTM into a GUID. For example, a GUID may be essentially a relatively long, random number that may be generated in a specific way. A valuable property of a GUID may be the ability to randomly generate the GUID. Even if a system generates billions of GUIDs, the probability of getting a collision may be extremely low. This means that GUIDs may be used by distributed systems, such as systems with a relatively large data set that may not easily fit on a single database server. To operate effectively, the data set may be split across one hundred or more servers. In some embodiments, the system may use each GUID as the unique ID for existing and new entries knowing that the system may likely not get a collision between two entries in the data set having the same GUID.

Distributed systems may be used for promotional campaigns by companies that have data sets that may be relatively large (e.g., the data set may not fit on one computer, may not fit on a local database, may not fit on one system, etc.). In some embodiments, accessing a distributed system with a UTM may require a two-step process: (i) the system checks the UTM and (ii) looks up and determines which object belongs in the data set for the UTM. In some embodiments, this may involve using a cross reference between a campaign identification portion of the UTM and an identifier of the corresponding object in the distributed data set. In some embodiments, the system may obtain the location of the resource (e.g., blog post) in the data set through the two step process, and then may use that resource to execute one or more activities that may be required in the campaign. Therefore, when translating a UTM to an object identifier/location, an extra data store query may be introduced to lookup the location. The methods and systems of UTM to GUID processing may be able to directly convert a UTM to an object location (e.g., GUID), which may allow for performance improvements in distributed systems. In some embodiments, a system to transform a UTM directly to a GUID may enable the system to query a correct data store or an intermediary system in between, and may provide faster access to data set assets even for systems with externally distributed databases.

Example UTM System and Process

The multi-service business platform 1000 may further include an urchin tracking module (UTM) to globally unique identifier (GUID) and validation system 25101 for enabling efficient and disambiguated access to a campaign object in a database, such as a customer relationship management (CRM) database based on an encrypted string in a UTM property of a uniform resource locator (URL). The multi-service business platform 1000 may also include a registration system 250103 of registration patterns that enable independence of applications that consume CRM object data from the underlying structures of those objects while further enabling efficiently maintaining consistency and updating of objects. The campaign UTM to GUID and validation system 250101 and the registration system 250103 may communicate with various systems, devices, and data sources of the multi-service business platform 1000.

Figure 25:
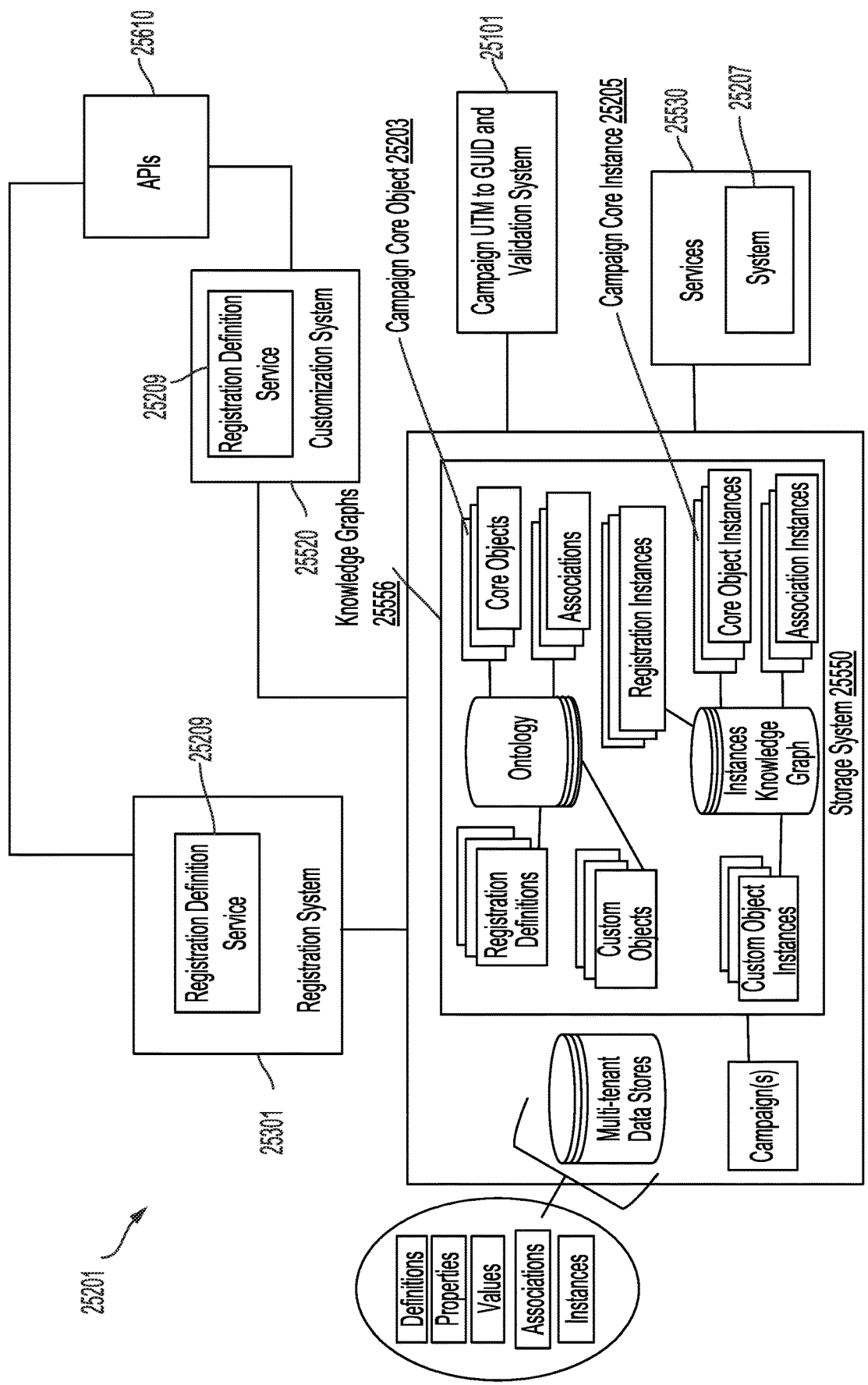

Referring to FIG. 25, a system 25201 of the multi-service business platform 1000 may include a registration system 25103 (that may include a registration definition service 25209) connected to a storage system 25550 and to a customization system 25520 (that may include a registration definition service 25209) via a set of APIs 25610. The registration system 25103 (and registration definition service 25209) may be used to create and use registration objects. The customization system 25520 may include the registration definition service 25209 for creating and/or generating registration objects. Further, similar to the organization of custom objects, an ontology may include registration objects and/or definitions and an instances knowledge graph that may include registration object instances. The storage system 25550 of the multi-service business platform 1000 may include a knowledge graph 25556 that facilitates associating core objects (e.g., campaign core objects 25203) and associations with registration definitions and custom objects via the ontology. The knowledge graph 25556 may further facilitate associating core object instances 25205 with association instances, custom object instances, and registration instances via the instances knowledge graph. Further, the system 25201 may include a campaign UTM to GUID and validation system 25101 that may be connected to the storage system 25550. A set of services 25530 that are associated with the storage system 25550 may include a system service 25207 (e.g., a calendar system service, an activity feed service, an asset association service, a campaign management service, etc.) that may rely on one or more output of the registration definition system 25103. Campaigns of the storage system 25550 may be associated with knowledge graph 25556. The storage system 25550 may include a set of multi-tenant data stores that may store several types of data including definitions, properties, values, associations, and instances. In some embodiments, the campaign UTM to GUID and validation system 25101 and the system service 25207 of services 25530 as shown may be connected to the features and/or components of the storage system 25550. Also, the campaign UTM to GUID and validation system 25101, the registration system 25103, and the registration definition service 25209 may be connected to the system service 25207 of the services 25530 indirectly via the storage system 25550.

In some embodiments, a UTM may include one or more attributes that facilitate identification of a corresponding campaign. A value for one of these attributes may be a name of the campaign. This campaign name, which may be a text string including words and spaces (e.g., "My campaign abc"), may be converted into a URL compatible string, such as by replacing spaces with value % 20. In some embodiments, this conversion may be expressed as UTM=URL (name), where (name) may be the example campaign name "My campaign abc", etc.

In some embodiments, when a campaign name changes, the UTM for the renamed campaign may need to be changed. However, to ensure all named versions of the campaign may be maintained in the CRM, older versions of the UTM may need to be stored separately from, although linked to the changed name campaign. If a UTM of a campaign were to change, then use of the changed UTM may cause a complete break from the prior named campaign. If a campaign of the changed UTM did not exist, then this may break tracking of the UTM completely. In some examples, the UTM may have to be static and permanent which may be typical for most systems. Once it becomes a modifiable entity, most systems may break down and stop working. Functionality to change the UTM of a campaign, which was previously not supported by advertising campaign handling platforms, is provided herein.

In some embodiments, a process for generating UTMs that relies on constancy of a campaign name in a UTM may include taking a generated campaign name (e.g., a Human Generated Campaign Name (HGCN)), such as "My first campaign." For use in a URL the name may be converted (e.g., replacing spaces with a symbol) to result in a URL compatible string "My%20first%20campaign." From this URL compatible string a UTM may be created with a name attribute "&CTM_campaign=My%20first%20campaign."

With each renaming of this campaign, a new UTM may be generated by changing the UTM_campaign attribute. For example, through a sequence of renaming of a campaign with an object identifier (e.g., ID 36792613638), a corresponding "CTM_campaign" attribute value may be URL converted to the following: a) My%20first%20campaign, b) My%20campaign, c) The%20campaign, d) The%20best%20campaign%20ever In some embodiments, when utilizing a given CRM database for several clients, even though the campaign has been renamed, it may be difficult to create another campaign with any of the previous or current campaign names used for other clients in the CRM. Also, it may be difficult to distinguish between two campaigns with the same name. This may happen because, when the name of a campaign is used as the sole identifier of a campaign in a UTM, it may be unique across multiple versions in the CRM. In some embodiments, in a user interface through which a user may generate a new campaign name, a warning may pop up (e.g., "Couldn't create campaign" warning or "Campaign with this UTM already exists" warning). In some embodiments, a given CRM database may be used for several clients so that even though a campaign has been renamed, it may be difficult to create another campaign with an older name in the CRM.

Figure 26:
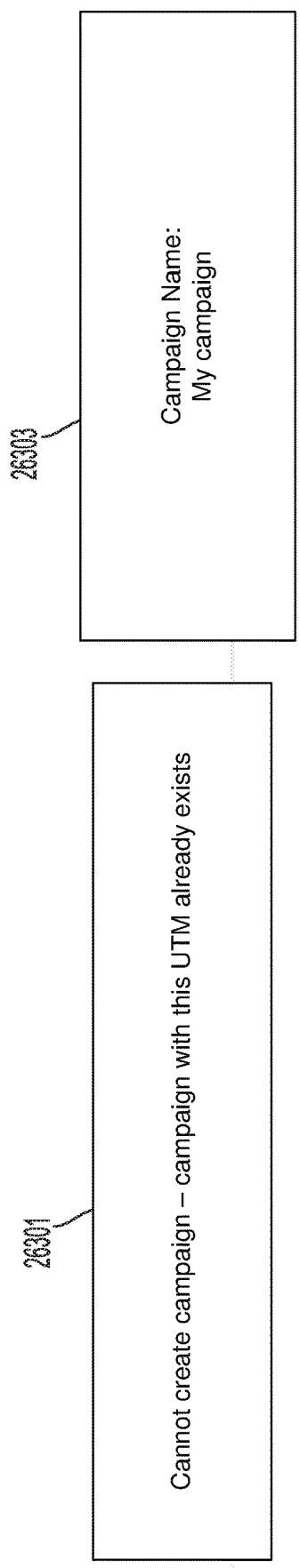

Referring to FIG. 26 a portion of a user interface of the campaign UTM to GUID and validation system 26101 may depict an error message that may be displayed when a user attempts to create a campaign (or rename an existing campaign) with a campaign name that may already exist in the CRM. In response to a user entering a campaign name in the required campaign name field 26303, a campaign creation error 26301 may be presented to the user.

New Improved UTM-GUID System

In some embodiments, the campaign UTM to GUID and validation system 25101 may be used, even for a renamed a campaign, to reliably retrieve intended information from a campaign UTM. This may be achieved by making a UTM that has a campaign name value, which may be stored in a database (e.g., a CRM database), completely redundant, such as through use of another corresponding identifier in the UTM, such as the GUID for the object (e.g., object ID) in the CRM. This campaign UTM to GUID and validation system 25101 may retrieve the intended information directly from the corresponding identifier value(s) (e.g., the GUID) which may be embedded in the UTM. While the UTM may be generated from the name of the campaign, the campaign UTM to GUID and validation systems and methods described herein may generate the UTM from the name as well as the object ID which may be optionally encrypted, and the version (e.g., a version of the campaign that corresponds to the campaign name) may be optionally encrypted. As will be described in greater detail, the object ID value and the version value may be combined and encrypted into a single encrypted string for use in a UTM.

In some embodiments, a generated campaign name may include a human generated campaign name or HGCN. Use of these terms may not require or imply that a human may physically generate (e.g., enter in a computer user interface) a name. Although user entry of an HGCN may be one example, the systems and processes herein of campaign UTM to GUID and validation may include any other form of generating and/or selecting a campaign name including being completely or partially computer automated. In some embodiments, a HGCN may be a familiar or conventional string of characters. However, any string of characters, whether they correspond to one of the examples herein or have no recognizable connection thereto may be used for the HGCN as described herein. As a further example, while a randomly generated HGCN may be used with the systems and processes provided herein.

In some embodiments, data for a UTM may include "human generated campaign name+<space>+multi-encrypted object ID+<space>+encrypted version." In other example embodiments, data for a UTM may include "Human generated campaign name+<space>+multi-encrypted [object ID+<space>+name version]". In some embodiments, name version may correspond to an index given to the campaign name by the system when a human generated campaign name is established/changed. A UTM text string for use in a URL may require conversion, such as URL conversion (data). For example embodiments in which the object ID and the version are combined and encrypted, this may result in a URL including: &CTM_campaign=

"campaign_name%20encrypt(36556484252 2)". For example embodiments in which the object ID and the version are encrypted separately, this may result in a URL including &CTM_campaign="campaign_ name%20encrypt (36556484252)%20encrypt(2)", etc.

As an example, a UTM for a CRM object in the multi-service business framework may include a name attribute/ property (e.g., campaign_name). In some embodiments, any property of a campaign object in the framework may have its own versions. In this example, the campaign may be only renamed once (e.g., notice the version of "2" at the end of the UTM_campaign string). However, if it was renamed five or six times, the CRM or the framework may store all six versions of the names. Each renamed version may be allocated a next sequential version number so that for a campaign that was originally named and then renamed five times, the version for the most recent name may be "6". The approach may upend the object ID (e.g., GUID that may uniquely identify this CRM object), then upend the information (e.g., encrypted object ID and version) along with the campaign name, and then may use it to generate the UTM. In this example, even if the name is changed, the system may be able to efficiently process a UTM to get or obtain the object ID and the version after decrypting the relevant portion of the UTM. In some embodiments, the system may directly fetch the name from the object that corresponds to the version in the UTM and may check if the name portion of the UTM is consistent with the name of that version taken from the object. If it is so, then the UTM may be a valid UTM. If not, then the UTM may not be the correct UTM for the corresponding CRM object.

A UTM with this compound UTM_campaign attribute value may relate to an object ID (e.g., ID specifically relating to custom objects interaction with the platform framework) in creating a "campaign object" for a data store. This allows users to create their own campaign objects that may be part of the core objects (where core objects may include campaign objects and core object instances may include campaign object instances).

In some embodiments, systems and processes described herein may include combining human-generated campaign name data for a campaign with an identifier uniquely assigned to a (database-specific) object instance for the campaign. This combining may facilitate identifying a distributed database object instance of a campaign directly from a UTM. This combining may also facilitate generating a campaign name (e.g., for use in a "CTM_campaign" attribute of a UTM) that may be unique for a given human generated campaign name and may be common across versions of the underlying campaign independently of which set of human generated name(s) for the campaign may be used in a UTM. This combining may further provide benefits including more efficient processor utilization when handling all aspects of an advertising campaign associated with use of a UTM, etc.

One example of improved computing efficiency may include direct identification of an object instance in a CRM database from each UTM used in all campaigns being operated through the CRM database. Direct identification of an object may eliminate overhead such as determining a correspondence between a human assigned campaign name and a set of records (e.g., an object instance) in a database (e.g., via an intermediary system that performs a cross reference operation). This overhead, which may be common with some current UTM technology, may be eliminated. Another computing efficiency improvement may include a reduction in data storage and network bandwidth demand for common advertising campaign operations, such as renaming a campaign when a campaign operator may seek to track, among other things, performance differences that may be made to campaign parameters, etc. At least a portion of the efficiency improvement may be the reduction and/or elimination of maintaining separate object instances for each renaming of a campaign. Details of how these and other efficiencies are obtained by the methods and systems are described herein.

In some embodiments, when relying on a human-generated campaign name for uniquely tracking campaign activity and performance, renaming a campaign may involve, among other things, duplicating all campaign-specific assets in a campaign database to be accessed under the renamed campaign. Continuity of the campaign across names may be generally lost since there may not be an effective mechanism within a UTM for such multi-name tracking. Further, user interface systems through which campaign names may be generated (e.g., human-generated campaign names) may maintain an up-to-date list of campaign names and may prevent users from selecting a campaign name that may already be in use (e.g., even if it is in use by an unaffiliated third party user of such a multi-service business platform that may include an advertising campaign platform). Further, when multiple users are using such interface systems to generate campaign names, real-time name generation consistency may become a greater complication that may yield poor user experience in some examples.

The methods and systems described herein may use a combined human-generated campaign name (HGCN) with a random and unique identifier for a database object instance of the campaign to provide some advantages over other systems.

In some embodiments, advantages of the UTM-GUID processing methods and systems described herein may include a process for creating the GUID as distinct from a process of using the GUID with a campaign. This new process may allow for a "more direct" access to a campaign object in a CRM than existing UTM-based campaign systems that may generally require an intermediate look-up step (e.g., to convert the "CTM_campaign" UTM attribute into a database index). This new process may also allow for multiple uses of a single campaign name, which may be a human generated and generally human referenced name due in part at least to the incorporation of the GUID into the UTM—this may be important for a multi-tenant unaffiliated client common CRM database. Yet further this may allow for revision tracking of changes. Also, this may allow for continuity of campaign performance, while enabling distinction based on when a change may be made. As an example, when a campaign name is changed, data before and after the change may be identified and treated uniquely or as a single continuous campaign. Another advantage may include a benefit of using a GUID for a campaign object such that all related objects in a campaign may be identified through the GUID. Yet further advantages to an operator of a multi-service business platform may include use of only a portion of a UTM_campaign value to identify which campaign may be associated with the UTM. This may allow the operator to determine that two distinct UTM_campaign values may reference different versions of a single campaign. Third-party UTM monitoring software may use the entire UTM_campaign value and therefore may not determine that two differently named UTMs are for the same campaign.

Further, external tools may receive traffic with a UTM, and on that UTM may be the name. The UTMs of the UTM to GUID and validation system may have a changed shape compared to typical UTMs, at least due in part to the UTM attribute UTM_campaign having a non-human readable portion.

Another advantage may be in the use of a JavaScript Object Notation (JSON) array structure (e.g., for the "value" of the "hs_name" attribute), because the JSON array structure may implicitly assign an index to each entry in the array, thereby producing an automatic versioning system by using this index as the version of the encapsulating object and/or of the corresponding HGCN.

Yet another advantage may be a result of including both the human generated campaign name string and a corresponding object id and version (e.g., JSON object name array index) that operate as a validation security feature so that use of the human generated campaign name string and an incorrect encrypting of the object ID and version may be rejected (e.g., the CRM database may not be accessed).

In some embodiments, use of a GUID within a UTM may improve ability to implement changes across multiple aspects of the platform where there may be multiple systems that may have to be updated.

Some advantages of using a compound UTM name field may include directly accessing the campaign object in the distributed database from the UTM/URL because object IDs may be directly encrypted therein. Further, as described herein, access to the CRM may be enhanced because the system may compare the name in the UTM to name information in the corresponding object based on the version decrypted from the UTM (e.g., a validation form of security). Because the UTM may be dynamically generated from the CRM database, it may not need to be stored in the CRM in an encrypted or compound form (e.g., like a CRM object). As such, it may be a more inferred value than a value that may be stored.

In some embodiments, another advantage of the methods and systems for UTM to GUID processing may include the object ID allowing direct (e.g., lookup table free) access to the campaign source object in the CRM. This may allow faster database access to the object (e.g., Campaign object) in the CRM as the object ID in the UTM may be the unique identifier in the CRM. This core benefit of faster database access may also mitigate the potential name-change issues mentioned herein. This approach may be advantageous on several technical levels. For example, it may speed up and simplify many CRM operations.

Yet another benefit may include being able to validate a UTM through validation of the name of the campaign for a given version expressed in the UTM. CRM object properties may store versions. If this validation succeeds, the UTM may be considered valid.

In some embodiments, another advantage may be that the processes and systems may solve the problem of a UTM being unique across versions of a campaign, at least for versions of the name of the campaign (e.g., as the combination of object ID and version may be unique as object ID may be unique for each campaign).

Further, there may be other advantages provided. For example, these methods and systems may solve the need to store a UTM and associate all UTMs (for all names of a given campaign) to a single campaign. Additionally, it may improve a platform operator's ability to implement changes across multiple aspects of the platform (e.g., including multiple systems that may have to be updated). Yet again it mitigates name change issues, such as when a user may prefer to change a campaign name but continue to use the same campaign underlying object while maintaining continuity with all earlier names. Also, a compound UTM_campaign value as described herein may support external solutions to the problem of making this compound UTM value human readable to at least some extent. In some embodiments, a user interface process may be configured to render a parsed UTM.

The methods and systems of generation and use of a GUID with a UTM for a multi-service business platform may enable advanced advertising campaign control and tracking capabilities. In some embodiments, one substantive benefit of these methods and systems may be facilitating independence of processes to generate GUIDs and instantiate GUIDs for distributed database system management from use of these GUIDs as a mechanism for enriching use of UTM technology, particularly for a multi-service business platform comprising a multi-tenant database of unaffiliated clients. In some embodiments, the methods and systems herein that facilitate integrating use of a GUID with human campaign naming capabilities may further streamline computing processes for operating UTM-based advertising campaign. As an example, a campaign object in a relatively large, distributed object-based database may be directly accessed from a "CTM_campaign" attribute value in a UTM due at least in part to encrypting the unique identifier of a campaign object that corresponds to the UTM into this attribute value. Further, these methods and systems may enable independence of a campaign generation and operational framework from an organizational framework for a corresponding distributed database architecture. All that may be required to be shared between the frameworks may be a unique object identifier. Intermediate lookup/cross-reference operations and resources (e.g., a server dedicated to performing campaign name to distributed database object cross referencing) may be further reduced and/or eliminated through these methods and systems.

Further benefits enabled through the methods and systems herein may include allowing multiple uses of a human generated campaign name for different clients in a multi-tenant campaign management database. This may be supported at least in part by integrating the campaign management database object identifier (GUID) directly into a UTM context. Without this integration and use of the GUID at the UTM level, campaign naming may be substantively (and from a human user's perspective arbitrarily) restricted to avoid duplicate names. This may be particularly beneficial when multiple unaffiliated clients may be using the common UTM framework for advertising campaigns within a single campaign management database.

Yet further benefits include a degree of revision tracking of changes (e.g., changes to campaign name) of underlying campaigns. In addition to the benefits above, the methods and systems for integrating a GUID with UTM technology may include allowing for continuity of campaign performance tracking, while enabling electing between continuity or distinction as changes to a campaign (e.g., a campaign name) may be made. Continuity may permit a holistic view of a campaign from instantiation throughout the life of the campaign, even when changes to a campaign name may be made. Distinction may permit tracking how changes to a campaign (e.g., those made in coordination with a change in campaign name) may impact performance by permitting tracking and measuring performance for human generate campaign name-based instances of a campaign. These benefits may extend further by reducing computing/data storage resources as changes to the campaign name may be made. Not only may two campaign names be linked with no overhead, but as campaign name changes are made, campaign attribute values that are unique to the renamed campaign may need to be tracked. Campaign elements/attributes that remain constant across a campaign name change may be maintained directly in the CRM database due to the indexing nature of elements within a campaign object. Thus, there may be no need to copy an entirety of a campaign CRM content merely when the campaign name may be changed.

New Improved UTM-GUID Process

It may be instructive to explore and compare the current UTM process (HGCN-based only) to a new compound UTM campaign name process performed by the campaign UTM to GUID and validation system described herein.

In some examples, to create a UTM for a campaign, a system may take a name of the campaign. The name of the campaign may be converted (e.g., encrypted in some examples) in such a way that it may work in a hyperlink because there may be a set of allowed characters. This step of the process URL conversion may be called. In some embodiments, the UTM variable "CTM_campaign" may be a length-limited version (optionally encrypted) of the campaign name. Although CRM use rules may enforce that this human generated campaign name may be unique to the customer who generates it, it may not be unique across the entirety of CRM data for a multi-service business platform that may serve several customers. Therefore, two customers may have exactly the same UTM campaign name variable. Included in the UTM may be some non-human readable information that may be encrypted to allow readily determining of the object within the CRM without having to do an intermediary lookup.

An example of where such an approach may be helpful may include one in which a platform may have 10 million users but only 5 million may fit in a single instance of the platform database. One approach may be to place one half of the alphabet, based on a customer's name, on one server, and a second half on another server, making a lightly distributed database. The system may look at the name and determine which database to select. However, when the size of the database may require 20, 30, 40, or 50 database servers, trying to be well balanced such as a simple name-based allocation scheme may be difficult. In such examples, the system may use either an intermediary server that may have enough information to do the look up and determine which server to select to obtain the data, or the system may use a mathematical operation (e.g., a random hash) to determine the server. In some examples, a distributed system in which no one server stores all the data may include an operation in the middle to determine how to get to a final storage location/server.

In some embodiments, using a unique ID (e.g., GUID) for each object in the CRM in the multi-service business framework, each object may be found through its ID. The multi-service business platform may have access to and/or may provide multiple APIs to do this. For example, to find a specific object given its ID, the platform may simply query using one of the platform CRM access APIs. The GUID may be considered the CRM equivalent of a primary key in a database. In some embodiments, a GUID may be applied to a range of objects in the CRM and may include custom objects with respect to the ID numbers.

In some embodiments, once an object ID is available, the system may directly query (e.g., via the API) that object based on the ID. There may be some objects which have multiple campaign names. If a campaign were renamed multiple times, the corresponding campaign object may be stored under the ID for multiple versions of the name. Even though this campaign was renamed multiple times, the corresponding campaign object may be accessed independently of the various names because the campaign UTM to GUID and validation methods and systems may generate a UTM that may use an encrypting of the unique object ID. The system may use that object ID (decrypted from the URL/CTM) to directly query a CRM distributed database for the campaign object. By retrieving the object from the CRM, properties of the object, including the entire group of properties of the object along with older versions of properties of the object stored in the object, may be accessed from the object.

An exemplary action associated with the compound UTM campaign naming techniques employed by the campaign UTM to GUID and validation system described herein may include using a URL to easily access the specific campaign object in a distributed CRM database. This may be due at least in part to the system's ability to directly determine a unique identifier (GUID) of the object with at least the UTM portion of the URL. This action may include fetching the UTM_campaign value in the URL and decrypting the last portion of the value to get the version of the object that may be associated with the campaign name found in the first portion of the UTM_campaign value. This version (e.g., the nth version) may also denote how many times the campaign object has been renamed. Another action may include obtaining the object ID (e.g., derived by decrypting the last portion of the UTM_campaign value), and then using the obtained object ID (e.g., as a database object index) when fetching the campaign object from a CRM. Yet further, an action may include validating the UTM name in the URL with the nth version of the campaign's name. If it matches, the system may validate access to and/or pass the object.

In some embodiments, a URL may be used in a process to decrypt a GUID of a campaign object associated with a UTM. The system may fetch the last value in the URL and may decrypt it to get the version, which may also denote how many times the object ID is encrypted. The system may next decrypt the object ID n times where n may be the version number. The system may next obtain the object ID and fetch the campaign from the CRM. The system may then validate, e.g., by matching the name of the nth version of the campaign's name. If it matches, the system may validate or pass the object.

In some embodiments, an example process to generate a "CTM_campaign" parameter for a UTM from a campaign object in a CRM may include the following steps: (i) take a human attributed campaign name (HGCN), such as the latest name from the "names" array in the corresponding object="My first campaign"; (ii) take the object ID of the campaign object and the version of the HGCN in step (i) (this may be the index of the HGCN in a name array of the object)="objectId=36792613638 and version=1"; (iii) encrypt object ID version (e.g., use advanced encryption standard (AES) encryption) to form a "versioned_ID"="encrypt("36792613638 1")→+9sXBkwpk/JzQY-WOHpRdvw=="; (iv) append this encrypted "versioned_ID" to the campaign name from step (i) (e.g., <campaignname><space><encrypted version_ID>)="My first campaign +9sXBkwpk/JzQYWOHpRdvw=="; (v) URL may convert the above payload= "My%20first%20campaign%20+9sXBkwpk/JzQYWOH-pRdvw=="; and (vi) assign it as a value of the "CTM_campaign" attribute for the URL.

With each renaming, a new URL-converted UTM may be generated. For example, a campaign with an object ID (e.g., object ID: 36792613638) may be converted to the following UTMs (e.g., where each UTM may reflect an impact of renaming the campaign): a) My%20first%20campaign%20+9sXBkwpk/JzQYWOHpRdvw==; b) My%20campaign%207sQO5Arq1+YPGVXaOjHMnA==; c) The%20campaign%20moOlwPraVOmX5hGQoscgUQ==; d) The%20best%20campaign%20ever%20NOjjkITe58jAavCjfpds2g==

Figure 27:
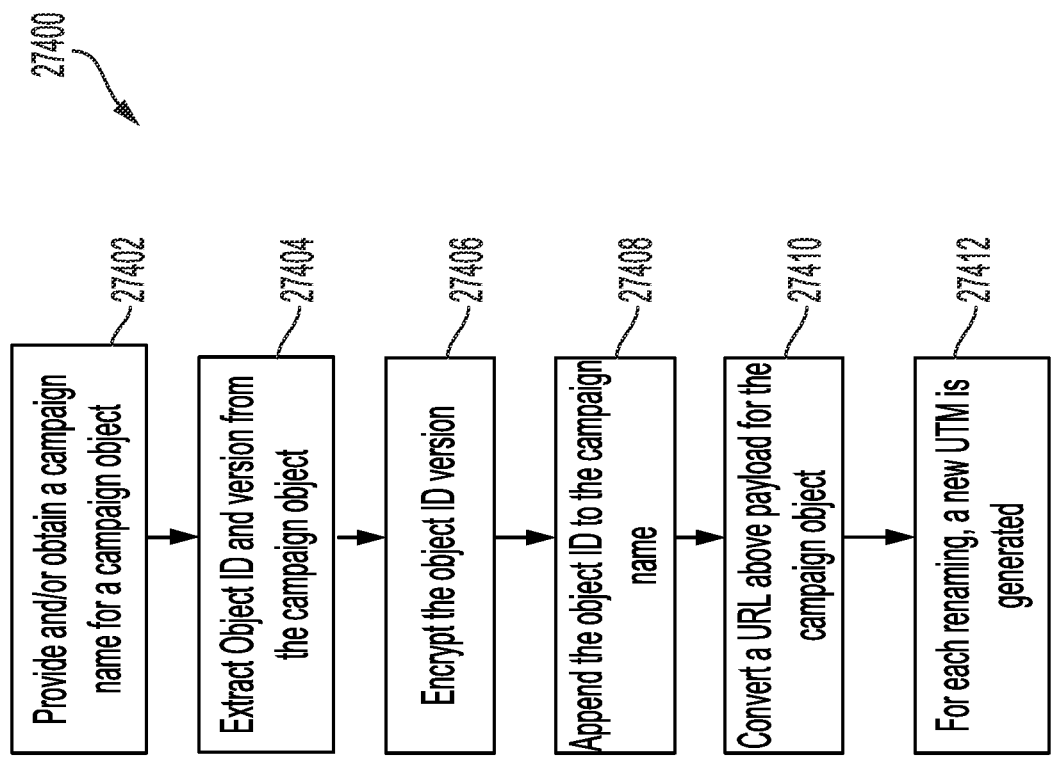
FIGS. 27-30 are flow charts illustrating example of sets of operations for performing one or more of the provisions set forth herein.
Figure 28:
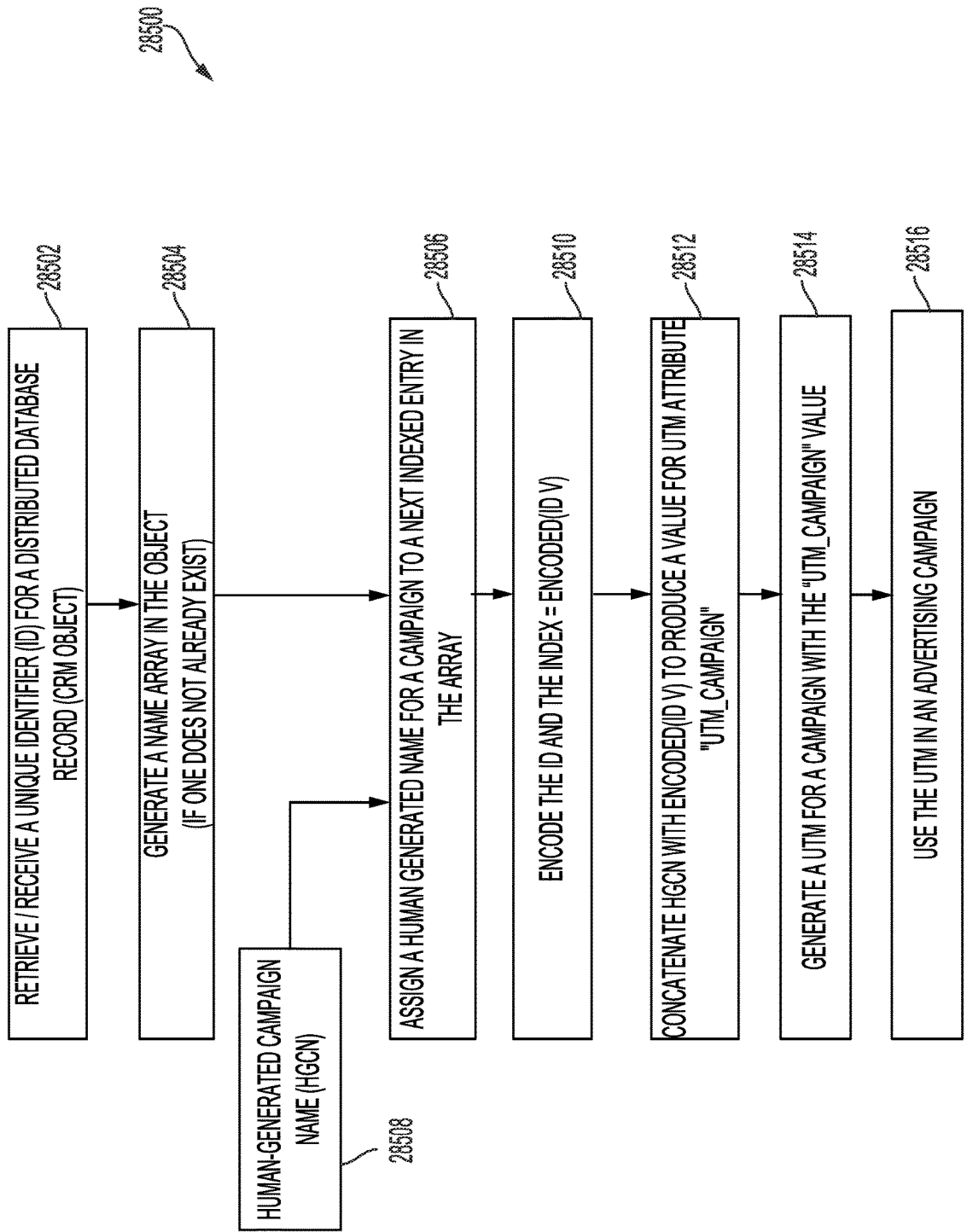

FIGS. 27 and 28 depict a process for generating a UTM with the campaign UTM to GUID and validation system 25101. The figures progress from a broad depiction in FIG. 27 to a detailed depiction in FIG. 28 of the process. Referring to FIG. 27, a flow chart is depicted illustrating an abstracted set of operations of a method for using a campaign UTM to GUID and validation system (e.g., campaign UTM to GUID and validation system 25101) of the multi-service business platform 1000 to validate campaign objects and convert a campaign GUID to a UTM. The flowchart 27400 may include a step in which a campaign name for a campaign object may be provided and/or obtained at 27402. An object ID and version may be extracted from the campaign object at 27404. At 27406, the extracted object ID and version may be encrypted. At 27408, the encrypted object ID and version string may be appended to the campaign name from 27402. A URL UTM payload may be converted that may facilitate identifying the campaign object from the URL at 27410. For each subsequent renaming of the campaign, as depicted at 27412, a new URL UTM payload may be generated by following the flow of the flowchart 27400.

Referring to FIG. 28, a flow chart 28500 illustrating a set of operations of a method for using a campaign UTM to GUID and validation system (e.g., campaign UTM to GUID and validation system 25101) of the multi-service business platform. Specifically, for example, FIG. 28 shows a process for generating a UTM campaign identifier (e.g., "CTM_Campaign") that may uniquely map to at least one distributed CRM database (e.g., single distributed CRM database) object for each human generated name. In particular, the steps in this flow chart 28500 may be performed to produce a UTM that may be unique for a specific human assigned/generated campaign name while maintaining direct access to the campaign objects in the distributed CRM database identified by a GUID independently of the human generated campaign name (HGCN). In some embodiments, FIG. 28 depicts generating a value for a UTM campaign identifier attribute (e.g., UTM_campaign) for each HGCN that may uniquely map to a distributed CRM database object instance identified by the GUID in flowchart 28500. At 28502, a unique identifier (e.g., a GUID) may be received/retrieved. This GUID may be generated using the random number generation techniques described herein and elsewhere that may include producing a data string that may be substantially unique. This GUID may be associated in a one-to-one relationship with an object instance in a distributed CRM database or the like that may optionally be configured for use with an advertising campaign that may rely at least in part on existing UTM technology. At 28502, the GUID may be received from a random number generating system. In some embodiments, the GUID may be retrieved from the CRM database. The CRM database may be configured with at least a default advertising campaign object instance (e.g., optionally referred to herein as a core object) to which the GUID may be assigned. In some embodiments, the GUID may be preassigned to one of a set of default advertising campaign object instances that may be allocated as new campaigns that may be instantiated in the database. In some embodiments, the GUID may be generated contemporaneously with instantiation of a new campaign, such as when a user may request creation of a new campaign. The remaining processes of the flowchart 28500 may proceed substantially independent of how a GUID may be sourced at 28502.

As a next step in instantiating a new campaign (at 28504), a name array may be generated and/or configured in the object instance of the GUID (if one does not already exist). Alternatively, step 28504 may be bypassed when an existing object instance of the GUID may already include a name array.

In some embodiments, a name array within an object instance may be use in a JSON script that may include a GUID value for "objectId" of "36792613638" and name array "versions" that may include four (4) versions of a HGCN for this GUID/campaign/object instance. Each "value" entry in the "versions" array may represent a unique HGCN for the advertising campaign with GUID "36792613638". In some embodiments, each indexed entry in the "versions" array may be treated by the methods and systems herein as a unique version of the campaign that may correspond to the object instance. Each entry in the "versions" array may be accessed by an index number. There may be versions 1 through 4 of the HGCN. As will be explained for step 28506, when a campaign may be renamed (e.g., given a new HGCN), an entry may be added to the "versions" array. Therefore, in this JSON script example embodiment, campaign 36792613638 may be renamed three (3) times since being instantiated. Following conventional JSON script rules, an order of campaign renames may be merely the reverse of the order of elements presented in the "versions" array. In this example, the HGCN at instantiation of this object instance (e.g., "My first campaign") may, by default, be assigned index 1 in the "version" array. The most recent name may be "The best campaign ever" which may be assigned index 4 in the array. An array index value for a given HGCN may correspond to a unique version of a campaign assigned to a GUID. Therefore, version 1 of the campaign identified in the database as 36792613638 may correspond to the first HGCN and version 4 of this campaign may correspond to the most recent HGCN.

In some embodiments, information, such as object ID, version, and other properties and/or their values may be stored in an encrypted form in a CRM object, such as a campaign CRM object instance.

In some embodiments of utilizing JSON, at 28506, a human generated campaign name (HGCN) 28508 may be assigned to a next indexed entry in the array. During an instantiation of an object instance for a campaign, the next indexed entry may be entry 1 in the array.

28510, a combination of the GUID and index that may correspond to the HGCN (which may also be referred to as the version of the GUID) may be encrypted. A range of existing encrypting techniques may be applied, including without limitation advanced encryption standard (AES) encryption. In some embodiments, for a GUID of 36792613638 and a version of 1, AES encryption may produce: "+9sXBkwpk/JzQYWOHpRdvw=="

At 28512, the encrypting of the combination of GUID and version may be appended to the corresponding HGCN 28508 and recorded as a value of a UTM attribute for use in UTMs for the campaign. In some embodiments, this UTM attribute may be a "CTM_campaign" attribute. A "CTM_campaign" attribute value for one of the HGCNs in the "versions" array may be generated at 28512 to include a concatenation of an HGCN with an encrypting of the "objectID" for the campaign and the index into the "versions" array that may correspond to the selected HGCN, such as: <<My first campaign>><<AES encrypting (36792613638 1)>> that when converted for URL compatibility may result in a "CTM_campaign" attribute value of: <<My%20first%20campaign % 20+9sXBkwpk/JzQY-WOHpRdvw=>>.

The exemplary embodiment of FIG. 28 may further include combining the "CTM_campaign" value generated in step 28512 with other campaign attributes to produce an HSGN-specific UTM at 28514, such as for use in an advertising campaign, such as in a URL.

The exemplary embodiment of FIG. 285 may further include an optional process 28516 in which the UTM generated at 28514 may be used in an advertising campaign, such as by encrypting the UTM into a URL compatible form and applying the encrypted UTM in an Internet Protocol-based advertising campaign, email campaign, embedding in web pages (e.g., as a selectable link), etc.

Further, the processes of FIG. 28 may be embodied variously. In one exemplary embodiment, processes 28502 and 28504 may be performed when a new CRM database object may be instantiated. These processes may be performed for several campaign instantiations, such as to prepare a set of campaign CRM object templates. One or more CRM object templates may be configured further as a core object, which may include specific default values. In some embodiments, default values of a core object may include values for an advertising campaign as may be defined by an operator of a multi-business service platform. In some embodiments, an object instance that may be uniquely identified by a GUID may be configured for multi-service business platform features other than advertising campaigns. In some embodiments, processes 28502 and 28504 may be performed responsive to receiving the HGCN 28508 or as a workflow that may include process 28506 where a received HGCN 28508 may be applied to the CRM database object.

In some embodiments, process 28506 may be performed each time a new HGCN 28508 may be received, such as when a campaign administrator generates a new name for an existing campaign. Processes 28502 through 28506 may be performed when a newly named campaign may be instantiated as an object in a CRM database. These processes of the flowchart depicted in FIG. 28 may result in configuring a portion of an object in a CRM database that may, at a different time, be used for generating UTM content.

In some embodiments, processes 1000 through at least 28514 may also be performed contemporaneously with process 28506, but may alternatively be performed distinctly from processes 28502 through 28506. Encrypting processes at 1000 and concatenating processes at 28512 may optionally be performed during activation of a campaign. Generation of a UTM, such as may occur at 28514, may be performed contemporaneously with process 28512, but may alternatively be performed distinctly, such as during execution of a campaign for the HGCN 28508 when a UTM may be required, such as when a user may select a link in a webpage, email, posting, etc. that may be part of a UTM-based campaign.

Figure 29:
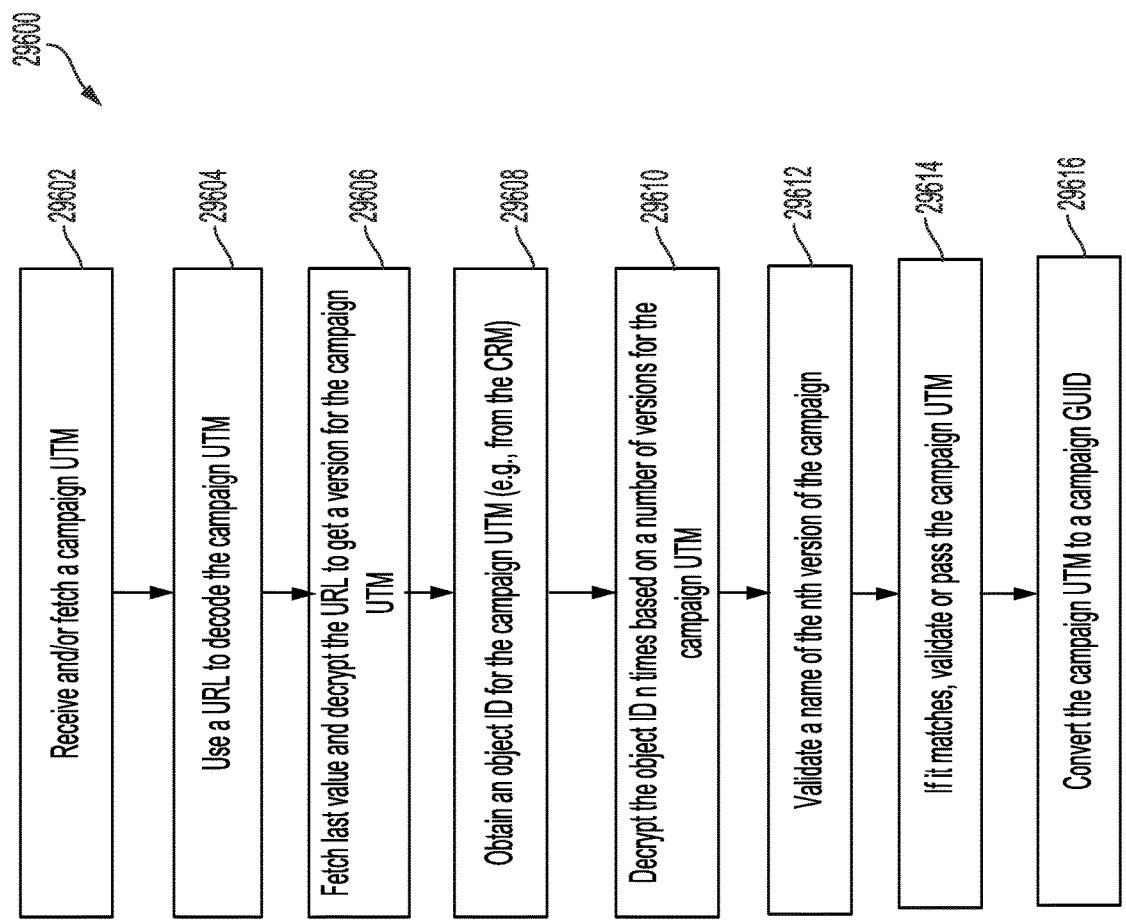
Figure 30:
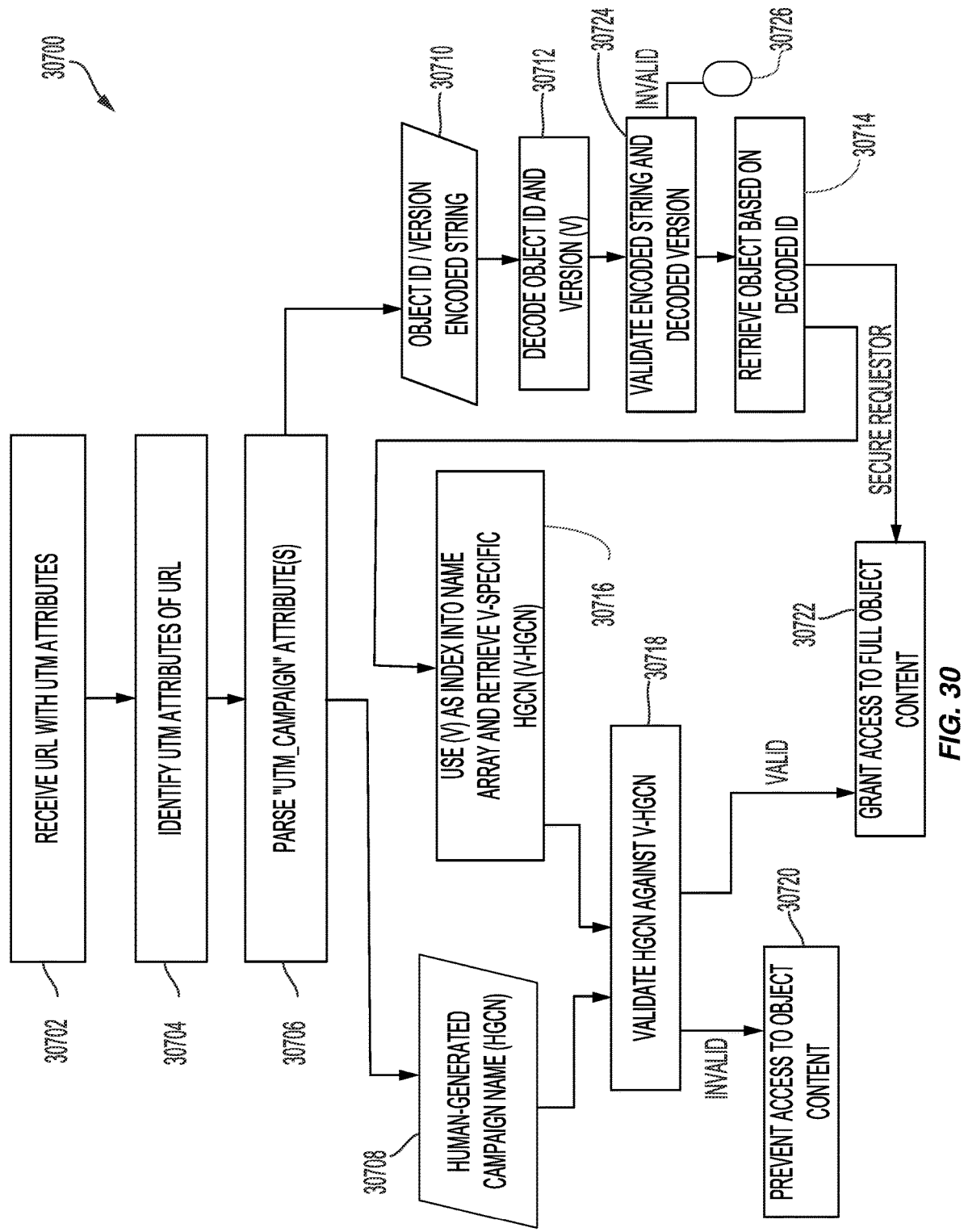

FIGS. 29 and 30 depict a process for retrieving a CRM object based on a UTM in a URL with the campaign UTM to GUID and validation system (e.g., campaign UTM to GUID and validation system 25101). The figures progress from a broad depiction in FIG. 29 to a detailed depiction in FIG. 30 of the process. FIG. 29 is a flow chart illustrating a set of operations 29600 of a method for using a campaign UTM to GUID and validation system (e.g., campaign UTM to GUID and validation system 25101) of the multi-service business platform to validate campaign objects and convert a campaign UTM to GUID. At 29602, the system may receive and/or fetch a campaign UTM. At 29604, the system may use a URL to decode the campaign UTM. At 29606, the system may fetch the last value and decrypt the URL to get a version for the campaign UTM. At 29608 the system may obtain an object ID for the campaign UTM (e.g., from the CRM). At 29610, the system may decrypt the object ID n times based on a number of versions for the campaign UTM. At 29612 the system may validate a name of the nth version of the campaign. At 29614, if it matches, the system may validate or pass the campaign UTM. At 29616, the system may convert the campaign UTM to a campaign GUID.

Referring to FIG. 30, a flow chart depicts a set of operations 30700 of a method for using a campaign UTM to GUID and validation system (campaign UTM to GUID and validation system 25101) of the multi-service business platform to validate a UTM and provide direct access to campaign objects in a distributed CRM database. In some embodiments, this set of operations may facilitate accessing a customer relationship management (CRM) distributed database record or object from a UTM based on each record in the CRM being identifiable by a unique ID, such as a GUID described herein.

In some embodiments, the set of operations 30700 may include receiving a URL that may include a UTM that includes one or more parameterized attributes at 30702. In some embodiments, at least one UTM attribute may be a "CTM_campaign" attribute. At 30704, the UTM may be processed so that at least the "CTM_campaign" attribute and corresponding value(s) may be distinguishable.

At 30706, a portion of the UTM attributes including at least the "CTM_campaign" attribute may be parsed. Parsing the "CTM_campaign" attribute may be based on an understanding of a predetermined structure for a value thereof based on the methods and systems described herein for generating a value of a "CTM_campaign" attribute, such as based on the processes described in association with at least processes of the UTM flowchart 28500 depicted in FIG. 28. In some embodiments, a value for the UTM attribute "CTM_campaign" may be structured as a text string of a human generated campaign name (HGCN) that may be followed by an encrypting of an identifier associated with the HGCN. The methods and systems for UTM generation and use in association with a multi-service business platform may be configured to process UTM attributes, such as "CTM_campaign" based on this understanding. This may provide an advantage over other, third-party service platforms that may rely on UTM technology for managing digital communication/advertising/promotional/tracking campaigns by facilitating a determination that each of two or more distinct "CTM_campaign" values detected in such promotional efforts may reference a common campaign.

Processing at least a "CTM_campaign" attribute of a UTM at 30706 may result in detection of: (i) a human generated campaign name (HGCN) 30708 portion, and (ii) a string of characters conveying an encrypting of an object identifier (e.g., GUID) and a version. In some embodiments, a value for a "CTM_campaign" attribute may include the following text: <<My first campaign +9sXBkwpk/JzQY-WOHpRdvw=>>. Processing this "CTM_campaign" attribute value may include separating the HGCN portion (30708) <<My first campaign>> from the encrypted portion (710) <<+9sXBkwpk/JzQYWOHpRdvw=>>. The HGCN portion 30708 may be stored for later use, such as for taking security measures including validating the UTM conveying this "CTM_campaign" attribute value.

The encrypted portion 30710 (e.g., object ID/version encrypted string) may be passed to process 30712 where the encrypted portion may be decrypted, such as through use of AES decryption. This decrypting process may be configured to produce two decrypted output values: (i) an object identifier value, and (ii) a version value. The object identifier value and version value may be uniquely associated with an object instance in a CRM distribute database of the multi-service business platform. For example, the encrypted portion <<+9sXBkwpk/JzQYWOHpRdvw==>> may be decrypted at 30712 using, for example, AES decryption to produce an object identifier value 36792613638 and a version value 1. In some embodiments, decrypting of the encrypted portion may be performed using the same approach used to produce the encrypted portion. Examples of such encrypting may be depicted in FIG. 28.

In some embodiments, optional process 30724 may be performed after process 30712 to validate the encrypted portion 30710 (e.g., validate encrypted string and decrypted version). At 30724, the decrypted version value may be used (e.g., as an index into an encrypted portion validation table) to identify a stored encryption, such as in the encrypted portion validation table. Referring to FIG. 31 may be an example of this table. If, during this optional step, validation is successful, such as if the encrypted string 30710 matches a corresponding value in the validation table, the process 30700 may proceed such as by proceeding to process 30714. However, if this optional validation step fails, the flow 30700 may be terminated by proceeding to termination 30726. Actions taken at termination 30726 may include notifying an administrative user, proceeding to process 30720, etc.

In some embodiments, proceeding at 30714, the decrypted object identifier value may be used, such as by a secure and/or system process, to access a CRM database of the multi-service business platform to retrieve a corresponding object instance (e.g., based on decrypted ID). Data resulting from process 30714 may include information that facilitates validating the "CTM_campaign" value parsed in step 30706. In some embodiments, data resulting from process 30714 may include one or more portions of a JSON script.

In some embodiments, at 30716, the version value decrypted from the encrypted portion 30710 at 30712 may be used as an index into an array of campaign names found in the object retrieved at 30714. In this example, the decrypted object identifier value may be 36792613638 and the version value may be 1. This indexing of an array of campaign names may result in a version-specific HGCN that may be stored for performing security measures to secure a CRM database of the multi-service business platform. Exemplary techniques for using the version value as an index into an array of campaign names, such as to retrieve a version-specific HGCN, may be used in the JSON script.

At 30718 in the flow 30700, the previously stored HGCN retrieved from the "CTM_campaign" attribute value 30708 at 30706 may be used to validate the UTM received at 30702. In some embodiments, validating may include comparing a pair of corresponding HGCN values, such as the stored HGCN and the version-specific HGCN determined at 30716.

Based on a degree of comparison at 30718 (e.g., text string matching, hash and match, etc.), the UTM received at 30702 may be validated or may be invalidated. If a result of validating at 30718 confirms that the UTM received at 30702 is invalid, access to the contents of the database object instance that corresponds to the object identifier value portion of the "CTM_campaign" attribute may be prohibited at 30720. In some embodiments, if the HGCN retrieved at 30714 from the object instance identified in the encrypted portion of the "CTM_campaign" attribute does not match the HGCN portion of that attribute (e.g., the HGCN stored at 30706), then the UTM received at 30702 may be invalid. Action taken after an invalid UTM determination may include a range of remedial and security actions, such as halting a process executing that has provided the received UTM, flagging the condition to an administrative user, etc. However, if a result of validating at 30718 indicates that the two HGCNs sufficiently compared (e.g., are duplicative), then access to at least the portion of the CRM database containing the object instance identified by the decrypted object identifier may be granted at 30722.

In some embodiments, access to content of the object instance determined at 30714 may be granted based on a degree of confidence in a process or user that has requested access to the object instance, such as by providing the URL with UTM attributes received at 30702. As an example, if a user process, executing in a secured user space, has been flagged by a system security monitoring facility as secure for the purposes of accessing at least a campaign portion of a CRM database of the multi-service business platform, flow 30700 may proceed from process 30714 directly to 30722, thereby bypassing validation processes 30716 and 30718.

In some embodiments, the UTM to GUID and validation system 25101 may provide a new way of generating UTM fields. For example, given an object ID of the campaign for which a user wants to generate a corresponding UTM, one could combine an encrypting of this object ID followed by space, followed by an encrypting of the version of the campaign name. This may be used to generate a UTM for a renamed campaign. In some previous example systems, a campaign tracking system may have used the campaign name as the only campaign identifier in a UTM. In this example new unique way of generating a UTM, it may be possible to decrypt at least a part the UTM (e.g., the encrypted object ID and encrypted version) to access and retrieve information from the corresponding campaign object. In some embodiments, as noted using a GUID, it may be possible to use that object ID to directly query the object. Information in the object may include a campaign name and corresponding version. If the campaign name in the UTM may get validated against (e.g., matches) the campaign name in the object that corresponds to the version, then the system may determine that this UTM may be a valid UTM and the system may provide the information of the campaign found in the object. If this validation does not work, it may mean that a third party may be trying to access the object so the system may not provide any information.

In some embodiments, a primary benefit of this new way of generating UTM fields may be saving a database step or process when using the newly generated UTM to access a corresponding campaign object. Notwithstanding a campaign tracking system's ability to support changing campaign names, reducing the processing required to access a campaign object remains a benefit. This benefit may exist even if a system does not support renaming campaigns and UTMs.

In some embodiments, validation when fetching a campaign by UTM may be performed in the following exemplary sequence of steps: (i) UTM "CTM_campaign" parameter passed in the URL="The%20campaign%20moOlwPraVOmX5hGQoscgUQ=="; (ii) convert from URL coding to get the UTM "CTM_campaign" string entry="The campaign moOlwPraVOmX5hGQoscgUQ=="; (iii) split this string by <space> and get the last portion from the split data=moOlwPraVOmX5hGQoscgUQ==; (iv) the remainder is the human-generated campaign name (HGCN)="The campaign"; (v) decrypting "moOlwPraVOmX5hGQoscgUQ==" may provide direct access to the CRM object, such as decrypting gives object ID=36792613638 and version=3; (vi) since the object ID may be a unique identifier of CRM objects, this may allow for the ability to quickly fetch the object independent of the HGCN (e.g., with all versions of the name); (vii) validate if the third (3rd) entry in the name versions array is "The campaign"; and (viii) If yes, the UTM may be valid and corresponds to the source campaign object with the object ID 36792613638.

In some embodiments, UTM generation and validation for a CRM object instance may be similar to core CRM objects. In some embodiments, each campaign CRM object instance may have at least one name and properties associated with versions. Information from the campaign CRM object instance such as object ID, campaign name version, campaign name, etc. may be extracted and used to generate a UTM using the exemplary process above. Even if the name changed, object IDs and versions may be obtained from a URL after decrypting the relevant portion thereof. A UTM may be validated by fetching an object instance (e.g., using the GUID found in the UTM) and checking if the human generated campaign name in the UTM may be consistent with the name in the name versions array of the object instance based on the version value decrypted from the UTM.

In some embodiments, a campaign object instance may be queried by an object ID. Multiple database query-type APIs may be used to find campaign objects by IDs such that any object may be located by querying the related ID (e.g., unique identifier for the object). Where objects have multiple names (e.g., renamed multiple times), there may be multiple versions that have the same encrypted object ID which may be queried. Locating the campaign object instance may provide access to an entire list of properties and various versions of the object instance.

Use of a GUID that identifies a campaign within each UTM of the campaign may also provide an advantage for a platform capable of handling a single campaign with multiple name variants at least because third-party campaign performance tracking systems may detect the distinct campaign names without any feasible way of determining that two campaigns with different "CTM_campaign" values are derived from a single campaign.

In some embodiments, use of JSON or the like array indexing capabilities, such as for capturing an advertising campaign, may provide an implicit form of campaign version control. As each new human generated campaign name is introduced into a campaign name array (which may be a prerequisite when making other changes in a campaign), the index of the new HGCN may become the version of the campaign. Further, use of the JSON (or the like) array indexing capabilities enables various types of validation that may be performed throughout the life of a campaign and/or when accessing a CRM or other database of the campaign at least because each new human generated campaign name may produce both a unique version value and a unique encrypting of the version and GUID for the campaign. Therefore, a version and/or a campaign GUID may be validated against a HGCN portion of the "CTM_campaign" attribute. Further an encrypting of the GUID/version may be validated for each HGCN and for each version. Any mismatch among HGCN, version, GUID, and encrypted GUID/version may be detected and flagged for enhancing safety of campaign data. This may be particularly helpful for multi-tenant CRM databases where data collisions, either inadvertent or intentional may be detected and remediated.

Registration Systems and Processes

Background of Registration Patterns

In some embodiments, a multi-service business platform may be organized around an object-oriented database, such as a customer relationship management (CRM) database. Such a CRM database may include a range of data objects (e.g., types of objects) that each contain several data fields and corresponding field values that may be configured for a purpose, such as operating an advertising campaign, tracking correspondence, etc. One or more of these data objects may be instantiated as a variety of object instances that effectively replicate a structure of the data object with instance-oriented values. As an example of object type instantiation differentiation, an advertising campaign object type structured with a "campaign_name" field may be instantiated as a first instance of a "campaign" type object with a value of "first" attributed to the "campaign_name" field and a second instance with a value of "second" attributed to the "campaign_name" field.

In some embodiments, structures of objects and values assigned to fields of such structure in a CRM may be configured for core functionality of a multi-service business platform. However, the content of these objects may be utilized in various services such as projects, applications, and contexts, such as a calendar, CRM activity monitoring, CRM performance, export to/from 3rd party platforms, an activity feed service (e.g., a social network feed), an asset association service (e.g., the ability to associate an email with a campaign), a campaign management service, a commenting service, etc. Further, not all such uses, applications, and external systems may be directly compatible with the structures and content of objects in the CRM database. As an example, a campaign type object may include a "campaign start date" field with a mmddyyyy structured content. A calendar application (e.g., using a calendar system service) may require a minimum set of information about a campaign to ensure that it may be displayed properly in a visualization of a calendar that may display campaign activities and other information. Such a calendar application may require a "start date" attribute in the form of "yyyymmdd" to visualize activities. Therefore, it may be beneficial for some type of easily-performed adaptation to occur when a calendar application is requested/instructed/automated to display the campaign type object (and related activities). The registration pattern systems and processes described herein may facilitate this adaptability through new and interesting uses of elements stored in a CRM database. In general, new types of CRM database elements, referred to herein as one or more of a "registration definition element" or a "registration association element", may provide a standardized approach for enabling a range of database content utilization, maintenance, and access capabilities. When these new types of registration data structures (herein registration elements) are stored in a database, such as in a database of a multi-service business platform, such a database may be configured to be self-adapting for new and interesting uses, such as CRM-powered applications, third-party applications, interfacing the CRM with other portals, other systems, CRM object maintenance, etc.

A few terms used herein may be related. In general, the term "registration pattern" may in certain contexts refer to an overall approach of using data in the CRM (or stored in association with the CRM) to facilitate operating/managing/maintaining other elements (e.g., objects) and/or may in certain contexts refer to techniques for facilitating operation of applications, such as CRM-powered applications that make use of objects and object content. In some embodiments, this overall approach may include computer implemented systems and methods that perform registration pattern operations. In general, the term "registration definition" may refer to an arrangement of data (e.g., a syntax, ontology, etc.) that may facilitate use of object properties and their values by applications (e.g., generally "consumers" of object properties) independent of structural or logical differences between how the data may be represented in the CRM and how a consuming application/portal/user/system may require the data to be represented. In general, the term "registration association" may refer to an arrangement of data that may facilitate maintaining consistency of related (e.g., associated) objects in the CRM. Generally, the term "registration element" may refer to any data item/structure, including registration definitions and registration associations that may be useful for implementing the systems and processes of registration patterns that may be stored in or in association with the CRM. In general, an instance of a registration pattern, referred to herein as "registration association element instance", "registration definition element instance", or "registration element instance" may refer to a CRM object type-specific registration association or definition that may be stored in or in association with the CRM. As an example, a registration definition campaign object-type specific element instance that is stored in or in association with the CRM may be referred to herein as a registration element instance. In some embodiments, a registration association that is stored in or in association with the CRM may be referred to herein as a registration element instance. In some embodiments, use of the term registration patterns may refer to processes and systems described herein that employ registration definitions, registration associations, registration elements, and/or registration elements instances. In some embodiments, registration associations may be created and used to link a registration definition with (e.g., by association or relationship to) various elements including registration elements, custom objects, core objects, other objects, other registration definitions, etc.

In some embodiments, registration patterns may be implemented as a plug-in for a service that may be associated with a CRM platform, such as an activity feed service, an asset association service, a campaign management service, a calendar service, etc. The plug-in may be used to connect functionality into the various services such as SMS functionality. In some embodiments, registration patterns may be utilized for populating navigation structures, reporting tools, task management, revenue attribution, access management, audit trails, object organization (e.g. folders, tagging), marketing asset performance analysis, external integrations (e.g., social networks, ticketing systems, 3rd party tools, etc.), automation & workflow tools, asset conversion (e.g., webpage to email), export tools, user interface configuration (which features are available for which object types), or any other scenario where an application operates on multiple object types that may be a subset of all available object types and may or may not require object specific configuration.

In some embodiments, a registration definition or a registration association may optionally be stored within (or in association with) a customer relationship management (CRM) data set. Stored registration definitions and/or registration associations may be referred to herein as registration elements. While registration elements may be embodied similarly to one or more objects in the CRM data set, use of the term "element" herein when applied to the term "registration" (e.g., a registration element) may connote a data item/structure stored in or in association with a CRM that may embody content, structures, attributes that may not be fully compatible with other objects of the CRM. In some embodiments, registration elements may allow, among other things, other (optionally pre-existing) objects (e.g., custom objects and/or core objects) to be adapted for new uses and processing without forcing use and/or processing constraints that may require altering the pre-existing objects. A benefit of using registration patterns may be that these new and adapted uses may occur without requiring new code to be written (or existing code to be modified) for each such use. Use of registration patterns may also eliminate needing to create use-specific shadow objects in the CRM. For example, allowing a pre-existing CRM object (e.g., webinar object, seminar object, campaign object, etc.) to be processed for display by a calendar application may occur. In some embodiments, core objects (e.g., which may be pre-defined) may include contact objects, company objects, deals objects, and ticket objects. New objects that may not be predefined objects may be referred to as custom objects. In some examples, the webinar object may be a unique object (e.g., portal specific object) that may be similar to a custom object.

In some embodiments, an aspect of registration pattern systems and processes functionality may be using registration elements, optionally stored in the CRM, to configure a CRM powered application. This may enable the CRM to have its own configuration and adjustment mechanism, which may make processes easier for customers who want to closely integrate with the CRM and which may be simple for integrators. In some embodiments, one benefit may be that all access may be made through a single application programming interface (API) or another programmatic interface. In some examples, a second system for managing interactions with the CRM may not be required for various applications, services, and third-parties to interact with the CRM. Providing access to the CRM through a single API or other programmatic interface may eliminate such second systems using a separate database to hold configuration information for these types of CRM interfacing processes.

In an example, an integrator uses a specific data structure for defining an online university course object, and the integrator prefers that these types of courses show up in a calendar application (e.g., rendered on the CRM-powered calendar application such as to announce when the courses were being taught). The integrator may create a registration definition (e.g., registration schema for some examples). The integrator may optionally store this registration definition as a registration element in the CRM. Use of this registration definition, such as by the single API, may enable the calendar application to interpret the integrator's specific data structure to facilitate rendering course information in a calendar. The integrator course object may be rendered as a fully-fledged, fully integrated object in the calendar. Using registration definitions as a form of registration patterning may be used with other types of CRM-powered applications, such as a campaign application. With use of a campaign application compatible registration definition (e.g., a registration definition that facilitates mapping content/fields of the specific course object to campaign object content/fields), a specific course object of the integrator may appear to a campaign application as if it were fully integrated.

There may be several advantages to this registration system and process in addition to the purely functional benefit. For example, some example embodiments of the registration pattern system and process may avoid the need for a two-system approach. While the examples herein may be based on online types of events (e.g., university courses, blog posts) support for offline events (e.g., events that may not have an online component but may be physical events), for example, may be captured and supported by the registration pattern systems and processes described herein. In some embodiments, a registration definition element instance may be tied to a target consuming application-specific registration pattern that may be applied against several types of CRM objects (e.g., seminars, webinars, blog posts, emails, campaign elements, etc.).

In some embodiments, a registration association may be a registration pattern variant (optionally stored as a registration element within the CRM) that may allow for, among other things, establishing/maintaining continuity of content and structure of related objects in the CRM based on monitored CRM events, such as changes to one or more objects in the CRM (e.g., a change in an email distribution date). Use of registration associations when monitoring CRM events may facilitate factor-based CRM reporting across a CRM-based multi-service business platform, for example. In some embodiments, being able to tie a registration association across the platform framework may facilitate reporting on various factors that may impact more than one CRM object.

In some embodiments, data and information in a CRM data structure (e.g., a distributed database) may be associated with one or more objects. In some embodiments, given a list of customers, each individual customer may be represented by their own CRM object. Similarly for a list of blog posts, each blog post may be represented by its own CRM object. In some cases, the associated objects may be custom definitions created by or for the specific customer. From this perspective of managing elements in a CRM data set, registration patterns (e.g., definitions, associations, etc.) may be similarly configured or structured. For example, a calendar registration definition (e.g., referred to herein as a calendar registration definition element instance) may be stored in the CRM; however, this calendar registration definition may be a different type of object compared to an object type for use by a campaign application. It may be appreciated that a variety of other registration definitions may be stored within the CRM such as registration definitions for an activity feed service, an asset association service, a campaign management service, etc.

In some embodiments, registration patterns may allow for providing support for new types of data to a service (e.g., a calendar), such as webinar data. When a CRM object for a webinar is ready, an administrator may create a calendar registration definition for the webinar object that may, for example, facilitate use of information in the webinar object by a CRM-powered calendar application. In some embodiments, this webinar object-to-calendar application registration definition may contain a field that identifies that it is for the webinar object type. In some embodiments, a start date may be a field on the webinar object (e.g., color coded start date such as yellow by default when rendered in a calendar application). Another webinar object field may capture the title. A webinar may be a recurring item such that there may be another field regarding how often the webinar occurs. In some embodiments, a webinar object (or other CRM object) may have up to ten (10) or twenty (20) or more different data fields to which a corresponding registration definition (e.g., a webinar-to-calendar registration definition) may be applied for integrating the webinar object with a CRM-powered application, such as the exemplary calendar application. In some embodiments, for each distinct type of object to be rendered on a calendar, there may be a separate registration definition. For example, there may be one registration definition for blog posts, one registration definition for website pages, one registration definition for tasks, one registration definition for campaigns, etc. In some embodiments, this may be accomplished in a database table. In some embodiments, there may be separate registration definitions for each type of data (e.g., CRM object, such as a webinar object) to be rendered in a calendar. A database table may include a calendar application row that identifies what types of data may be provided to the calendar. It may also identify minimum required information to be provided to a calendar application so that an object may be displayed on the calendar. This information may be used to query the CRM data set for webinar objects to be rendered in the calendar.

One advantage to having all of this data and information in a single CRM and using a CRM object-like element to store a registration pattern data structure may be that there is no need to give outside vendors, integrators, or customers access to two different systems (e.g., the CRM and the separate database). Further, this may all be performed through a common set of APIs (and in some example embodiments a single API) used to access the CRM. In an example, rather than having to access the CRM to populate a bunch of data into a data set, and then logging into a web page (e.g., that includes a control panel) to arrange the data in the data set for configuring a calendar application, or rather than requiring access to two different APIs (e.g., one API for the CRM and one API for the calendar), use of registration patterns may facilitate accessing the CRM and configuring the accessed CRM data for use by a calendar without needing resources external to the CRM. Once granted access to the CRM through, for example, a customer portal, an integrator may create new CRM objects and corresponding registration definitions to keep processes running smoothly.

The multi-service business platform 1000 may further include an urchin tracking module (UTM) to globally unique identifier (GUID) and validation system 25101 for enabling efficient and disambiguated access to a campaign object in a database, such as a customer relationship management (CRM) database based on an encoded string in a UTM property of a uniform resource locator (URL). The multi-service business platform 1000 may also include a registration system 25103 of registration patterns that enable independence of applications that consume CRM object data from the underlying structures of those objects while further enabling efficiently maintaining consistency and updating of objects. The campaign UTM to GUID and validation system 25101 and the registration system 25103 may communicate with various systems, devices, and data sources of the multi-service business platform 1000.

Registration System and Process

The multi-service business platform 1000 may include a registration system 25103 (that may include a registration definition service 25209) connected to a storage system 25550 and to a customization system 520 (that may include a registration definition service 25209) via a set of APIs 25610. The registration system 25103 (and registration definition service 25209 in some examples) may be used to create and use registration patterns. The customization system 25520 may include the registration definition service 25209 for creating and/or generating registration elements. Further, similar to the organization of custom objects, an ontology may include registration associations and/or registration definitions and an instances knowledge graph that may include registration definition and/or association element instances. The storage system 25550 of the multi-service business platform 1000 may include a knowledge graph 25556 that facilitates associating core objects (e.g., campaign core objects 25203) and associations with registration definitions and custom objects via the ontology. The knowledge graph 25556 may further facilitate associating core object instances 25205 with registration association element instances, custom object instances, and registration element instances via the instances knowledge graph. Further, the system 25201 may include a campaign UTM to GUID and validation system 25101 that may be connected to the storage system 25550. A set of services 25530 that are associated with the storage system 25550 may include a system service 25207 (e.g., a calendar system service, an activity feed service, an asset association service, a campaign management service, etc.) that may rely on one or more outputs of the registration definition system 25103. Campaigns of the storage system 25550 may be associated with the knowledge graph 25556. The storage system 25550 may include a set of multi-tenant data stores that may store several types of data including, without limitation, definitions, properties, values, associations, and instances. In some embodiments, the campaign UTM to GUID and validation system 25101 and the calendar system of services 25530 as shown may be connected to the features and/or components of the storage system 25550. Also, the campaign UTM to GUID and validation system 25101, the registration system 25103, and the registration definition service 25209 may be connected to the calendar system of the services 25530 indirectly via the storage system 25550.

Registration Definition Features

In some embodiments, the systems and processes of registration definitions described herein may include features that relate generally to a registration pattern with respect to a customer relationship management (CRM) system (also referred to as CRM). In some embodiments, the CRM may include customer objects, content objects (e.g., blog post CRM objects), registration definitions (e.g., calendar registration definitions), etc. When a "new" (e.g., new to a calendar application) type of object in the CRM (or new to the CRM) may be added to an application (e.g., calendar application), registration definition information may be updated or created for this "new" type of object (e.g., based on registration definition types such as a webinar definition type). When data of a CRM object that has not previously been used by a CRM-powered application (e.g., calendar application) is used, corresponding registration data may be updated. In this example, a registration definition element instance (e.g., within a calendar application registration definition element) that may be linked to the CRM object (e.g., based on the CRM object type) may be updated to reflect how this previously not relied upon data is to be handled by the calendar application.

In some embodiments, registration definitions may map attributes of a source object (e.g., Email sent date) to generic fields required by an application (e.g., start date for an event in the calendar application). Further, registration definitions may include a set of definitions on how to process items. Yet further, in addition to mapping data, registration definitions may also contain configuration information for instructing applications about use of these registration definitions, such as one or more conditions that may need to be present in a corresponding definition and/or object (e.g., a master registration definition activate/deactivate parameter value) for the registration definition to be applied. Further, use of specific features of a registration definition may be conditionally applied based on similar feature-specific context. In this way, an entire registration definition may be disabled or only portions of it may be disabled while others may be enabled.

In some embodiments, registration mappings and definitions may be utilized for different types of registration patterns. For example, a marketing calendar may support a campaign object type as depicted in a user interface (UI) filter that may allow a customer to display the campaign object or not by adjusting a field in the UI. The UI may display a code that the campaign object may be currently enabled for the calendar application use. Adjusting the field in the UI may send a request to the platform for disabling it from being rendered in the marketing calendar so that the campaign object may not appear anymore. Such a UI may be useful because this process of enabling/disabling does not apply only for enabling or disabling an object type but may also be used for changing a property in order to show the proper name or the like. In some examples, to bring campaigns back on the marketing calendar, the system may be used to do the inverse and change the UI field to set it to "enabled". In some embodiments, relying on the UI for registration patterns may allow for configuring a CRM object type for a given example in a relatively dynamic way. In some embodiments, the UI may rely upon APIs to effectively make the changes described in the registration definitions (e.g., enable/disable rendering of a campaign object in a marketing calendar, etc.).

In some embodiments, this dynamic configuration mechanism may be used for dynamic association of assets with campaigns through use of a campaign registration association. In some embodiments, different registration patterns may be used for the campaign association at least because a campaign may not require all the fields that a calendar requires. In some embodiments, similar processes may be applied here to disable use of an asset in campaigns so that the asset may not get associated with campaigns. In some examples, a user may merely use the UI to disable this registration. In some embodiments, some other information from an asset may be needed for fulfilling the campaign association.

In some embodiments, use of a registration definition and/or association may be activated or deactivated through use of one or more properties of an object, such as a scope property. In some embodiments, when visualizing a marketing calendar, for example that may not have a "MARKETING EMAILS" scope property defined, all the marketing emails may not be accessible to the calendar (e.g., not returned by use of a registration pattern). In some embodiments, use of some features for activating and deactivating use of registration patterns may depend on the user or the portal, which may be using/looking at the current calendar. In some embodiments, another approach for enabling and disabling use of registration patterns may include a gating strategy.

In some embodiments, a concept of gating, for example, for release of a new feature, may allow for controlled release of the feature across one or more of the portals. Gating may enable gradually releasing of the feature for different portals, such as in order to have control over bugs or some problems that the new feature may introduce. In some embodiments, gating may be enabled by a registration being configured with a gate name property. If a registration pattern includes a gate name property (e.g., "BETA"), and a portal (e.g., consuming application) may not be enabled (gated) for using this BETA feature, it may not access portion(s) of objects defined in this "gated" registration. If the application/portal is enabled for, in this example, "BETA" features, the corresponding registration pattern may be used to facilitate access to object content gated by this feature.

Another mechanism by which registration aspects may be activated/deactivated and/or enabled/disabled may include use of optional properties in a registration data structure. In some embodiments, a consuming application, such as a calendar application may identify object properties as being optional. A property that is optional may be processed by the registration pattern, but if it is not available in the source object being processed, the property may be ignored when rendering the object in a calendar, for example. Although optional properties are not mandatory per the target consuming application, when they are present and when there is a value for them in the source object, the optional properties may enable specific features for an application (e.g., for a marketing calendar application).

In some embodiments, records may be created in the customer relationship management (CRM) database to register other records (e.g., email, contact, company) with CRM powered applications. This may be compared to other approaches including an external set of mappings or target consumer-specific CRM-processing code. The techniques described herein for registration patterns may power the CRM by using its storage and access capabilities and functions as a plug-in mechanism. This may further benefit the CRM because the registration elements may be created substantially similar to the way that a custom object may be created, which in turn may be slightly different from a non-custom object (e.g., core object). In some embodiments, differences between creating a custom object and a non-custom object may include who may be allowed to do it (e.g., user-based determination), and for example, what set of permissions a user may have, otherwise it may be substantively a similar technical process. The systems and processes of registration patterns described herein may facilitate in creating a registration element which in turn may enable at least one of a custom object or even a standard object to interact with an application. A characteristic of the registration pattern may be that it may be used for a range of CRM objects, standard objects, and/or custom objects to provide CRM object content to a specific application feature. In some embodiments, a registration structure itself may not be a CRM object such that the registration structure may be stored in a home database. In some embodiments, the registration structure may be a CRM object itself. In some embodiments, there may be distinct registration elements for the standard objects and registration elements for the custom objects. In some embodiments, these objects may be stored in the CRM. In some embodiments, these objects may be portal specific and may be replicated across one or more of the portals.

In some embodiments, a registration pattern may include a registration definition element that may be stored in a database, such as a CRM database. A registration definition element (also referred to herein as a registration definition) may allow pre-existing objects of the CRM (e.g., custom objects, core objects, object types, etc.) to be adapted for new uses and consumed by processes (e.g., onboarding a CRM asset to a project/application) without any of the following: (i) forcing use and/or processing constraints to require altering the pre-existing objects; (ii) requiring new code to be written and/or existing code to be modified for such use; and (iii) needing to maintain use-specific shadow objects in the CRM (e.g., that may contain at least a portion of the object being shadowed in a use-specific format). A registration definition may be configured to ensure that content from a CRM asset may meet consumer application-specific (e.g., a CRM-powered application, such as a calendar) requirements for content, format, etc. In this way, registration patterns may facilitate reduced computational resources, reduced data storage resources, and reduced network activity when onboarding new assets or when changing behaviors of assets already on-boarded to (e.g., used by) a project/application. In an example, registration definitions may allow a pre-existing CRM object (e.g., webinar object, seminar object, etc.) to be processed for display by a calendar application, even when the pre-existing CRM object may include structures, formats, content, etc. that may not be fully compliant with calendar application input or use data requirements. Each type of project/application that consumes CRM data may be associated with a registration definition that may be specific to the project/application. This association may be one-to-one, with each project having a one-to-one association to a specific registration definition element in the CRM. This association may be one-to-many, optionally based on, for example, a type of project. In an example of a one-to-many relationship, there may be several instances of a project type "calendar" that may all share a single registration definition element.

In some embodiments, a registration definition element that may be associated with a target project/application may include registration definition element instances (e.g., discrete portions of the registration definition element) for several types of CRM objects (e.g., seminar objects, webinar objects, blog posts, emails, campaign elements, etc.). A registration definition element instance may be seen as a configuration read by a project when handling a specific object type. In some embodiments, a registration element instance may identify a set of criteria for CRM-sourced content to be consumed by, for example, a CRM-powered application. While this set of criteria may be consistent within the consuming application for at least a subset of all object types in the CRM, different object types in the CRM may store the consuming application's required information differently (e.g., may use different field names, may store the content in different formats, etc.). Therefore, while the required content may be consistent, a pattern by which information from the different types of objects may be registered may be different, resulting in, for example, source object dependent registration patterns.

In some embodiments, a registration pattern may include a registration association element that may be stored in the database. A registration association element (may also be referred to herein as a registration association or in certain contexts an association) may be a variant of a registration pattern that allows establishing and/or maintaining continuity of content and/or structure of related pre-existing objects. This registration pattern variant may facilitate CRM database continuity through identifying objects and one or more fields therein to be monitored for change. In some embodiments, a registration association element may be employed with a process for monitoring a CRM event stream (e.g., a log of events and/or active event stream) to facilitate detecting changes to objects in the CRM. A CRM event stream may include a CRM event (e.g., a change to a value in an object in the CRM) that matches at least a portion of content of a registration association may signify a change in the CRM that triggers a monitoring application to cause further CRM events to occur to ensure continuity in the CRM. As an example of maintaining continuity through use of a registration association element, an object type of "blog" may include a "source" field label that may be used by CRM-powered applications (e.g., ad campaign administration). A registration association element may be configured with this object type and this field label. Responsive to a CRM event monitoring application detecting a CRM event (e.g., in an event stream) that matches this registration association element, the monitoring application may cause other instances of the "blog" type object to be updated based on a change in the monitored field "source". Use of registration associations when monitoring CRM events may facilitate factor-based CRM reporting (e.g., CRM analytics) across a CRM (and the like)-based multi-service business platform.

In some embodiments, the methods and systems of registration pattern creation, configuration, use, and adaptation described herein may be further enabled through features of a host CRM, such as CRM-specific application programming interfaces (APIs). One or more CRM-specific APIs may facilitate uniform execution of read and/or write operations on objects in the CRM independently of a type of the objects. In some embodiments, use of such APIs with the methods and systems of registration patterns described herein may facilitate dynamically enabling use of several CRM object types for a specific use case (e.g., a CRM project, CRM-powered application, etc., some of which are described herein) using unmodified use case software/code. Further such us of the APIs may avoid redeployment and/or modification of software/code, CRM-specific data structures, etc. Benefits of such CRM-specific API functionality may include, among other things: (i) improved performance when using the CRM as compared to services that require such modification/adaptation; (ii) efficient CRM-independence of use case/user/service; (iii) efficient reuse of existing code thereby reducing the amount of use case-specific code to be maintained; and (iv) uniformity and consistency of CRM object structures, interface methods, and codebase that results in easier platform maintenance, debugging, and general understanding thereof.

Registration patterns (definitions and/or associations) may be established based on a range of factors and aspects of the CRM as well as consuming applications/processes. In some embodiments, when a new object type is defined in the CRM, such as a transaction-type object, one or more transaction type object registration definitions may be configured in the CRM. In some embodiments, a transaction type object registration definition may be created in the CRM for each consuming application so that each consuming application may seamlessly use/process the new object type by referring to its transaction type object registration definition. Further in this example, one or more registration associations may be defined and stored in the CRM to facilitate monitoring CRM event activity and maintaining continuity within the CRM for events that may impact the transaction-type object. In another example, when a new consuming application (e.g., a compliance application) is to initiate access to the CRM, one or more compliance application-specific registration definitions (e.g., one for each type of object present in the CRM contemporaneous with the compliance application initiating access) may be created and stored in the CRM.

In some embodiments, registration patterns may adhere at least in part to requirements of other objects in the CRM, such as use of syntax, taxonomy, structural elements like field definitions, etc. In this regard, registration patterns may be defined, instantiated, and maintained in the CRM through one or more pre-existing interfaces, portals, applications, wizards, etc. through which objects, object types may be defined, instantiated, and maintained in the CRM. Use of preexisting interfaces, tools, etc. may reduce complexity of a multi-service business platform, may reduce training time, may increase the likelihood that registration patterns may be adopted by users of the multi-service business platform, etc.

Registration patterns may be configured with a range of functionality including mapping source object field values to consuming application fields, reformatting source object field values to conform with consuming application formatting needs, establishing and/or signaling use of default values for consuming application data that may not be provided by a source object, indicating whether an object type may be used (activated) or may not be used (deactivated) by the consuming application, etc. Further, records (e.g., registration definition elements) may be created in the CRM to register other records (e.g., email objects, contact objects, etc.) with, for example CRM-powered applications. In this way, and optionally when combined with CRM-specific APIs, a registration pattern-enabled CRM may self-adapt for a wide variety of uses without, among other things, external sets of mappings of source object content to consumer (e.g., application) content or CRM-specific access code created content for and/or associated with each individual use case/application. In some embodiments, a registration pattern-enabled CRM may facilitate mapping attributes of source objects to specific fields required by any application that accesses (e.g., reads or writes) the CRM. Therefore, not only may the CRM be constructed and operated optimally for meeting requirements of a hosting multi-service business platform, but the CRM may be made accessible to external services by merely creating registration patterns for the external service.

By storing the registration patterns as object/elements in the CRM, the CRM may become its own configuration and adjustment mechanism. This enables independence of the CRM so that there may be no other system, no other interfaces, and no need for any system, application, third-party, or the like knowing about the details of objects in the CRM. Each registration pattern that is created for each object (e.g., object type) may hold the details about how to use the information in the object in the CRM to satisfy the system/application/third-party information requirements.

Registration Definition Process

In some embodiments, a registration pattern map may attribute properties of the source object (e.g., Email Sent Date) to generic fields required by the application to which the source object data may be applied/used (e.g., start date for an event in the calendar). This pattern may be used with different applications/systems (e.g., calendar system and/or campaign system).

In some embodiments, creating registration patterns and some custom objects may be accomplished through the same process and the same portal, such as the same form filling API used for custom objects. In some embodiments, it may be the same API, even though the logic performed by the API (e.g., in the background) may change. However, a standard object may be stored with a different data server than a custom object or registration pattern, due at least in part different freight limiting and other aspects that may not be needed for custom objects. In some embodiments, when trying to register a custom object, the system may execute logic for custom objects. When trying to create standard objects, the system may execute logic required for the standard objects. However, the interface (e.g., representation of the registration element to the user) may be the same. In some embodiments, the system may store the same kind of information for both of these (e.g., registration elements and custom objects).

In some embodiments, a registration pattern (e.g., registration definition element, registration association element, etc.) may be configured through a process that may include several actions. One such action may include identifying a target consumer application/user/project of information stored in objects in the CRM. Another such action may include identifying content types that may be required for use by the target consumer application/user, such as dates, links, etc. An example target consumer of CRM object information may include CRM-powered applications, such as a calendar application/service, a performance monitoring (e.g., analytics) application/service, an ingestion application/service, a CRM access application/service (e.g., CRM-access API), a data conversion service, a third-party application, etc. When one or more content types may be identified for the target consumer application/service, corresponding source fields for one or more (optionally all) types of CRM objects may be determined. As an example, a start_date field of a calendar application may require a particular source date content to ensure that the calendar application may populate aspects of the source objects from the CRM in the proper date. Information in a campaign-type object in the CRM may include several date fields (e.g., a date field that defines a trial period, a date field that defines when the campaign object was created, another date field for when a targeted advertising action of the campaign is to start, etc.). In some embodiments, a date field of the campaign-type object may be determined to correspond to the start_date field of the calendar application through use of automated and/or at least partially with manual activity. Date fields of other object types in the CRM may be determined to correspond to a start_date field of a calendar application. This process may be repeated for each target consumer application/user in combination with each object type defined in the CRM.

Registration Definition Creation and Use Processes

In some embodiments, a process to create a registration pattern, such as a registration definition may include identifying content types (e.g., dates, links, etc.) that may be required for a target consumer application/portal/user, such as a marketing calendar application, etc. The process may include, for each CRM object type, determining which source field may correspond to each of the identified content types. From this information, a CRM compatible object/element, such as a target consumer-specific registration definition that facilitates the correspondence may be arranged in a form that makes plain which source object and field corresponds to which target consumer content field. In some embodiments, a user may create such a registration pattern using the same user interface tool as may be used to create objects in the CRM. In some embodiments, the registration pattern (e.g., a registration definition) may be created and optionally arranged, as in JSON, to be stored in or in association with a database, such as the CRM database referenced herein. In some embodiments, the stored registration pattern may be identified (e.g., indexed in the CRM) by an identifier of the target consumer application.

In some embodiments, a process by which the registration definition created as described above, or otherwise created, copied, accessed, provided, or the like may be used and may include accessing the target consumer-specific registration definition. Based on object type properties of the retrieved registration definition, the system may receive/retrieve object(s) of the identified type from the CRM to be processed. In some embodiments, a record, optionally stored in or in association with the CRM (e.g., in an object processing tracking history), may identify object(s) of the CRM that may have already been processed. For each object of the identified object type accessed, the registration definition content (e.g., the map of object properties to target-user properties) may be used to map source object field values into target consumer-required fields. The resulting data may be used by the target consumer/application to perform its function, such as populate a calendar for rendering in a user interface, etc.

For a given target-consumer/source CRM object-type combination, a CRM compatible element (optionally an object of the CRM) (herein referred to as a registration definition element) may be created to facilitate use of the corresponding date information in the source CRM object-type. Information structured into a registration definition element may include source object type and corresponding field and target consumer application fields for several source object types, as represented in this example JSON script in FIG. 9.

A registration definition element may be created in a CRM database using tools, interfaces, and other existing object creation and maintenance functions that may be used to create CRM objects for the CRM database.

A registration definition element may be created for each target-consumer application/user. Each such registration definition element may include field correspondence statements for several different types of CRM objects. These field correspondence statements may be grouped within the registration definition element as a source-object type-specific registration element instance. As an example, a target-consumer application-specific registration definition element may include correspondences for date fields for an EMAIL object, a RECURRING EMAIL object, a CAMPAIGN object, etc. In this example, other field correspondences for an EMAIL object (for example) may be grouped in an EMAIL registration element instance within the target-consumer registration definition element.

In some embodiments, a target-consumer application/user may be configured to access and apply a registration definition element when attempting to access content of a source object in the CRM. The object type of the source object in the CRM being accessed by the target-consumer application may be used to identify a portion in the registration definition element that may facilitate mapping the relevant fields of the source object. The field mappings in the registration definition element may be used to map field values from source fields of the source object to corresponding fields of the target-consumer application/user. The mapped source field content may be used by the target-consumer application/user to perform a function, such as populate a calendar, transmit object data to a third party, perform analytics on the CRM, etc. In some embodiments, field mapping may be performed in batch mode with results of field mapping being stored in an intermediate CRM element that may be directly accessed by the target-consumer application. In other example embodiments, field mapping may be performed contemporaneously with execution of the target-consumer application. In some embodiments, an API may be configured as a registration definition element handling service, such as to retrieve data from the CRM, process the data per the registration definition element, and deliver the processed data to the target-consumer application.

Calendar Example Process with Registration Definitions

In some embodiments, a calendar application, such as a marketing calendar for use in managing a multi-service business platform may be CRM powered in that it may include a set of tasks for updating the calendar based on content of the CRM. An example calendar application may integrate different types of assets to be added to the calendar application. Examples include email campaigns that may be going out, sharing social media posts, entire campaigns, collections of assets, blog posts, etc. The methods and systems of registration patterns may facilitate bringing content in the CRM (e.g., in and associated with objects) to the calendar easily and quickly. Such a process may be referred to as a registration-activated calendar update that may be an extremely powerful CRM-application integration tool. Initially, a calendar application may request available object-specific registration definitions (e.g., distinct registration definitions for blog posts, landing pages, social media posts, etc.). In some embodiments, use of registration definitions (e.g., CRM registration definition) with the calendar application allows for the calendar application to integrate content of objects in the CRM associated with each of these registration definitions into the calendar (e.g., a blog post registration definition may enable integration of the properties of the blog post with the calendar.)

In this example of a calendar service, the calendar looks up its registration elements (e.g., looking for data such as name and/or what is being shown in the calendar). A registration definition may be useful when any application accesses a CRM database at least as a filtering mechanism that may be structured to facilitate restricting access to the CRM so that the requesting application is not shown (e.g., provided access to) content that may not be in the calendar. Further, a registration pattern definition may be useful for ensuring that content of properties of a source object may be determined for a minimum set of content required by the calendar application, such as the start date, which may be critical for rendering content on calendars. In some embodiments, these are the kinds of definitions may be part of a calendar registration definition.

As the calendar application loads, it may request from the CRM the registration elements identified as calendar registration definitions. For example, there may be a registration definition for blog posts, a registration definition for a landing page, a registration definition for social media posts, and so on. A start date of the blog post on the calendar may be a corresponding date field of the blog post objects. In addition to facilitating mapping object properties to calendar content fields, calendar rendering aspects, such as a preferred background color to be used when highlighting the blog post in the calendar may be a default highlight color field on the CRM object. As described herein in a range of example embodiments, a registration pattern may essentially be a set or collection of configurations and mappings from a pre-existing CRM object to what the calendar expects. A CRM access capability of the system may then know how to query for the CRM objects, and how to transform properties into a standard (e.g., compatible) representation for the calendar.

In some embodiments, a CRM access capability may be configured as an API end point that may, for example, fetch a list of blog posts CRM objects, and convert/deliver content of certain properties to the calendar based on the applicable registration definition. In some embodiments, CRM content fetched may include several JSON data structures representing blog posts objects in the CRM. Further the system may include an API to feed data from the registration-based CRM access API to the calendar. In summary, a process for creating a calendar event with the registration methods and systems described herein may include taking the list of objects from the CRM, and applying the configuration and rules in the registration definition to produce a standard calendar event. In some embodiments, applying a registration definition for populating a calendar may cause an impact on data structures of or associated with a calendar application that may populate the calendar. In some embodiments, a CRM object may include identified fields and/or field values that may be processed with a corresponding registration definition to generate and/or impact data structures, such as fields and/or values of a target CRM object (e.g., a calendar instance object), or configure and/or generate a CRM object that may be used by (e.g., accessed within the CRM) a calendar application for performing calendar functions, such as populating a calendar. In some embodiments, identified fields and/or field values of a target CRM object may be processed by a registration definition(s). A result of the processing may be provided to a calendar application, such as in a stream of calendar population values from which a calendar may be populated.

Further, in this calendar example, the list of registration patterns for the calendar may include a landing page. This registration element may be created in order to make sure that the landing page objects are properly rendered in the calendar. In this example, there are many fields that embody the kind of information that a registration definition possesses for the calendar use, such as: the object ID, the name of the object, etc. The registration definition may answer questions for the calendar, such as what is the property that is keeping an ID for landing pages?; what is the property keeping track of the published date for the landing page objects?; and what is the property keeping track of the name of those objects? In some embodiments, this registration may facilitate fetching, from the CRM, the properties that may be needed in order to properly render landing page objects in the calendar.

In some embodiments, the methods and systems of registration patterns may provide flexibility for CRM operation because if key properties required by the calendar change, it may be possible that all the landing pages may not be rendered by the calendar anymore. The CRM may be updated to cause a change in how to store the start date in landing page objects. To accommodate such changes for all objects, only the registrations may need to change. In some embodiments, a seed registration may have a dynamic configuration that may be updated (e.g., by developers) in order to ensure that some changes in the CRM may be reflected in the calendar or in general, in the example use case that uses the registration pattern.

In some embodiments, registration definitions may be standardized across portals so that no matter what portal is accessing the CRM, the view may be consistent for the corresponding object types. However, custom registration definitions (e.g., created for customer objects) may provide customers with registration definition-level control over use of customer objects. In some embodiments, a customer may define and configure a home webinar object in the CRM. These custom webinar objects may be shown in the calendar by use of a custom webinar object-specific registration element instance being configured, optionally by the customer, using the methods and systems of registration definition creation herein. In some embodiments, the methods and systems of registration patterns may be adapted to allow specific portals (e.g., customers) to create registrations for their home custom objects. In some embodiments, integration of object content into a calendar and/or into a structure to be reported, may be controlled on a user-specific basis through use of custom objects and custom registration definitions for those objects.

Fields within the registration definition may provide various configurations and mappings that may be executed by the calendar system (e.g., start date field, preferred background color field, etc. in the blog post registration element).

In the calendar use case, a minimal set of corresponding fields in the CRM object may be required, which in this case may include the start date, property, and the title property, and optionally the object ID property. If a CRM object type has at least these properties, the CRM object type may be registered for (integrated into/with) the calendar. As an example, if a first object type does not have a title property, then it may not be possible to show the first object type in the calendar. As noted herein, not all target consuming applications/portals/users may require the same source object properties. For example, campaign applications may not require all of the property fields that a calendar application may require. In an example of integrating a marketing email object with a calendar, different properties may be required for the marketing email to be properly shown in calendar. In some embodiments, other properties may not be mandatory. However, some non-mandatory properties may enable some calendar features, such as object preview. Therefore, if a preview property is configured in a marketing email object, the calendar UI may provide user access to the preview key as well.

In some embodiments, comparable properties on different object types may be given the same identifier (e.g., object ID), although that may not be required. A first object may define the ID property with one name, but another object may define the ID property with a different name. The methods and systems of registration patterns may allow two different properties in two different objects to have the same name, while ensuring that each is mapped properly when each object is processed by its corresponding registration definition (e.g., for use by an application such as the calendar application).

In some embodiments, query registration definitions may be transformed into standard representations for a calendar application. Example embodiments may include using a calendar system to look up registration definitions (e.g., look for data properties such as name and/or what is shown in the calendar including start date). In some embodiments, registration definition required fields may include primary ID, definition name, definition type, properties such as start date, etc. for use with the calendar system.

In some embodiments, an API may be configured for use as an interface between an application (e.g., calendar) and the CRM. An example may include an API used to fetch registration definitions (e.g., blog posts CRM objects which may be JSON representing blog posts objects in the CRM). This example may include an API that may feed data from the CRM to be transformed and formatted for an application (e.g., calendar application). This example may include a list of registration definitions from a CRM that may include configurations and rules that may be applied as part of obtaining a standard calendar event (e.g., feed of data pre-transformation and post-transformation for each registration definition).

In some embodiments, there may be a level of common functionality to registration patterns that may be applied across objects, applications, and CRM elements in general. In some embodiments, an application may feed off data from the CRM. A registration pattern may be keyed to one of several types of objects. In some embodiments, a registration pattern may have a set of data that may apply to any use of the registration pattern. Also, a registration pattern for a calendar application may define a set of "must have" fields such as start date as described herein. This may be an example of a data item in the set of data that, while it may apply to any use of the registration pattern, may be accompanied by application-specific transformation and configuration data.

In some embodiments, a calendar application use of registration patterns is provided. Prior to use of a registration pattern by a marketing calendar application to render events on the calendar of different object/asset types, the application may fetch the relevant data from several objects in the CRM. In this example, the CRM may be a multi-service business platform CRM database that may include different types of CRM objects for several platform users. The calendar application may seek to render select assets for the users in one calendar view. Therefore, the calendar application may retrieve CRM object content from a range of asset types and user-specific objects and render the respective calendar events accordingly. For some examples, in addition to needing to discern specific portions of different types of assets for a single user, having to deal with several users may require a substantive amount of code development and maintenance that may cause a negative impact on the platform codebase, on the platform metrics, and on the overall platform performance. Further, in some examples, a lack of homogeneity may make onboarding new assets to the calendar tedious and error prone as more and more complexity may be added to the calendar application codebase. This greater complexity may contribute to overall platform performance degradation in some examples.

Use of the methods and systems of registration patterns may resolve and/or eliminate these complications, performance cost, and complexity. The example calendar application (and generally most such applications that access a CRM) may use fetching logic of the CRM. That fetching logic complexity may be reduced so that a single fetching logic (e.g., program code) may be used to fetch content from all different types of CRM objects or assets for all different user objects stored in the CRM. Typical operational activity of the platform, such as onboarding a new asset to the calendar (e.g., rendering a newly created campaign in the calendar) has been turned from a tedious error-prone process that may result in impacting rendering of other assets into a simple registration definition creation process using CRM-object creation tools. This improvement may be further exemplified by each registration element instance in a registration definition element being responsible for onboarding of a specific asset type. The registration element instance may contain at least a mapping of properties on the CRM object to fields on a common calendar event object. Prior to use of registration patterns, the mappings between specific assets and calendar events (e.g., between CRM object fields and calendar object fields) were statically coded for each asset. This required having several entities responsible for onboarding each individual asset type to be rendered in the calendar. With the use of registration patterns, a single entity may be configured to receive a registration element instance with a corresponding CRM object and deliver a conforming calendar event data set that may be rendered by the calendar application.

Figure 32:
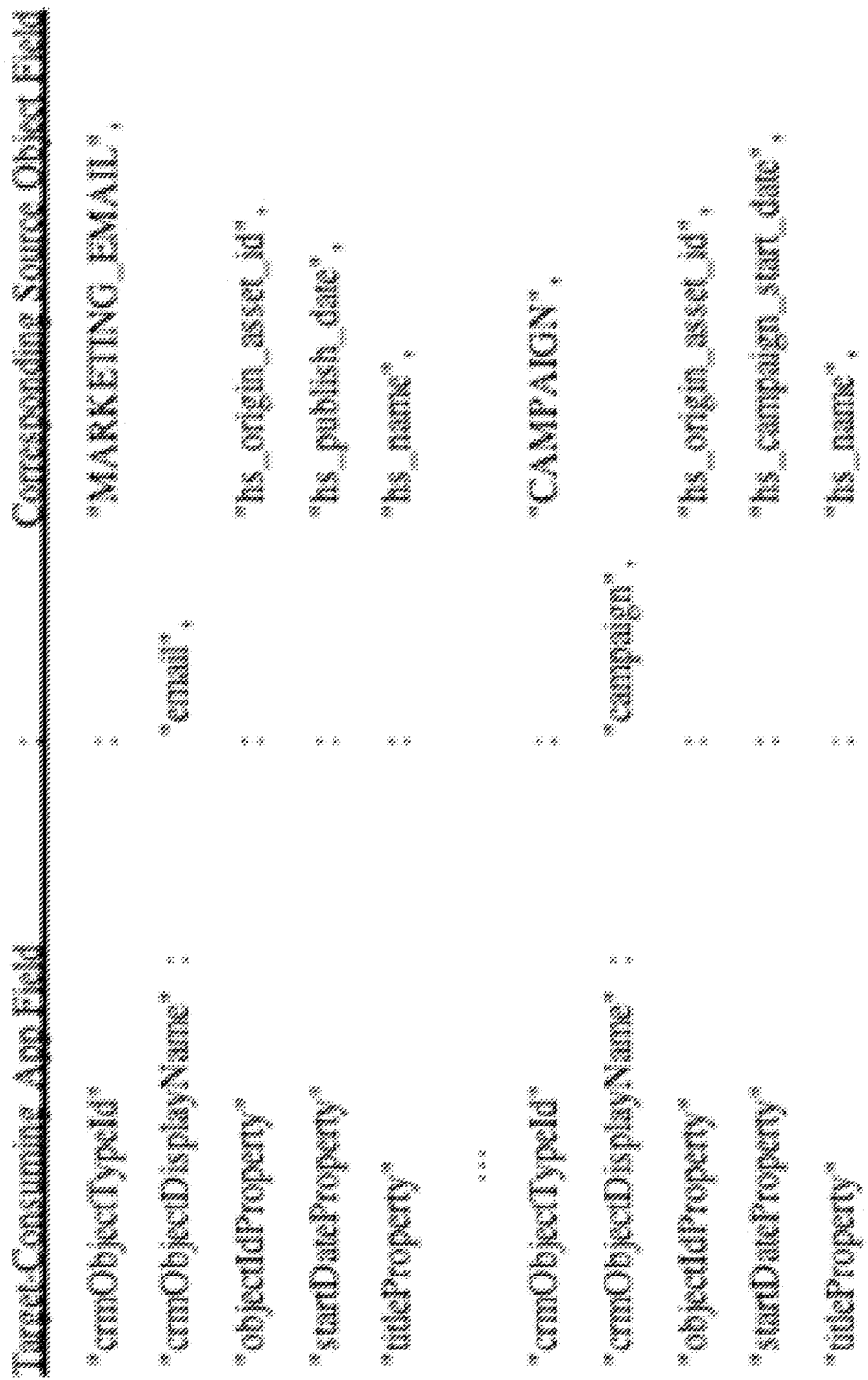

Further, in this registration pattern example for use by a calendar application, a calendar application may request registration definition element(s) configured to facilitate onboarding of calendar events based on select object (types/assets) in the CRM, such as blog posts, landing pages, social media posts, etc. A CRM-interface portion of the calendar application, or optionally a CRM-interface service of the CRM such as a CRM-specific API, may use the information that identifies each registration element instance in each registration definition element to identify assets in the CRM to be accessed. In some embodiments, a calendar application may target a specific CRM asset when requesting the registration definition element(s), such as when a user may adjust a view of the calendar to include an asset not currently rendered in the calendar. Content of the targeted assets may be retrieved and values from fields identified in a corresponding registration element instance may be selected and configured for delivery to the calendar application. Configuring these selected values may include generating a data set that attributes each selected value to a specific field/attribute of the calendar application. In the example of FIG. 32, a value of the CAMPAIGN asset field "hs_campaign_start_date" for a selected CRM asset may be attributed to the calendar required field "startDateProperty". The calendar then may use this value to render the CAMPAIGN asset on the proper date in the calendar.

FIG. 33 provides an example of a registration definition element instance for rendering a MARKETING_EMAIL asset with a Calendar application. The left column indicates the required calendar function attribute fields to be populated for rendering the asset. The right column indicates the field in the MARKETING_EMAIL asset from which a value for the corresponding calendar function attribute field may be obtained.

Further, in the example of FIG. 33, the MARKETING_E-MAIL registration definition element instance may be enabled for use by the calendar or disabled for use. The value in the registration definition element instance entry labeled "isEnabled" may be used for such a purpose. When the entry labelled "isEnabled" given a value of "true" as depicted in FIG. 10, then the calendar application may render CRM objects of the type "MARKETING_EMAIL". If the same entry value was not "true" (e.g., "false"), then the calendar application may not render CRM objects of the type "MARKETING_EMAIL".

In some embodiments, registration definitions may facilitate distinguishing between two different variants of an object type. In the example of FIG. 10, the specific variant of object type "MARKETING_EMAIL" to which this registration definition applies may be an "email" variant as determined by the "crmObjectDisplayName" field. In this way, rendering of other variants of "MARKETING_E-MAIL" by the calendar application may be separately controlled.

Further, in the example of FIG. 33, the calendar field "gateName" may be configured for each registration definition element instance. Use of this field may further determine conditions under which the registration definition element instance may be utilized. When this field is "null", as is the case in FIG. 33, the registration definition element instance may be used without further gating. However, when this field is not "null", conditions associated with the "gateName" specified may be considered when determining if and how this registration definition element instance is to be used.

In some embodiments, a flow of data may be envisioned as a source stream originating at the corresponding fields in the source object, through a function that applies the registration instance mapping(s), and to a target stream that is ingested by the calendar application for rendering therein.

In some embodiments, example core objects (e.g., object types) that a calendar application (or other application) may process through the methods and systems of registration patterns described herein may include, without limitation: publishing_task/task, marketing_email/email, marketing_e-mail/recurring-email, social_broadcast/social, ad_campaign/social network ad campaign, ad_campaign/google ad campaign, blog_post/blog-post, marketing_event/marketing event, ad_group/social network ad group, site_page/site-page, landing_page/landing-page, campaign/campaign, etc.

A user interface is provided through which registration definitions for a calendar application may be selected for onboarding a corresponding CRM asset/object. The highlighted drop-down list may be used to select one or more asset types to be rendered in the calendar. Selection (e.g., checking a corresponding checkbox in the drop-down list) may cause a CRM fetching service to access a corresponding registration instance within a registration definition element for the calendar application. In the example of, all of the available event types may be selected. For the remainder of this example, the event type such as a social network ad group (SNAG) is referenced. In some embodiments, the CRM fetching service may access corresponding registration instances for SNAG event type. In some embodiments, the fetching service (or the like) may proceed to retrieve data from each SNAG object in the CRM, apply the registration instance mappings for a SNAG object type, and deliver the resulting content to the calendar application. The result may include one or more lead generation ads rendered on the calendar. The processes described in this example may leave the source object(s) (e.g., all SNAG-type objects) in the CRM database unchanged, while ensuring that each may be properly rendered in the calendar.

Registration Patterns—Associations Embodiments

In some embodiments, registration patterns may include a variant referred to herein as registration associations. Registration associations may facilitate, among other things, maintaining consistency across objects within a multi-service business platform database, such as a customer relationship management (CRM) database. Registration associations may facilitate adding new associations among objects and/or updating existing associations based on actions on or within the CRM. In some embodiments, existing associations may be cleared/removed or updated for maintaining consistency.

In some embodiments, registration associations may define one to one associations (among assets of the platform, such as objects of the platform) and one to many associations. In some embodiments, registration association type patterns may allow associating an object with a different type of object, such as to a campaign. The example of one to one or one to many association may include associating one blog post to one campaign in a one to one registration association relationship. In an example of changing a one-to-one relationship association, if a blog post, e.g., "the best blog post ever" is associated to a first campaign, an association status for this blog post may show that it is currently part of (e.g., associated with) this campaign. If that blog post association is changed, such as by attempting to associate it to a second campaign, through application of the methods and systems of registration association described herein, it may be removed from the first campaign because, in this example, one blog post may only be part of one campaign.

In some embodiments, an example of a many to many asset association may include association of a workflow. In this example, a user (or system process or other automated process) may add a first workflow to a first campaign. If one were to add the first workflow to a second campaign, the system may accept this second association of the first workflow without removing it from the first campaign because, in this example, one workflow may be part of multiple campaigns. In some embodiments, a control for whether or not an asset may be used in a one-to-many association may optionally be indicated by an association definition index value recorded in the registration association data structure. In an example of a registration data structure that uses a JSON syntax, this value may be retrieved from an "association ID" property of the registration association data structure.

In some embodiments, a value of an "association ID" may be used by the system to retrieve a related data structure (optionally referred to as a definition of the registration association) that may provide greater/other details of a registration instance. This related data structure may include information that determines if the asset type to which this registration instance applies (e.g., is identified in a "toObjectType" property of the instance) may be used in a one-to-many relationship.

Figure 34:
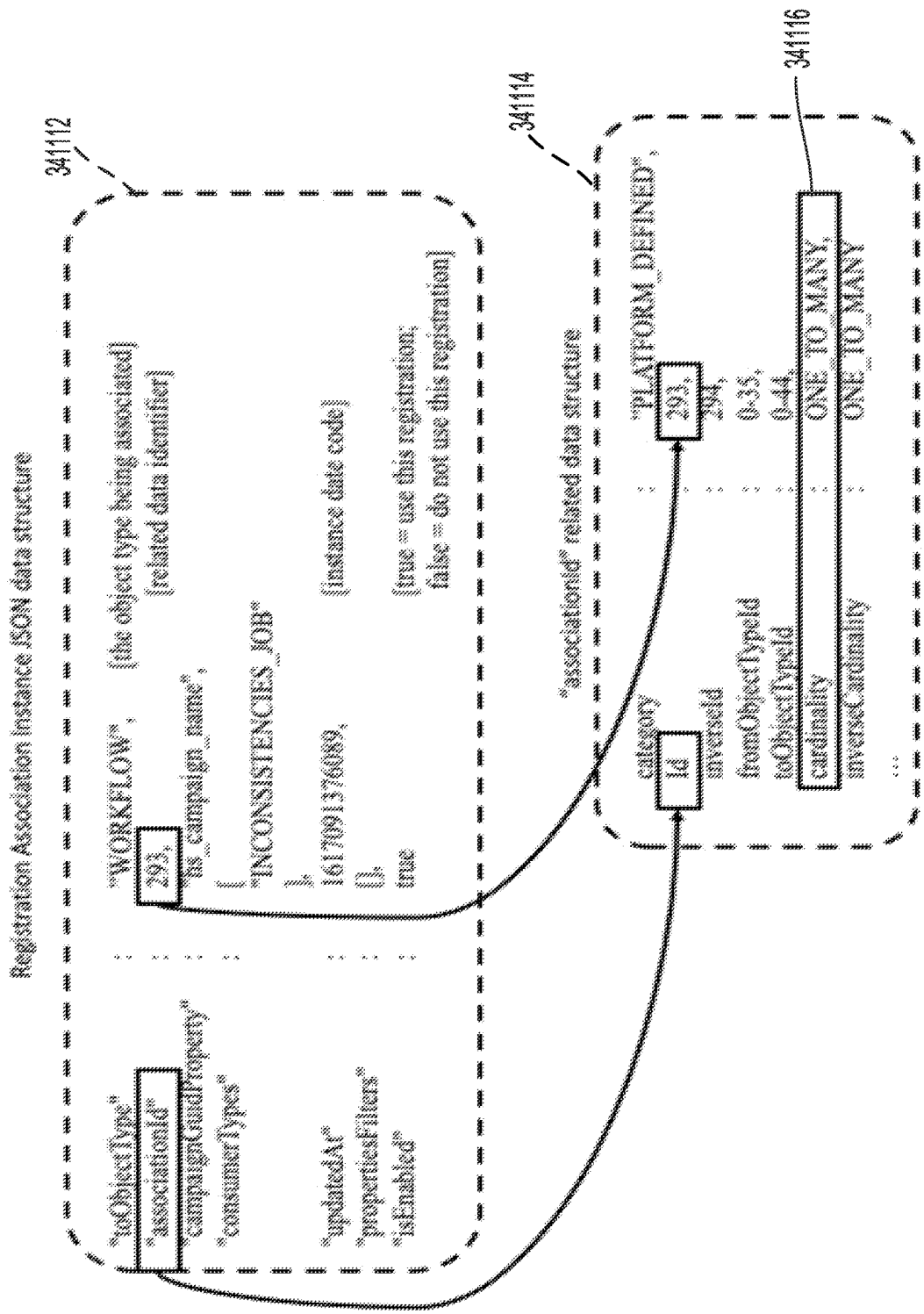

FIG. 34 depicts JSON script for a registration association and its related definition data structure(s). A registration association data structure instance 341112 may include an "associationId" with a value "293". The "associationId" may be mapped with one or more functions of the platform to an "Id" field of definition data structure 341114. In some embodiments, the platform may include such definition data structures. In the example of FIG. 34, "associationId" value "293" may be found in a corresponding "Id" field. A determination of whether objects to which registration association element instance 341112 applies may be associated through a ONE-TO-ONE or a ONE-TO-MANY arrangement is based on a value of a "cardinality" property of the definition data structure 341114. In this example, asset object type "WORKFLOW" (to which registration association element instance 341112 applies) may be arranged in a ONE-TO-MANY association relationship based on cardinality 341116 value.

In addition to handling asset association relationship modes (one-to-one and one-to-many), the association variants of registration patterns herein may be used by a CRM activity monitoring service of the platform that may be utilized to process updates to objects for consistency across the platform (e.g., updating of associations such as a blog post belongs to a particular campaign, or the particular campaign has a blog post). In some embodiments, a worker system may monitor for changes in the CRM (e.g., changes to registration definitions, campaigns, etc. that may require changes to associations). The registration association information from several object type-specific registration association element instances may be used (e.g., by the worker system) in determining specific changes (e.g., type of object, properties, and/or associations of the object) that may be required for consistency. In some embodiments, the worker system may query a source of data that may include changes to one or more objects (e.g., a CRM ingestion/activity stream and/or log) for activity associated with an object type defined in one of several registration association element instances being used by the worker system to determine if certain properties have changes (e.g., value present in property may have changed). If CRM change activity matches the information in the registration association being used by the worker system, one or more objects (e.g., campaign objects) may need to be changed based on that property change (e.g., property change may be moving of blog post from one campaign to another campaign).

In some embodiments, managing campaigns in a CRM may rely on registration definitions to facilitate processing what may be complex multi-object updates (e.g., process updates to objects to ensure associations and related aspects of a campaign stay consistent). In some embodiments, an "association" action may be based on a "registration association" as described herein that may be substantively equivalent to a database "join" operation. For example, to achieve consistency so that there is no doubt when accessing the CRM that "this blog post" belongs to this campaign, and this campaign has "this blog post" in it, registration associations that relate "this blog post" with this campaign may be used.

A worker system (e.g., a platform service) may use registration elements as the worker system listens to a stream of change events in the CRM. Worker system may also be referred to as worker service. For each event, the worker system may monitor changes to one or more object values defined by a registration association for the object type identified in the event to determine among other things how the CRM may have changed, such as how a campaign associated with the object type identified in the event may have changed. If the campaign has changed, the worker system or service may attempt to update all the associations of the campaign and keep the CRM consistent. In particular, a registration element used by that worker service may identify a type of object and what fields of the object may be monitored for changes in the event stream. Based on changes in that field, the worker system may determine which associations should be updated, which ones should be cleared out, which new ones should be created, etc. In some embodiments, the worker service or system may perform these association consistency updates independent of the object being a custom object or a standard core object. In some embodiments, how a registration element is structured (e.g., the property that it checks for) may change for each different application/use.

In some embodiments, one may use the registration associations for doing associations of assets with the campaign. In some embodiments, a registration may include a set of definitions for processing items. For example, an example registration may facilitate a worker service in determining if, in the CRM, any object of the type "automation platform flow" changes, and if a property (e.g., campaign GUID property "hs_campaign_guids") specifically changes, then the value which may be present in the change event for that property may be associated with the object that has been changed. For example, an object of type "automation platform flow" that has changed may be considered. The value of a property may have changed (e.g., campaign GUID score changed). In some embodiments, the worker service may automatically do the association of the "automation platform flow" (which has changed) with the corresponding campaign. This example of registration patterns relates to managing of associations between objects in the CRM. A type of registration association data structure for use by a worker service may include only a few sets of fields such as fields relating to object type being monitored and the field being monitored.

The worker service may use this registration element to find a type of object in the CRM (e.g., "automation platform flow") with a specific property (e.g., "hs_campaign_guids"). When the worker service finds the object of the type "automation platform flow" in the CRM, the worker service may attempt to find whether the "hs_campaign_guids" property has changed based on what is found in the CRM and what is provided in the CRM change event stream. If this property has changed, then a campaign identified by this "hs_campaign_guids" campaign value may have this "automation platform flow" associated with it. In some embodiments, the worker system, which does this monitoring for any changes in the CRM, may monitor everything that is changing in the CRM using filters that may be based on the registrations, and then may do the work of associating assets in the CRM based on what has been configured in the registration association.

In some embodiments, there may be several applications that move assets in and out of campaigns. It may require monitoring and possible adjustment of the code of these applications such as making changes to keep the associations straight and up-to-date. In other example embodiments, the CRM may emit a constant stream of events. Every time anything changes such as a definition, an object, or an object instance, there may be an event in that stream. The worker service that uses registration associations may be monitoring the stream for all of these changes. For example, if a user took a blog post and moved it from a first campaign to a second campaign, that change may generate an event in the stream. The worker service may monitor (e.g., listen) for such an event and determine that the blog post had its campaign field updated to reflect the second campaign. The worker service may check the second campaign object (that may be defined in the updated campaign field in the blog post change event) and may make sure that the second campaign object reflects the new campaign assignment. In some embodiments, such a worker service or system may be a CRM internal tool to keep the associations between objects in the CRM up-to-date. Rather than changing the database in some examples, this worker system or service may be adjusting the association (e.g., changing the graph data). In some embodiments, applications may be changing the database and may also be updating at least portions of the CRM. This registration association-based worker service/system may monitor the portion of the CRM that may be changed to determine what else in the CRM may be impacted by the change, thereby centrally implementing the change across the CRM for objects and/or object types identified in the registration association employed by the worker service. This central implementation of CRM changes through use of registration associations may eliminate the need for requiring the change be made by every individual application that may make use of the CRM.

In some embodiments, registration patterns may include variations that may facilitate updating portions of the CRM based on monitored CRM events, such as activities of sources of changes to other portions of the CRM. In some embodiments, such a registration pattern variant may be a registration association that may be configured to facilitate identifying an object type and at least one field of that object type to be monitored. When a CRM activity monitoring service, that utilizes registration associations, detects an event of the CRM that identifies an object type noted in the utilized registration association, the content of the event (e.g., what the event is causing to be accomplished in the CRM to the object type) may be checked to determine if it impacts the field of the object type defined in the registration association. When the content of the event matches both the object type and the specific field identified in the registration association object, an association CRM activity may be activated.

In some embodiments, an association CRM activity may include making conforming changes to the specified field in other instances of the object designated in the registration association. As a non-limiting example, a registration association element may be configured as depicted in FIG. 34.

An activity monitoring service may monitor CRM activity based on the registration association element of FIG. 33. The activity monitoring service may look in the monitored activity for event content that may signify that an object type "LANDING_PAGE" is being targeted for some action (e.g., reading a value in the object, writing/updating a value of one or more fields in the object, etc. When the monitored event identifies the object type "LANDING PAGE", the event may be further evaluated/monitored to determine if a specific field or fields of the object type are being acted upon by the event. In the example of FIG. 10, the registration association for the object type LANDING_PAGE indicates that actions taken in the event against object field "hs_campaign_name" are to be followed up for maintaining consistency in the CRM database. As a specific embodiment of the example of FIG. 10, when the event reflects that the object field "hs_campaign_name" is being/has been assigned a value (which is optionally the same as the current value or may be a different value than a current value), action may be taken within the CRM to ensure consistency as required based on the change.

In another example, a registration association element may identify a "blog post" field of a "campaign" object for monitoring by a CRM event activity monitoring service. When a CRM event matches this registration association element, a new value in the "blog post" field that may be defined in the event may be used to update portions of the CRM database for maintaining consistency. As another example, some (but not necessarily all) applications that have access to the CRM may be making changes that require updating the CRM. The activity monitoring service may use registration associations to determine if the change being made requires other changes in the CRM for consistency. Such an approach may reduce the burden on such applications of ensuring that CRM database consistency is maintained.

In yet another example of use of registration association elements, information in the registration association may facilitate identifying what the CRM consistency application may need to do when a specific field in a specific object type is acted upon. In some embodiments, a CRM activity event may detect where a value of an attribute in a CAMPAIGN object is changed in the CRM. There may be other CRMs that may be impacted by such a change. In some embodiments, a CRM consistency service may use the change of object information identified in the association registration to query the CRM for other (e.g., related) objects that rely on the now changed object field content. As the CRM consistency service finds other impacted objects, it may change them accordingly so that the now changed object content may be propagated to the other related objects.

In some embodiments, registration associations may be configured to facilitate monitoring CRM activity for a variety of object types including, without limitation, the following object types: landing_page/131, cta/141, blog_post/135, site_page/133, automation_patform_flow/293, ad_campaign/315, marketing_email/139, social_broadcast/305, etc.

Figure 35:
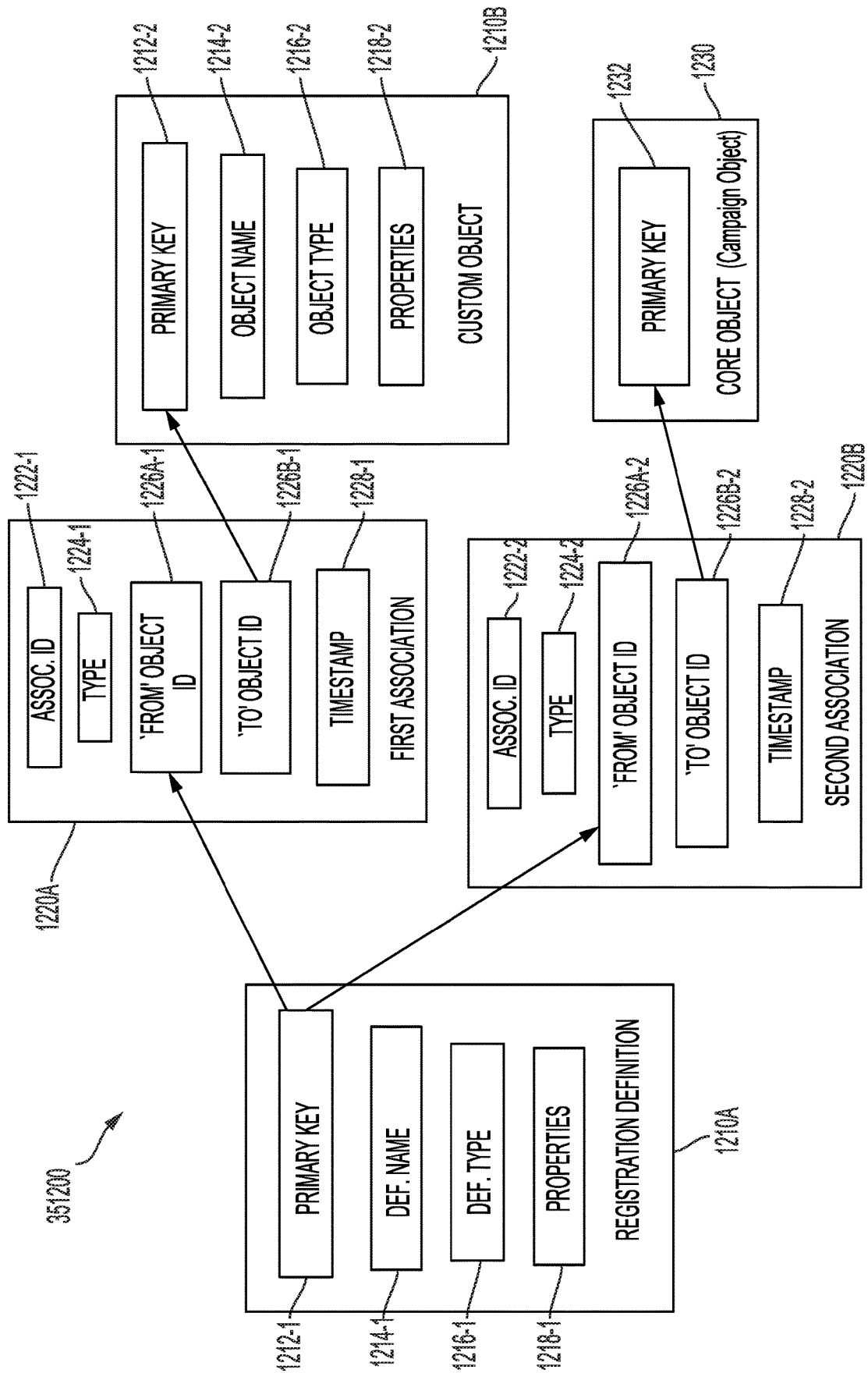

Referring to FIG. 35, an example detailed view of a registration definition and associations embodied in a registration pattern or a defined relationship of the registration definition with other objects and associations 351200. The instance or relationship 351200 may include a registration element and associations between the registration element and other objects (e.g., custom objects and/or core objects) as depicted. Registration definition 1210A may include data fields that may be useful when applied in the registration pattern methods and systems described herein. Fields of registration definition 1210A may include a primary key field 1212-1 that may be used to identify related association data structures (e.g., 1220A or 1220B) based on a correspondence of the primary key field 1212-1 with a "from"

object ID (e.g., 1226A-1 or 1226A-2) in related association data structures. A definition name 1214-1 and definition type 1216-1 may be included. Further, a set of properties 1218-1 of the registration definition 1210A may be useful for determining, for example, whether or not an instance of this registration data structure 1210A is enabled. In some embodiments, a registration definition (e.g., registration definition 1210A) may be related to one or more association data structures, such as first association 1220A and second association 1220B. In some embodiments, an association data structure may include several fields that may be referenced by the registration patterns' methods and systems described herein. Example fields may include an association ID field 1222-1/2, a type field 1224-1/2, a from object ID field 1226A-1/2, a to object ID field 1226B-1/2, and a timestamp field 1228-1/2. In the example embodiment of FIG. 35, the first association 1220A may be related to a custom object via the to object ID field 1226B-1, such as by the to object ID field 1226B-1 facilitating linking the first association data structure 1220A to a custom object 1210B. This linked custom object 1210B may include several fields including, without limitation, a primary key field 1212-2 that may facilitate linking the custom object 1210B to the first association 1220A, an object name field 1214-2, an object type filed 1216-2, and a set of object properties 1218-2. In some embodiments, the second association 1220B may be related to a core object 1230 (e.g., a campaign object) via the to object ID field 1226B-2 facilitating linking the second association data structure 1220B to a core object 1230. The linked core object 1230 may include at least one field such as a primary key field 1232 that may facilitate linking the core object 1230 to the second association 1220B.

Figure 36:
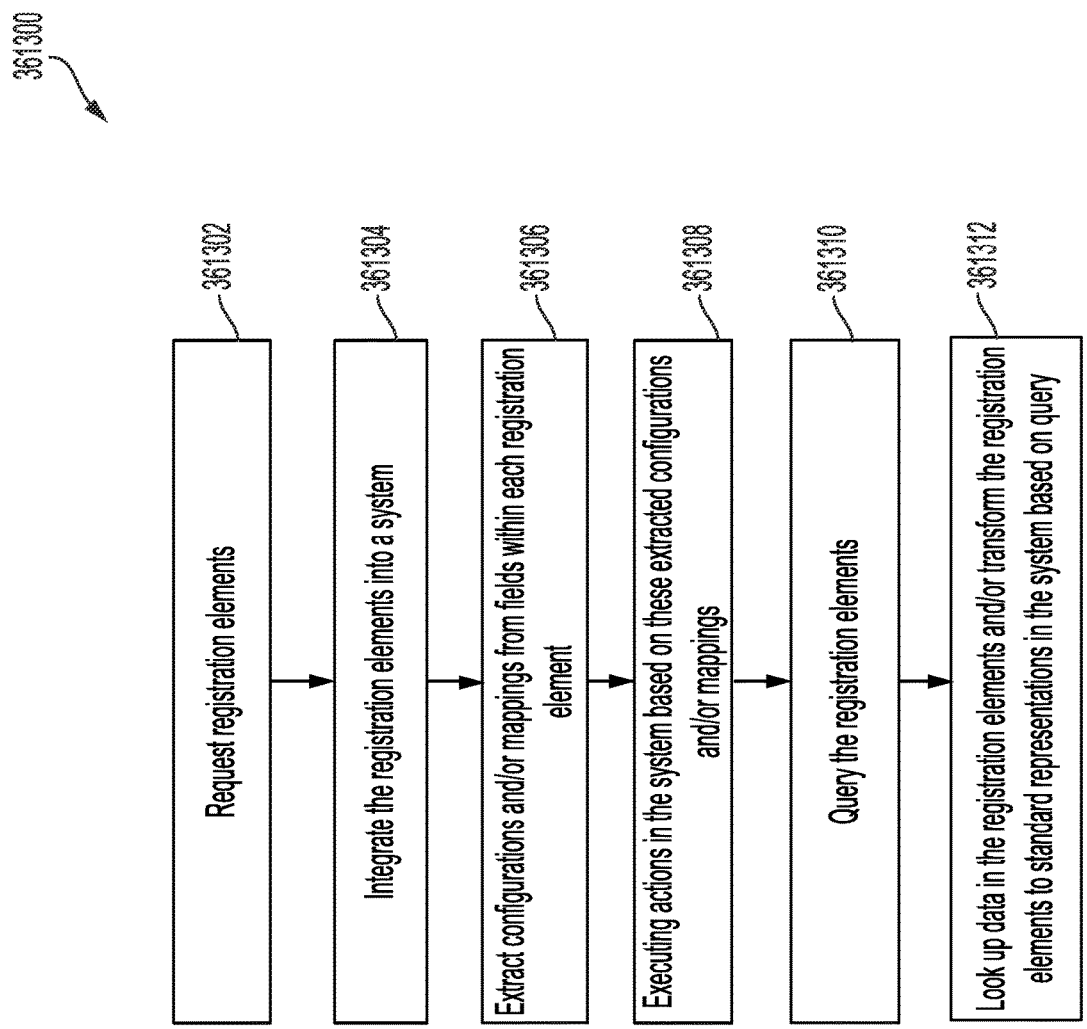
FIG. 36 is a flow chart illustrating an example of a set of operations for performing one or more of the provisions set forth herein.

In some embodiments, FIG. 36 is a registration pattern use flow diagram 361300 of an example embodiment of use of registration patterns with a service (e.g., a calendar application, an activity feed service, an asset association service, a campaign management service, etc.). The flow diagram 361300 illustrates a set of operations for using the registration system 103 (and the registration definition service) with a service (e.g., calendar system of the services 530 of the multi-service business platform 1000). At 361302, registration elements may be requested. At 361312, the registration elements may be integrated into the service and the registration elements may be used to integrate CRM object content into the service. At 361306, configurations and/or mappings may be extracted from fields within each registration element. At 361308, the service (e.g., calendar application) may execute one or more actions based on the extracted configurations and/or mappings. At 361310, registration elements and CRM objects to which the registration elements relate may be queried. At 361312, information in the queried objects may be looked up. Also, the information from the queried objects and/or the registration elements may be transformed based on information in the registration elements into standard representation content for rendering in the calendar based on the query.

Figure 37:
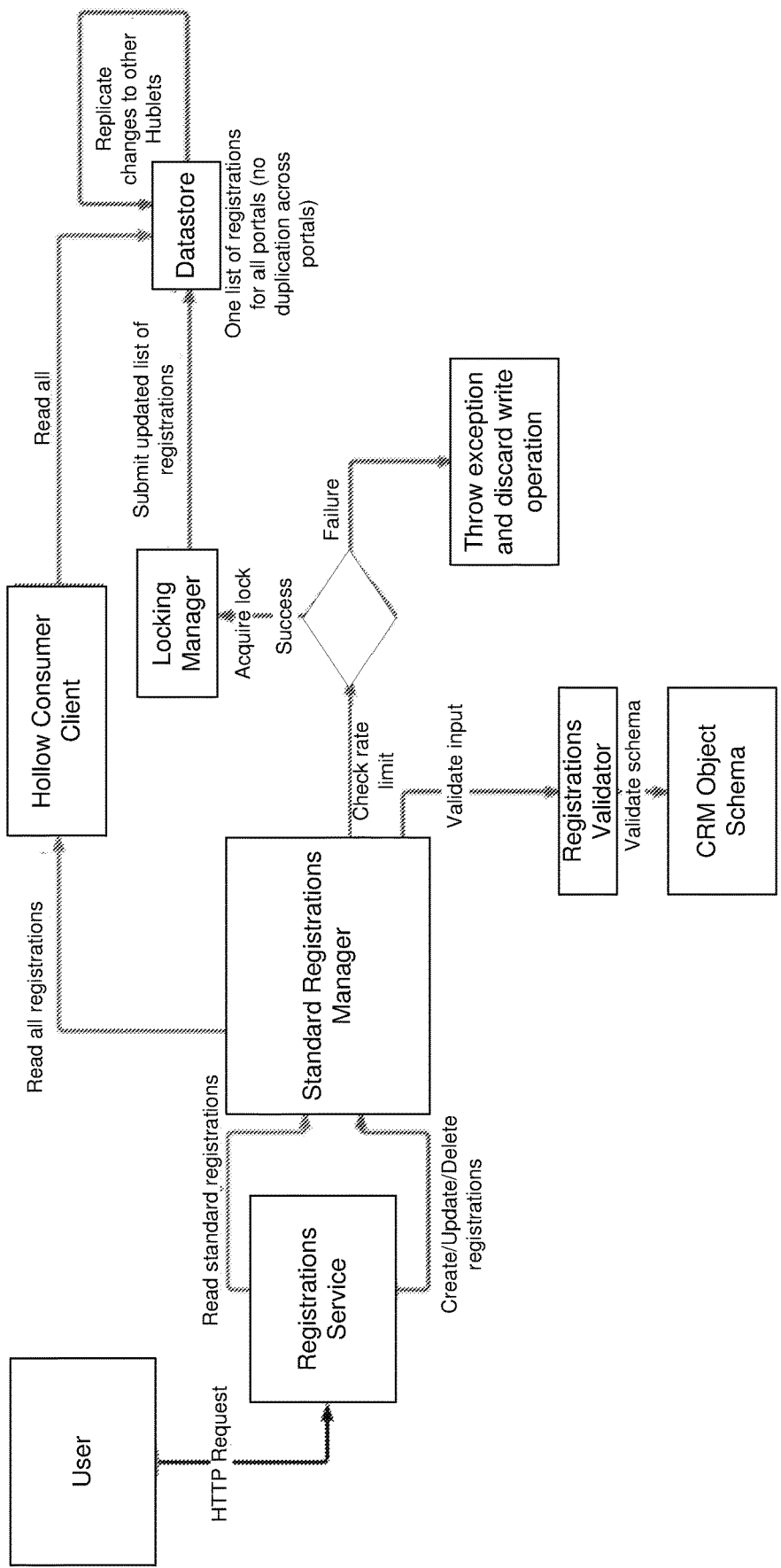
FIGS. 37-39 are block diagrams illustrating examples of computing environment wherein one or more of the provisions set forth herein may be implemented.

FIG. 37 is an example diagram 371400 for registering standard object types, according to one or more embodiments of the disclosure. A user device may submit an HTTP request to a registrations service that is configured to read standard registrations and create/update/delete registrations maintained by a standard registrations manager. The standard registrations manager validates input using a registrations validator that validates a schemed using a CRM object schema. The standard registrations manager checks a rate limit. If there is a failure, then an exception is thrown and a write operation is discarded. Otherwise, a lock is acquired from a locking manager, and an updated list of registrations is submitted to a data store. There is one list of registrations for all portals without replication across portals. Changes are replicated to other hublets. The standard registrations manager also reads registrations from the data store through a hollow consumer client component.

Figure 38:
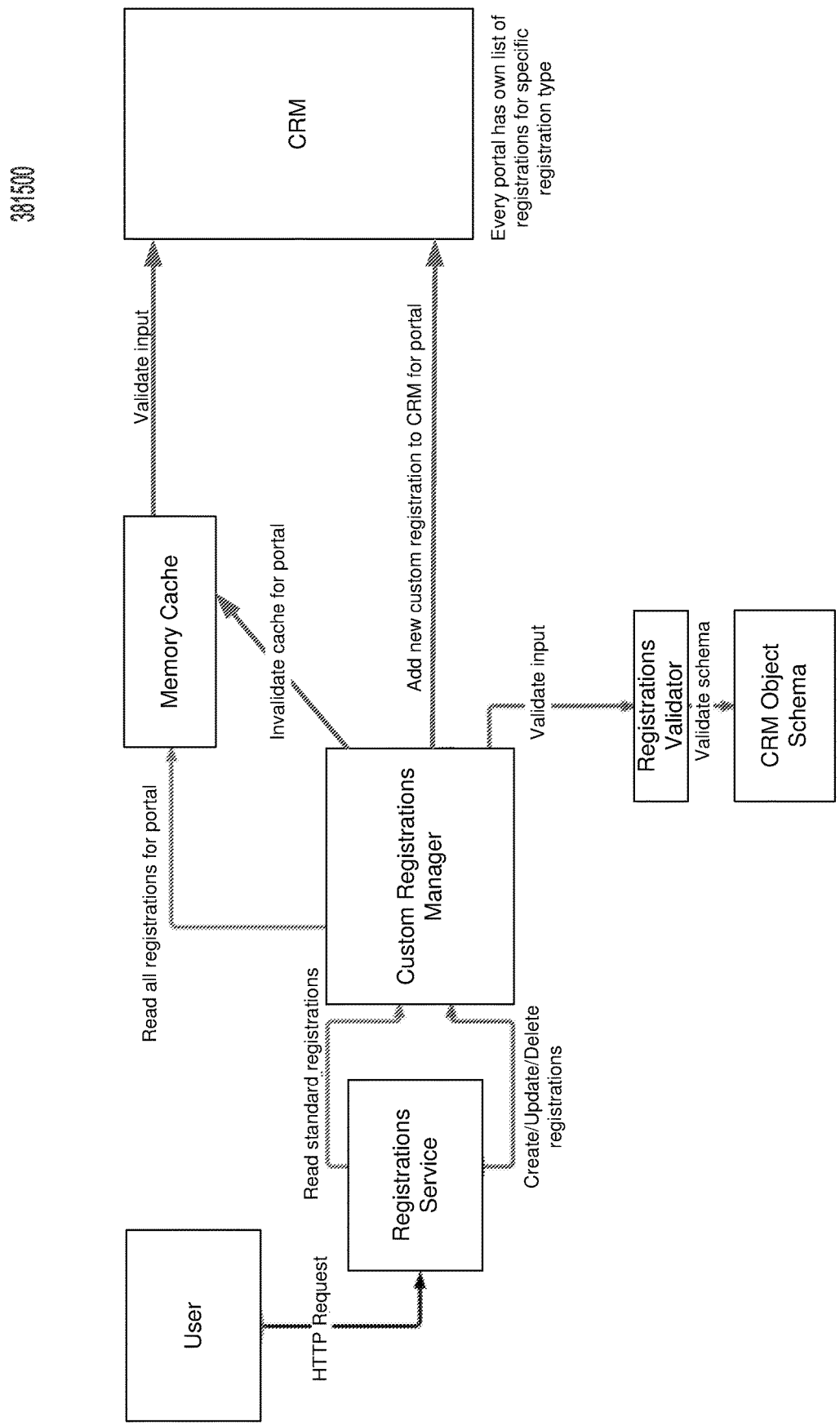

FIG. 38 is an example diagram 381500 for registering custom object types, according to one or more embodiments of the disclosure. A user device may submit an HTTP request to a registrations service that is configured to read standard registrations and create/update/delete registrations maintained by a custom registrations manager. The custom registrations manager validates input using a registrations validator that validates a schemed using a CRM object schema. The custom registrations manager reads all registrations for a portal through a memory cache that can validate input through a CRM. The custom registrations manager can invalidate cache for a portal. The custom registrations manager can add a new custom registration to the CRM for a portal. Every portal has its own list of registrations for a specific registration type.

Figure 39:
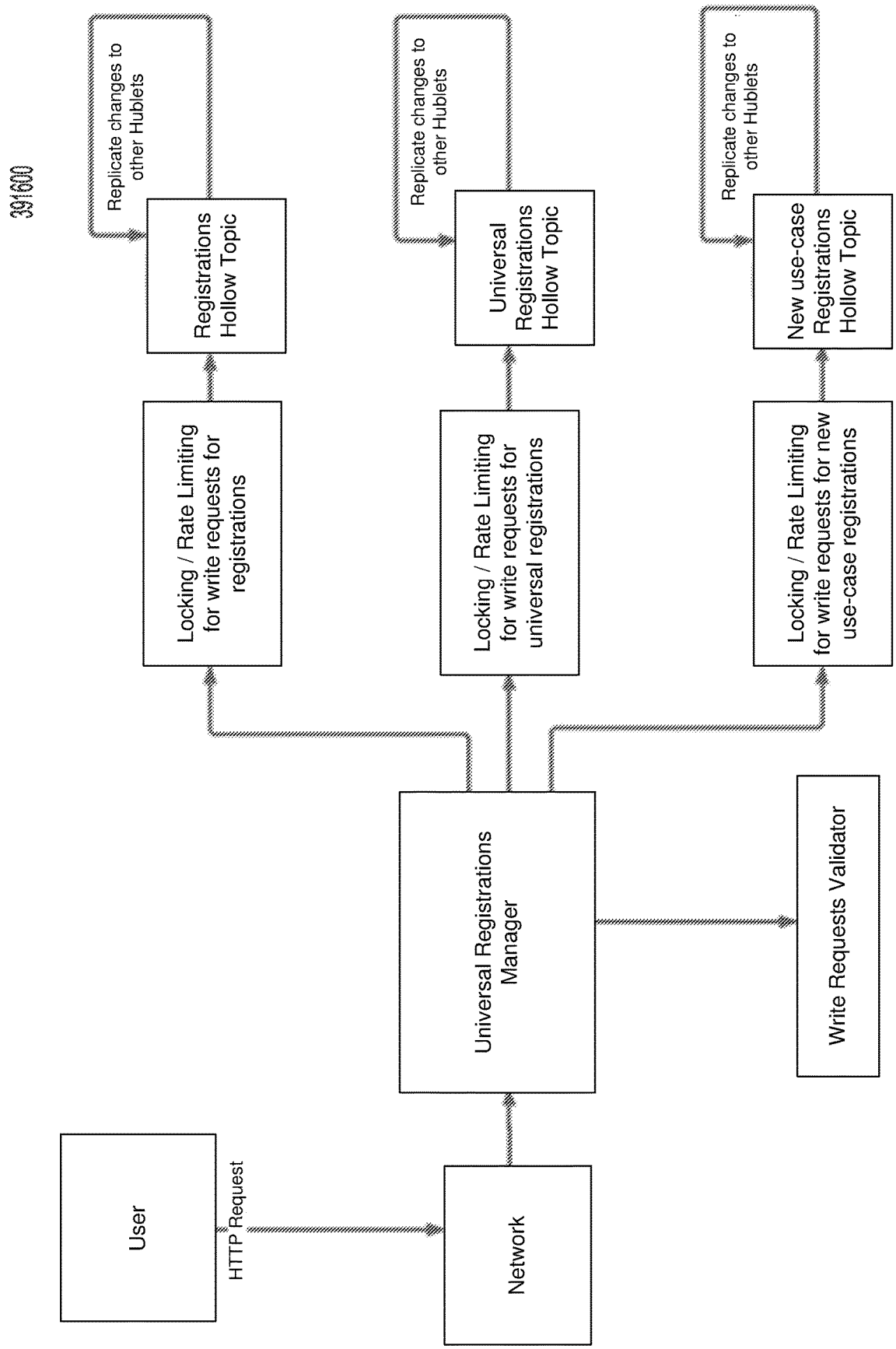

FIG. 39 is an example diagram 391600 for defining a registration model, according to one or more embodiments of the disclosure. A user device may submit an HTTP request to a universal registrations manager through a network. The universal registrations manager utilizes a write requests validator to validate write requests. The universal registrations manager performs locking and rate limiting for write requests for calendar registrations associated with a calendar registrations hollow topic where changes are replicated to other hublets. The universal registrations manager performs locking and rate limiting for write requests for universal registrations associated with a universal registrations hollow topic where changes are replicated to other hublets. The universal registrations manager performs locking and rate limiting for write requests for new user-case registrations associated with a new user case registrations hollow topic where changes are replicated to other hublets.

Registration Definition Use Cases

In some embodiments, example applications of registration definition use may include being used with a calendar system (e.g., internal calendar application) and/or a campaign system. As described herein, registration definitions may be used to display scheduling of advertisements on a platform calendar. In some embodiments, these registration definitions may be tied to a payment system (e.g., allowing for payments for events using the payment system or tool).

In some embodiments, use of registration definitions with an analytics system may facilitate determining analytics from CRM activity, such as the number of clicks during an advertisement published on a CRM calendar. In some embodiments, examples may include use of the registration patterns methods and systems described herein to create CRM events such as counting of clicks. The registration definitions may be used with an analytics system to process events for monitoring activities related to the events (e.g., who signed in for an event that the customer is running for their product). Potential touch points may include who is registering, how did they register, what source did they register from, etc. (e.g., relating to signing up for events such as hosting webinars).

There may other examples for use of registration definitions. In some embodiments, a CRM analytics system may be used to determine, for example, how many times a blog post has been clicked through the use of registration definitions to create CRM blog post click events. Another example use case may include an online university use of course objects with corresponding registration definitions to facilitate integration of the course objects into the calendar system and/or the campaign system. Yet another use case for registration patterns may include use in attribution reporting systems.

One of the potential benefits of registration patterns is that third-parties may not be forced to adhere to a unique standard (e.g., one that may be different than the third-party's standard) when third parties create their own (e.g., custom) objects and use them within the multi-service business platform CRM. This may relate to third-party CRM use/access examples. The methods and systems of registration patterns described herein may provide benefits to third-party CRM use and access. In an example, a customer may define a custom class CRM object that they have been using for a period of time (e.g., one or two years or more). In this example, when the customer finds a vendor (e.g., with a system/service that they want to use with their custom class CRM objects), there is no need for either the customer or the vendor to change their systems—both may keep their objects as they were and the vendor may keep their system in place. If the vendor or the customer uses the example registration pattern methods and systems, interfacing between the customer custom class CRM and the vendor may be done through automatically transforming data without requiring any new code to run. In some embodiments, registration patterns, such as registration definitions may allow for custom object use and creation by third parties. The registration patterns (and supporting CRM access APIs) may be configured with external endpoints through which third parties may access the CRM for their own tools in order to, among other things, visualize custom registration patterns, create new elements or objects, update custom objects in the CRM, etc. Also, a customer may operate an external CRM system and may want to use the systems and processes of registration patterns to map these external CRM objects to objects and/or services of the multi-service business platform CRM. This may be accomplished by defining a set of registration patterns that may facilitate mapping the external CRM object properties to internal CRM object properties and use this set of registration patterns during exchange of data between the systems. In some embodiments, exchange of data between a CRM and external systems may include transforming data based on applied registration patterns (e.g., registration definitions). Transforming may include converting objects (or portions thereof) in the external system to be compatible with objects (or corresponding portions thereof) in the CRM. Registration patterns may also facilitate transforming data for compatibility when transferring CRM objects to the external system.

Through the methods and systems of registration association described herein, a range of CRM-centric capabilities may be enabled. In one example, a metering service may be configured to use registration associations to facilitate monetizing a CRM. Such a metering service may be configured to detect when CRM activity events, such as events by third parties, match a monetizing criteria (e.g., accessing certain fields of certain objects). Based on a CRM access arrangement with the example third party, the metering service may track and count such accesses to form a basis for payment by the third party, etc. In another example, registration associations may be utilized by a CRM analytics service for, among other things, tracking activity within the CRM, such as for maintaining a log of access by specific users, services, etc. Tracking may facilitate analytics pertaining to who is registering/accessing the CRM, what access portal did they use, what source device did they register from, what portion of the CRM are they accessing (e.g., users signing up for events offered through the multi-service business platform), etc. Further, such an analytics system may facilitate adapting allocation to and usage of computing, network, and storage resources for the CRM based on a result of such analysis. If a distal portion of the CRM appears to be accessed frequently by local resources, changes in where the distal portion is stored may occur (e.g., move a highly accessed portion to a storage system that is physically closer to a point of use).

In some embodiments, use of registration associations to monitor CRM activity may cause CRM events, such as analytics that may, for example, increment a "view" counter for a blog post. In some embodiments, if the monitored event identifies that a blog post has been accessed (e.g., retrieved for viewing), the monitoring service that detects this event may update a "view_count" field of the blog post object.

Registration associations may also be applied to tracking application activity within a CRM, such as when new assets are on-boarded to a calendar (e.g., when higher education users post new educational class objects that trigger onboarding to the calendar, or when an ad campaign is changed such as a blog posting service requiring access to blog posts registered in the CRM, etc.). Yet further, registration associations may be utilized in attribution reporting systems, etc.

Figure 40:
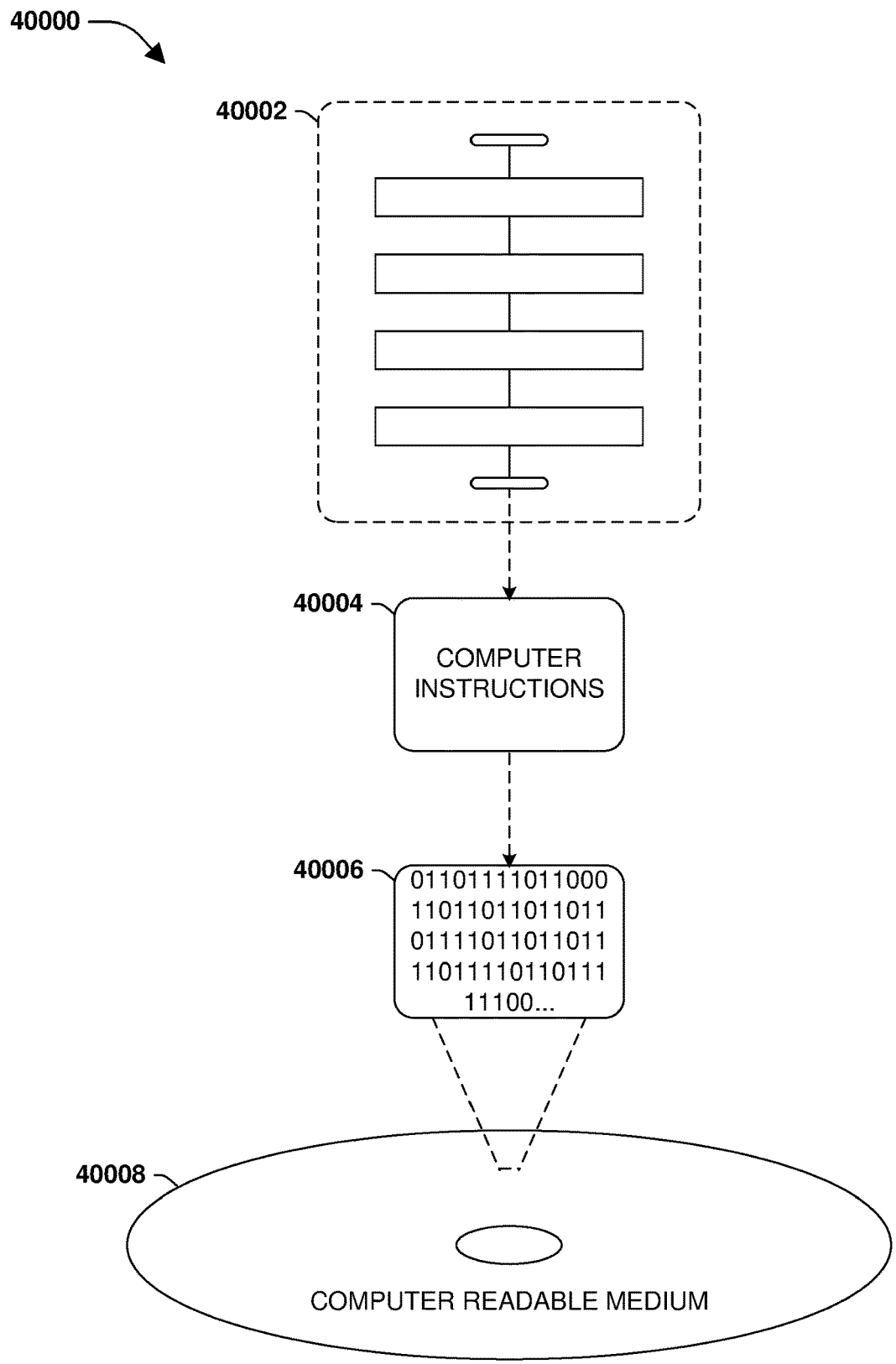
FIG. 40 is an example of a computer readable medium in which an embodiment of the present technology may be implemented.

A computer-readable medium comprises processor-executable instructions configured to implement one or more of the techniques presented herein. An example embodiment of a computer-readable medium or a computer-readable device is illustrated in FIG. 40, wherein the implementation 40000 comprises a computer-readable medium 40008, such as a CD-R, DVD-R, flash drive, a platter of a hard disk drive, etc., on which is encoded computer-readable data 40006. This computer-readable data 40006, such as binary data comprising at least one of a zero or a one, in turn comprises a set of computer instructions 40004 configured to operate according to one or more of the principles set forth herein. In some embodiments, the processor-executable computer instructions 40004 are configured to perform a method 40002, for example. In some embodiments, the processor-executable instructions 40004 are configured to implement a system, for example. Many such computer-readable media are devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims. As used in this application, the terms "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. A component may reside within a process and/or thread of execution and a component may be localized on one computer and/or distributed between two or more computers. Furthermore, the claimed subject matter may be implemented as a method, apparatus, or article of manufacture using programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Many modifications may be made to this configuration without departing from the scope or spirit of the claimed subject matter.

Figure 41:
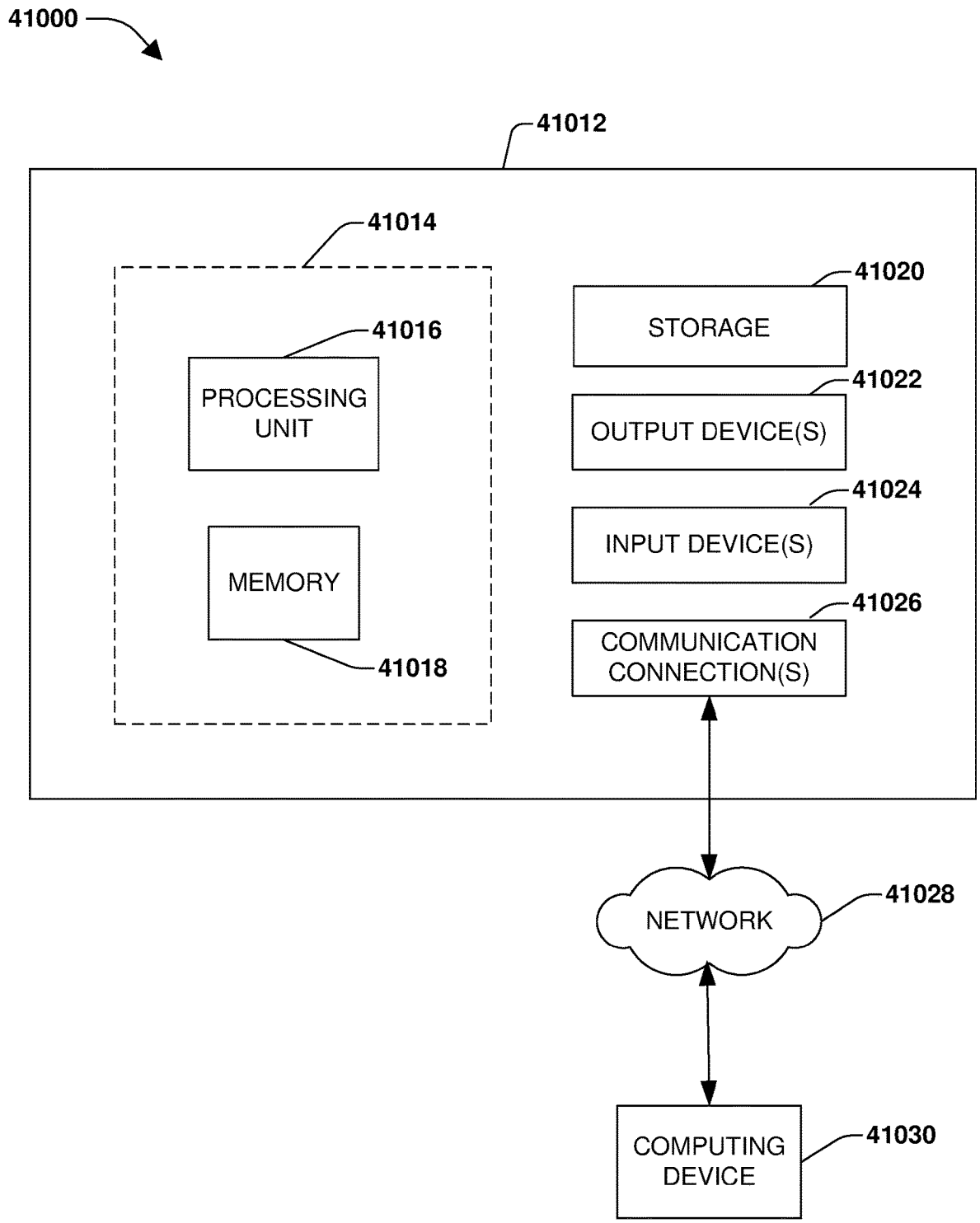
FIG. 41 illustrates an exemplary computing environment wherein one or more of the provisions set forth herein may be implemented.

FIG. 41 and the following discussion provide a brief, general description of a suitable computing environment to implement embodiments of one or more of the provisions set forth herein. The operating environment of FIG. 41 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like. Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 41 illustrates an example of a system 41000 comprising a computing device 41012 configured to implement one or more embodiments provided herein. In one configuration, computing device 41012 includes at least one processing unit 41016 and memory 41018. Depending on the exact configuration and type of computing device, memory 41018 may be volatile (such as RAM, for example), non-volatile (such as ROM, flash memory, etc., for example) or some combination of the two. This configuration is illustrated in FIG. 41 by dashed line 41014. In other embodiments, device 41012 may include additional features and/or functionality. For example, device 41012 may also include additional storage (e.g., removable and/or non-removable) including, but not limited to, magnetic storage, optical storage, and the like. Such additional storage is illustrated in FIG. 41 by storage 41020. In one embodiment, computer readable instructions to implement one or more embodiments provided herein may be in storage 41020. Storage 41020 may also store other computer readable instructions to implement an operating system, an application program, and the like. Computer readable instructions may be loaded in memory 41018 for execution by processing unit 41016, for example. The term "computer readable media" as used herein includes computer storage media. Computer storage media includes volatile and nonvolatile, removable and non-removable media implemented in any method or technology for storage of information such as computer readable instructions or other data. Memory 41018 and storage 41020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 41012. Computer storage media does not, however, include propagated signals. Rather, computer storage media excludes propagated signals. Any such computer storage media may be part of device 41012.

Device 41012 may also include communication connection(s) 41026 that allows device 41012 to communicate with other devices. Communication connection(s) 41026 may include, but is not limited to, a modem, a Network Interface Card (NIC), an integrated network interface, a radio frequency transmitter/receiver, an infrared port, a USB connection, or other interfaces for connecting computing device 41012 to other computing devices. Communication connection(s) 41026 may include a wired connection or a wireless connection. Communication connection(s) 41026 may transmit and/or receive communication media. The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal. Device 41012 may include input device(s) 41024 such as keyboard, mouse, pen, voice input device, touch input device, infrared cameras, video input devices, and/or any other input device. Output device(s) 41022 such as one or more displays, speakers, printers, and/or any other output device may also be included in device 41012. Input device(s) 41024 and output device(s) 41022 may be connected to device 41012 via a wired connection, wireless connection, etc. In one embodiment, an input device or an output device from another computing device may be used as input device(s) 41024 or output device(s) 41022 for computing device 41012. Components of computing device 41012 may be connected by various interconnects, such as a bus. Components of computing device 41012 may be interconnected by a network. For example, memory 41018 may be comprised of multiple physical memory units located in different physical locations interconnected by a network. For example, a computing device 41030 accessible via a network 41028 may store computer readable instructions to implement one or more embodiments provided herein.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments. Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object. Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising". Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    crawling a primary online content object to create a set of results from the crawling;
    parsing the set of results to generate key phrases and a content corpus from the primary online content object;
    processing the key phrases and the content corpus to create topic clusters which arrange topics within the primary online content object around a core topic based on semantic similarity;
    generating a suggested topic that is similar to a topic of the topic clusters, wherein the suggested topic is generated based upon a competitiveness criteria corresponding to a measure of how a domain of an enterprise will be ranked for a term used to create the suggested topic, wherein the suggested topic is stored within a topic cluster data store;
    generating, by an application, a strategy for development of online presence content, wherein the application includes a set of tools for exploring and selecting suggested topics stored in the topic cluster data store for generating the online presence content that is linked to the primary online content object by a cluster of semantically related content, wherein a subtopic is identified and recommended through the application for a selected suggested topic based upon the subtopic being validated using scoring metrics and a similarity of the subtopic to the core topic; and
    providing a list of the suggested topics that are of highest semantic relevance for the enterprise based on the parsing of the set of results from the crawling.

2. The method of claim 1, comprising:
    executing an Artificial Intelligence/Machine Learning (AI/ML) concierge to host a chat interface through which content is displayed.

3. The method of claim 1, comprising:
    displaying, through the application, enrichment information through a sidebar component.

4. The method of claim 1, comprising:
    populating, using a conversation agent, a customer chat utilizing the suggested topic.

5. The method of claim 1, comprising:
    updating a knowledge graph with a new relationship between an entity and a new entity, wherein the application utilizing the knowledge graph generate a personalized message for an individual.

6. The method of claim 1, comprising:
    configuring a client-specific service system that includes the application for processing tickets utilizing a ticket pipeline.

7. The method of claim 1, comprising:
    hosting the application as a machine learning-as-a service system that generates inference outcomes in response to inference requests.

8. The method of claim 1, wherein the application is provided with access to a customer relationship management system, and wherein the method comprises:
    creating, by the application, a custom object within the customer relationship management system.

9. The method of claim 1, wherein the application is provided with access to a customer relationship management system, and wherein the method comprises:
    creating, by the application, an event record for a primary object stored within the customer relationship management system, wherein the event record associates an event type with the primary object.

10. A computing device comprising:
    a memory comprising machine executable code; and
    a processor coupled to the memory, the processor configured to execute the machine executable code to cause the processor to perform operation comprising:
        crawling a primary online content object to create a set of results from the crawling;
        parsing the set of results to generate key phrases and a content corpus from the primary online content object;
        processing the key phrases and the content corpus to create topic clusters which arrange topics within the primary online content object around a core topic based on semantic similarity;
        generating a suggested topic that is similar to a topic of the topic clusters, wherein the suggested topic is generated based upon a competitiveness criteria corresponding to a measure of how a domain of an enterprise will be ranked for a term used to create the suggested topic, wherein the suggested topic is stored within a topic cluster data store;
        generating, by an application, a strategy for development of online presence content, wherein the application includes a set of tools for exploring and selecting suggested topics stored in the topic cluster data store for generating the online presence content that is linked to the primary online content object by a cluster of semantically related content, wherein a subtopic is identified and recommended through the application for a selected suggested topic based upon the subtopic being validated using scoring metrics and a similarity of the subtopic to the core topic; and providing a list of the suggested topics that are of highest semantic relevance for the enterprise based on the parsing of the set of results from the crawling.

11. The computing device of claim 10, wherein the operations comprise:
generating, by the application, conversation information derived from a conversation recording.

12. The computing device of claim 10, wherein the operations comprise:
generating, by the application, a workflow associated with an event, wherein the workflow is triggered based upon an occurrence of the event.

13. The computing device of claim 10, wherein the application is provided with access to a customer relationship management system, and wherein the operations comprise:
propagating, by the application, a property change to a corresponding property of an object stored by the customer relationship management system, wherein the property change corresponds to an object type of a change event matched to a list of registration associations.

14. The computing device of claim 10, wherein the application is provided with access to a customer relationship management system, and wherein the operations comprise:
generating, by the application, concatenated information to track a campaign using an urchin tracking module.

15. A non-transitory machine-readable storage medium comprising instructions that when executed by a machine, causes the machine to perform operations comprising:
crawling a primary online content object to create a set of results from the crawling;
parsing the set of results to generate key phrases and a content corpus from the primary online content object;
processing the key phrases and the content corpus to create topic clusters which arrange topics within the primary online content object around a core topic based on semantic similarity;
generating a suggested topic that is similar to a topic of the topic clusters, wherein the suggested topic is generated based upon a competitiveness criteria corresponding to a measure of how a domain of an enterprise will be ranked for a term used to create the suggested topic, wherein the suggested topic is stored within a topic cluster data store;
generating, by an application, a strategy for development of online presence content, wherein the application includes a set of tools for exploring and selecting suggested topics stored in the topic cluster data store for generating the online presence content that is linked to the primary online content object by a cluster of semantically related content, wherein a subtopic is identified and recommended through the application for a selected suggested topic based upon the subtopic being validated using scoring metrics and a similarity of the subtopic to the core topic; and
providing a list of the suggested topics that are of highest semantic relevance for the enterprise based on the parsing of the set of results from the crawling.

16. The non-transitory machine-readable storage medium of claim 15, wherein the operations comprise:
executing an Artificial Intelligence/Machine Learning (AI/ML) concierge to host a chat interface through which content is displayed.

17. The non-transitory machine-readable storage medium of claim 15, wherein the operations comprise:
displaying, through the application, enrichment information through a sidebar component.

18. The non-transitory machine-readable storage medium of claim 15, wherein the operations comprise:
populating, using a conversation agent, a customer chat utilizing the suggested topic.

19. The non-transitory machine-readable storage medium of claim 15, wherein the operations comprise:
updating a knowledge graph with a new relationship between an entity and a new entity, wherein the application utilizing the knowledge graph generate a personalized message for an individual.

20. The non-transitory machine-readable storage medium of claim 15, wherein the operations comprise:
configuring a client-specific service system that includes the application for processing tickets utilizing a ticket pipeline.

* * * * *